US008201096B2

(12) United States Patent
Robert et al.

(10) Patent No.: US 8,201,096 B2
(45) Date of Patent: Jun. 12, 2012

(54) BROWSING OR SEARCHING USER INTERFACES AND OTHER ASPECTS

(75) Inventors: Julien Robert, Paris (FR); Cedric Bray, Vincennes (FR); Thomas Goossens, Paris (FR)

(73) Assignee: Apple Inc., Cupertino, CA (US)

(*) Notice: Subject to any disclaimer, the term of this patent is extended or adjusted under 35 U.S.C. 154(b) by 669 days.

(21) Appl. No.: 11/760,759

(22) Filed: Jun. 9, 2007

(65) Prior Publication Data

US 2008/0307343 A1 Dec. 11, 2008

(51) Int. Cl.
*G06F 3/048* (2006.01)
*G06F 3/00* (2006.01)

(52) U.S. Cl. ........ 715/767; 715/713; 715/732; 715/757; 715/850

(58) Field of Classification Search .................. 715/713, 715/732, 757, 767, 850
See application file for complete search history.

(56) References Cited

U.S. PATENT DOCUMENTS 4,847,781 A 7/1989 Brown et al.
5,303,388 A 4/1994 Kreitman et al.
5,345,543 A 9/1994 Capps et al.
5,396,590 A 3/1995 Kreegar
5,404,316 A 4/1995 Klingler et al.
5,452,414 A 9/1995 Rosendahl et al.
5,463,725 A 10/1995 Henckel et al.
5,555,354 A 9/1996 Strasnick et al.
5,586,237 A 12/1996 Baecker
5,831,617 A 11/1998 Bhukhanwala
5,838,326 A 11/1998 Card et al.
5,864,868 A 1/1999 Contois
5,880,733 A 3/1999 Horvitz
5,960,448 A 9/1999 Reichek et al.
5,974,549 A 10/1999 Golan
6,006,227 A 12/1999 Freeman et al.
6,023,275 A 2/2000 Horvitz et al.
6,064,380 A 5/2000 Swenson et al.
6,202,061 B1 3/2001 Khosla et al.
6,215,523 B1 4/2001 Anderson
6,262,724 B1 7/2001 Crow et al.
6,262,732 B1 * 7/2001 Coleman et al. .............. 715/835
6,295,062 B1 9/2001 Tada et al.
6,346,951 B1 2/2002 Mastronardi (Continued)

FOREIGN PATENT DOCUMENTS

EP 1 148 412 A2 10/2001

(Continued)

OTHER PUBLICATIONS

Andrew Coulter Enright "The Fliptych Interface" The treehouse + the cave, Aug. 6, 2006 2 pages.*

(Continued)

*Primary Examiner* — William Bashore
*Assistant Examiner* — Andrea Long
(74) *Attorney, Agent, or Firm* — Jones Day

(57) ABSTRACT

User interfaces for browsing and/or searching are described. In one embodiment, a method includes displaying a first display area for display representations of documents matching a search query, the first display area configured to display content of the documents which can have a plurality of different types of content including at least one of text-based content and a folder, and displaying a second display area for selecting a selected document to be displayed in the first display area. Other embodiments are also described, and computer readable media and apparatuses are also described.

18 Claims, 95 Drawing Sheets

U.S. PATENT DOCUMENTS

| | | | |
|---|---|---|---|
| 6,401,097 | B1 | 6/2002 | McCotter et al. |
| 6,448,987 | B1 | 9/2002 | Easty et al. |
| 6,486,895 | B1 | 11/2002 | Robertson et al. |
| 6,489,951 | B1 | 12/2002 | Wong et al. |
| 6,519,568 | B1 | 2/2003 | Harvey et al. |
| 6,564,383 | B1 | 5/2003 | Combs et al. |
| 6,577,330 | B1 | 6/2003 | Tsuda et al. |
| 6,613,101 | B2 | 9/2003 | Mander et al. |
| 6,618,733 | B1 | 9/2003 | White et al. |
| 6,638,313 | B1 | 10/2003 | Freeman et al. |
| 6,654,030 | B1 | 11/2003 | Hui |
| 6,654,754 | B1 | 11/2003 | Knauft et al. |
| 6,667,751 | B1 | 12/2003 | Wynn et al. |
| 6,725,427 | B2 | 4/2004 | Freeman et al. |
| 6,760,721 | B1 | 7/2004 | Chasen et al. |
| 6,768,999 | B2 | 7/2004 | Prageri et al. |
| 6,868,225 | B1 | 3/2005 | Brown et al. |
| 6,876,729 | B1 | 4/2005 | Kuter et al. |
| 6,889,001 | B1 | 5/2005 | Nikaido et al. |
| 6,914,551 | B2 | 7/2005 | Vidal |
| 6,944,819 | B2 | 9/2005 | Banatwala et al. |
| 6,975,306 | B2 | 12/2005 | Hinckley et al. |
| 6,990,671 | B1 | 1/2006 | Evans et al. |
| 7,032,177 | B2 | 4/2006 | Novak et al. |
| 7,085,590 | B2 | 8/2006 | Kennedy et al. |
| 7,085,761 | B2 | 8/2006 | Shibata |
| 7,096,431 | B2 | 8/2006 | Tambata et al. |
| 7,143,102 | B2 | 11/2006 | Fiennes et al. |
| 7,146,388 | B2 | 12/2006 | Stakutis et al. |
| 7,162,466 | B2 | 1/2007 | Kaasten et al. |
| 7,162,488 | B2 | 1/2007 | DeVorchik et al. |
| 7,205,471 | B2 | 4/2007 | Looney et al. |
| 7,318,047 | B1 | 1/2008 | Foth et al. |
| 7,333,982 | B2 | 2/2008 | Bakalash et al. |
| 7,392,248 | B2 | 6/2008 | Bakalash et al. |
| 7,437,358 | B2 * | 10/2008 | Arrouye et al. ....................... 1/1 |
| 7,479,949 | B2 | 1/2009 | Jobs et al. |
| 7,492,350 | B2 | 2/2009 | Fabre et al. |
| 7,581,186 | B2 | 8/2009 | Dowdy et al. |
| 7,587,680 | B2 | 9/2009 | Wada |
| 7,647,278 | B1 | 1/2010 | Foth et al. |
| 7,656,393 | B2 | 2/2010 | King et al. |
| 7,657,603 | B1 | 2/2010 | He et al. |
| 7,689,933 | B1 | 3/2010 | Parsons |
| 7,710,393 | B2 | 5/2010 | Tsuk et al. |
| 7,730,047 | B2 | 6/2010 | Hugill et al. |
| 7,752,237 | B2 | 7/2010 | Ray |
| 7,996,792 | B2 | 8/2011 | Anzures et al. |
| 2001/0015719 | A1 | 8/2001 | Van Ee et al. |
| 2001/0028363 | A1 | 10/2001 | Nomoto et al. |
| 2001/0050687 | A1 | 12/2001 | Iida et al. |
| 2002/0030699 | A1 | 3/2002 | Van Ee |
| 2002/0054017 | A1 | 5/2002 | Agata et al. |
| 2002/0091662 | A1 | 7/2002 | Bogia |
| 2002/0113824 | A1 | 8/2002 | Myers |
| 2002/0140746 | A1 | 10/2002 | Gargi |
| 2002/0196266 | A1 | 12/2002 | Mou et al. |
| 2002/0198909 | A1 | 12/2002 | Huynh et al. |
| 2003/0016951 | A1 | 1/2003 | Jakel et al. |
| 2003/0076322 | A1 | 4/2003 | Ouzts et al. |
| 2003/0093572 | A1 | 5/2003 | Laux et al. |
| 2003/0122787 | A1 | 7/2003 | Zimmerman et al. |
| 2003/0128242 | A1 | 7/2003 | Gordon |
| 2003/0156140 | A1 | 8/2003 | Watanabe |
| 2003/0189602 | A1 | 10/2003 | Dalton et al. |
| 2004/0013416 | A1 | 1/2004 | Mok |
| 2004/0047588 | A1 | 3/2004 | Okada et al. |
| 2004/0056837 | A1 | 3/2004 | Koga et al. |
| 2004/0095396 | A1 | 5/2004 | Stavely et al. |
| 2004/0100479 | A1 | 5/2004 | Nakano et al. |
| 2004/0122683 | A1 | 6/2004 | Grossman et al. |
| 2004/0150671 | A1 | 8/2004 | Kamiwada et al. |
| 2004/0155907 | A1 | 8/2004 | Yamaguchi et al. |
| 2004/0162845 | A1 | 8/2004 | Kim et al. |
| 2004/0199582 | A1 | 10/2004 | Kucharewski et al. |
| 2004/0223737 | A1 | 11/2004 | Johnson |
| 2004/0230599 | A1 | 11/2004 | Moore et al. |
| 2004/0235520 | A1 | 11/2004 | Cadiz et al. |
| 2005/0010860 | A1 | 1/2005 | Weiss et al. |
| 2005/0012723 | A1 | 1/2005 | Pallakoff |
| 2005/0024341 | A1 | 2/2005 | Gillespie et al. |
| 2005/0027539 | A1 | 2/2005 | Weber et al. |
| 2005/0060666 | A1 | 3/2005 | Hoshino et al. |
| 2005/0091596 | A1 | 4/2005 | Anthony et al. |
| 2005/0102373 | A1 | 5/2005 | Grinberg |
| 2005/0110768 | A1 | 5/2005 | Marriott et al. |
| 2005/0125728 | A1 | 6/2005 | Peiro et al. |
| 2005/0132055 | A1 | 6/2005 | Neogi |
| 2005/0138664 | A1 | 6/2005 | Neogi |
| 2005/0154716 | A1 | 7/2005 | Watson et al. |
| 2005/0155077 | A1 | 7/2005 | Lawrence et al. |
| 2005/0198574 | A1 | 9/2005 | Lamkin et al. |
| 2005/0240880 | A1 | 10/2005 | Banks et al. |
| 2005/0246324 | A1 | 11/2005 | Paalasmaa et al. |
| 2005/0283739 | A1 | 12/2005 | Mohr et al. |
| 2005/0289482 | A1 | 12/2005 | Anthony et al. |
| 2006/0001645 | A1 | 1/2006 | Drucker et al. |
| 2006/0026535 | A1 | 2/2006 | Hotelling et al. |
| 2006/0031357 | A1 | 2/2006 | Misra et al. |
| 2006/0036959 | A1 | 2/2006 | Heatherly et al. |
| 2006/0059426 | A1 | 3/2006 | Ogikubo |
| 2006/0064720 | A1 | 3/2006 | Istvan et al. |
| 2006/0074869 | A1 | 4/2006 | Rosenberg et al. |
| 2006/0085442 | A1 | 4/2006 | Fujiwara |
| 2006/0095865 | A1 | 5/2006 | Rostom |
| 2006/0107207 | A1 | 5/2006 | Wada |
| 2006/0143327 | A1 | 6/2006 | Hsieh et al. |
| 2006/0156246 | A1 | 7/2006 | Williams et al. |
| 2006/0174214 | A1 * | 8/2006 | McKee et al. ................ 715/802 |
| 2006/0195512 | A1 | 8/2006 | Rogers et al. |
| 2006/0195790 | A1 * | 8/2006 | Beaupre et al. ............... 715/727 |
| 2006/0206428 | A1 | 9/2006 | Vidos et al. |
| 2006/0206779 | A1 | 9/2006 | Wehn et al. |
| 2006/0238835 | A1 | 10/2006 | Nishida et al. |
| 2006/0265417 | A1 | 11/2006 | Amato et al. |
| 2006/0280437 | A1 | 12/2006 | Logan et al. |
| 2007/0016860 | A1 | 1/2007 | Lim |
| 2007/0028267 | A1 | 2/2007 | Ostojic et al. |
| 2007/0033295 | A1 | 2/2007 | Marriott |
| 2007/0044036 | A1 | 2/2007 | Ishimura et al. |
| 2007/0053268 | A1 | 3/2007 | Crandall et al. |
| 2007/0061306 | A1 | 3/2007 | Pell et al. |
| 2007/0061745 | A1 | 3/2007 | Anthony et al. |
| 2007/0070066 | A1 | 3/2007 | Bakhash |
| 2007/0079259 | A1 | 4/2007 | Sauve et al. |
| 2007/0080823 | A1 | 4/2007 | Fu |
| 2007/0083616 | A1 | 4/2007 | Madden et al. |
| 2007/0083911 | A1 | 4/2007 | Madden et al. |
| 2007/0085841 | A1 | 4/2007 | Tsuk et al. |
| 2007/0101364 | A1 | 5/2007 | Morita |
| 2007/0124680 | A1 | 5/2007 | Robbin et al. |
| 2007/0136750 | A1 | 6/2007 | Abanami et al. |
| 2007/0143245 | A1 | 6/2007 | Dettinger et al. |
| 2007/0143493 | A1 | 6/2007 | Mullig et al. |
| 2007/0156669 | A1 | 7/2007 | Marchisio et al. |
| 2007/0157095 | A1 | 7/2007 | Bilow et al. |
| 2007/0168413 | A1 | 7/2007 | Barletta et al. |
| 2007/0169115 | A1 | 7/2007 | Ko et al. |
| 2007/0189708 | A1 | 8/2007 | Lerman et al. |
| 2007/0189737 | A1 | 8/2007 | Chaudhri et al. |
| 2007/0260994 | A1 | 11/2007 | Sciammarella et al. |
| 2007/0266411 | A1 | 11/2007 | Yamamoto et al. |
| 2008/0021921 | A1 | 1/2008 | Horn |
| 2008/0033919 | A1 | 2/2008 | Arrouye et al. |
| 2008/0034306 | A1 | 2/2008 | Ording |
| 2008/0034325 | A1 | 2/2008 | Ording |
| 2008/0034381 | A1 | 2/2008 | Jalon et al. |
| 2008/0036743 | A1 | 2/2008 | Westerman et al. |
| 2008/0062141 | A1 | 3/2008 | Chandhri |
| 2008/0066016 | A1 | 3/2008 | Dowdy et al. |
| 2008/0066135 | A1 | 3/2008 | Brodersen et al. |
| 2008/0115182 | A1 | 5/2008 | van Willigenburg |
| 2008/0122796 | A1 | 5/2008 | Jobs et al. |
| 2008/0307343 | A1 | 12/2008 | Robert et al. |
| 2008/0307350 | A1 | 12/2008 | Sabatelli et al. |
| 2008/0307363 | A1 | 12/2008 | Jalon et al. |
| 2009/0002335 | A1 | 1/2009 | Chaudhri |

| | | | |
|---|---|---|---|
| 2009/0106674 A1 | 4/2009 | Bray et al. |
| 2009/0112719 A1 | 4/2009 | Bhave et al. |
| 2009/0125842 A1 | 5/2009 | Nakayama |
| 2009/0150769 A1 | 6/2009 | Konnola et al. |
| 2009/0150792 A1 | 6/2009 | Laakso et al. |
| 2009/0172532 A1 | 7/2009 | Chaudhri |
| 2009/0198359 A1 | 8/2009 | Chaudhri |
| 2009/0249210 A1 | 10/2009 | Sheldon et al. |
| 2009/0300540 A1 | 12/2009 | Russell |

FOREIGN PATENT DOCUMENTS

| | | |
|---|---|---|
| EP | 1 677 497 A1 | 7/2006 |
| WO | WO 99/49496 A1 | 9/1999 |
| WO | WO 00/63766 A | 10/2000 |
| WO | WO 01/79980 A1 | 10/2001 |
| WO | WO 2005/121920 | 12/2005 |
| WO | WO 2006/013485 A2 | 2/2006 |
| WO | WO 2006/020305 A2 | 2/2006 |
| WO | WO 2006/032442 A | 3/2006 |
| WO | WO 2007/005789 A | 1/2007 |
| WO | WO 2008/019113 | 2/2008 |
| WO | WO 2008/030779 A2 | 3/2008 |
| WO | WO 2008/030976 A2 | 3/2008 |
| WO | WO 2008/153646 A1 | 12/2008 |
| WO | WO 2008/153647 A1 | 12/2008 |

OTHER PUBLICATIONS

Apples iTunes 7 CNET editors' review Sep. 15, 2006 6 pages.*
Windows Media Player 11—The Other album art aware app! May 11, 2006 4 pages.*
Adam C. Engst iPhoto 6 for Mac OS X: Visual QuickStart Guide Peachpit Press Jun. 20, 2006 pp. 9, 45, 50, 100, 105, 122, 144-146.*
Greg Perry "Sams Teach Yourself Windows XP All in One" Second Edition Dec. 17, 2004 pp. 93-96.*
Andrew Coulter Enright, "Dissatisfaction Sows Innovation", The Treehouse + The Cave, http://thetreehouseandthecave.blogspot.com/2004/12/dissatisfaction-sows-innovation.html, Dec. 29, 2004, 6 pages, Bushwick, Brooklyn.
Andrew Coulter Enright, "Dissatisfaction Sows Innovation", The Treehouse + The Cave, http://thetreehouseandthecave.blogspot.com/2004/12/dissatisfaction-sows-innovation.html, Jun. 15, 2006, 18 pages, Bushwick, Brooklyn.
Cody Hinze, "CoverFlow—A beautiful way to browse your MP3s", Noise blog, http://noise.typepad.com/noise_blog/2006/02/cover_flow_the_html, Feb. 5, 2006, 2 pages.
PCT Search Report and Written Opinion for PCT/US2007/017424, mailed Feb. 4, 2008, 9 pages.
Imran Chandri, U.S. Appl. No. 60/937,986, filed Jun. 29, 2007, 72 pages (specification).
Thomas Dowdy, et al., U.S. Appl. No. 60/843,832, filed Sep. 11, 2006, 68 pages (specification and drawings).
PCT International Search Report and Written Opinion for PCT International Appln No. PCT/US2008/005900 mailed Aug. 1, 2008. (14 pages).
U.S. Appl. No. 60/843,832, filed Sep. 11, 2006, titled "Techniques and Systems for Browsing Media Content", by inventors Thomas Dowdy, David Heller and Anne Jones, 68 pages (specification and drawings).
U.S. Appl. No. 60/878,746, filed Jan. 5, 2007, titled "Electronic Device With Image Based Browsers", by inventors Thomas Dowdy, David Heller and Anne Jones, 98 pages. (specification and drawings).
"Apple Tiger vs Windows Vista," Jun. 25, 2006, 3 pages.
Apple, "Quick Look Programming Guide—Data Management: File Management,"XP007915043, Jul. 20, 2009, pp. 1-50.
Apples iTunes 7 CNET Editors' Review, Sep. 15, 2006, 6 pages).
Microsoft Corporation, "Creating Windows XP Icons," Jul. 2001, 12 pages.
Microsoft Corporation, "How to Modify your Folder View Settings or to do a Custom Folder", Apr. 27, 2004, 5 pages.
Office Action dated Aug. 13, 2010 for U.S. Appl. No. 11/876,750, entitled "Previewing User Interfaces and Other Aspects" filed Oct. 22, 2007, 8 pages.
Office Action dated Jan. 13, 2011 for U.S. Appl. No. 11/876,750, entitled "Previewing User Interfaces and Other Aspects" filed Oct. 22, 2007, 11 pages.
Office Action dated Nov. 19, 2010 for U.S. Appl. No. 12/189,673, entitled "Browsing or Searching User Interfaces and Other Aspects" filed Aug. 11, 2008, 21 pages.
Office Action dated May 26, 2010 for U.S. Appl. No. 12/189,673, entitled "Browsing or Searching User Interfaces and Other Aspects" filed Aug. 11, 2008, 18 pages.
Office Action dated May 28, 2009 for European Patent Application No. 07836525.1-2201, 4 pages.
Office Action dated Dec. 3, 2010 for U.S. Appl. No. 11/760,760, entitled "Browsing or Searching User Interfaces and Other aspects" filed Jun. 9, 2007, 19 pages.
Office Action dated Jan. 6, 2010 for U.S. Appl. No. 11/760,761, entitled "Browsing or Searching User Interfaces and Other Aspects" filed Jun. 9, 2007, 12 pages.
Office Action dated Dec. 8, 2010 for U.S. Appl. No. 12/189,668, entitled "Browsing or Searching User Interaces and Other Aspects" filed Aug. 11, 2008, 21 pages.
Office Action dated Jul. 8, 2010 for U.S. Appl. No. 11/760,761, entitled "Browsing or Searching User Interfaces and Other Aspects" filed Jun. 9, 2007, 14 pages.
Ording, Bas, et al., "Methods and Apparatuses for Operating a Data Processing System," U.S. Appl. No. 10/873,661, filed Jun. 21, 2004 (92 pages).
PCT International Search Report and Written Opinion of the International Searching Authority for PCT/US2008/005901 dated Sep. 11, 2008, 14 pages.
PCT Notification of International Preliminary Report on Patentability and Written Opinion of the International Searching Authority for PCT/US2008/005901 dated Dec. 23, 2009, 9 pages.
PCT Notification of Transmittal of the International Search Report and the Written Opinion of the International Searching Authority, or the Declaration for PCT/US2010/042606 dated Oct. 5, 2010, 13 pages.
Ricadela, Aaron, "New Windows Era," InformationWeek, Aug. 1, 2005, 3 pages.
"Screenshots from iTunes 4.1 running on Windows XP" Internet Citation, XP002486348, Oct. 5, 2005, pp. 1-17.
Chaudhri, U.S. Appl. No. 12/215,651, filed Jun. 26, 2008.
Australian Patent Office, Examiner's Report dated Feb. 15, 2010 for Australian Patent App. No. 2007296558.
Australian Patent Office, Examiner's Report dated Mar. 3, 2011 for Australian Patent App. No. 2007296558.
Australian Patent Office, Examiner's Report dated Mar. 27, 2009 for Australian Innovation Patent App. No. 2008101162.
Australian Patent Office, Examiner's Report dated Apr. 1, 2009 for Australian Innovation Patent App. No. 2008101171.
Australian Patent Office, Examiner's Report dated Mar. 24, 2009 for Australian Innovation Patent App. No. 2008101164.
Canadian Patent Office, Examiner's Report dated Jun. 9, 2010 for Canadian Patent App. No. 2661200.
Chinese Patent Office, First Office Action for Chinese Patent App. No. 200780033722.5 dated Jul. 8, 2010.
Chinese Patent Office, Second Office Action for Chinese Patent App. No. 200780033722.5 dated Mar. 9, 2011.
Chinese Patent Office, First Office Action for Chinese Patent App. No. 200780033703.2 dated Sep. 8, 2010.
German Patent Office, Office Action dated Jun. 25, 2010 for German Patent App. No. 11 2007 002 143.8-53.
Korean Patent Office, Office Action dated Nov. 16, 2010 for Korean Patent App. No. 10-2009-7005010.
Korean Patent Office, Office Action dated May 13, 2011 for Korean Patent App. No. 10-2009-7005010.
Korean Patent Office, Office Action dated May 13, 2011 for Korean Patent App. No. 10-2011-7003607.
Korean Patent Office, Office Action dated May 13, 2011 for Korean Patent App. No. 10-2011-7003609.
UK Patent Office, Office Action dated Sep. 24, 2010 for United Kingdom Patent App. No. 0905084.0.
UK Patent Office, Office Action dated Aug. 23, 2011 for United Kingdom Patent App. No. 0905084.0.

UK Patent Office, Office Action dated Oct. 17, 2011 for United Kingdom Patent App. No. 0905084.0.
UK Patent Office, Office Action dated May 11, 2011 for United Kingdom Patent App. No. 0905084.5.
UK Patent Office, Search and Examination Report dated Sep. 23, 2011 for United Kingdom Patent App. No. 1114593.5.
UK Patent Office, Search and Examination Report dated Sep. 15, 2011 for United Kingdom Patent App. No. 1114592.7.
USPTO, Office Action dated Nov. 14, 2008 for U.S. App. No. 11/519,416, filed Sep. 12, 2006.
USPTO, Restriction Requirement dated Sep. 21, 2010 for U.S. Appl. No. 11/767,409, filed May 22, 2007.
USPTO, Office Action dated Nov. 23, 2010 for U.S. Appl. No. 11/767,409, filed May 22, 2007.
USPTO, Final Office Action dated Mar. 16, 2011 for U.S. Appl. No. 11/767,409, filed May 22, 2007.
USPTO, Office Action dated Aug. 13, 2010 for U.S. Appl. No. 11/876,750, filed Oct. 22, 2007.
USPTO, Office Action dated May 27, 2011 for U.S. Appl. No. 12/395,541, filed Feb. 27, 2009.
USPTO, Office Action dated May 9, 2011 for U.S. Appl. No. 12/395,537, filed Feb. 27, 2009.
ISA, PCT International Preliminary Report on Patentability and Written Opinion for PCT/US2008/005900 dated Dec. 23, 2009.
ISA, PCT International Search Report and Written Opinion for PCT/US2007/078180 dated Mar. 3, 2008.
ISA, PCT International Preliminary Report on Patentability for PCT/US2007/078180 dated Mar. 26, 2009.
ISA, PCT International Search Report and Written Opinion for PCT/US2007/078052 dated Feb. 12, 2008.
ISA, PCT International Preliminary Report on Patentability for PCT/US2007/078052 dated Mar. 26, 2009.
Slide Show www.digitalphotoslideshow.com/doc/configure.htm archived May 25, 2005, p. 1.
"CoverFlow," www.steelskies.com/coverflow/, downloaded Jun. 15, 2006, pp. 1-2.
"CoverFlow—Features," www.steelskies.com/coverflow/features.php, downloaded Jun. 15, 2006, p. 1.
"CoverFlow—FAQ & Tips," www.steelskies.com/coverflow/faq.php, downloaded Jun. 15, 2006, pp. 1-3.
"CoverFlow—Download," www.steelskies.com/coverflow/downloaded.php, downloaded Jun. 15, 2006, pp. 1-4.
Crespo et al., "Responsive Interaction for a Large Web Application, The Meteor Shower Architecture in the WebWriter II Editor," Proc. 6th Intn'l Work Wide Web Conf. 1996.
Enright, Andrew Coulter, "Dissatisfaction Sows Innovation—Visual Browsing in iTunes," Internet Blog of Andrew Coulter Enright, Dec. 29, 2004, pp. 1-6.
Enright, Andrew Coulter, "Dissatisfaction Sows Innovation," The Treehouse + The Cave, Jun. 15, 2006, Bushwich, Brooklyn (18 pages).
Enright, Andrew Coulter, "Meet CoverFlow," The Treehouse + The Cave, Aug. 13, 2005, pp. 1-2.
Enright, Andrew Coulter, "Visual Browsing on a iBook DS," The Treehouse + The Cave, Dec. 29, 2004, p. 1.
IBM, "Mechanism for Visual Lists and Selections," IBM Technical Disclosure Bulletin, vol. 40, No. 5, May 1, 1997, 2 pages.
Labarge, Ralph, DVD Authoring & Production, 2001, Focal Press, pp. 113 and 252.
Microsoft Windows XP for Home Users Service Pack 2nd Edition, Jul. 7, 2005, Peachpit Press, 13 pages.
Microsoft, Windows XP Media Center Edition, First Released: Jan. 2002—Last released: Nov. 2004.
Remote for iTunes (URM-15T), product information datasheet, Keyspan, http://keyspan.com/products/usb/urm15t,downloaded Sep. 25, 2005, pp. 1-2.
Express Remote (URM-17A), product information datasheet, Keyspan, http://keyspan.com/products/usb/urm15t,downloaded Sep. 25, 2005, pp. 1-2.
"Keyspan Express Remote Supports Apple's Airport Express," Press Release, Keyspan, Nov. 10, 2004.
"Keyspan Express Remote," Product Fact Sheet, Keyspan, published Sep. 25, 2005.
Keyspan:DMR Software v. 1.3 for Mac OS.X User Manual rev. 04.09.01A, published 1998.
Doom9 What's in a DVD, Apr. 28, 2001, http://web.archive.org/web/20010428123010/http://www.doom9.org/dvd-structure.htm.
DVD Authoring Terminology, Feb. 19, 2004, http://webarchive.org/web/20040219211732/http://www.mainfest-tech.com/links/dvd_terms.htm.
Rose, M. "Music in the Home: Interfaces for Music Applications," Personal Technologies, vol. 4, No. 1, pp. 45-53.
Salling Software, Sailing Clicker 2.2.1, User Manual, Sailing Sofware AB 2005.
Sawyer, "Get with the CoverFlow," The Olive Press, Dec. 8, 2005, p. 1.
Website printout, www.steelskies.com/coverflow/downloaded.php, downloaded Jun. 15, 2006, pp. 1-4.
Wikipedia, "Windows XP Media Center Edition," http:/en.wikipedia.org/wiki/Windows_XP_Media_Center_Edition, downloaded Sep. 27, 2005, pp. 1-5.
Wikipedia, "Application Software," Wikipedia, the free encyclopedia, http://en.wikipedia.org/wiki/Application_sofware, 3 pages, downloaded May 22, 2006.
Wikipedia, "Digital Audio," Wikipedia, the free encyclopedia, http://en.wikipedia.org/wiki/Digital_audio, 3 pages, downloaded May 25, 2006.
Wikipedia, "Digital Media," Wikipedia, the free encyclopedia, http://en.wikipedia.org/wiki/Digital_media, 3 pages, date unknown.
Wikipedia, "Digital Video," Wikipedia, the free encyclopedia, http://en.wikipedia.org/wiki/Digital_video, 3 pages, May 6, 2006.
Wikipedia, "ITunes," Wikipedia, the free encyclopedia, http://en.wikipedia.org/wiki/ITunes, 11 pages, May 22, 2006.
Wikipedia, "Media Player," Wikipedia, the free encyclopedia, http://en.wikipedia.org/wiki/Media_player, 1 page, May 20 2006.
Wikipedia, "Mutimedia," Wikipedia, the free encyclopedia, http://en.wikipedia.org/wiki/"Mutimedia,", 2 pages, May 25 2006.
NPL documents from Interview Jan. 11, 2012 (for U.S. Appl. No. 11/760,761)—Microsoft Windows 2000, USPTO, UTube and Way Back Machine computer screenshots.
Zaitseff, John, Sample Page For the File-type icons Nov. 16, 2006 (2 pages).

* cited by examiner

BROWSING OR SEARCHING USER INTERFACES AND OTHER ASPECTS

BACKGROUND OF THE INVENTION

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the Finder program which operates on Macintosh computers from Apple Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. However, this search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. A program such as Microsoft Word may automatically create some of this data when a user creates a file and the user may add additional data or edit the data by selecting the "property sheet" from a menu selection in Microsoft Word. The property sheets in Microsoft Word allow a user to create metadata for a particular file or document. However, in existing systems, a user is not able to search for metadata across a variety of different applications using one search request from the user. Furthermore, existing systems can perform one search for data files, but this search does not also include searching through metadata for those files.

SUMMARY OF THE DESCRIPTION

Methods for managing data in a data processing system and systems for managing data are described herein.

A method of managing data in one exemplary embodiment includes displaying a first display area for displaying two-dimensional (2-D) representations of documents matching a search query, the first display area configured to display content of the documents which can have a plurality of different types of content including at least one of text-based content and a folder, and the method further includes displaying a second display area for selecting a selected document to be displayed in the first display area. In at least certain embodiments, the content of the selected document can be zoomed from the first display area to display an enlarged view or may be presented as multiple pages which are selectable such that the document can be viewed one page at a time or several pages at a time. In certain embodiments, the first display area and the second display area are adjacent each other in the same moveable, closeable, resizeable and minimizeable window, which includes user interface objects to receive user inputs to move the window, close the window, resize the window, maximize the window and minimize the window. Further, the window may include various user interface objects which allow the user to pick between different views, including a view which includes the first display area and the second display area. In at least certain embodiments, the first display area may be referred to as a "cover flow" view area and the second display area may be referred to as a "list display" view area. In at least certain embodiments, the method may include the performance of a search through metadata for various different kinds of documents, as well as an index database which includes a full-text inverted database containing the full text of the content of the documents within a data processing system. In certain embodiments, the documents may be organized and stored in a hierarchical file system, and a user interface program, such as the Finder from Apple Inc. of Cupertino, Calif., or Windows Explorer from Microsoft of Redmond, Wash., may be provided to allow the user to manage the location, etc. of the documents and files maintained by the hierarchical filing system (HFS).

In at least certain embodiments, a user may select a document in the list view and this causes the documents in the cover flow view to scroll in order to show the same document in the selected document position of a cover flow view. In certain embodiments, scrolling of the documents in the cover flow view is linked to the scrolling of documents in the list display view area such that scrolling in one area is matched by and coordinated with scrolling in the other area. In at least certain embodiments, the list display view area displays at least a portion of the documents matching the search query, and the order of the documents in the list view area matches the order of the documents shown in the cover flow view area which also shows documents matching the search query. The cover flow view area typically includes one set of documents on one side of the selected document and another set of documents on the other side of the selected document; the spacing between the documents is not uniform. In at least certain embodiments, documents on the left side of the selected document appear to be facing towards the right and therefore towards the selected document, while documents on the right side of the selected document appear to be facing towards the left side and therefore towards the selected document. The apparent direction each set of documents faces may be achieved by providing a perspective view in which one side of the document is longer than another side of the document even though, in fact, the underlying document has sides that are equal and parallel.

According to another aspect of the inventions described herein, a method of managing data in one exemplary embodiment includes displaying a first display area for displaying two-dimensional representations of at least a portion of files and folders in a hierarchical file system, the first display area configured to display content of the files in the first display area, and displaying a second display area for selecting a selected document to be displayed in the first display area, wherein the second display area displays the two-dimensional representations of at least a portion of the files and folders in the hierarchical file system. In this method, the first display area and the second display area may be a cover flow view area and a list display view area, respectively, each of which are adjacent to each other in the same window which is moveable, resizeable, closeable, minimizeable, and maximizeable. The window may include various user interface objects which allow a user to close, minimize, maximize, resize, or move the window. Further, the window may include user interface objects which allow a user to input various commands for operating on the files in the hierarchical file system, such as commands to move a file in the hierarchical file system (HFS), or create a copy of the file in the HFS, or delete a file, or create a new folder in the HFS or move a folder in the HFS or create a copy of the folder or delete the folder or move a file from a first folder to a second folder, etc. Each view area, such as the cover flow view area and the list display view area, may include scroll control user interface objects, such as a scroll bar and scroll arrows for allowing the user to scroll the views in each display area. The scrolling may be linked or not linked depending on the implementation.

According to another aspect of the inventions described herein, a method of managing data in one exemplary embodiment includes displaying an icon of a folder, wherein the icon of the folder is at least partially transparent to show icons at least partially within the folder, and displaying a set of icons at least partially within the icon of the folder. In at least certain embodiments, the icons may rotate within the icon of the folder to display, after a sufficient amount of rotating, all viewable files in the folder, and wherein the folder represents a subdirectory in a hierarchical file system. In at least certain embodiments, the set of icons are animated to display at least a subset of the icons over a period of time. The set of icons may be animated by one of rotating, over time, the icons in the set of icons, or shuffling, over time, the icons in the set of icons, or displaying momentarily and sequentially each of the icons in the set of icons, etc. The icons in the set of icons in the folder may be at least one of graphical images or thumbnails of content of files represented by the icons.

Another method of managing data in one exemplary embodiment includes displaying an icon of a folder which includes files represented by the icons, the files being in a hierarchical file system and displaying automatically, without user interaction with the icon of the folder, an animation presenting a content or representation of each of the files, wherein a subset of the files is shown after a sufficient period of time. The animation may present the content or representation at least partially within the icon of the folder. The icon of the folder may or may not be transparent and the animation may present the content or representation on the face of the icon of the folder if the folder is not transparent. The animation may be one of rotating, over time, the content or representation of each of the files or shuffling, over time, the content or representation of each of the files or other mechanisms for displaying, over time, the various icons in the file.

According to another aspect of the inventions described herein, methods and software architectures provide previews of files, such as previews of content of the files without launching the applications which created those files. In one embodiment, a method includes receiving a first call, through a first application programming interface (API), to obtain a preview of content of a file, the first call being made by a first application program and being received by a preview generator, such as a preview generator daemon which is provided by operating system software; and the method also includes generating a request (which may be a call through a second API) to obtain a first software routine, such as a first plug-in, from a set of software routines, such as a set of plug-ins which may be extensible, wherein the first plug-in is configured to process a file type of the file to produce content in a format which can be displayed by the first application program. This method allows, at least in certain embodiments, for previews of content to be provided to the first application program for a wide variety of different file types (e.g. PDF, HTML, Visio, AutoCAD, PPT, DOC, text, XLS (Excel), JPG, and other file types noted herein, etc.) without requiring that the applications which created these files be launched in order to view the content. The first application program may be one of a set of programs including at least one user level program which use this method to present previews of content; for example, the first application program may be a file management software program (e.g. the Finder from Apple Inc. or Windows Explorer from Microsoft) or a search software program (e.g. Spotlight from Apple Inc.) or an email software program or a calendar software program or an instant messaging software program or other software programs.

In at least certain embodiments, the first application program (e.g. the Finder or Spotlight) displays an initial preview of the file in a first view which is one of a list view or an icon view or a cover flow view and wherein the initial preview is not configured to be interactive, within the first view, in response to user inputs and wherein the content produced through the first plug-in is configured to interactively display content of the file (e.g. page through or scroll through or browse through the content or zoom or resize the content or playback the content, such as playback a movie) in response to user inputs. This interactive display of content may also occur in the first view or zoom out from the first view or be layered over the first view. The first application program may also display, while displaying the initial preview within the first view, other initial previews of other files and data (e.g. data within a file such as an address information within a contact/address book database) within the first view. Further, the interactive content displayed through the first plug-in may be displayed in the first view while the other initial previews are also being displayed within the first view.

In at least certain embodiments, a method may further include generating a second call to a file system program to obtain an identifier of the file type of the file and receiving the identifier of the file type in response to the second call, wherein the identifier is used to select the first plug-in from the set of plug-ins.

In at least certain embodiments, the content produced through the first plug-in is displayable by the first application program without further conversion of data; in other embodiments, the content produced through the first plug-in may be in a standard format (e.g. HTML, text, PDF, JPG) which can be processed through the first application to generate displayed content.

Software architectures are also described, and these may include a preview generator daemon which interfaces with applications (e.g. Finder) which make calls to the preview generator daemon through a first application programming interface (API). The preview generator daemon may, in response to those calls, request plug-ins to provide the content of the files for a preview of that content without launching the applications which created those files.

Other aspects of the present inventions include various data processing systems which perform these methods and machine readable media which cause a data processing system to perform various methods described herein.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2007.

Figure 1:
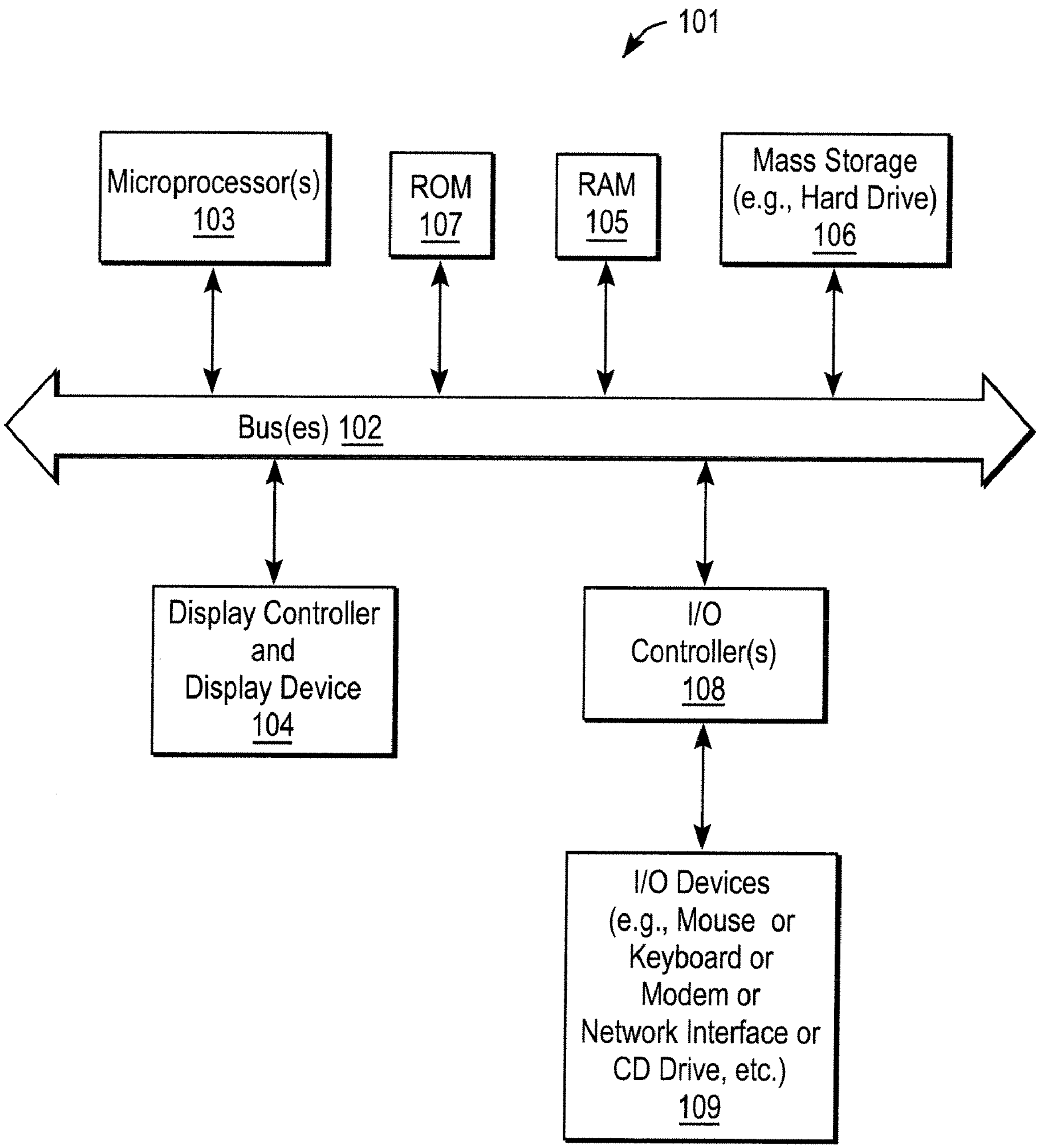
FIG. 1 shows an exemplary embodiment of a data processing system, which may be a general purpose computer system and which may operate in any of the various methods described herein.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that personal digital assistants (PDAs), cellular telephones, media players (e.g. an iPod), devices which combine aspects or functions of these devices (e.g. a media player combined with a PDA and a cellular telephone in one device), an embedded processing device within another device, network computers, a consumer electronic device, and other data processing systems which have fewer components or perhaps more components may also be used with or to implement one or more embodiments of the present invention. The computer system of FIG. 1 may, for example, be a Macintosh computer from Apple Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a microprocessor from Intel or a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Capturing and Use of Metadata Across a Variety of Application Programs

Figure 2:
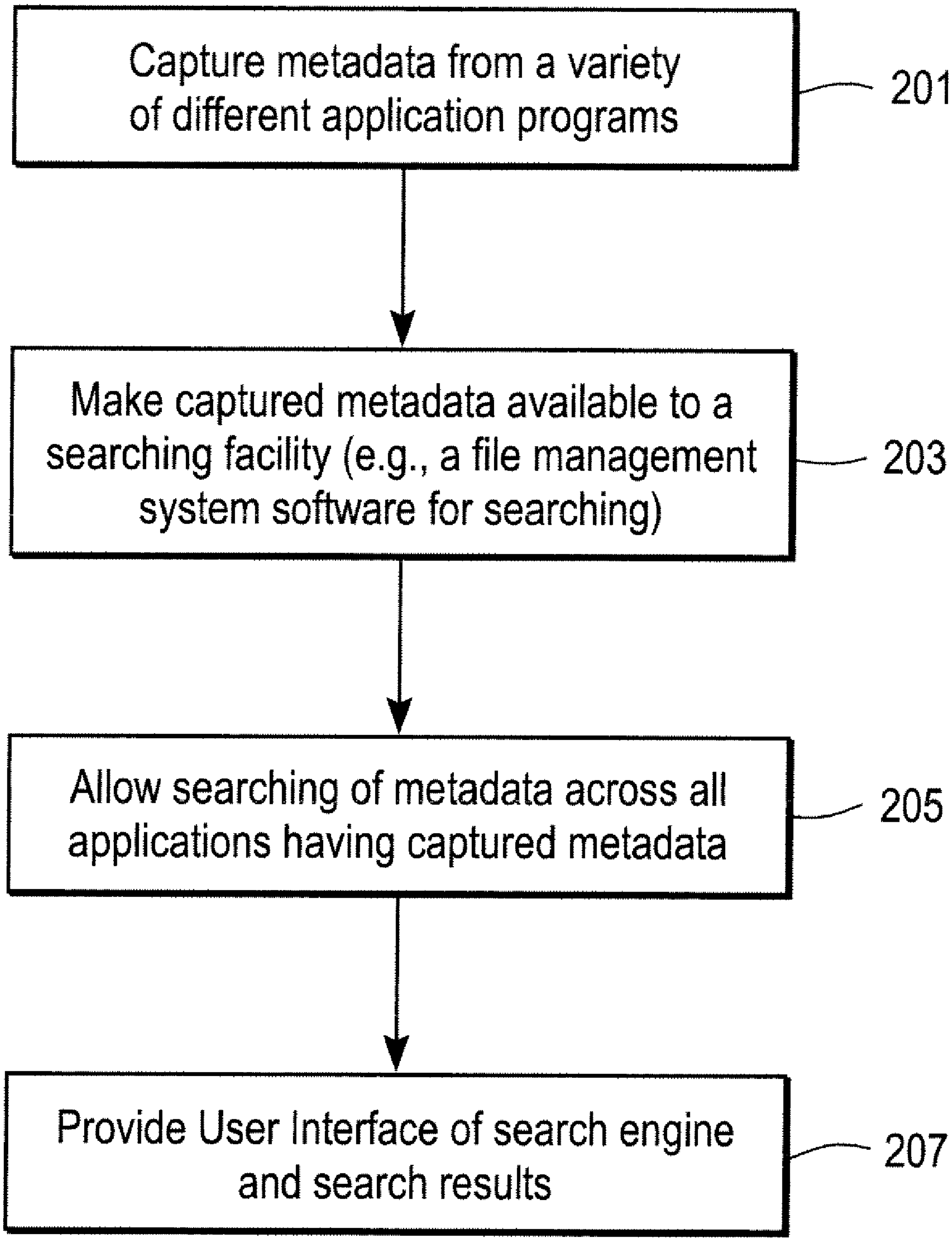
FIG. 2 shows a general example of one exemplary method of one aspect of the invention.
Figure 5:
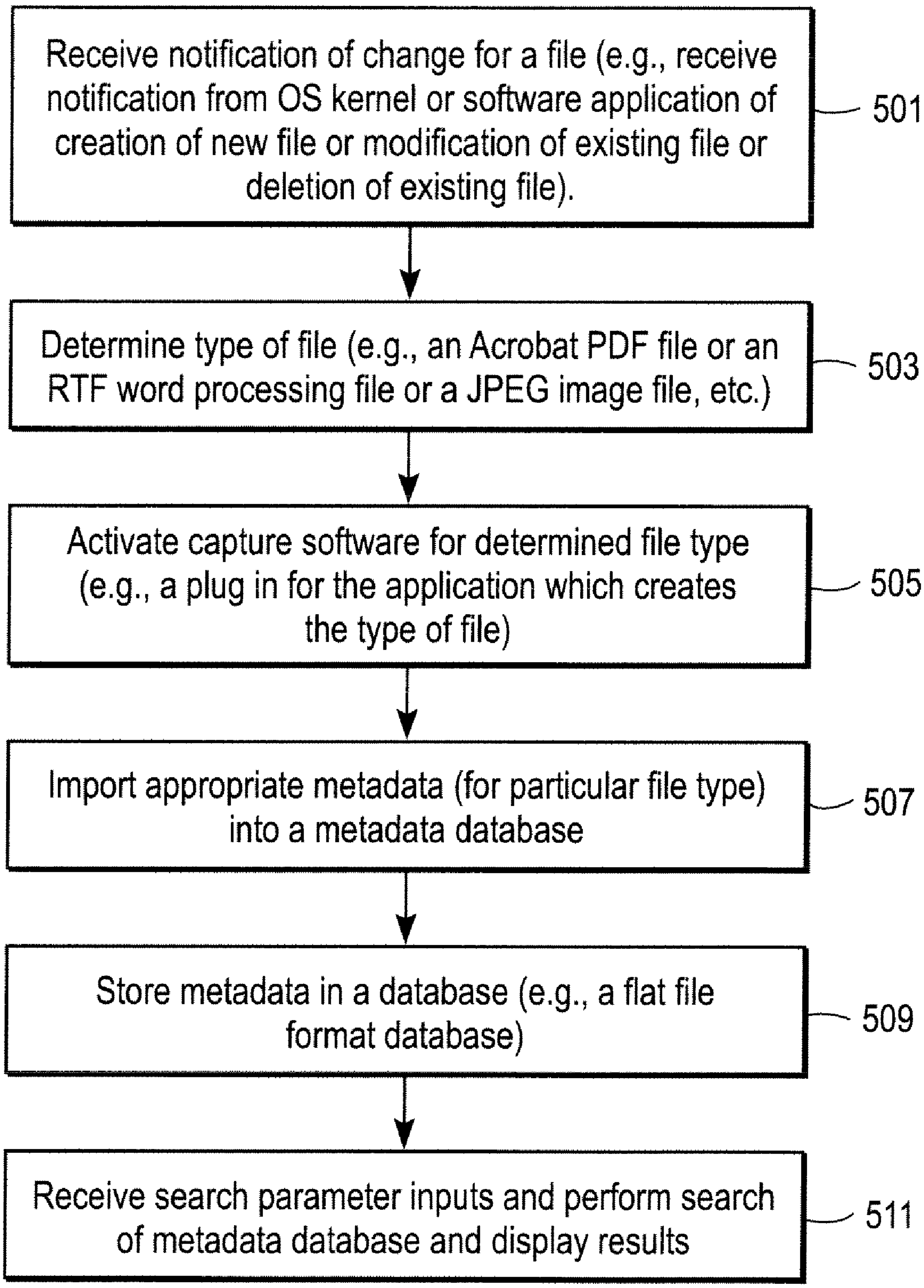
FIG. 5 is a flow chart showing another exemplary method of the present invention.

FIG. 2 shows a generalized example of one embodiment of the present invention. In this example, captured metadata is made available to a searching facility, such as a component of the operating system which allows concurrent searching of all metadata for all applications having captured metadata (and optionally for all non-metadata of the data files). The method of FIG. 2 may begin in operation 201 in which metadata is captured from a variety of different application programs. This captured metadata is then made available in operation 203 to a searching facility, such as a file management system software for searching. This searching facility allows, in operation 205, the searching of metadata across all applications having captured metadata. The method also provides, in operation 207, a user interface of a search engine and the search results which are obtained by the search engine. There are numerous possible implementations of the method of FIG. 2. For example, FIG. 5 shows a specific implementation of one exemplary embodiment of the method of FIG. 2. Alternative implementations may also be used. For example, in an alternative implementation, the metadata may be provided by each application program to a central source which stores the metadata for use by searching facilities and which is managed by an operating system component, which may be, for example, the metadata processing software. The user interface provided in operation 207 may take a variety of different formats, including some of the examples described below as well as user interfaces which are conventional, prior art user interfaces. The metadata may be stored in a database which may be any of a variety of formats including a B tree format or, as described below, in a flat file format according to one embodiment of the invention.

The method of FIG. 2 may be implemented for programs which do not store or provide metadata. In this circumstance, a portion of the operating system provides for the capture of the metadata from the variety of different programs even though the programs have not been designed to provide or capture metadata. For those programs which do allow a user to create metadata for a particular document, certain embodiments of the present invention may allow the exporting back of captured metadata back into data files for applications which maintain metadata about their data files.

Figure 4:
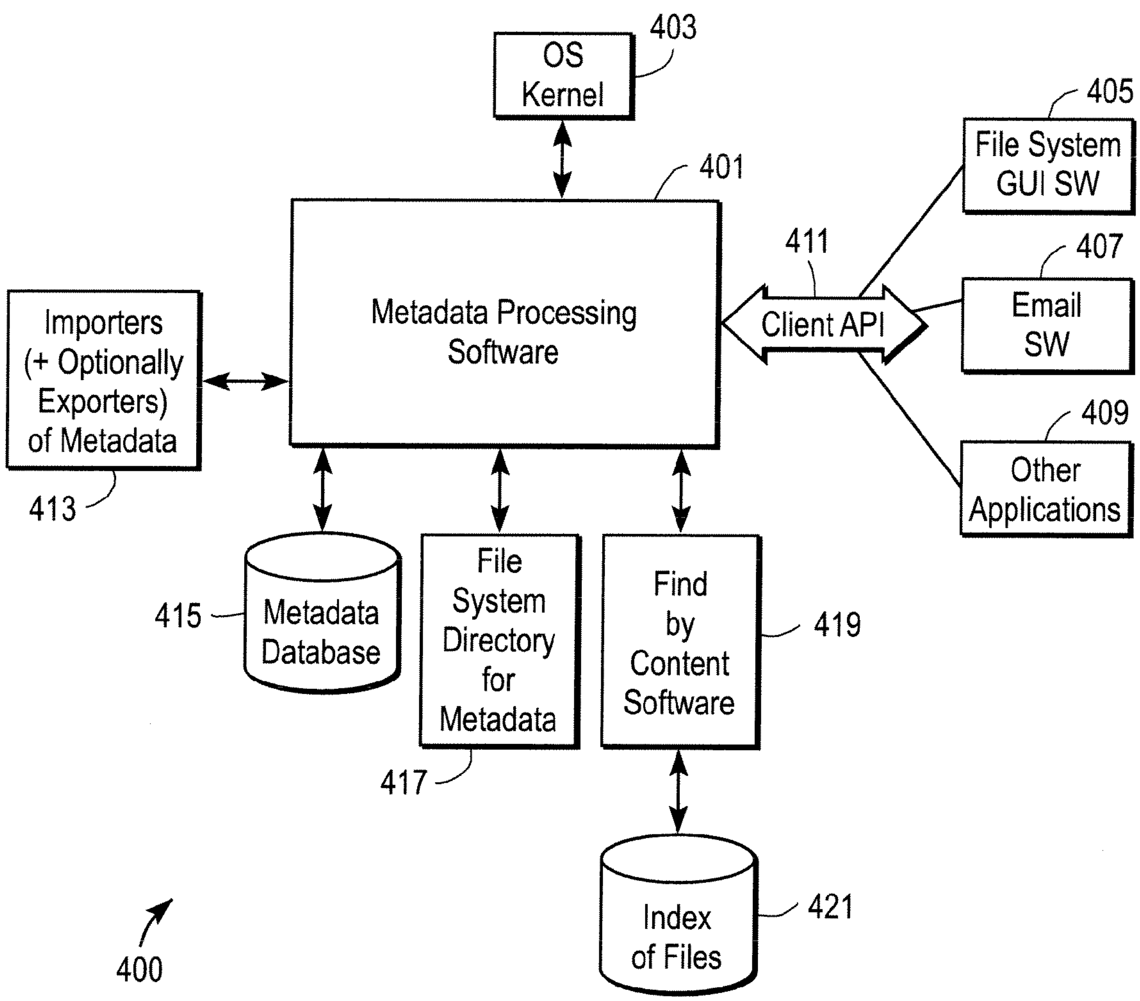
FIG. 4 shows an example of an architecture for managing metadata according to one exemplary embodiment of the invention.

The method of FIG. 2 allows information about a variety of different files created by a variety of different application programs to be accessible by a system wide searching facility, which is similar to the way in which prior art versions of the Finder or Windows Explorer can search for file names, dates of creation, etc. across a variety of different application programs. Thus, the metadata for a variety of different files created by a variety of different application programs can be accessed through an extension of an operating system, and an example of such an extension is shown in FIG. 4 as a metadata processing software which interacts with other components of the system and will be described further below.

Figure 3A:
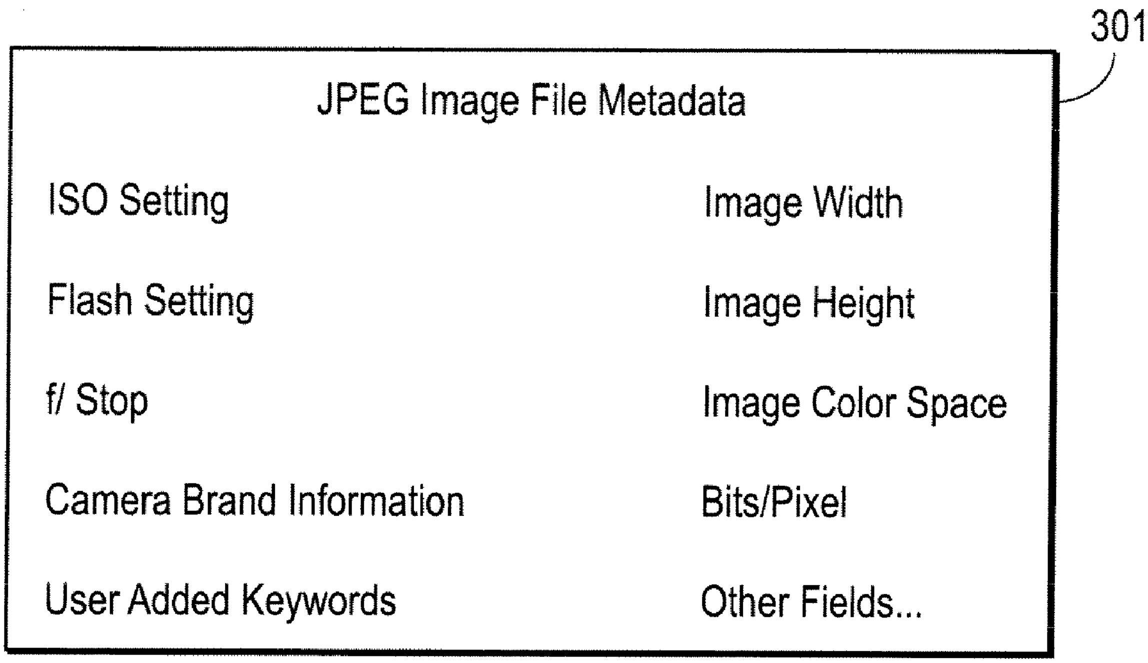
FIG. 3A shows an example of the content of the particular type of metadata for a particular type of file.
Figure 3B:
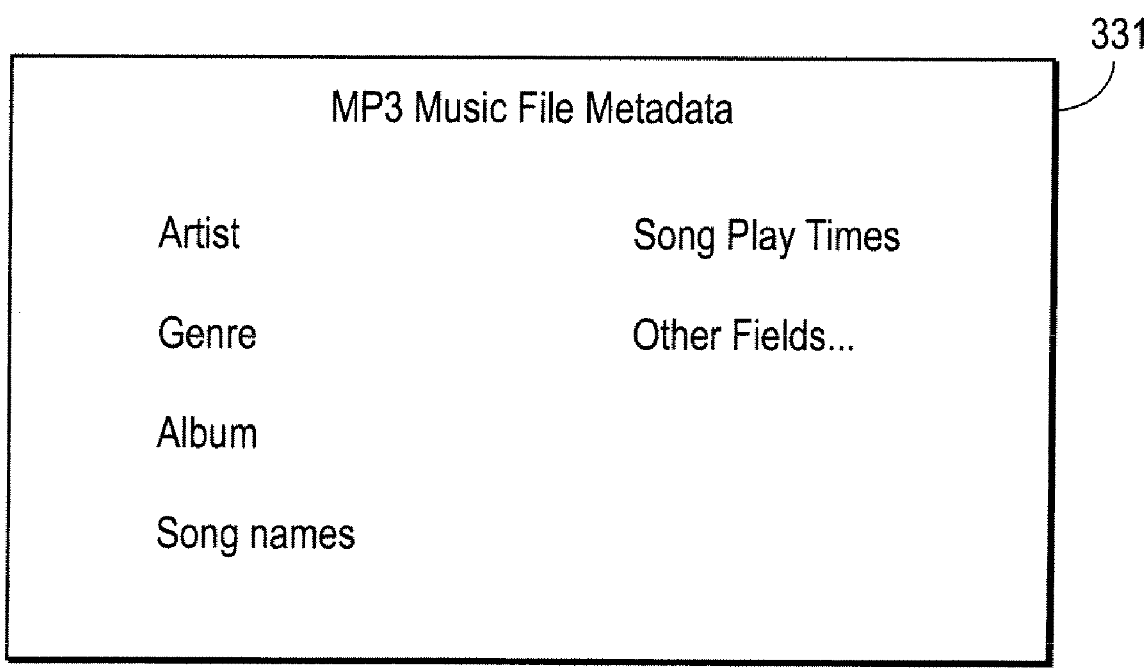
FIG. 3B shows another example of a particular type of metadata for another particular type of file.

FIGS. 3A and 3B show two different metadata formats for two different types of data files. Note that there may be no overlap in any of the fields; in other words, no field in one type of metadata is the same as any field in the other type of metadata. Metadata format 301 may be used for an image file such as a JPEG image file. This metadata may include information such as the image's width, the image's height, the image's color space, the number of bits per pixel, the ISO setting, the flash setting, the F/stop of the camera, the brand name of the camera which took the image, user-added keywords and other fields, such as a field which uniquely identifies the particular file, which identification is persistent through modifications of the file. Metadata format 331 shown in FIG. 3B may be used for a music file such as an MP3 music file. The data in this metadata format may include an identification of the artist, the genre of the music, the name of the album, song names in the album or the song name of the particular file, song play times or the song play time of a particular song and other fields, such as a persistent file ID number which identifies the particular MP3 file from which the metadata was captured. Other types of fields may also be used. The following chart shows examples of the various fields which may be used in metadata for various types of files.

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| Item | n/a | Authors | Who created or contributed to the contents of this item | CFString | Yes | No | Yes | Yes | Yes | Address Book |
| | | Comment | A free form text comment | CFString | No | No | Yes | Yes | Yes | |
| | | ContentType | This is the type that is determined by UTI | CFString | No | ? | No | Yes | Yes | |
| | | ContentTypes | This is the inheritance of the UTI system | CFString | Yes | ? | No | Yes | Yes | |
| | | CreatedDate | When was this item created | CFDate | No | No | No | Yes | Yes | |
| | | DisplayName | The name of the item as the user would like to read it. Very well may be the file name, but it may also be the subject of an e-mail message or the full name of a person, for example. | CFString | No | Yes | Yes | Yes | Yes | Finder (or Launch Services) |
| | | Keywords | This is a list words set by the user to identify arbitrary sets of organization. The scope is determined by the user and can be flexibly used for any kind of organization. For example, Family, Hawaii, Project X, etc. | CFString | Yes | System-provided keywords (if any) | Yes | Yes | Ask | |
| | | Contact Keywords | A list of contacts that are associated with this document, beyond what is captured as Author. This may be a person who's in the picture or a document about a person or contact (performance review, contract) | CFString | Yes | No | Yes | Yes | Ask | Address Book |
| | | ModifiedDate | When this item was last modified | CFDate | No | No | No | Yes | | |
| | | Rating | A relative rating (0 to 5 value) on how important a particular item is to you, whether it's a person, file or message | CFNumber | No | n/a | Yes | Yes | | |
| | | RelatedTos | A list of other items that are arbitrarily grouped together. | CFString | Yes | No | Yes | Yes | | |
| | | TextContent | An indexed version of any content text | CFString | No | No | No | Yes | | |
| | | UsedDates | Which days was the document opened/viewed/played | CFDate | Yes | No | No | Yes | | |
| Content/ Data | Item | Copyright | Specifies the owner of this content, i.e. Copyright Apple Inc. | CFString | No | No | Yes | Yes | | |
| | | CreatorApp | Keeps track of the application that was used to create this document (if it's known). | CFString | No | ? | No | Yes | | |
| | | Languages | The languages that this document is composed in (for either text or audio-based media) | CFString | Yes | Yes | Yes | Yes | | |
| | | ParentalControl | A field that is used to determine whether this is kid-friendly content or not | CFString | No | ? | Yes | Yes | | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | Publishers | The name or a person or organization that published this content. | CFString | Yes | No | Yes | Yes | | Address Book |
| | | PublishedDate | The original date that this content was published (if it was), independent of created date. | CFDate | No | No | Yes | Yes | | |
| | | Reviewers | A list of contacts who have reviewed the contents of this file. This would have to be set explicitly by an application. | CFString | Yes | No | Yes | Yes | | Address Book |
| Image | Data | ReviewStatus | Free form text that used to specify where the document is in any arbitrary review process | CFString | No | ? | Yes | Yes | | |
| | | TimeEdited | Total time spent editing document | CFDate | No | No | No | Yes | | |
| | | WhereTos | Where did this go to, eg. CD, printed, backedup | CFString | Yes | System-provided words only (if any) | ? | Yes | | |
| | | WhereFroms | Where did this come from, e.g. camera, email, web download, CD | CFString | Yes | System-provided words only (if any) | ? | Yes | | |
| | | BitsPerSample | What is the bit depth of the image (8-bit, 16-bit, etc.) | CFNumber | No | | | Yes | | |
| | | ColorSpace | What color space model is this document following | CFString | No | | | Yes | | ColorSync Utility? |
| | | ImageHeight | The height of the image in pixels | CFNumber | No | | | Yes | | |
| | | ImageWidth | The width of the image in pixels | CFNumber | No | | | Yes | | |
| | | ProfileName | The name of the color profile used with for image | CFString | No | | | Yes | | ColorSync Utility? |
| | | Resolution-Width | Resolution width of this image (i.e. dpi from a scanner) | CFNumber | No | | | Yes | | |
| | | Resolution-Height | Resolution height of this image (i.e. dpi from a scanner) | CFNumber | No | | | Yes | | |
| | | LayerNames | For image formats that contain "named" layers (e.g. Photoshop files) | CFString | Yes | | | Yes | | |
| | | Aperture | The f-stop rating of the camera when the image was taken | CFNumber | No | | | Yes | | |
| | | CameraMake | The make of the camera that was used to acquire this image (e.g. Nikon) | CFString | No | Yes | | Yes | | |
| | | CameraModel | The model of the camera used to acquire this image (Coolpix 5700) | CFString | No | Yes | | Yes | | |
| | | DateTime-Original | Date/time the picture was taken | CFDate | No | | | Yes | | |
| | | ExposureMode | Mode that was used for the exposure | CFString | No | | | Yes | | |
| | | ExposureTime | Time that the lens was exposed while taking the picture | CFDate | No | | | Yes | | |
| | | Flash | This attribute is overloaded with information about red-eye reduction. This is not a binary value | CFNumber | No | | | Yes | | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | GPS | Raw value received from GPS device associated with photo acquisition. It hasn't necessarily been translated to a user-understandable location. | CFString | No | | | Yes | | |
| | | ISOSpeed | The ISO speed the camera was set to when the image was acquired | CFNumber | No | | | Yes | | |
| | | Orientation | The orientation of the camera when the image was acquired | CFString | No | | | Yes | | |
| | | WhiteBalance | The white balance setting of the camera when the picture was taken | CFNumber | No | | | Yes | | |
| | | EXIFversion | The version of EXIF that was used to generate the metadata for the image | CFString | No | | | Yes | | |
| Time-based | Data | Acquisition-Sources | The name or type of device that used to acquire the media | CFString | Yes | | | Yes | | |
| | | Codecs | The codecs used to encode/decode the media | CFString | Yes | | | Yes | | |
| | | DeliveryType | FastStart or RTSP | CFString | No | | | Yes | | |
| | | Duration | The length of time that the media lasts | CFNumber | No | | | Yes | | |
| | | Streamable | Whether the content is prepared for purposes of streaming | CFBoolean | No | | | Yes | | |
| | | TotalBitRate | The total bit rate (audio & video combined) of the media. | CFNumber | No | | | Yes | | |
| | | AudioBitRate | The audio bit rate of the media | CFNumber | No | | | Yes | | |
| | | AspectRatio | The aspect ratio of the video of the media | CFString | No | | | Yes | | |
| | | ColorSpace | The color space model used for the video aspect of the media | CFString | No | | | Yes | | |
| | | FrameHeight | The frame height in pixels of the video in the media | CFNumber | No | | | Yes | | |
| | | FrameWidth | The frame width in pixels of the video in the media | CFNumber | No | | | Yes | | |
| | | ProfileName | The name of the color profile used on the video portion of the media | CFString | No | | | Yes | | |
| | | VideoBitRate | The bit rate of the video aspect of the media | CFNumber | No | | | Yes | | |
| Text | Data | Subject | The subject of the text. This could be metadata that's supplied with the text or something automatically generated with technologies like VTWIN | CFString | No | | | Yes | | |
| | | PageCount | The number of printable pages of the document | CFNumber | No | | | Yes | | |
| | | LineCount | The number of lines in the document | CFNumber | No | | | Yes | | |
| | | WordCount | The number of words in the document | CFNumber | No | | | Yes | | |
| | | URL | The URL that will get you to this document (or at least did at one time). Relevant for saved HTML documents, bookmarks, RSS feeds, etc. | CFString | No | | | Yes | | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | PageTitle | The title of a web page. Relevant to HTML or bookmark documents | CFString | No | | | Yes | | |
| | | Google Hierarchy | Structure of where this page can be found in the Google hierarchy. Relevant to HTML or bookmark documents | CFString | No | | | Yes | | |
| Compound document | Data | <Abstract> | There are no specific attributes assigned to this item. This is to catch all app-specific file formats that fall within Data, but don't fit into any of the other types. Typically these documents have multiple types of media embedded within them. (e.g. P | n/a | n/a | n/a | n/a | n/a | n/a | n/a |
| PDF | Compound document | NumberOfPages | The number of printable pages in the document | CFNumber | No | | | Yes | | |
| | | PageSize | The size of the page stored as points | CFNumber | No | | No | Yes | | |
| | | PDFTitle | PDF-specific title metadata for the document | CFString | No | | ? | Yes | | |
| | | PDFAuthor | PDF-specific author metadata for the document | CFString | No | | ? | Yes | | Address Book |
| | | PDFSubject | PDF-specific subject metadata for the document | CFString | No | | ? | Yes | | |
| | | PDFKeywords | PDF-specific keywords metadata for the document | CFString | Yes | | ? | Yes | | |
| | | PDFCreated | PDF-specific created metadata for the document | CFDate | No | | ? | Yes | | |
| | | PDFModified | PDF-specific modified metadata for the document | CFDate | No | | ? | Yes | | |
| | | PDFVersion | PDF-specific version metadata for the document | CFString | No | | ? | Yes | | |
| | | Security-Method | Method by which this document is kept secure | CFString | No | | | Yes | | |
| Presentation (Keynote) | Compound document | SlideTitles | A collection of the titles on slides | CFString | Yes | | | Yes | | |
| | | SlideCount | The number of slides | CFString | No | | | Yes | | |
| | | SpeakerNotes-Content | The content of all the speaker notes from all of the slides together | CFString | ? | | | Yes | | |
| Application | Item | Categories | The kind of application this is: productivity, games, utility, graphics, etc. A set list that | CFString | Yes | | | Yes | | |
| Message | Item | Recipients | Maps to To and Cc: addresses in a mail message. | CFString | Yes | | | Yes | | Address Book |
| | | Priority | The priority of the message as set by the sender | CFString | No | | | Yes | | |
| | | Attachment-Names | The list of filenames that represent attachments in a particular message (should be actionable within the Finder) | CFString | Yes | | | Yes | | |
| | | Authors | maps to From address in mail message | CFString | Yes | No | Yes | Yes | Yes | Address Book |
| | | Comment | Not applicable to Mail right now (should we consider?) | CFString | No | No | Yes | Yes | Yes | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | ContentType | | CFString | No | | No | Yes | Yes | |
| | | ContentTypes | | CFString | Yes | | No | Yes | Yes | |
| | | CreatedDate | When was this message was sent or received | CFDate | No | No | No | Yes | Yes | |
| | | DisplayName | Subject of the message | CFString | No | Yes | Yes | Yes | Yes | |
| | | Keywords | There will be a way to set keywords within Mail | CFString | Yes | System-provided keywords (if any) | Yes | Yes | Ask | |
| | | Contact Keywords | Could be where recipients are held | CFString | Yes | No | Yes | Yes | Ask | Address Book |
| | | ModifiedDate | Not applicable | CFDate | No | No | No | Yes | | |
| | | Rating | A relative rating (0 to 5 stars) on how important a particular message is to you (separate from a message's Priority) | CFNumber | No | n/a | Yes | Yes | | |
| | | RelatedTos | Potentially threaded messages could be put into this category | CFString | Yes | No | Yes | Yes | | |
| | | TextContent | An indexed version of the mail message | CFString | No | No | No | Yes | | |
| | | UsedDates | The day/time in which the mail message was viewed/read | CFDate | Yes | No | No | Yes | | |
| Contact | Item | Company | The company that this contact is an employee of | CFString | No | | | Yes | | Address Book |
| | | E-mails | A list of e-mail addresses that this contact has | CFString | Yes | | | Yes | | Mail |
| | | IMs | A list of instant message handles this contact has | CFString | Yes | | | Yes | | iChat |
| | | Phones | A list of phone numbers that relate to this contact | CFString | Yes | | | | | |
| | | Addresses | A list of physical addresses that relate to this person | CFString | Yes | | | | | |
| | | Authors | the name of the owner of the Address Book (current user name) | CFString | Yes | No | Yes | Yes | Yes | Address Book |
| | | Comment | | CFString | No | No | Yes | Yes | Yes | |
| | | ContentType | | CFString | No | | No | Yes | Yes | |
| | | ContentTypes | | CFString | Yes | | No | Yes | Yes | |
| | | CreatedDate | date the user entered this into his AddressBook (either through import or direct entry) | CFDate | No | No | No | Yes | Yes | |
| | | DisplayName | Composite name of contact (First Name, Last Name) | CFString | No | Yes | Yes | Yes | Yes | |
| | | Keywords | There will be a way to set keywords within Address Book | CFString | Yes | System-provided keywords (if any) | Yes | Yes | Ask | |
| | | Contact Keywords | | CFString | Yes | No | Yes | Yes | Ask | Address Book |
| | | ModifiedDate | Last time this contact entry was modified | CFDate | No | No | No | Yes | | |
| | | Rating | A relative rating (0 to 5 stars) on how important a particular contact is to you (separate from a message's Priority) | CFNumber | No | n/a | Yes | Yes | | |
| | | RelatedTos | (potentially could be used to associate people from the same company or family) | CFString | Yes | No | Yes | Yes | | |
| | | TextContent | An indexed version of the Notes section | CFString | No | No | No | Yes | | |
| | | UsedDates | The day/time in which the contact entry was viewed in Address Book | CFDate | Yes | No | No | Yes | | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| Meeting (TBD) | Item | Body | text, rich text or document that represents the full content of the event | CFString | No | | | Yes | | |
| | | Description | text describing the event | CFString | No | | | Yes | | |
| | | EventTimes | time/date the event starts | CFDate | Yes | | | Yes | | |
| | | Duration | The length of time that the meeting lasts | CFNumber | No | | | Yes | | |
| | | Invitees | The list of people who are invited to the meeting | CFString | Yes | | | Yes | | Address Book |
| | | Location | The name of the location where the meeting is taking place | CFString | No | | | Yes | | |

One particular field which may be useful in the various metadata formats would be a field which includes an identifier of a plug-in or other software element which may be used to capture metadata from a data file and/or export metadata back to the creator application.

Various different software architectures may be used to implement the functions and operations described herein. The following discussion provides one example of such an architecture, but it will be understood that alternative architectures may also be employed to achieve the same or similar results. The software architecture shown in FIG. 4 is an example which is based upon the Macintosh operating system. The architecture 400 includes a metadata processing software 401 and an operating system (OS) kernel 403 which is operatively coupled to the metadata processing software 401 for a notification mechanism which is described below. The metadata processing software 401 is also coupled to other software programs such as a file system graphical user interface software 405 (which may be the Finder), an email software 407, and other applications 409. These applications are coupled to the metadata processing software 401 through client application program interface 411 which provide a method for transferring data and commands between the metadata processing software 401 and the software 405, 407, and 409. These commands and data may include search parameters specified by a user as well as commands to perform searches from the user, which parameters and commands are passed to the metadata processing software 401 through the interface 411. The metadata processing software 401 is also coupled to a collection of importers 413 which extract data from various applications. In particular, in one exemplary embodiment, a text importer is used to extract text and other information from word processing or text processing files created by word processing programs such as Microsoft Word, etc. This extracted information is the metadata for a particular file. Other types of importers extract metadata from other types of files, such as image files or music files. In this particular embodiment, a particular importer is selected based upon the type of file which has been created and modified by an application program. For example, if the data file was created by PhotoShop, then an image importer for PhotoShop may be used to input the metadata from a PhotoShop data file into the metadata database 415 through the metadata processing software 401. On the other hand, if the data file is a word processing document, then an importer designed to extract metadata from a word processing document is called upon to extract the metadata from the word processing data file and place it into the metadata database 415 through the metadata processing software 401. Typically, a plurality of different importers may be required in order to handle the plurality of different application programs which are used in a typical computer system. The importers 413 may optionally include a plurality of exporters which are capable of exporting the extracted metadata for particular types of data files back to property sheets or other data components maintained by certain application programs. For example, certain application programs may maintain some metadata for each data file created by the program, but this metadata is only a subset of the metadata extracted by an importer from this type of data file. In this instance, the exporter may export back additional metadata or may simply insert metadata into blank fields of metadata maintained by the application program.

The software architecture 400 also includes a file system directory 417 for the metadata. This file system directory keeps track of the relationship between the data files and their metadata and keeps track of the location of the metadata object (e.g. a metadata file which corresponds to the data file from which it was extracted) created by each importer. In one exemplary embodiment, the metadata database is maintained as a flat file format as described below, and the file system directory 417 maintains this flat file format. One advantage of a flat file format is that the data is laid out on a storage device as a string of data without references between fields from one metadata file (corresponding to a particular data file) to another metadata file (corresponding to another data file). This arrangement of data will often result in faster retrieval of information from the metadata database 415.

The software architecture 400 of FIG. 4 also includes find by content software 419 which is operatively coupled to a database 421 which includes an index of files. The index of files represents at least a subset of the data files in a storage device and may include all of the data files in a particular storage device (or several storage devices), such as the main hard drive of a computer system. The index of files may be a conventional indexed representation of the content of each document. The find by content software 419 searches for words in that content by searching through the database 421 to see if a particular word exists in any of the data files which have been indexed. The find by content software functionality is available through the metadata processing software 401 which provides the advantage to the user that the user can search concurrently both the index of files in the database 421 (for the content within a file) as well as the metadata for the various data files being searched. The software architecture shown in FIG. 4 may be used to perform the method shown in FIG. 5 or alternative architectures may be used to perform the method of FIG. 5.

The method of FIG. 5 may begin in operation 501 in which a notification of a change for a file is received. This notification may come from the OS kernel 403 which notifies the metadata processing software 401 that a file has been changed. This notification may come from sniffer software elements which detect new or modified files and deletion of files. This change may be the creation of a new file or the modification of an existing file or the deletion of an existing file. The deletion of an existing file causes a special case of the processing method of FIG. 5 and is not shown in FIG. 5. In the case of a deletion, the metadata processing software 401, through the use of the file system directory 417, deletes the metadata file in the metadata database 415 which corresponds to the deleted file. The other types of operations, such as the creation of a new file or the modification of an existing file, causes the processing to proceed from operation 501 to operation 503 in which the type of file which is the subject of the notification is determined. The file may be an Acrobat PDF file or an RTF word processing file or a JPEG image file, etc. In any case, the type of the file is determined in operation 503. This may be performed by receiving from the OS kernel 403 the type of file along with the notification or the metadata processing software 401 may request an identification of the type of file from the file system graphical user interface software 405 or similar software which maintains information about the data file, such as the creator application or parent application of the data file. It will be understood that in one exemplary embodiment, the file system graphical user interface software 405 is the Finder program which operates on the Macintosh operating system. In alternative embodiments, the file system graphical user interface system may be Windows Explorer which operates on Microsoft's Windows operating system. After the type of file has been determined in operation 503, the appropriate capture software (e.g. one of the importers 413) is activated for the determined file type. The importers may be a plug-in for the particular application which created the type of file about which notification is received in operation 501. Once activated, the importer or capture software imports the appropriate metadata (for the particular file type) into the metadata database, such as metadata database 415 as shown in operation 507. Then in operation 509, the metadata is stored in the database. In one exemplary embodiment, it may be stored in a flat file format. Then in operation 511, the metadata processing software 401 receives search parameter inputs and performs a search of the metadata database (and optionally also causes a search of non-metadata sources such as the index of files 421) and causes the results of the search to be displayed in a user interface. This may be performed by exchanging information between one of the applications, such as the software 405 or the software 407 or the other applications 409 and the metadata processing software 401 through the interface 411. For example, the file system software 405 may present a graphical user interface, allowing a user to input search parameters and allowing the user to cause a search to be performed. This information is conveyed through the interface 411 to the metadata processing software 401 which causes a search through the metadata database 415 and also may cause a search through the database 421 of the indexed files in order to search for content within each data file which has been indexed. The results from these searches are provided by the metadata processing software 401 to the requesting application which, in the example given here, was the software 405, but it will be appreciated that other components of software, such as the email software 407, may be used to receive the search inputs and to provide a display of the search results. Various examples of the user interface for inputting search requests and for displaying search results are described herein and shown in the accompanying drawings.

It will be appreciated that the notification, if done through the OS kernel, is a global, system wide notification process such that changes to any file will cause a notification to be sent to the metadata processing software. It will also be appreciated that in alternative embodiments, each application program may itself generate the necessary metadata and provide the metadata directly to a metadata database without the requirement of a notification from an operating system kernel or from the intervention of importers, such as the importers 413. Alternatively, rather than using OS kernel notifications, an embodiment may use software calls from each application to a metadata processing software which receives these calls and then imports the metadata from each file in response to the call.

Figure 6:
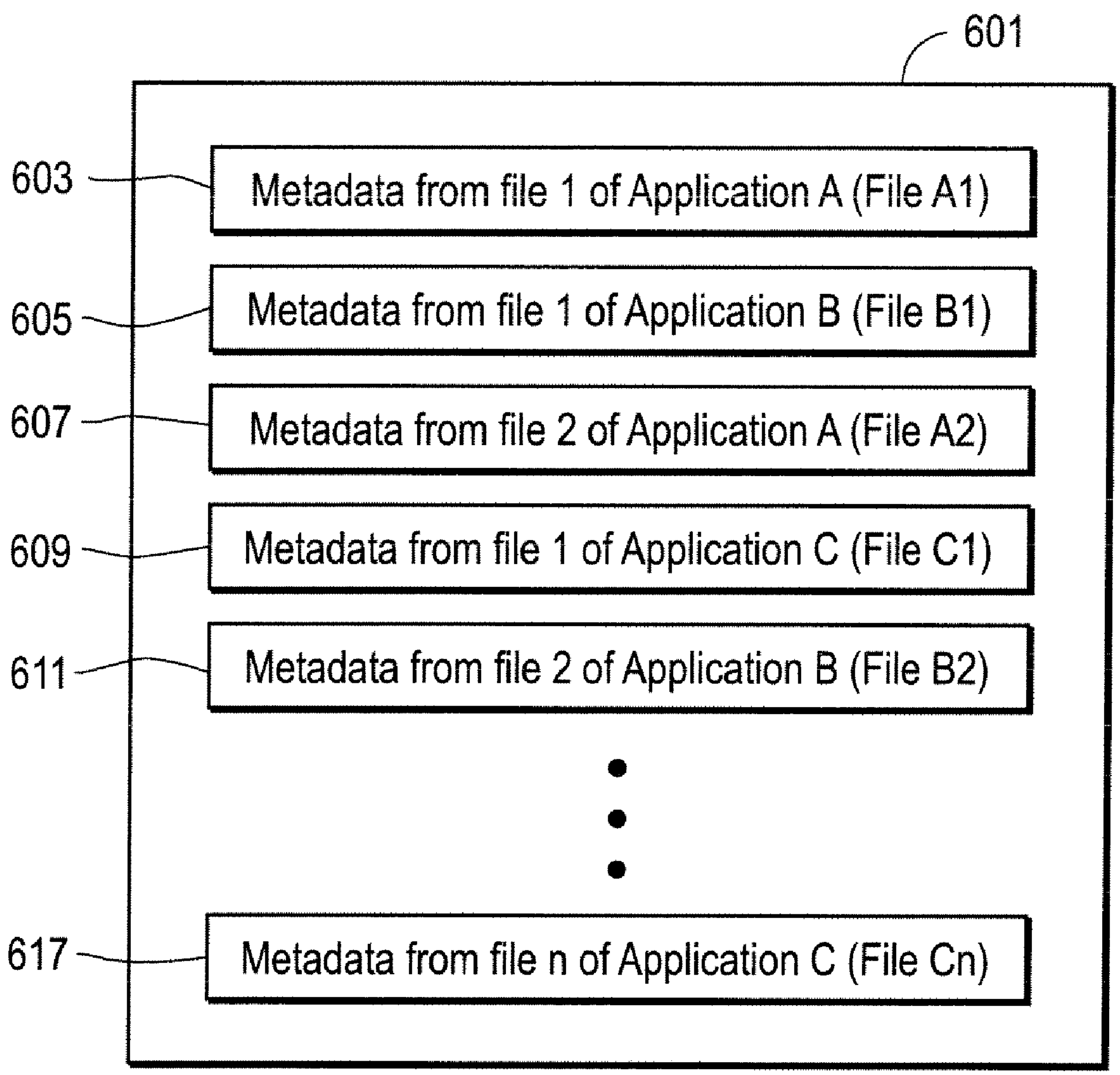
FIG. 6 shows an example of a storage format which utilizes a flat file format for metadata according to one exemplary embodiment of the invention.

As noted above, the metadata database 415 may be stored in a flat file format in order to improve the speed of retrieval of information in most circumstances. The flat file format may be considered to be a non-B tree, non-hash tree format in which data is not attempted to be organized but is rather stored as a stream of data. Each metadata object or metadata file will itself contain fields, such as the fields shown in the examples of FIGS. 3A and 3B. However, there will typically be no relationship or reference or pointer from one field in one metadata file to the corresponding field (or another field) in the next metadata file or in another metadata file of the same file type. FIG. 6 shows an example of the layout in a flat file format of metadata. The format 601 includes a plurality of metadata files for a corresponding plurality of data files. As shown in FIG. 6, metadata file 603 is metadata from file 1 of application A and may be referred to as metadata file A1. Similarly, metadata file 605 is metadata from file 1 of application B and may be referred to as metadata file B1. Each of these metadata files typically would include fields which are not linked to other fields and which do not contain references or pointers to other fields in other metadata files. It can be seen from FIG. 6 that the metadata database of FIG. 6 includes metadata files from a plurality of different applications (applications A, B, and C) and different files created by each of those applications. Metadata files 607, 609, 611, and 617 are additional metadata files created by applications A, B, and C as shown in FIG. 6.

A flexible query language may be used to search the metadata database in the same way that such query languages are used to search other databases. The data within each metadata file may be packed or even compressed if desirable. As noted above, each metadata file, in certain embodiments, will include a persistent identifier which uniquely identifies its corresponding data file. This identifier remains the same even if the name of the file is changed or the file is modified. This allows for the persistent association between the particular data file and its metadata.

User Interface Aspects

Various different examples of user interfaces for inputting search parameters and for displaying search results are provided herein. It will be understood that some features from certain embodiments may be mixed with other embodiments such that hybrid embodiments may result from these combinations. It will be appreciated that certain features may be removed from each of these embodiments and still provide adequate functionality in many instances.

Figure 7A:
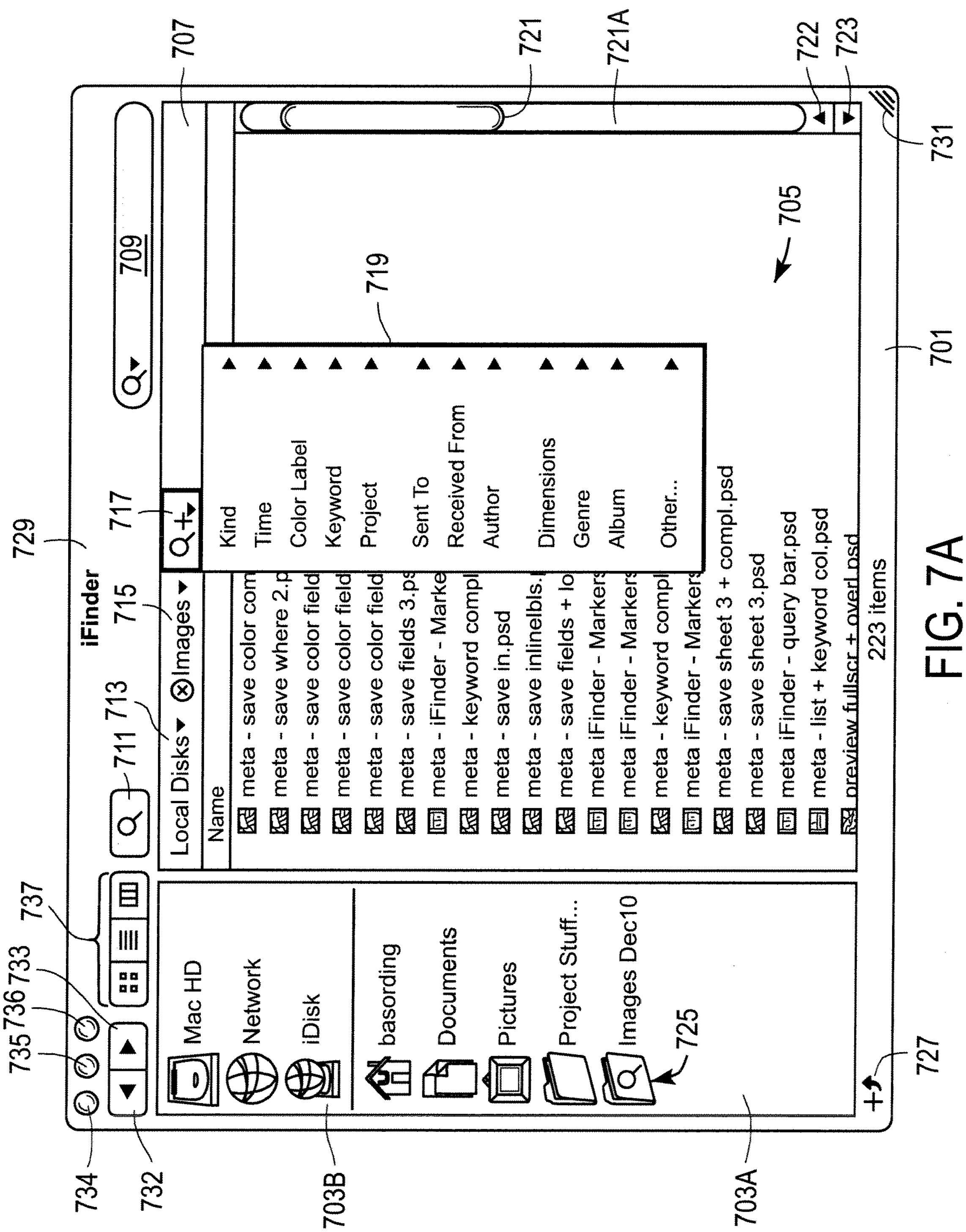
FIGS. 7A-7E show a sequence of graphical user interfaces provided by one exemplary embodiment in order to allow searching of metadata and/or other data in a data processing system.

FIG. 7A shows a graphical user interface which is a window which may be displayed on a display device which is coupled to a data processing system such as a computer system. The window 701 includes a side bar having two regions 703A, which is a user-configurable region, and 703B, which is a region which is specified by the data processing system. Further details in connection with these side bar regions may be found in co-pending U.S. patent application Ser. No. 10/873,661 filed Jun. 21, 2004, and entitled "Methods and Apparatuses for Operating a Data Processing System," by inventors Donald Lindsay and Bas Ording. The window 701 also includes a display region 705 which in this case displays the results of searches requested by the user. The window 701 also includes a search parameter menu bar 707 which includes configurable pull down menus 713, 715, and 717. The window 701 also includes a text entry region 709 which allows a user to enter text as part of the search query or search parameters. The button 711 may be a start search button which a user activates in order to start a search based upon the selected search parameters. Alternatively, the system may perform a search as soon as it receives any search parameter inputs or search queries from the user rather than waiting for a command to begin the search. The window 701 also includes a title bar 729 which may be used in conjunction with a cursor control device to move, in a conventional manner, the window around a desktop which is displayed on a display device. The window 701 also includes a close button 734, a minimize button 735, and a resize button 736 which may be used to close or minimize or resize, respectively, the window. The window 701 also includes a resizing control 731 which allows a user to modify the size of the window on a display device. The window 701 further includes a back button 732 and a forward button 733 which function in a manner which is similar to the back and forward buttons on a web browser, such as Internet Explorer or Safari. The window 701 also includes view controls which include three buttons for selecting three different types of views of the content within the display region 705. When the contents found in a search exceed the available display area of a display region 705, scroll controls, such as scroll controls 721, 722, and 723, appear within the window 701. These may be used in a conventional manner, for example, by dragging the scroll bar 721 within the scroll region 721A using conventional graphical user interface techniques.

The combination of text entry region 709 and the search parameter menu bar allow a user to specify a search query or search parameters. Each of the configurable pull down menus presents a user with a list of options to select from when the user activates the pull down menu. As shown in FIG. 7A, the user has already made a selection from the configurable pull down menu 713 to specify the location of the search, which in this case specifies that the search will occur on the local disks of the computer systems. Configurable pull down menu 715 has also been used by the user to specify the kind of document which is to be searched for, which in this case is an image document as indicated by the configurable pull down menu 715 which indicates "images" as the selected configuration of this menu and hence the search parameter which it specifies. The configurable pull down menu 717, as shown in FIG. 7A, represents an add search parameter pull down menu. This add search parameter pull down menu allows the user to add additional criteria to the search query to further limit the search results. In the embodiment shown in FIG. 7A, each of the search parameters is logically ANDed in a Boolean manner. Thus the current search parameter specified by the user in the state shown in FIG. 7A searches all local disks for all images, and the user is in the middle of the process of selecting another search criteria by having selected the add search criteria pull down menu 717, resulting in the display of the pull down menu 719, which has a plurality of options which may be selected by the user.

Figure 7B:
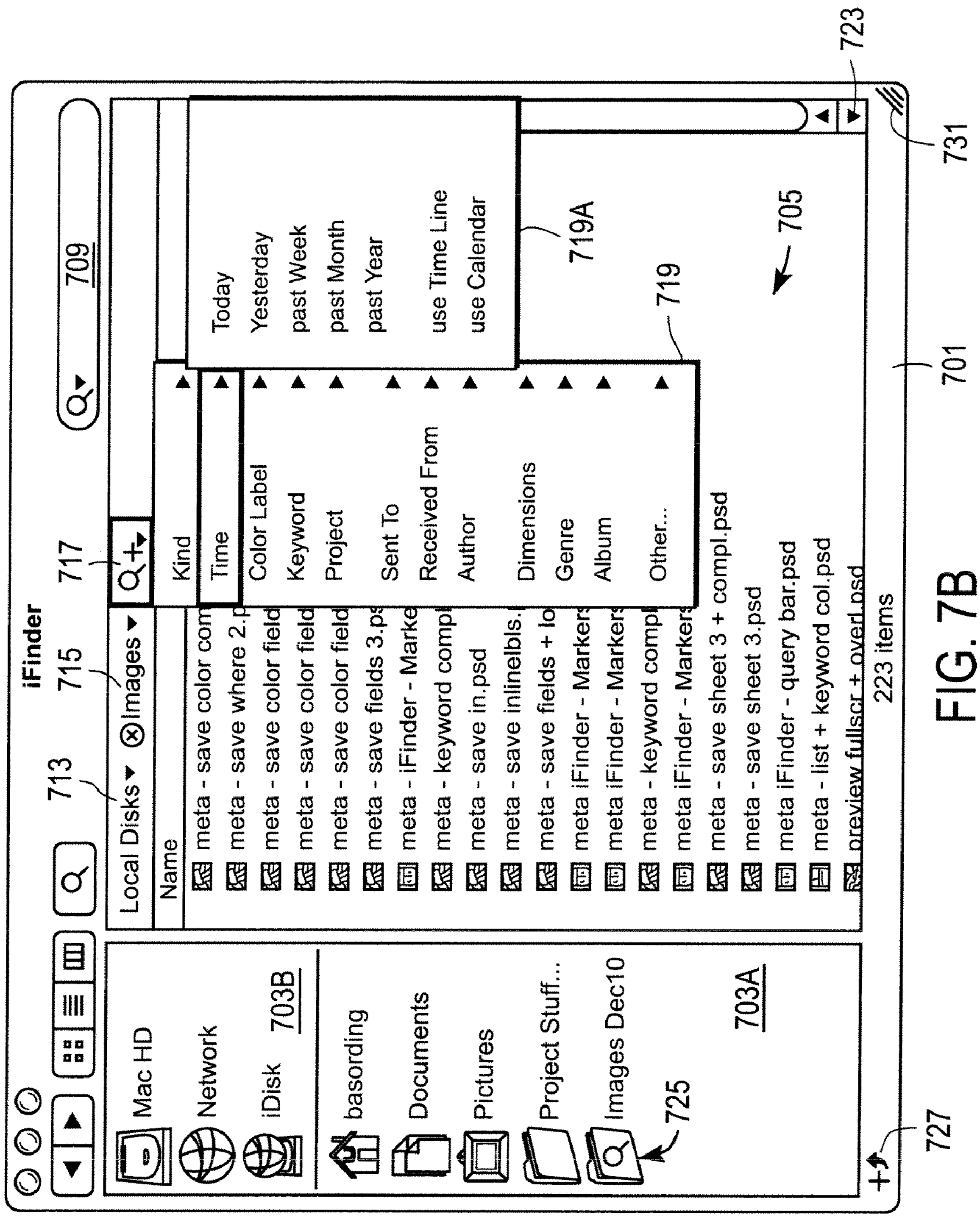

FIG. 7B shows the window 701 after the user has caused the selection of the time option within pull down menu 719, thereby causing the display of a submenu 719A which includes a list of possible times which the user may select from. Thus it appears that the user wants to limit the search to all images on all local disks within a certain period of time which is to be specified by making a selection within the submenu 719A.

Figure 7C:
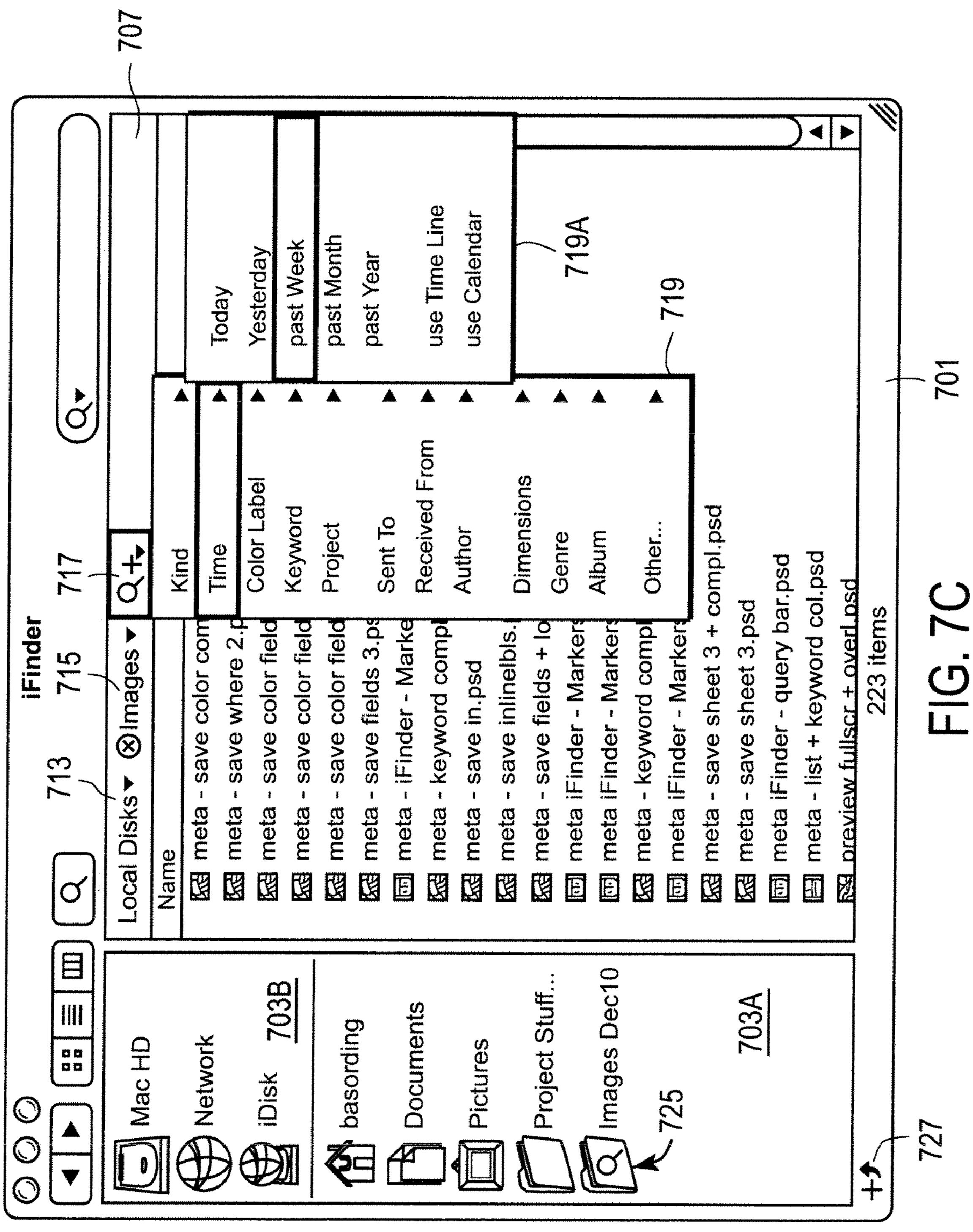
Figure 7D:
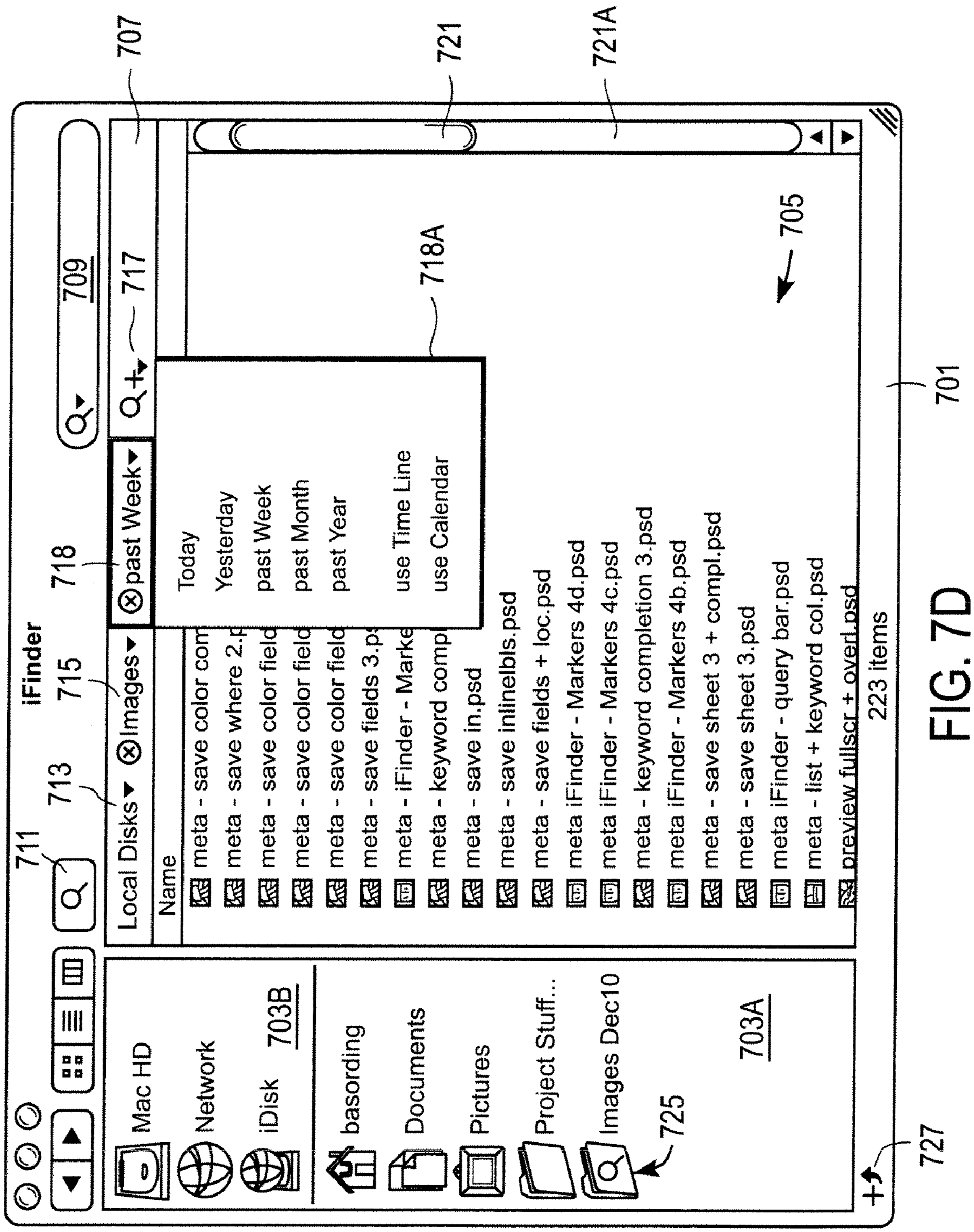
Figure 7E:
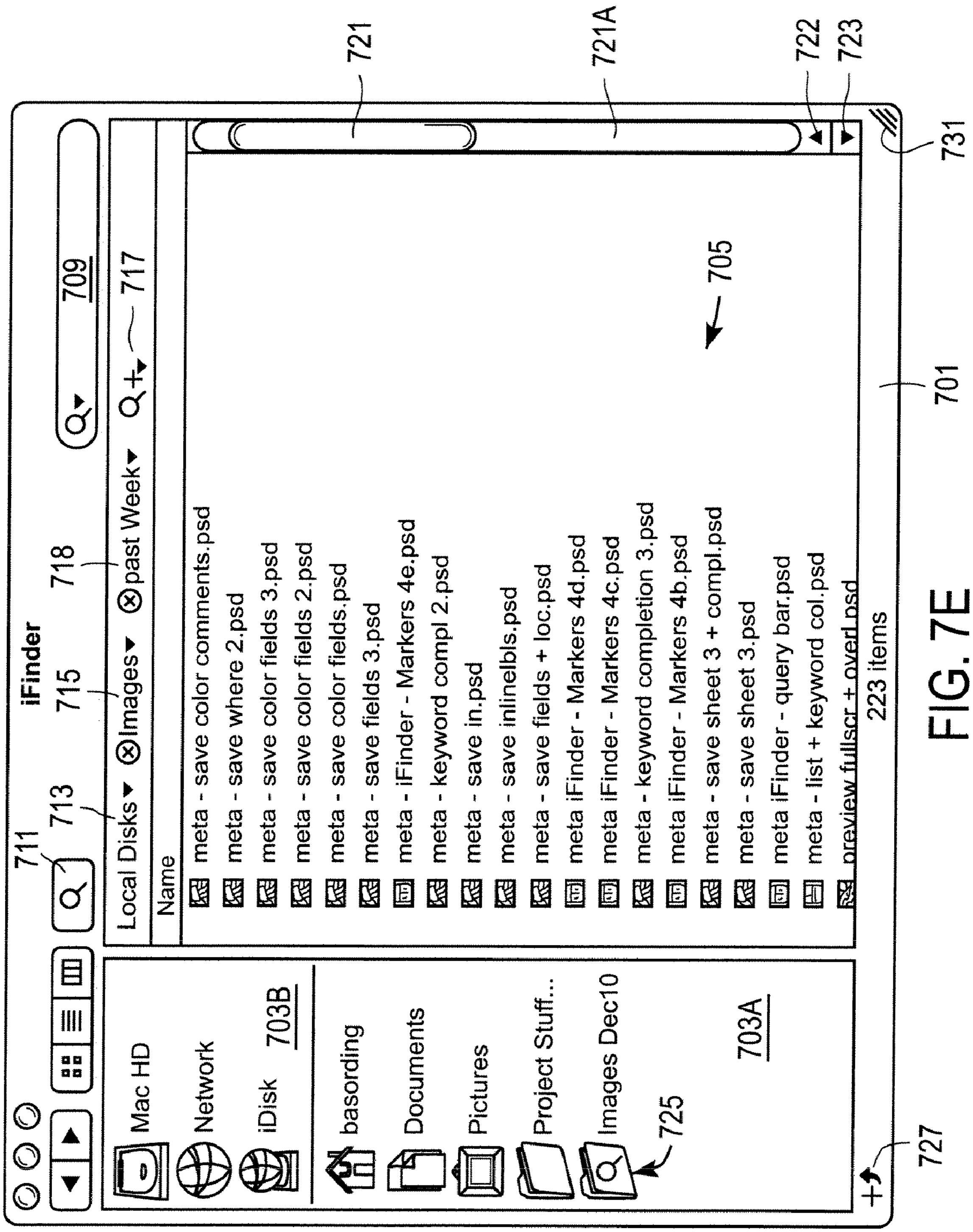

FIG. 7C shows the window 701 on the display of a data processing system after the user has selected a particular option (in this case "past week") from the submenu 719A. If the user accepts this selection, then the display shown in FIG. 7D results in which the configurable pull down menu 718 is displayed showing that the user has selected as part of the search criteria files that have been created or modified in the past week. It can be seen from FIG. 7D that the user can change the particular time selected from this pull down menu 718 by selecting another time period within the pull down menu 718A shown in FIG. 7D. Note that the configurable pull down menu 717, which represents an add search parameter menu, has now moved to the right of the configurable pull down menu 718. The user may add further search parameters by pressing or otherwise activating the configurable pull down menu 717 from the search parameter menu bar 707. If the user decides that the past week is the proper search criteria in the time category, then the user may release the pull down menu 718A from being displayed in a variety of different ways (e.g. the user may release the mouse button which was being depressed to keep the pull down menu 718A on the display). Upon releasing or otherwise dismissing the pull down menu 718A, the resulting window 701 shown in FIG. 7E then appears. There are several aspects of this user interface shown in FIG. 7A-7E which are worthy of being noted. The search parameters or search query is specified within the same window as the display of the search results. This allows the user to look at a single location or window to understand the search parameters and how they affected the displayed search results, and may make it easier for a user to alter or improve the search parameters in order to find one or more files. The configurable pull down menus, such as the add search parameter pull down menu, includes hierarchical pull down menus. An example of this is shown in FIG. 7B in which the selection of the time criteria from the pull down menu 717 results in the display of another menu, in this case a submenu 719A which may be selected from by the user. This allows for a compact presentation of the various search parameters while keeping the initial complexity (e.g. without submenus being displayed) at a lower level. Another useful aspect of the user interface shown in FIG. 7A-7E is the ability to reconfigure pull down menus which have previously been configured. Thus, for example, the configurable pull down menu 713 currently specifies the location of the search (in this case, all local disks), however, this may be modified by selecting the pull down region associated with the configurable pull down menu 713, causing the display of a menu of options indicating alternative locations which may be selected by the user. This can also be seen in FIG. 7D in which the past week option has been selected by the user (as indicated by "past week" being in the search parameter menu bar 707), but a menu of options shown in the pull down menu 718A allows the user to change the selected time from the "past week" to some other time criteria. Another useful aspect of this user interface is the ability to continue adding various search criteria by using the add search criteria pull down menu 717 and selecting a new criteria.

It will also be appreciated that the various options in the pull down menus may depend upon the fields within a particular type of metadata file. For example, the selection of "images" to be searched may cause the various fields present in the metadata for an image type file to appear in one or more pull down menus, allowing the user to search within one or more of those fields for that particular type of file. Other fields which do not apply to "images" types of files may not appear in these menus in order reduce the complexity of the menus and to prevent user confusion.

Another feature of the present invention is shown in FIGS. 7A-7E. In particular, the side bar region 703A, which is the user-configurable portion of the side bar, includes a representation of a folder 725 which represents the search results obtained from a particular search, which search results may be static or they may be dynamic in that, in certain instances, the search can be performed again to obtain results based on the current files in the system. The folder 725 in the example shown in FIGS. 7A-7E represents a search on a local disk for all images done on December $10^{th}$. By selecting this folder in the side bar region 703A, the user may cause the display in the display region 705 of the results of that search. In this way, a user may retrieve a search result automatically by saving the search result into the side bar region 703A. One mechanism for causing a search result or a search query to be saved into the side bar region 703A is to select the add folder button 727 which appears in the bottom portion of the window 701. By selecting this button, the current search result or search query is saved as a list of files and other objects retrieved in the current search result. In the case where the search query is saved for later use rather than the saving of a search result, then the current search query is saved for re-use at a later time in order to find files which match the search query at that later time. The user may select between these two functionalities (saving a search result or saving a search query) by the selection of a command which is not shown.

Figure 8A:
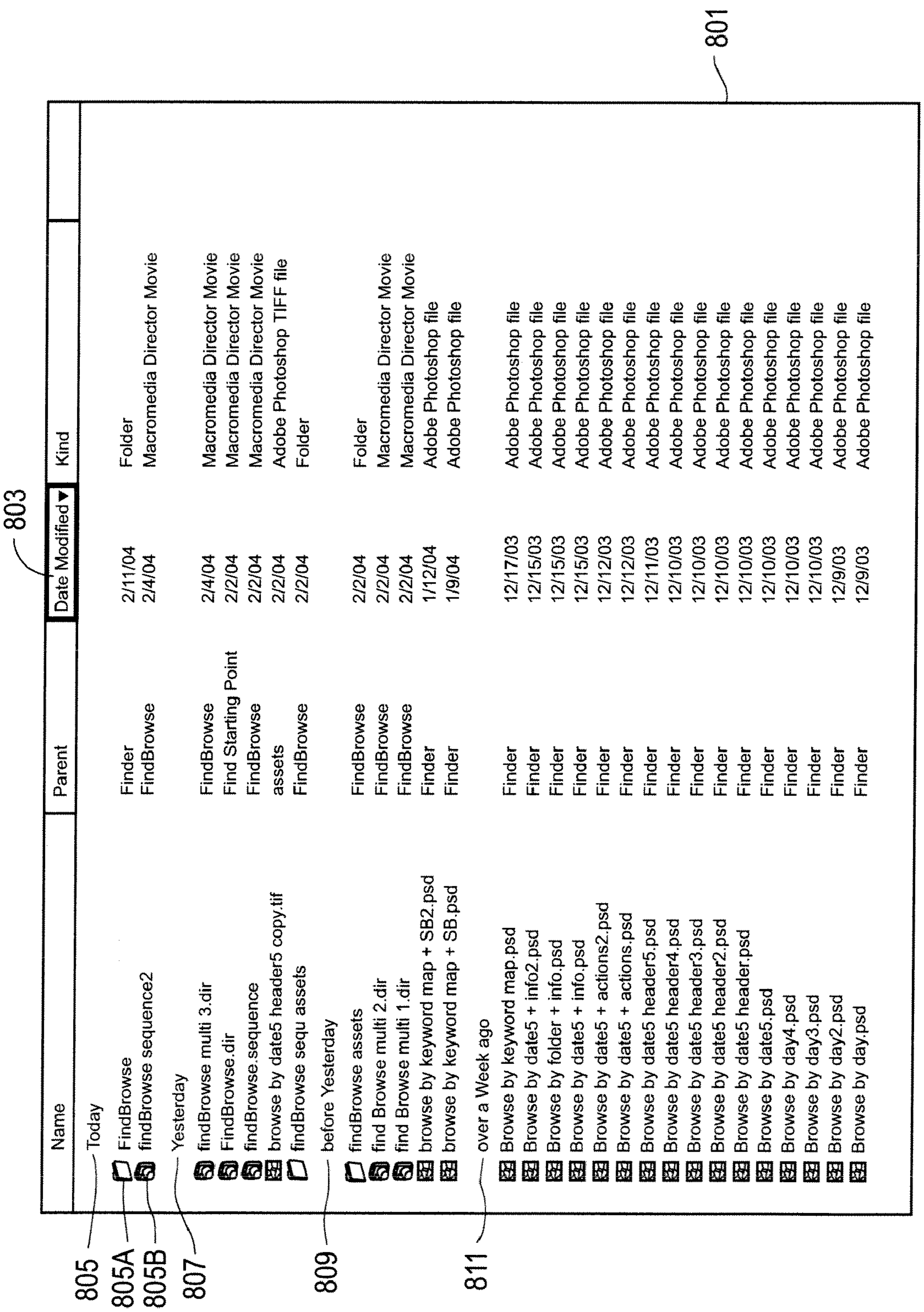
FIGS. 8A and 8B show two examples of formats for displaying search results according to one exemplary embodiment of the invention.
Figure 8B:
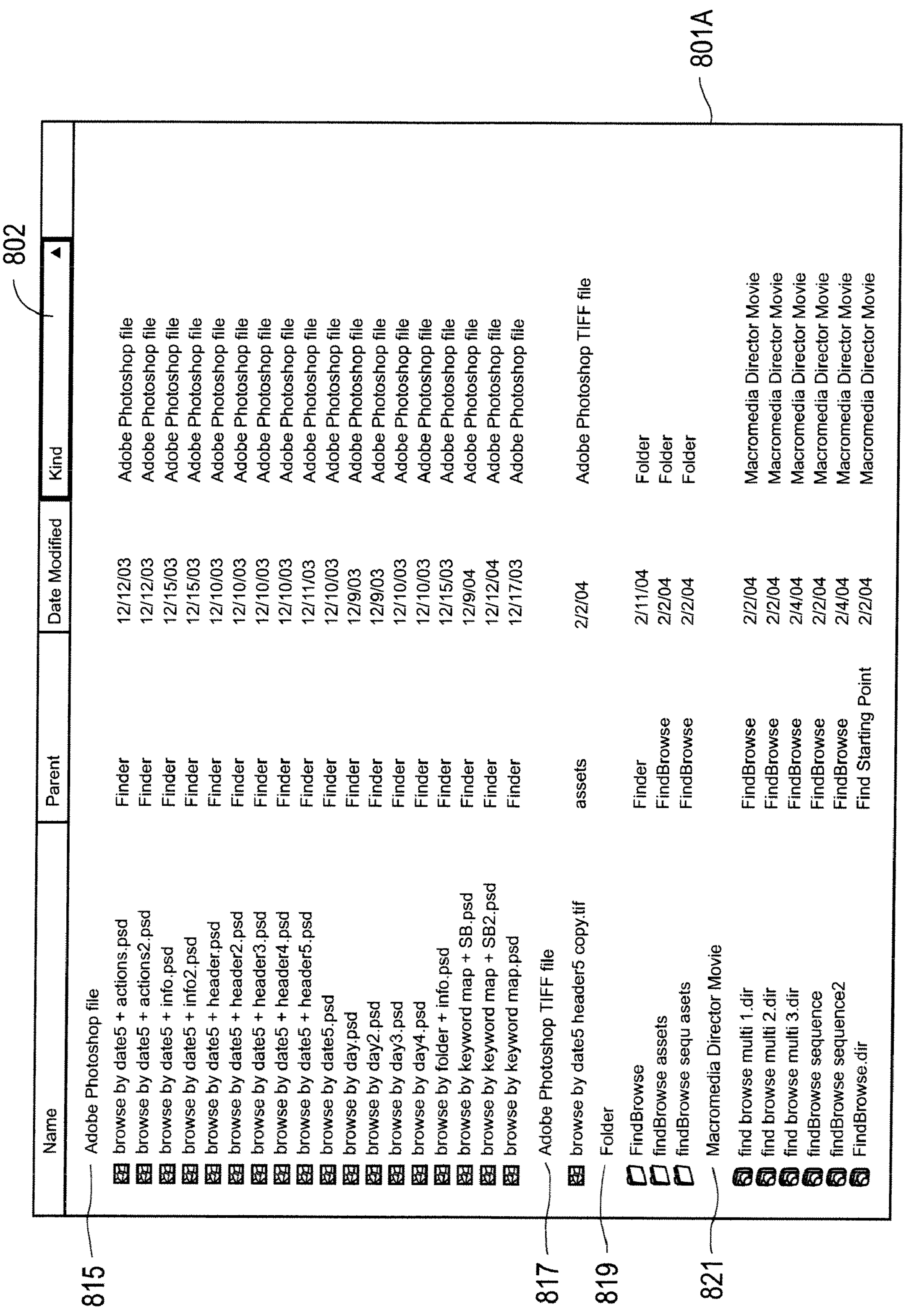

FIGS. 8A and 8B show another aspect of a user interface feature which may be used with certain embodiments of the present invention. The window 801 of FIG. 8A represents a display of the search results which may be obtained as a result of using one of the various different embodiments of the present invention. The search results are separated into categories which are separated by headers 805, 807, 809, and 811 which in this case represent periods of time. This particular segmentation with headers was selected by the user's selecting the heading "date modified" using the date modified button 803 at the top of the window 801. An alternative selection of the kind category by selecting the button 802 at the top of the window 801A shown in FIG. 8B results in a different formatting of the search results which are now categorized by headers which indicate the types of files which were retrieved in the search and are separated by the headings 815, 817, 819, and 821 as shown in FIG. 8B. The use of these headings in the search results display allows the user to quickly scan through the search results in order to find the file.

Figure 9:
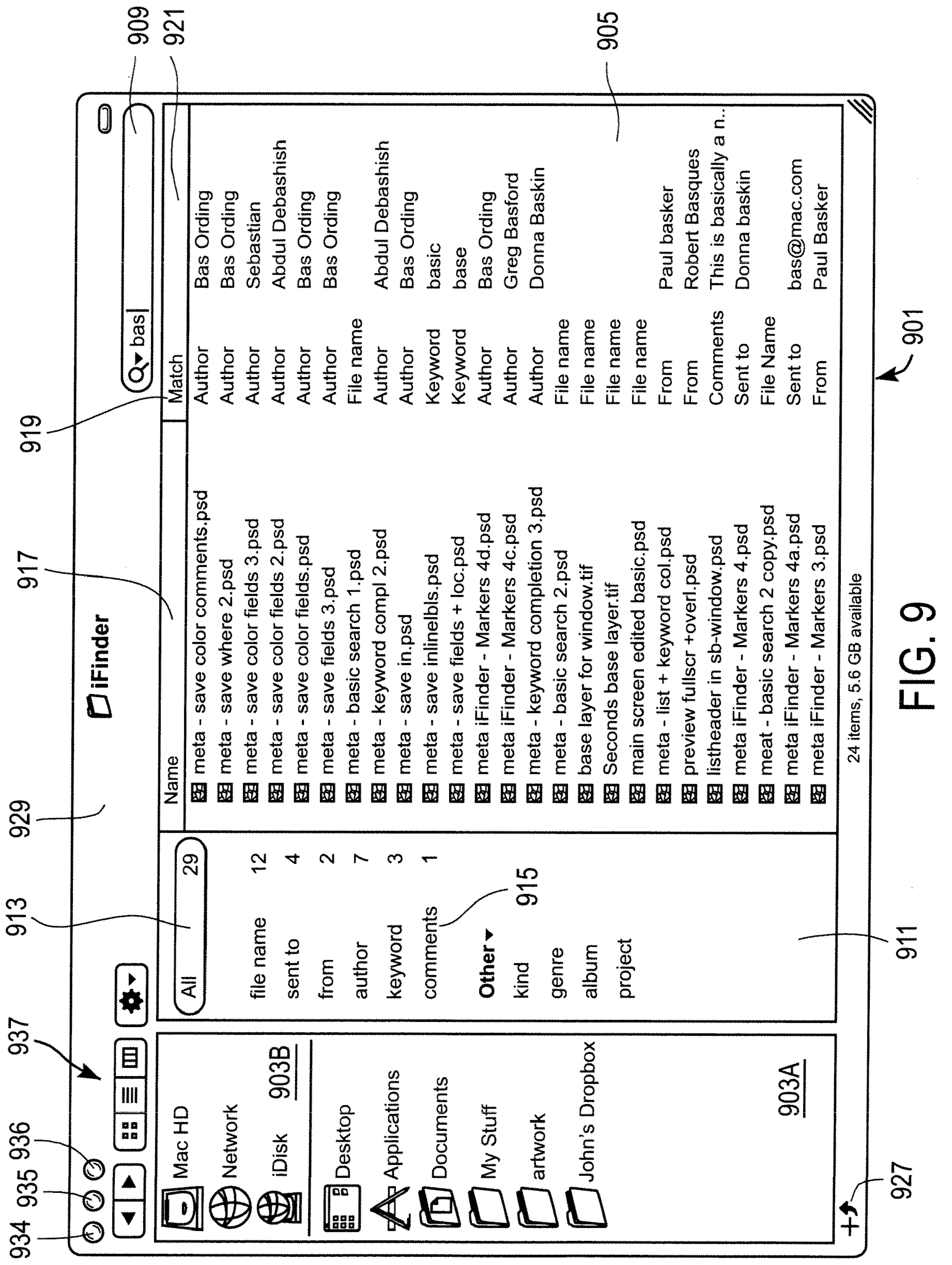
FIG. 9 shows another exemplary user interface of the present invention.

FIG. 9 shows another aspect of the present invention that is illustrated as part of the window 901 shown in FIG. 9. This window includes a display region 905 which shows the results of the search and the window also includes two side bar regions 903A and 903B, where the side bar region 903A is the user-configurable portion and the side bar region 903B is the system controlled portion. A folder add button 927 may be selected by the user to cause the addition of a search result or a search query to be added to the user-configurable portion of the side bar. The window 901 also includes conventional window controls such as a title bar or region 929 which may be used to move the window around a display and view select buttons 937 and maximize, minimize and resize buttons 934, 935, and 936 respectively. The window 901 shows a particular manner in which the results of a text-based search may be displayed. A text entry region 909 is used to enter text for searching. This text may be used to search through the metadata files or the indexed files or a combination of both. The display region 905 shows the results of a search for text and includes at least two columns, 917 and 919, which provide the name of the file that was found and the basis for the match. As shown in column 919, the basis for the match may be the author field or a file name or a key word or comments or other data fields contained in metadata that was searched. The column 921 shows the text that was found which matches the search parameter typed into the text entry field 909. Another column 911 provides additional information with respect to the search results. In particular, this column includes the number of matches for each particular type of category or field as well as the total number of matches indicated in the entry 913. Thus, for example, the total number of matches found for the comments field is only 1, while other fields have a higher number of matches.

Figure 10:
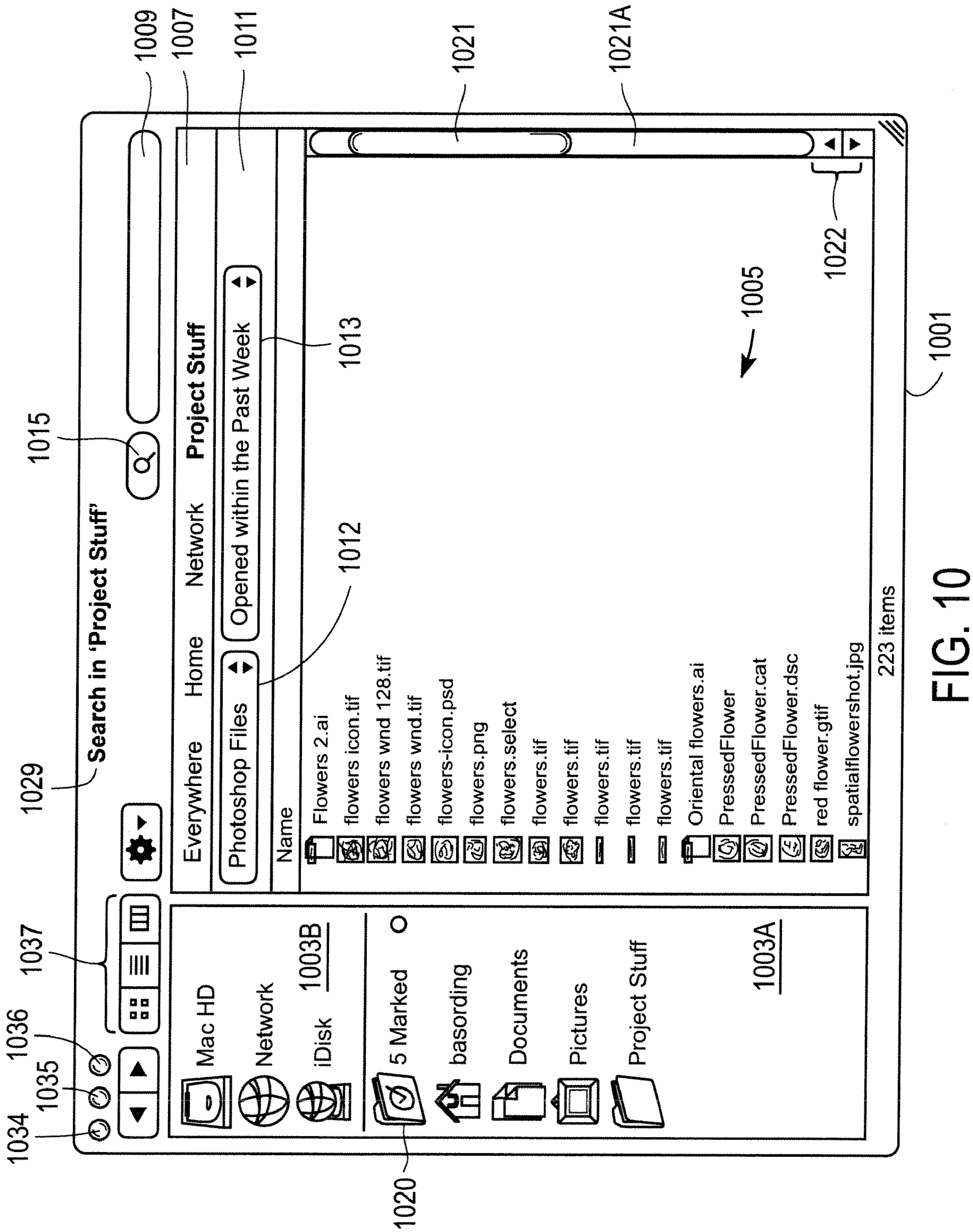
FIG. 10 shows another exemplary user interface of the present invention.

FIG. 10 shows certain other aspects of some embodiments of the present invention. Window 1001 is another search result window which includes various fields and menus for a user to select various search parameters or form a search query. The window 1001 includes a display region 1005 which may be used to display the results of a search and a user-configurable side bar portion 1003A and a system specified side bar portion 1003B. In addition, the window 1001 includes conventional scrolling controls such as controls 1021 and 1022 and 1021A. The window further includes conventional controls such as a title bar 1029 which may be used to move the window and view control buttons 1037 and maximize, minimize, and resize buttons 1034, 1035, and 1036. A start search button 1015 is near a text entry region 1009. A first search parameter menu bar 1007 is displayed adjacent to a second search parameter bar 1011. The first search parameter search bar 1007 allows a user to specify the location for a particular search while two menu pull down controls in the second search parameter menu bar 1011 allow the user to specify the type of file using the pull down menu 1012 and the time the file was created or last modified using the menu 1013.

The window 1001 includes an additional feature which may be very useful while analyzing a search result. A user may select individual files from within the display region 1005 and associate them together as one collection. Each file may be individually marked using a specific command (e.g. pressing the right button on a mouse and selecting a command from a menu which appears on the screen, which command may be "add selection to current group") or similar such commands. By individually selecting such files or by selecting a group of files at once, the user may associate this group of files into a selected group or a "marked" group and this association may be used to perform a common action on all of the files in the group (e.g. print each file or view each file in a viewer window or move each file to a new or existing folder, etc.). A representation of this marked group appears as a folder in the user-configurable portion 1003A. An example of such a folder is the folder 1020 shown in the user-configurable portion 1003A. By selecting this folder (e.g. by positioning a cursor over the folder 1020 and pressing and releasing a mouse button or by pressing another button) the user, as a result of this selection, will cause the display within the display region 1005 of the files which have been grouped together or marked. Alternatively, a separate window may appear showing only the items which have been marked or grouped. This association or grouping may be merely temporary or it may be made permanent by retaining a list of all the files which have been grouped and by keeping a folder 1020 or other representations of the grouping within the user-configurable side bar, such as the side bar 1003A. Certain embodiments may allow multiple, different groupings to exist at the same time, and each of these groupings or associations may be merely temporary (e.g. they exist only while the search results window is displayed), or they may be made permanent by retaining a list of all the files which have been grouped within each separate group. It will be appreciated that the files within each group may have been created from different applications. As noted above, one of the groupings may be selected and then a user may select a command which performs a common action (e.g. print or view or move or delete) on all of the files within the selected group.

Figure 11A:
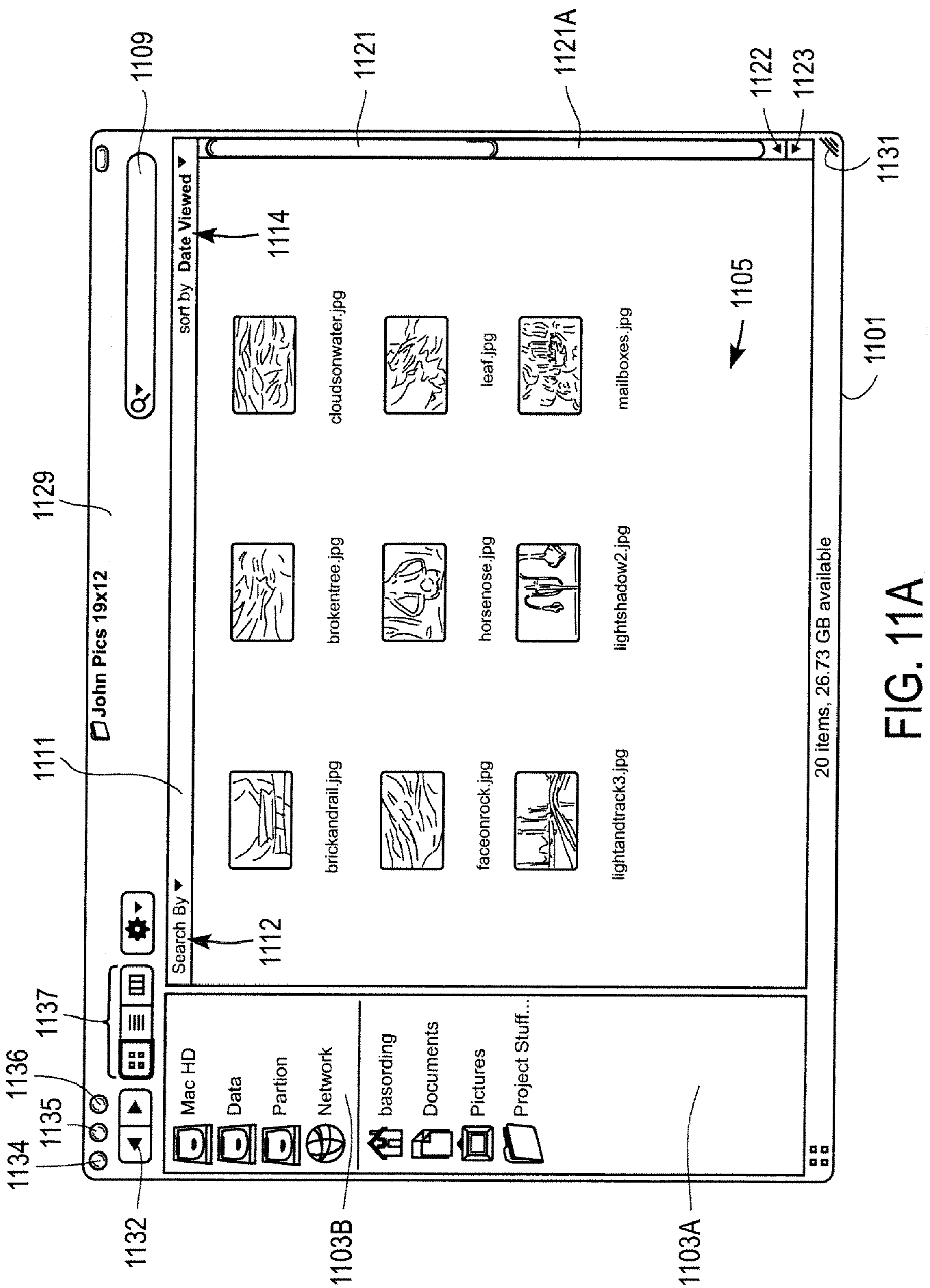
FIGS. 11A-11D show, in sequence, another exemplary user interface according to the present invention.
Figure 11B:
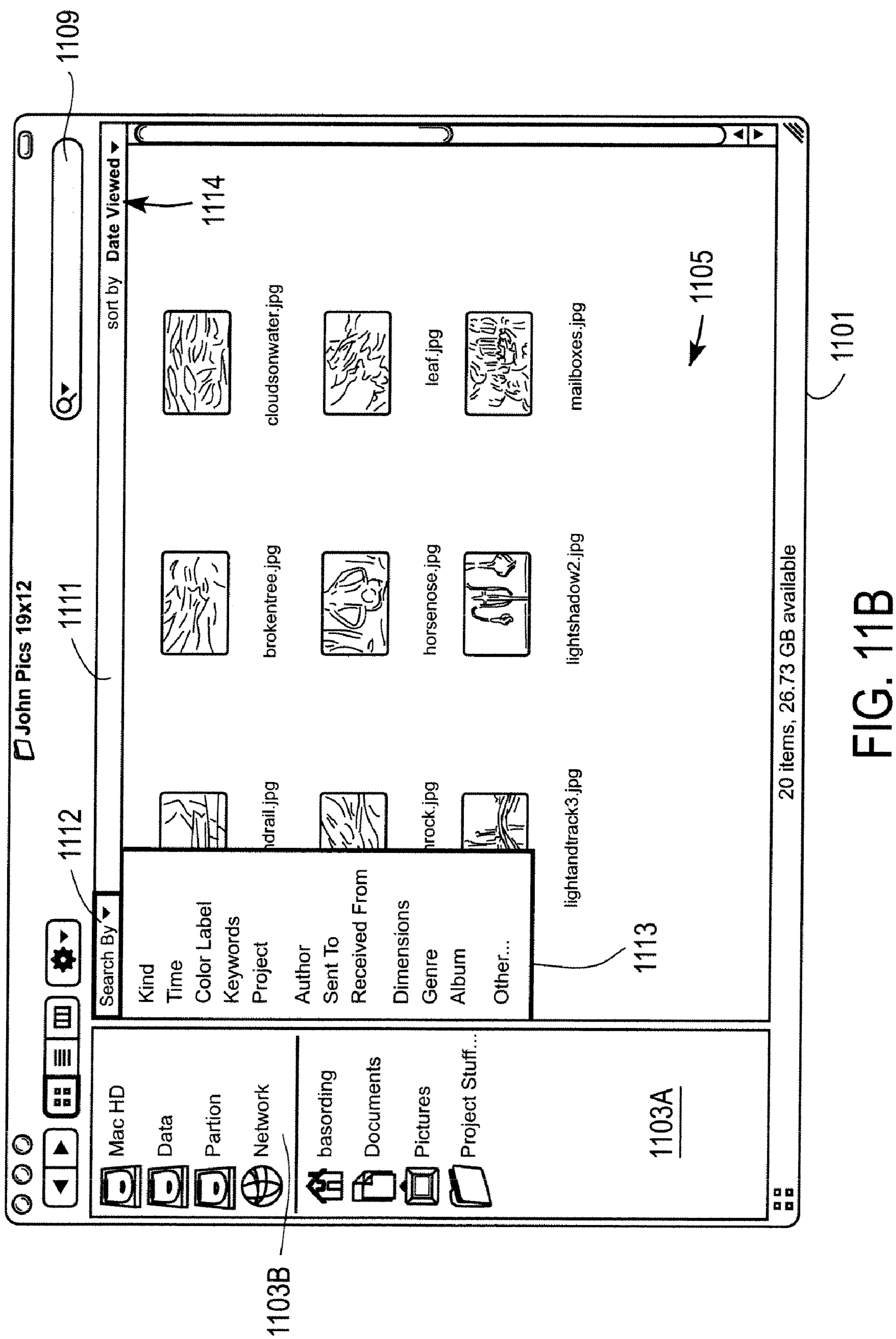

FIGS. 11A, 11B, 11C, and 11D show an alternative user interface for allowing a user to input search queries or search parameters. The user interface shown in these figures appears within the window 1101 which includes a user-configurable side bar region 1103A and a system specified side bar region 1103B. The window 1101 also includes traditional window controls such as a window resizing control 1131 which may be dragged in a conventional graphical user interface manner to resize the window, and the window further includes scrolling controls such as controls 1121, 1122, and 1123. The scrolling control 1121 may, for example, be dragged within the scrolling region 1121A or a scroll wheel on a mouse or other input device may be used to cause scrolling within a display region 1105. Further, traditional window controls include the title bar 1129 which may be used to move the window around a desktop which is displayed on a display device of a computer system and the window also includes view buttons 1137 as well as close, minimize, and resize buttons 1134, 1135 and 1136. A back and forward button, such as the back button 1132, are also provided to allow the user to move back and forth in a manner which is similar to the back and forth commands in a web browser. The window 1101 includes a search parameter menu bar 1111 which includes a "search by" pull down menu 1112 and a "sort by" pull down menu 1114. The "search by" pull down menu 1112 allows a user to specify the particular search parameter by selecting from the options which appear in the pull down menu once it is activated as shown in FIG. 11B. In particular, the pull down menu 1113 shows one example of a pull down menu when the "search by" pull down menu 1112 has been activated. The "sort by" pull down menu 1114 allows a user to specify how the search results are displayed within a display region 1105. In the example shown in FIGS. 11A-11D a user has used the "sort by" pull down menu 1114 to select the "date viewed" criteria to sort the search results by. It should also be noted that the user may change the type of view of the search results by selecting one of the three view buttons 1137. For example, a user may select an icon view which is the currently selected button among the view buttons 1137, or the user may select a list view or a column view.

Figure 11C:
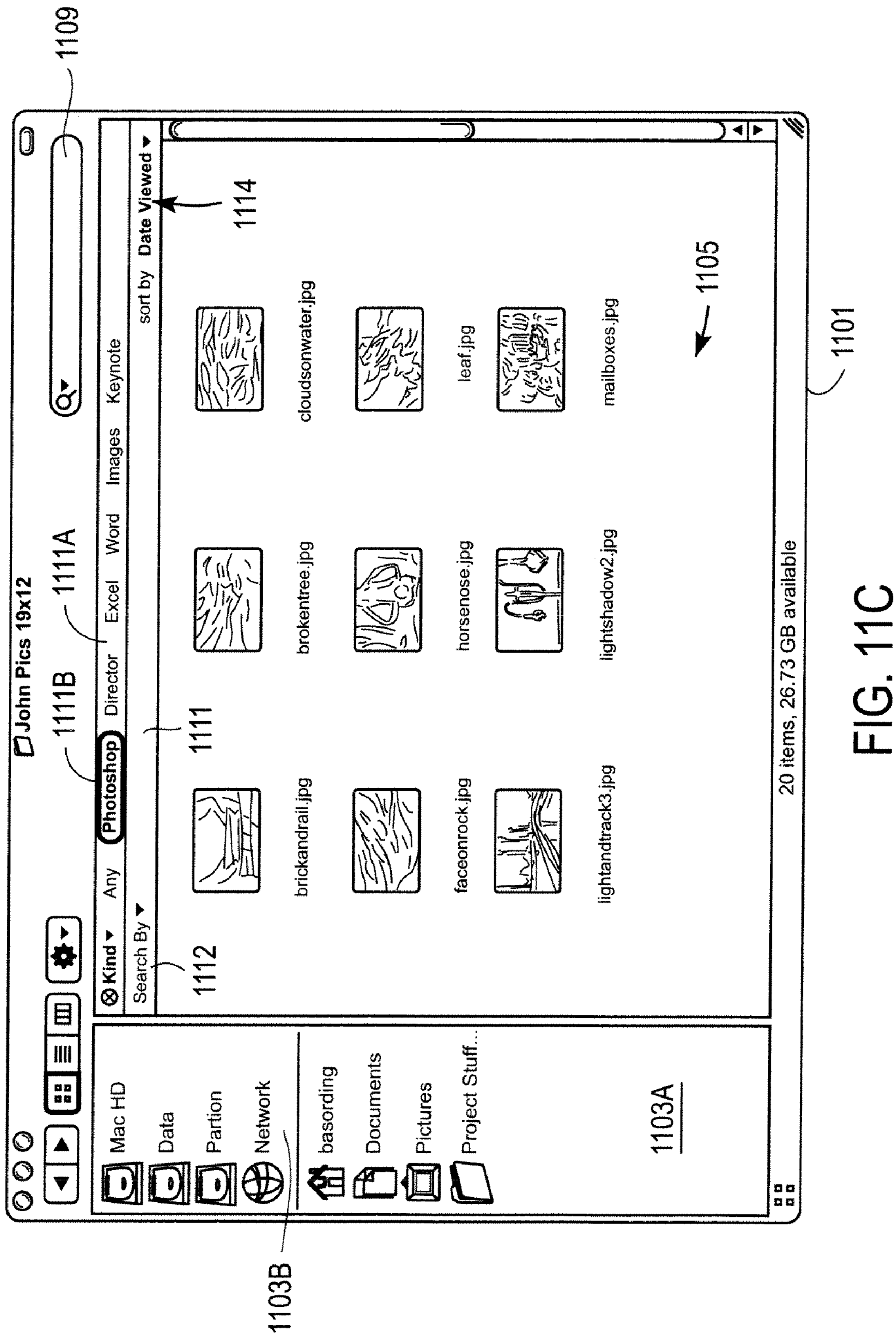
Figure 11D:
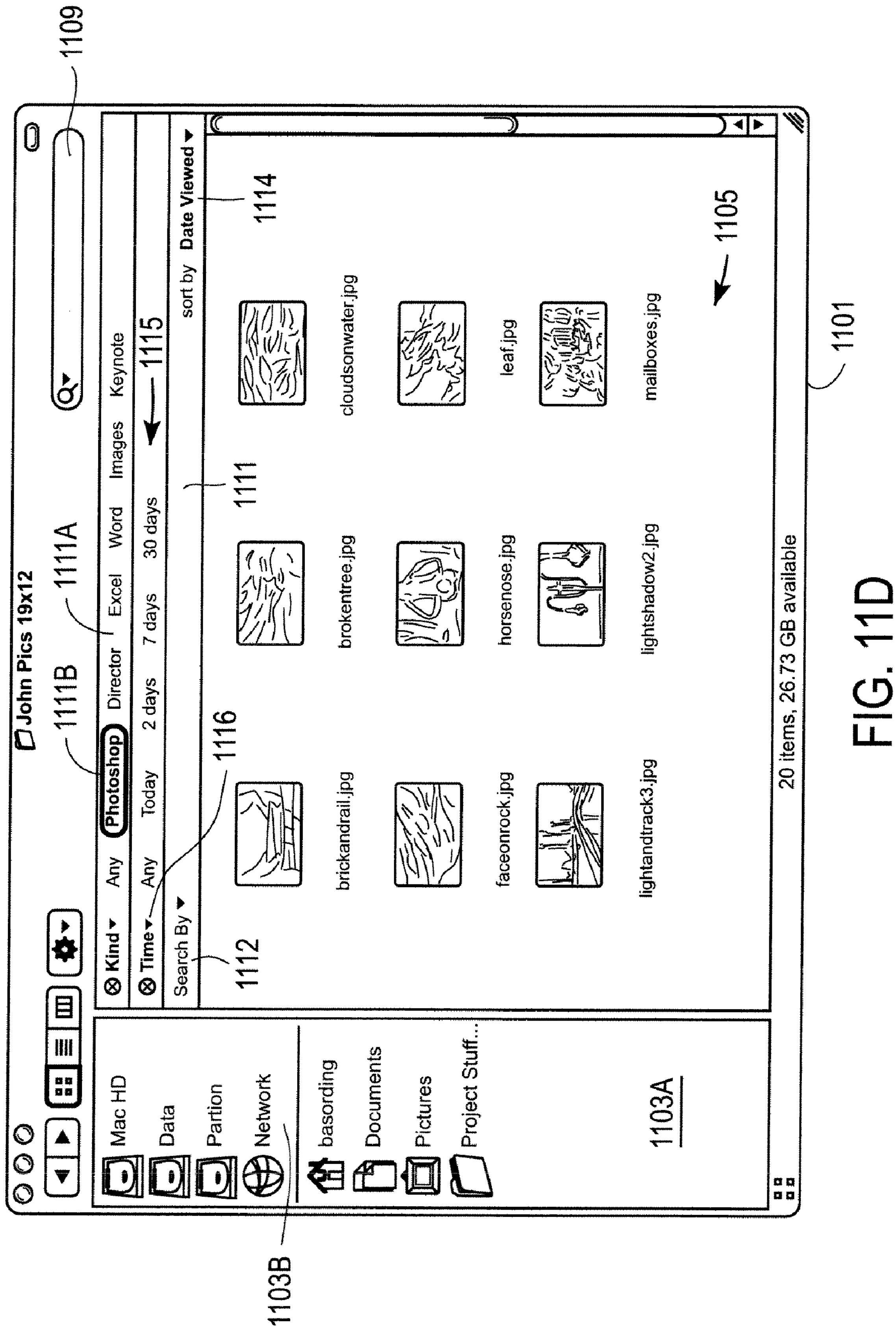

FIG. 11B shows the result of the user's activation of a "search by" pull down menu 1112 which causes the display of the menu 1113 which includes a plurality of options from which the user may choose to perform a search by. It will be appreciated that there are a number of different ways for a user to activate the "search by" pull down menu 1112. One way includes the use of a cursor, such as a pointer on a display which is controlled by a cursor control device, such as a mouse. The cursor is positioned over the region associated with the "search by" menu title (which is the portion within the search parameter menu bar 1111 which contains the words "search by") and then the user indicates the selection of the menu title by pressing a button, such as a mouse's button, to cause the pull down menu to appear, which in this case is the menu 1113 shown in FIG. 11B. At this point, the user may continue to move the cursor to point to a particular option within the menu, such as the "time" option. This may result in the display of a submenu to the left or to the right of the menu 1113. This submenu may be similar to the submenu 719A or to the menu 1214 shown in FIG. 12A. If the "kind" option is selected in the menu 1113, the submenu may include a generic list of the different kinds of documents, such as images, photos, movies, text, music, PDF documents, email documents, etc. or the list may include references to specific program names such as PhotoShop, Director, Excel, Word, etc. or it may include a combination of generic names and specific names. FIG. 11C shows the result of the user having selected PhotoShop type of documents from a submenu of the "kind" option shown in menu 1113. This results in the display of the search parameter menu bar 1111A shown in FIG. 11C which includes a highlighted selection 1111B which indicates that the PhotoShop type of documents will be searched for. The search parameter menu bar 1111 appears below the search parameter menu bar 1111A as shown in FIG. 11C. The user may then specify additional search parameters by again using the "search by" pull down menu 1112 or by typing text into the text entry field 1109. For example, from the state of the window 1101 shown in FIG. 11C, the user may select the "search by" pull down menu 1112 causing the display of a menu containing a plurality of options, such as the options shown within the menu 1113 or alternative options such as those which relate to PhotoShop documents (e.g. the various fields in the metadata for PhotoShop type of documents). A combination of such fields contained within metadata for PhotoShop type documents and other generic fields (e.g. time, file size, and other parameters) may appear in a menu, such as the menu 1113 which is activated by selecting the "search by" pull down menu. The user may then select another criteria such as the time criteria. In this case, the window 1101 displays a new search parameter menu bar 1115 which allows a user to specify a particular time. The user may select one of the times on the menu bar 1115 or may activate a pull down menu by selecting the menu title "time," which is shown as the menu title 1116. The state of the window 1101 shown in FIG. 11D would then search for all PhotoShop documents created in the last 30 days or 7 days or 2 days or today or at any time, depending on the particular time period selected by the user.

FIGS. 12A, 12B, 12C and 12D show another example of a user interface for allowing the creation of search queries for searching metadata and other data and for displaying the results of the search performed using a search query. The different implementation shown in FIGS. 12A-12D shows a user interface presentation in a column mode; this can be seen by noting the selection of the column button, which is the rightmost button in the view buttons 1237 shown in FIG. 12A. The window 1201 has two columns 1211 and the display region 1205, while the window 1251 of FIG. 12C has three columns which are columns 1257, 1259, and the display region 1255, and the window 1271 has three columns which are columns 1277, 1279, and the display region 1275.

Figure 12A:
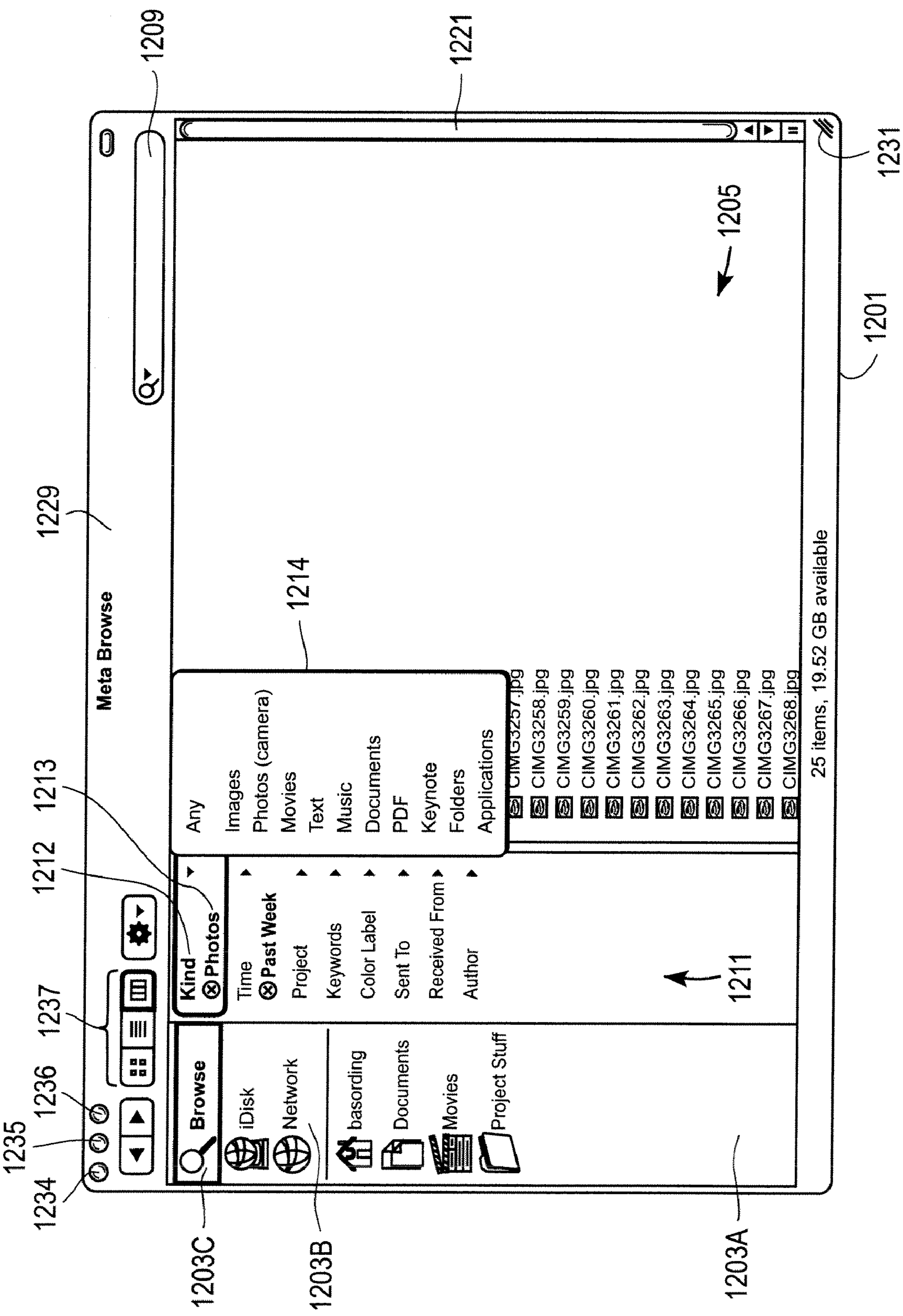
FIGS. 12A-12D show alternative embodiments of user interfaces according to the present invention.
Figure 12B:
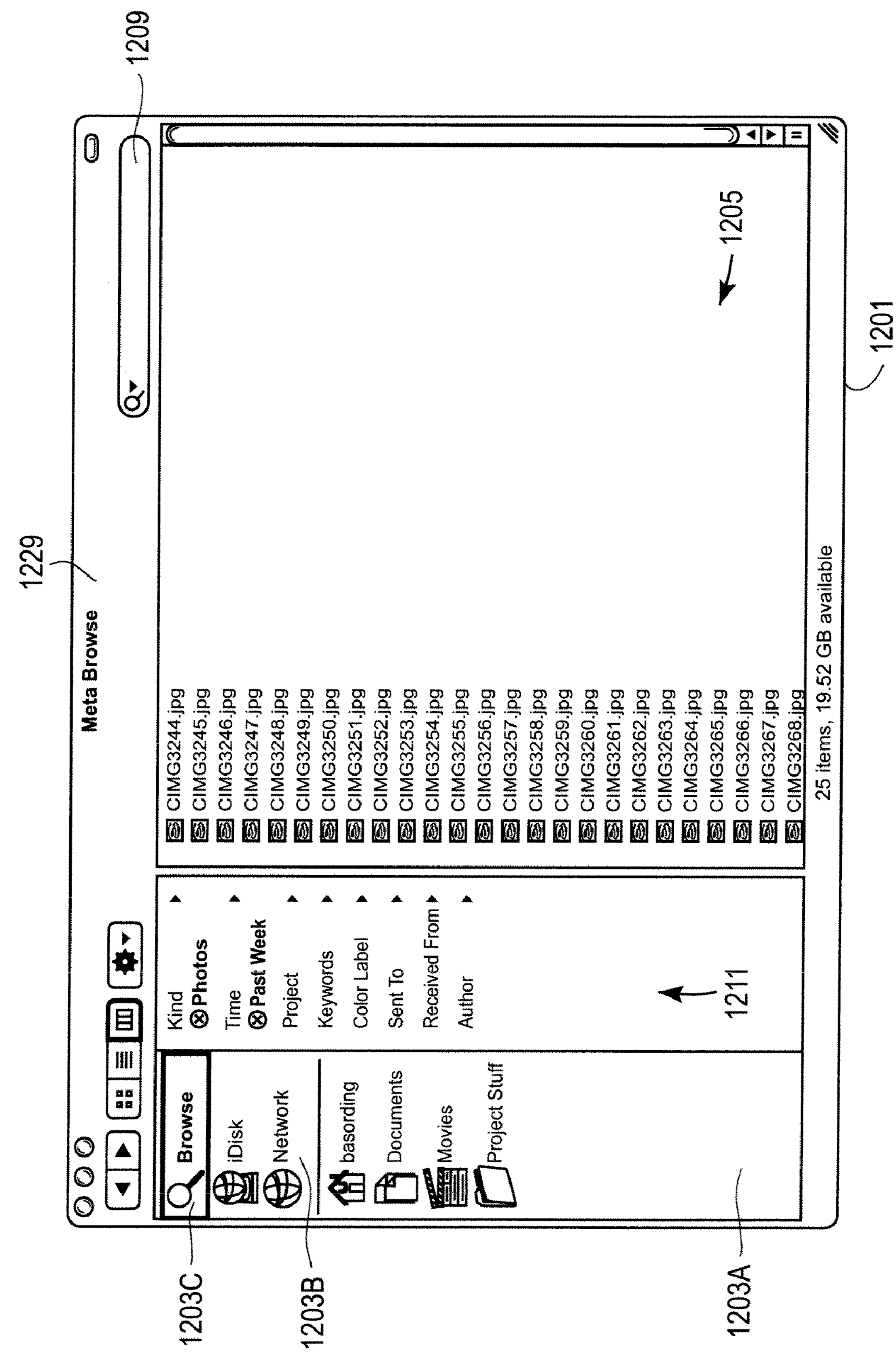

The window 1201 shown in FIGS. 12A and 12B includes a display region 1205 which shows the results of a search; these results may be shown dynamically as the user enters search parameters or the results may be shown only after the user has instructed the system to perform the search (e.g. by selecting a "perform search" command). The window 1201 includes conventional window controls, such as a resizing control 1231, a scrolling control 1221, a title bar 1229 which may be used to move the window, a window close button, a window minimize button, and a window resize button 1234, 1235, and 1236, respectively. The window 1201 also includes a user-configurable side bar region 1203A and a system specified side bar region 1203B. It can be seen from FIG. 12A that a browse mode has been selected as indicated by the highlighted "browse" icon 1203C in the system specified side bar region 1203B. The window 1201 also includes a text entry region 1209, which a user may use to enter text for a search, and the window 1201 also includes view selector buttons 1237.

A column 1211 of window 1201 allows a user to select various search parameters by selecting one of the options which in turn causes the display of a submenu that corresponds to the selected option. In the case of FIG. 12A, the user has selected the "kind" option 1212 and then has used the submenu 1214 to select the "photos" option from the submenu, resulting in an indicator 1213 (photos) to appear in the column 1211 under the "kind" option as shown in FIG. 12A. It can also be seen that the user has previously selected the "time" option in the column 1211 and has selected from a submenu brought up when the "time" option was selected the "past week" search parameter. When the user has finished making selections of the various options and suboptions from both the column 1112 and any of the corresponding submenus which appear, then the display showed in FIG. 12B appears. Note that the submenus are no longer present and that the user has completed the selection of the various options and suboptions which specify the search parameters. Column 1211 in FIG. 12B provides feedback to the user indicating the exact nature of the search query (in this case a search for all photos dated in the past week), and the results which match the search query are shown in the display region 1205.

Figure 12C:
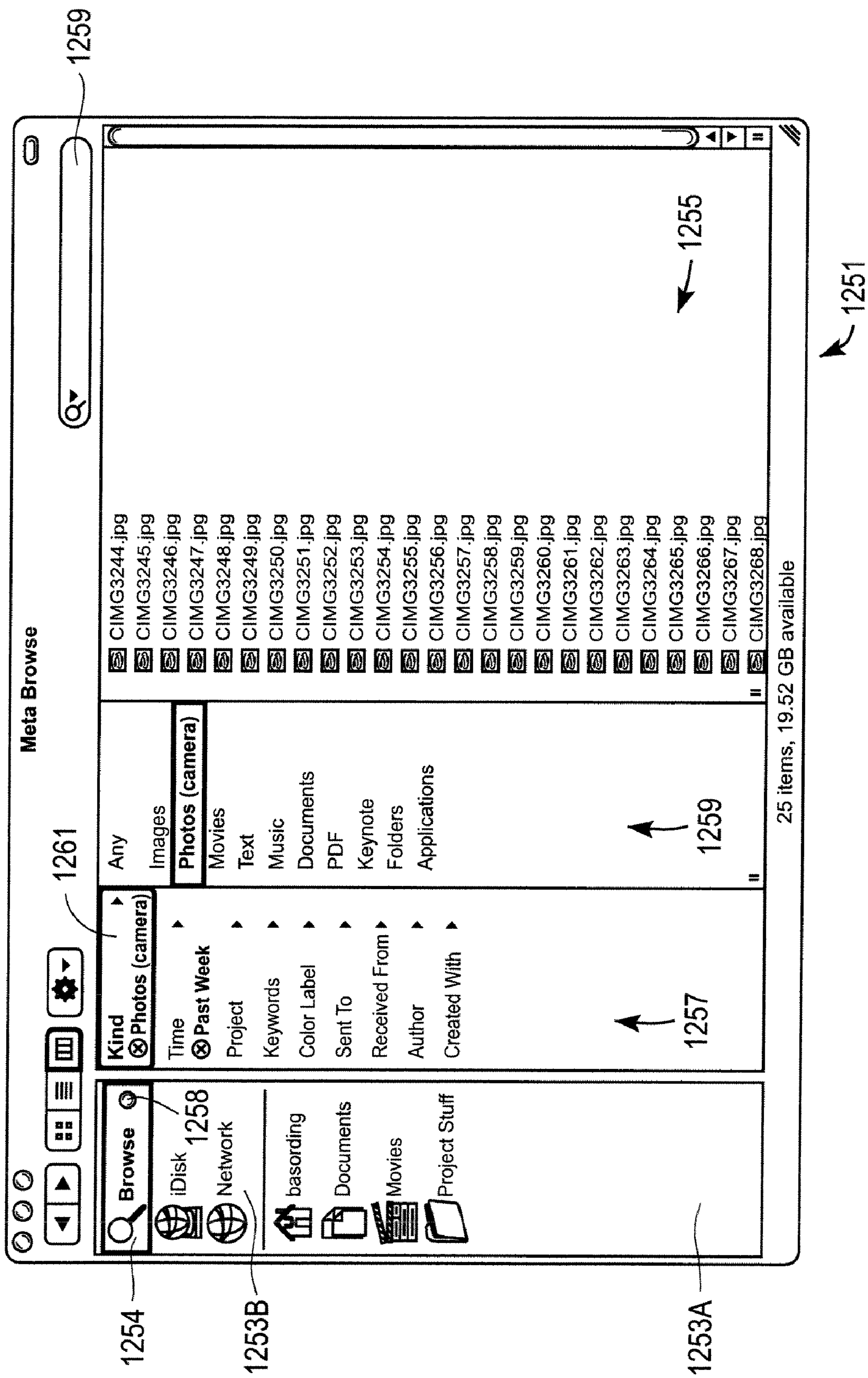
Figure 12D:
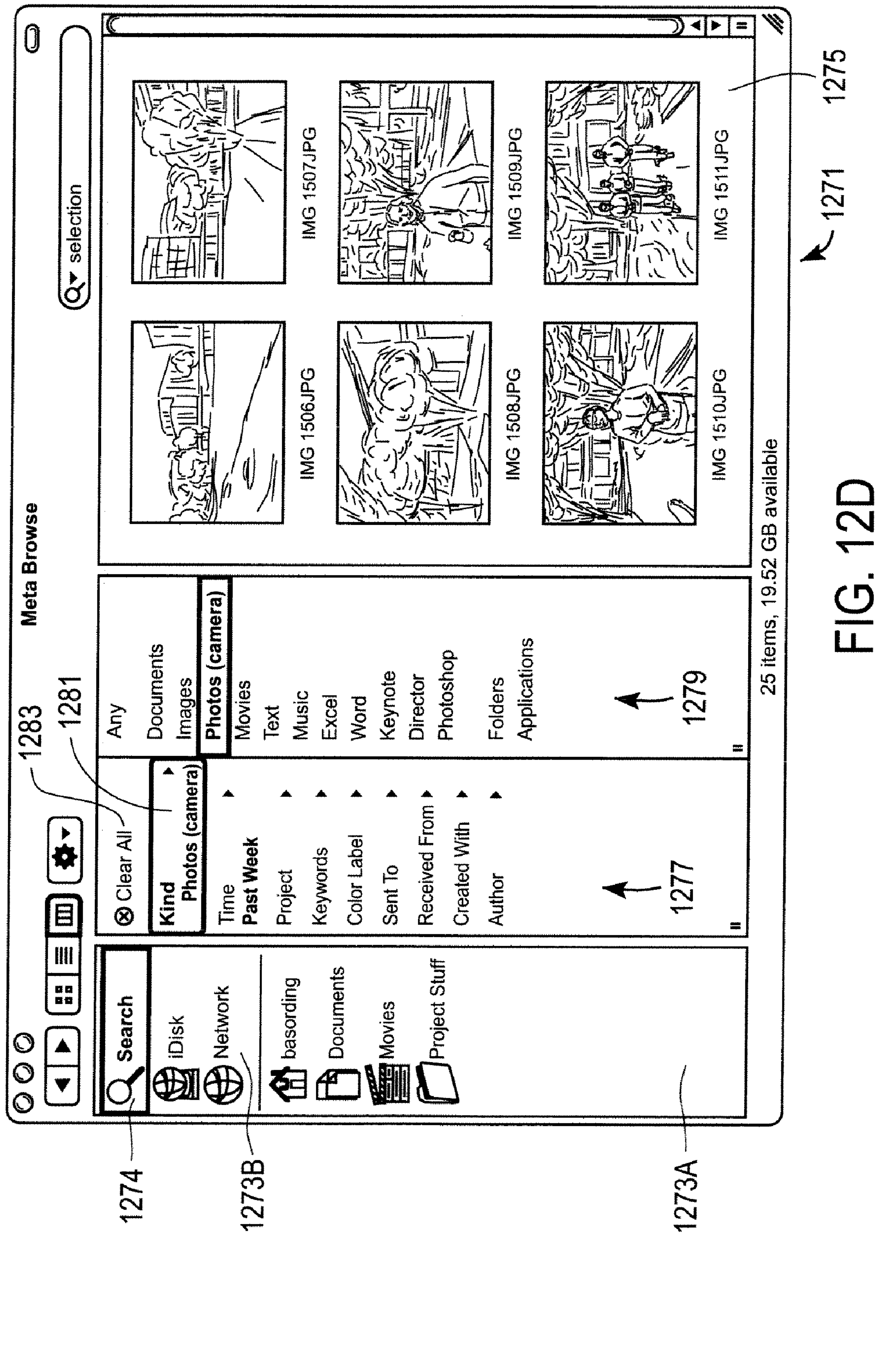

FIGS. 12C and 12D show an alternative embodiment in which the submenus which appear on a temporary basis in the embodiment of FIGS. 12A and 12B are replaced by an additional column which does not disappear after a selection is made. In particular, the column 1259 of the window 1251 functions in the same manner as the submenu 1214 except that it remains within the window 1251 after a selection is made (wherein the submenu 1214 is removed from the window after the user makes the selection from the submenu). The column 1279 of window 1271 of FIG. 12D is similar to the column 1259. The window 1251 includes a side bar which has a user-configurable side bar region 1253A and a system defined side bar region 1253B. The system specified side bar region 1253B includes a "browse" selection region 1254 which has a clear button 1258 which the user may select to clear the current search query. The window 1271 of FIG. 12D provides an alternative interface for clearing the search query. The window 1271 also includes a user configurable side bar region 1273A and a system specified side bar region 1273B, but the clear button, rather than being with the "search" region 1274 is at the top of the column 1277. The user may clear the current search parameter by selecting the button 1283 as shown in FIG. 12D.

Figure 13A:
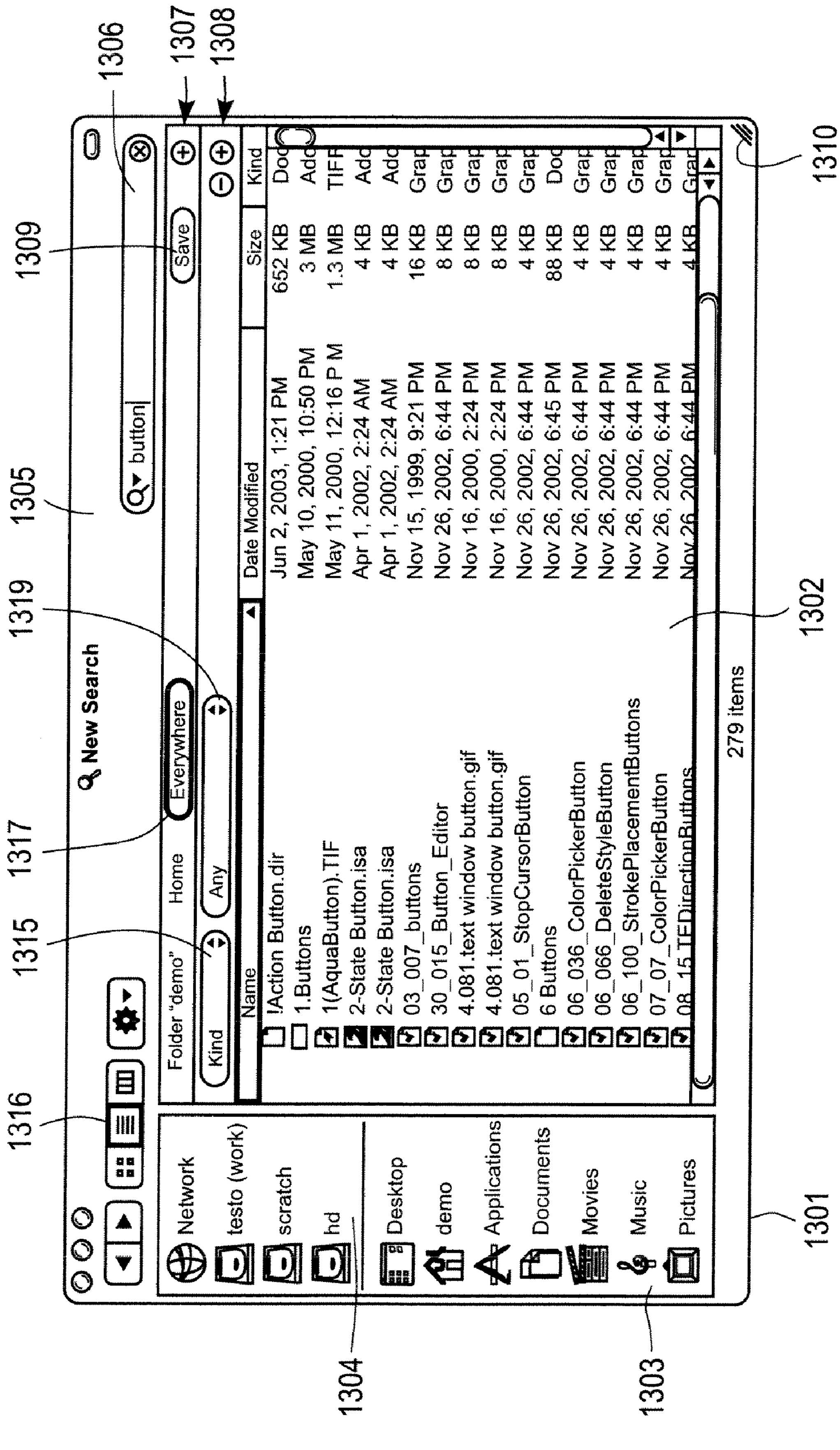
FIGS. 13A and 13B show further alternative embodiments of user interfaces according to the present invention.
Figure 13B:
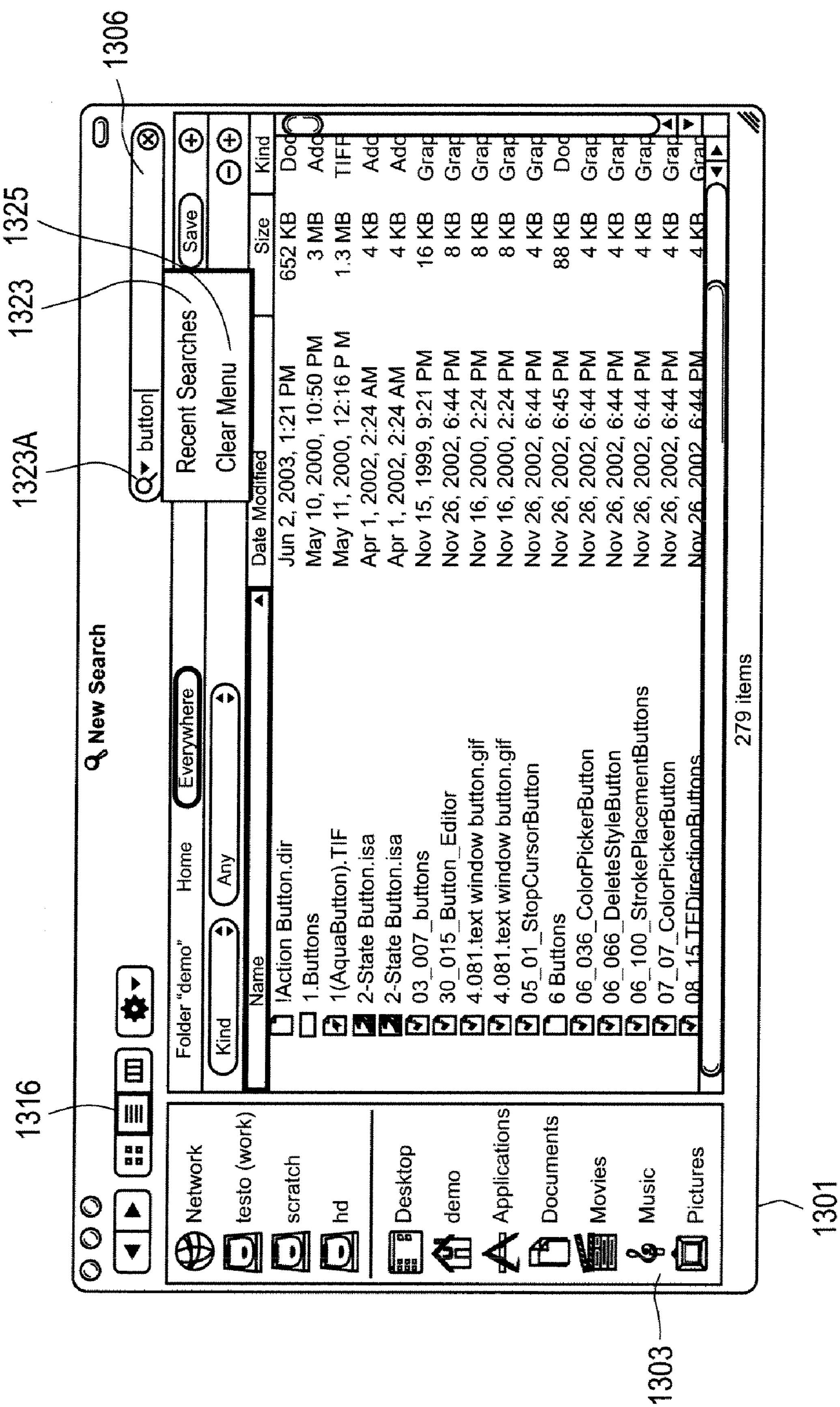

FIG. 13A shows another embodiment of a window 1301 which displays search results within a display region 1302. The window 1301 may be a closeable, minimizeable, resizeable, and moveable window having a resizing control 1310, a title bar 1305 which may be used to move the window, a text entry region 1306 and a user configurable portion 1303, and a system specified portion 1304. The window 1301 further includes buttons for selecting various views, including an icon view, a list view, and a column view. Currently, the list view button 1316 has been selected, causing the display of the search results in a list view manner within the display region 1302. It can be seen that the text ("button") has been entered into the text entry region 1306 and this has caused the system to respond with the search results shown in the display region 1302. The user has specified a search in every location by selecting "everywhere" button 1317. Further, the user has searched for any kind of document by selecting the "kind" option from the pull down menu 1315 and by selecting the "any" option in the pull down menu 1319. The where or location slice 1307 includes a "+" button which may be used to add further search parameters, and similarly, the slice 1308 includes a "+" and a "−" button for adding or deleting search parameters, respectively. The slice 1307 further includes a "save" button 1309 which causes the current search query to be saved in the form of a folder which is added to the user configurable portion 1303 for use later. This is described further below and may be referred to as a "smart folder." The search input user interface shown in FIGS. 13A and 13B is available within, in certain embodiments, each and every window controlled by a graphical user interface file management system, such as a Finder program which runs on the Macintosh or Windows Explorer which runs on Microsoft Windows. This interface includes the text entry region 1306 as well as the slices 1307 and 1308.

The window 1301 shown in FIG. 13B shows the activation of a menu by selecting the search button 1323A, causing a display of a menu having two entries 1323 and 1325. Entry 1323 displays recently performed searches so that a user may merely recall a prior search by selecting the prior search and cause the prior search to be run again. The menu selection 1325 allows the user to clear the list of recent searches in the menu.

Figure 14A:
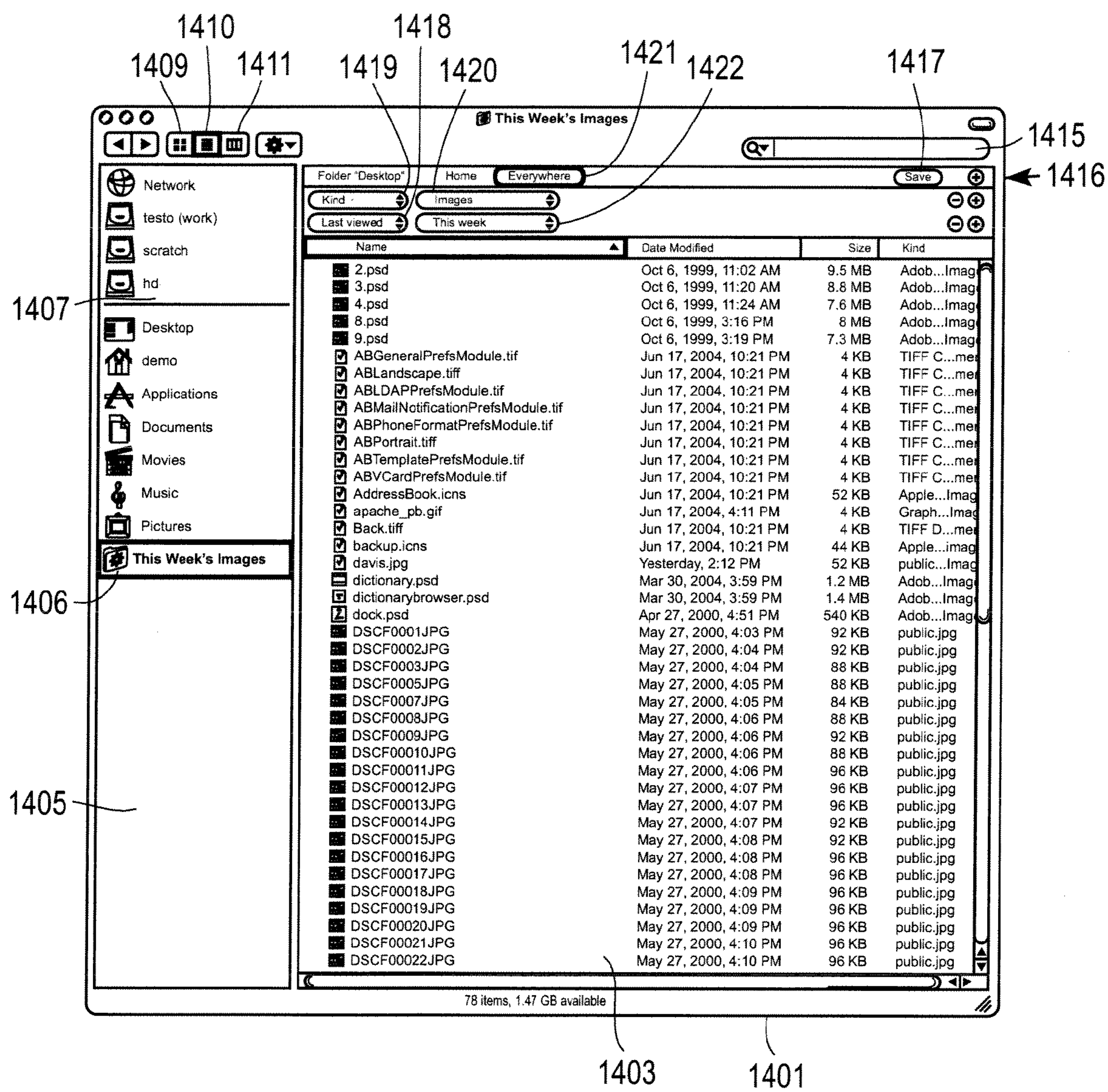
FIGS. 14A, 14B, 14C, and 14D show further alternative embodiments of user interfaces according to the present invention.
Figure 14B:
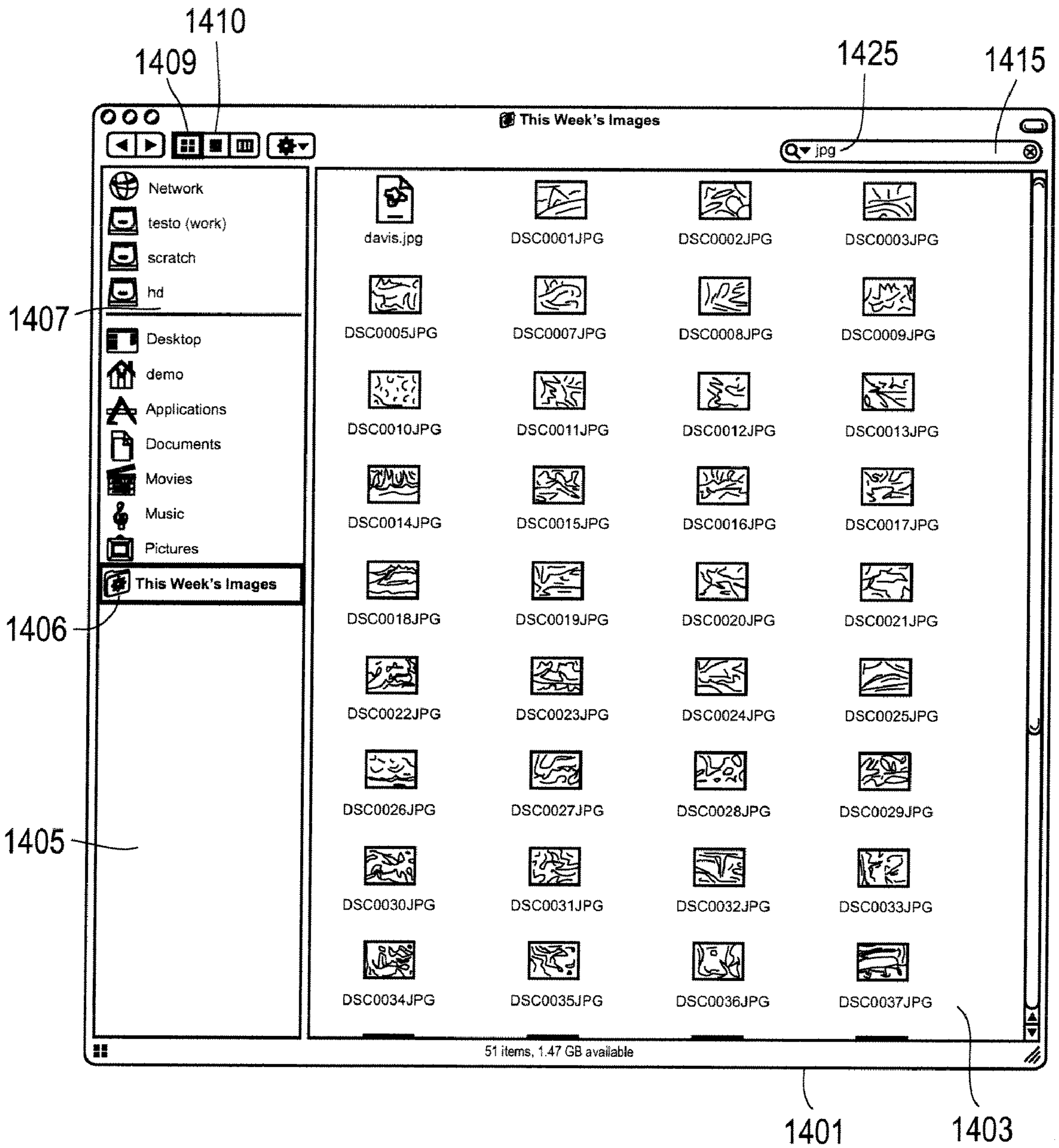
Figure 14C:
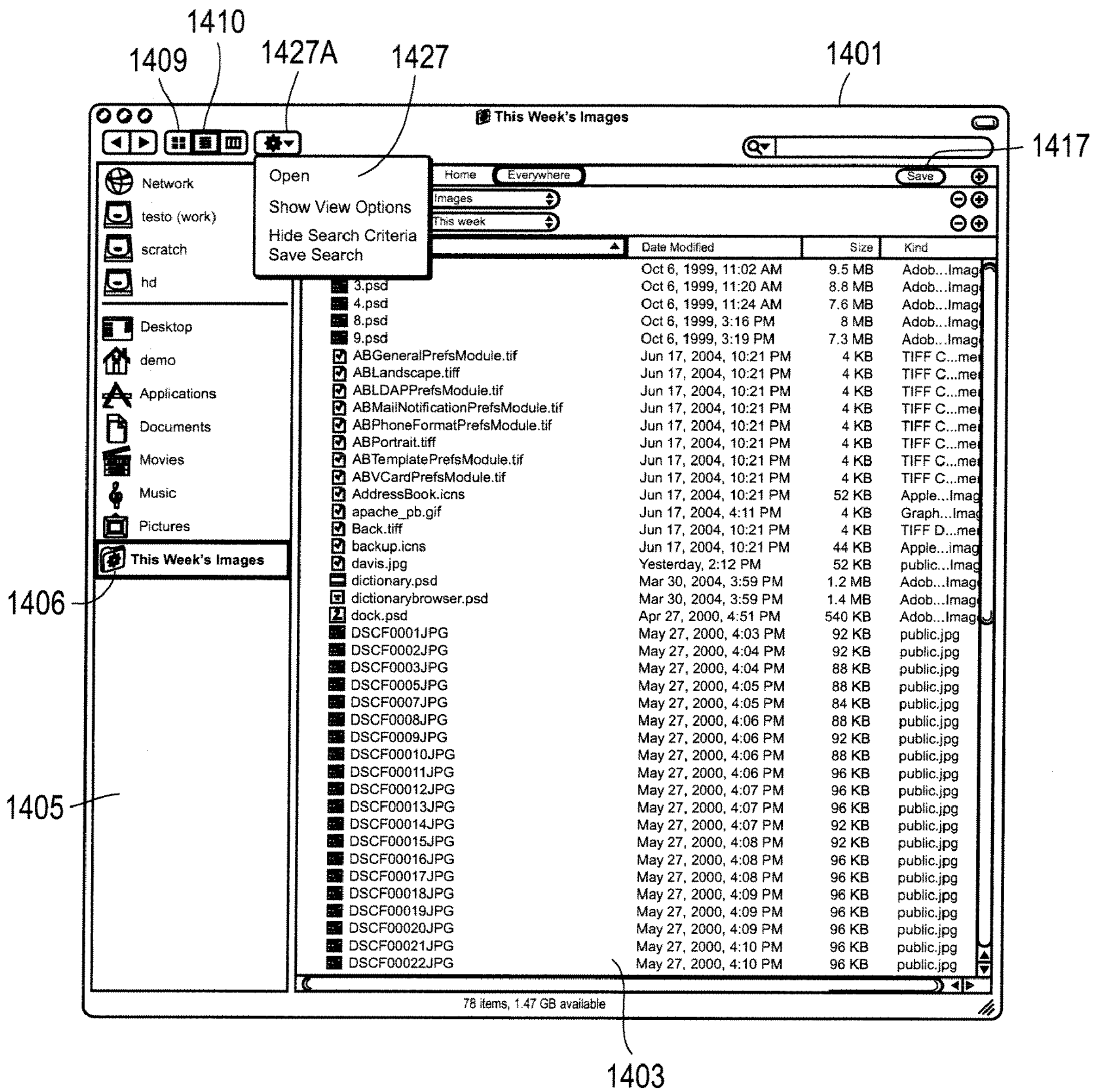

FIGS. 14A, 14B, and 14C show examples of another window in a graphical user interface file system, such as the Finder which runs on the Macintosh operating system. These windows show the results of a particular search and also the ability to save and use a smart folder which saves a prior search. The window 1401 shown in FIG. 14A includes a display region 1403, a user configurable region 1405, a smart folder 1406, a system specified region 1407, an icon view button 1409, a list view button 1410, and a column view button 1411. The window 1401 also includes a text entry region 1415 and a location slice 1416 which may be used to specify the location for the search, which slice also includes a save button 1417. Additional slices below the slice 1416 allow the user to specify further details with respect to the search, in this case specifying types of documents which are images which were last viewed this week. The user has set the search parameters in this manner by selecting the "kind" option from the pull down menu 1419 and by selecting the "images" type from the pull down menu 1420 and by selecting the "last viewed" option from pull down menu 1418 and by selecting "this week" from the pull down menu 1422. The user has also selected "everywhere" by selecting the button 1421 so that the search will be performed on all disks and storage devices connected to this system. The results are shown within the display region 1403. The user can then save the search query by selecting the "save" button 1417 and may name the saved search query as "this week's images" to produce the smart folder 1406 as shown in the user configurable portion 1405. This allows the user to repeat this search at a later time by merely selecting the smart folder 1406 which causes the system to perform a new search again, and all data which matches the search criteria will be displayed within the display region 1403. Thus, after several weeks, a repeating of this search by selecting the smart folder 1406 will produce an entirely different list if none of the files displayed in the display region 1403 of FIG. 14A are viewed in the last week from the time in which the next search is performed by selecting the smart folder 1406.

FIG. 14B shows a way in which a user may sort or further search within the search results specified by a saved search, such as a smart folder. In the case of FIG. 14B, the user has selected the smart folder 1406 and has then entered text "jpg" 1425 in the text entry region 1415. This has caused the system to filter or further limit the search results obtained from the search query saved as the smart folder 1406. Thus, PhotoShop files and other files such as TIF files and GIF files are excluded from the search results displayed within the display region 1403 of FIG. 14B because the user has excluded those files by adding an additional search criteria specified by the text 1425 in the text entry region 1415. It can be seen that the "jpg" text entry is ANDed logically with the other search parameters to achieve the search results displayed in the display region 1403. It can also be seen that the user has selected the icon view by selecting the icon view button 1409. Thus, it is possible for a user to save a search query and use it later and to further limit the results of the search query by performing a search on the results of the search query to further limit the search results.

FIG. 14C shows the window 1401 and shows the search results displayed within the display region 1403, where the results are based upon the saved search specified by the smart folder 1406. The user has caused a pull down menu 1427 to appear by selecting the pull down region 1427A. The pull down region 1427 includes several options which a user may select. These options include hiding the search criteria or saving the search (which is similar to selecting the button 1417) or showing view options or opening the selected file. This allows the user, for example, to hide the search criteria, thereby causing the slice 1416 and the other search parameters to be removed from the window 1401 which is a moveable, resizeable, minimizeable, and closeable window.

Figure 14D:
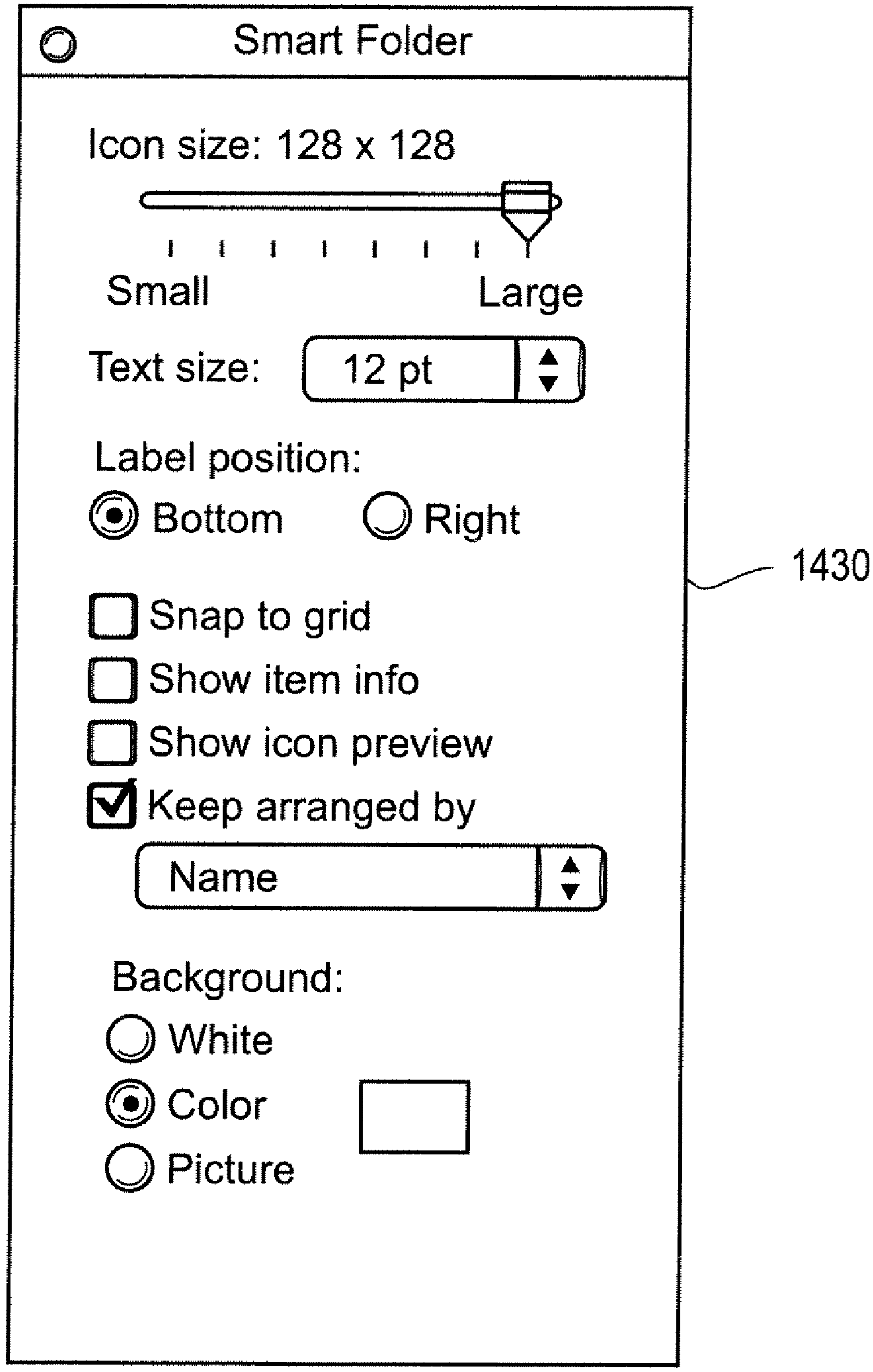

FIG. 14D shows an example of a user interface which allows the user to specify the appearance of a smart folder, such as the smart folder 1406.

Figure 15A:
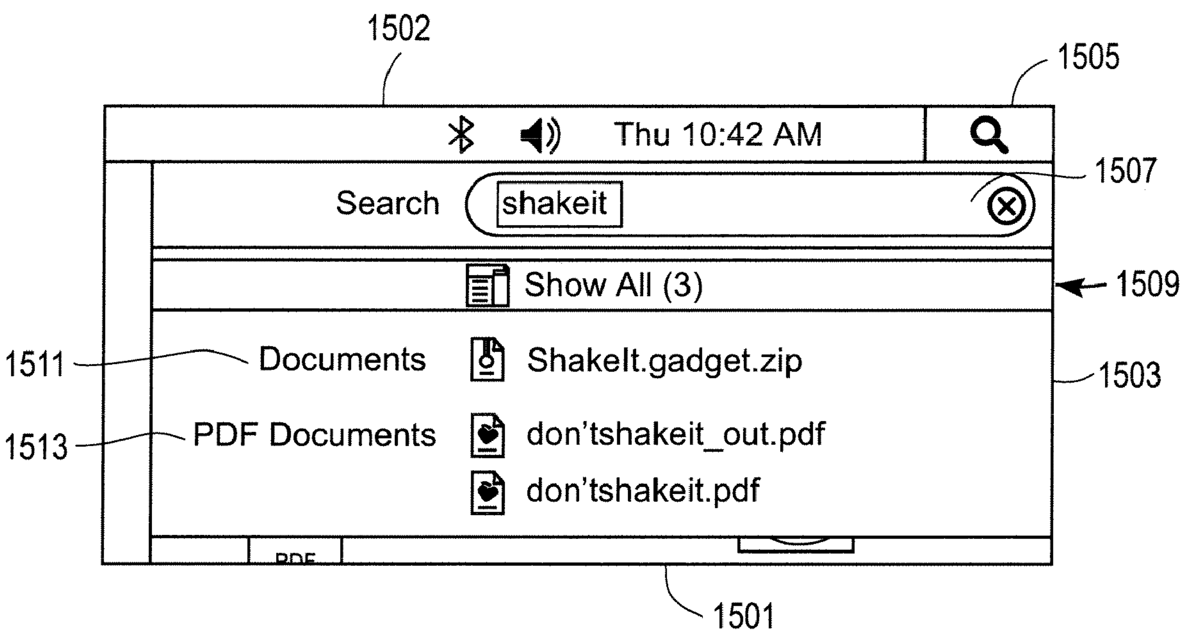
FIGS. 15A, 15B, 15C and 15D show another alternative embodiment of user interfaces according to the present invention.
Figure 15B:
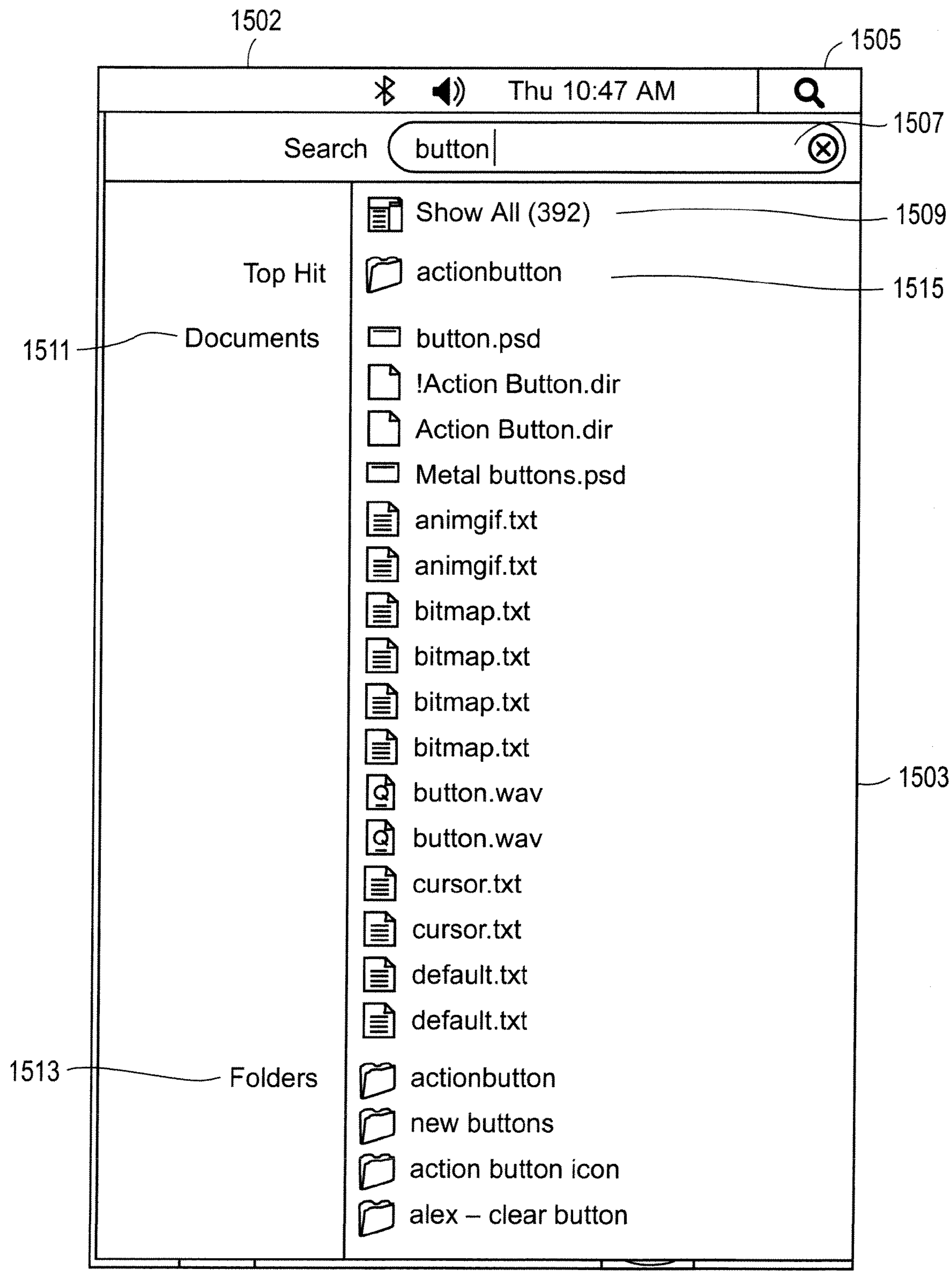
Figure 15C:
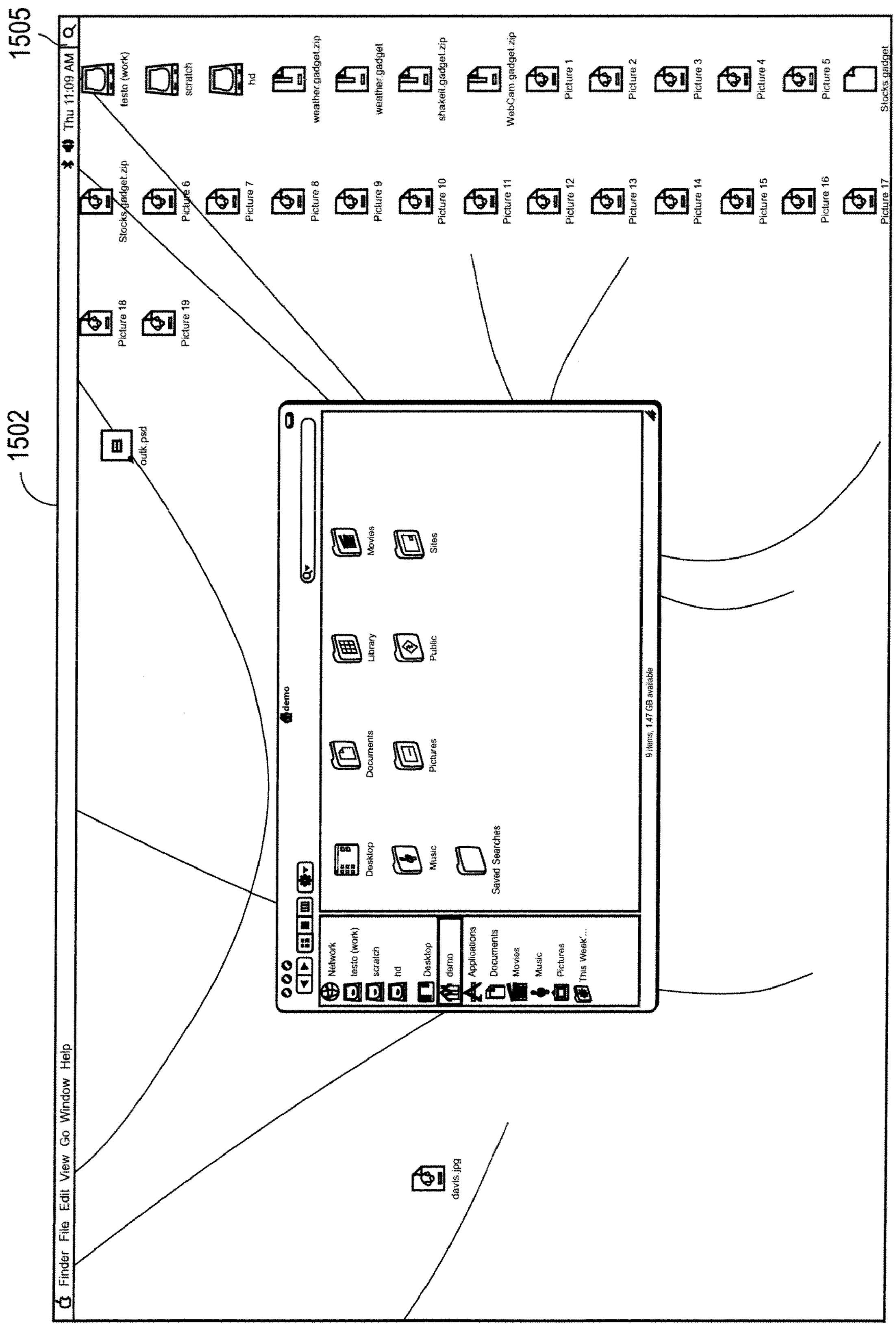
Figure 15D:
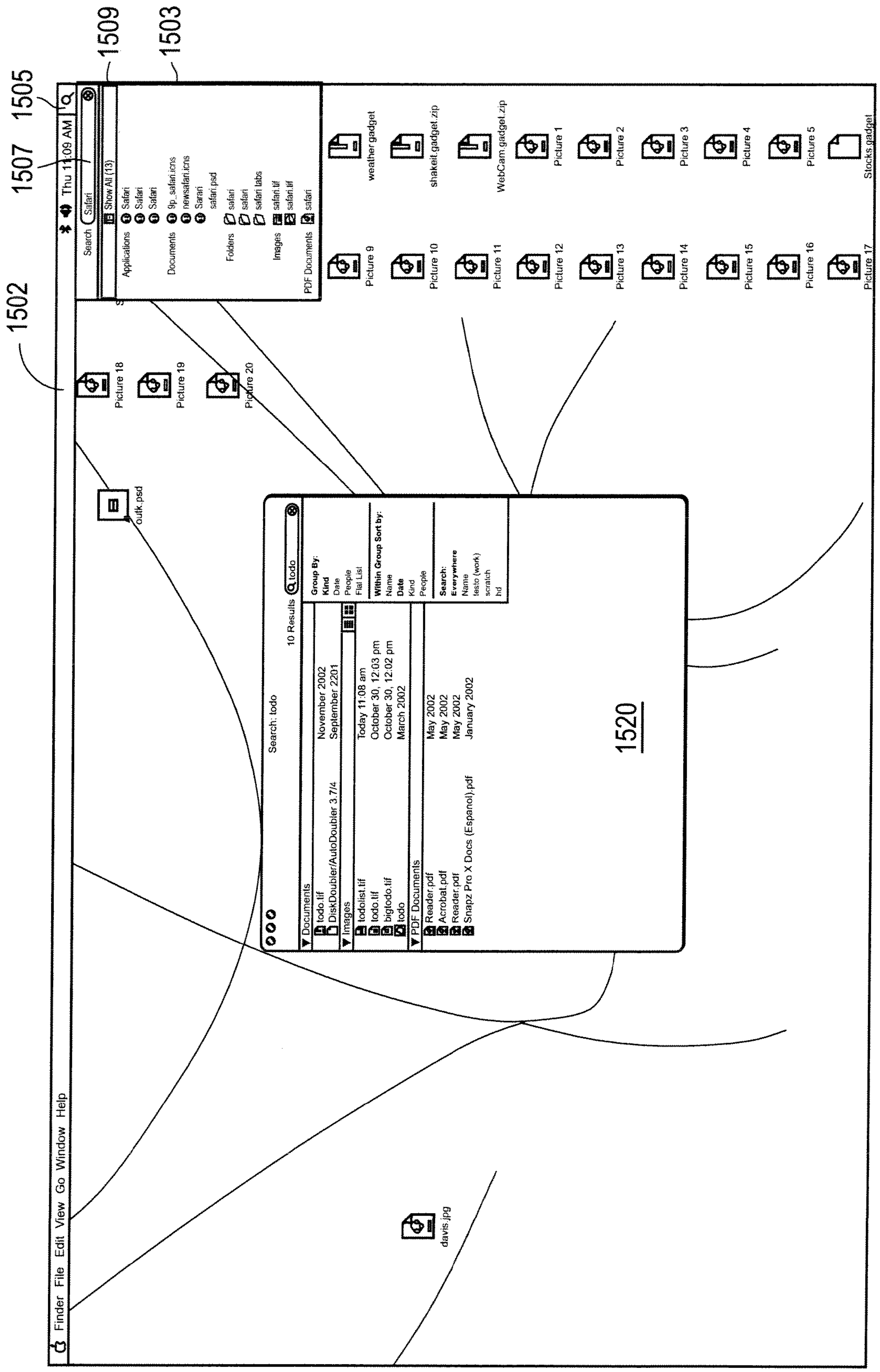

FIGS. 15A, 15B, 15C, and 15D show an example of a system wide search input user interface and search result user interface. In one particular exemplary embodiment, these user interfaces are available on the entire system for all applications which run on the system and all files and metadata, and even address book entries within an address book program, such as a personal information manager, and calendar entries within a calendar program, and emails within an email program, etc. In one exemplary embodiment, the system begins performing the search and begins displaying the results of the search as the user types text into a text entry field, such as the text entry field 1507. The search results are organized by categories and are displayed as a short list which is intentionally abbreviated in order to present only a selected number of the most relevant (scored) matches or hits to the search query. The user can ask for the display of all the hits by selecting a command, such as the "show all" command 1509. FIG. 15A shows a portion of a display controlled by a data processing system. This portion includes a menu bar 1502 which has at its far end a search menu command 1505. The user can select the search menu command by positioning a cursor, using a mouse, for example, over the search menu command 1505 and by pressing a button or by otherwise activating or selecting a command. This causes a display of a text entry region 1507 into which a user can enter text. In the example shown in FIG. 15A, which is a portion of the display, the user has entered the text "shakeit" causing the display of a search result region immediately below a "show all" command region 1509 which is itself immediately below the text entry region 1507. It can be seen that the hits or matches are grouped into categories ("documents" and "PDF documents") shown by categories 1511 and 1513 within the search result region 1503. FIG. 15B shows another example of a search. In this case, a large number of hits was obtained (392 hits), only a few of which are shown in the search result region 1503. Again, the hits are organized by categories 1511 and 1513. Each category may be restricted in terms of the number of items displayed within the search result region 1503 in order to permit the display of multiple categories at the same time within the search result region. For example, the number of hits in the documents category may greatly exceed the available display space within the search result region 1503, but the hits for this category are limited to a predetermined or dynamically determinable number of entries within the search result region 1503 for the category 151. An additional category, "top hit" is selected based on a scoring or relevancy using techniques which are known in the art. The user may select the "show all" command 1509 causing the display of a window, such as window 1601 shown in FIG. 16A. FIG. 15C shows a display of a graphical user interface of one embodiment of the invention which includes the menu bar 1502 and the search menu command 1505 on the menu bar 1502. FIG. 15D shows another example of the search result region 1503 which appeared after a search of the term "safari" was entered into the text entry region 1507. It can be seen from the search result region 1503 of FIG. 15D that the search results are again grouped into categories. Another search result window 1520 is also shown in the user interface of FIG. 15D. It can be seen that application programs are retrieved as part of the search results, and a user may launch any one of these application programs by selecting it from the search result region, thereby causing the program to be launched.

Figure 16A:
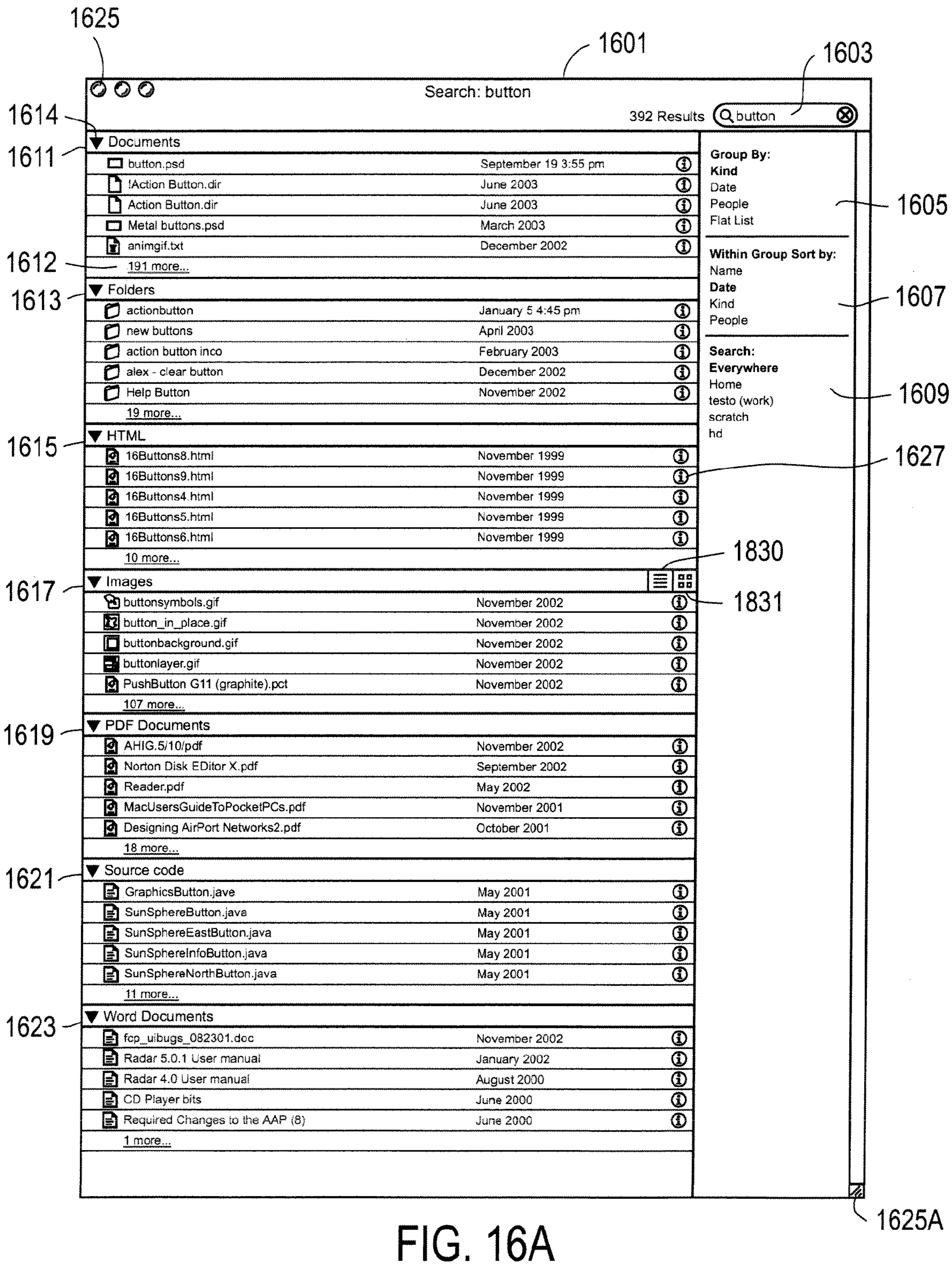
FIGS. 16A and 16B show certain aspects of embodiments of user interfaces according to the present invention.
Figure 16B:
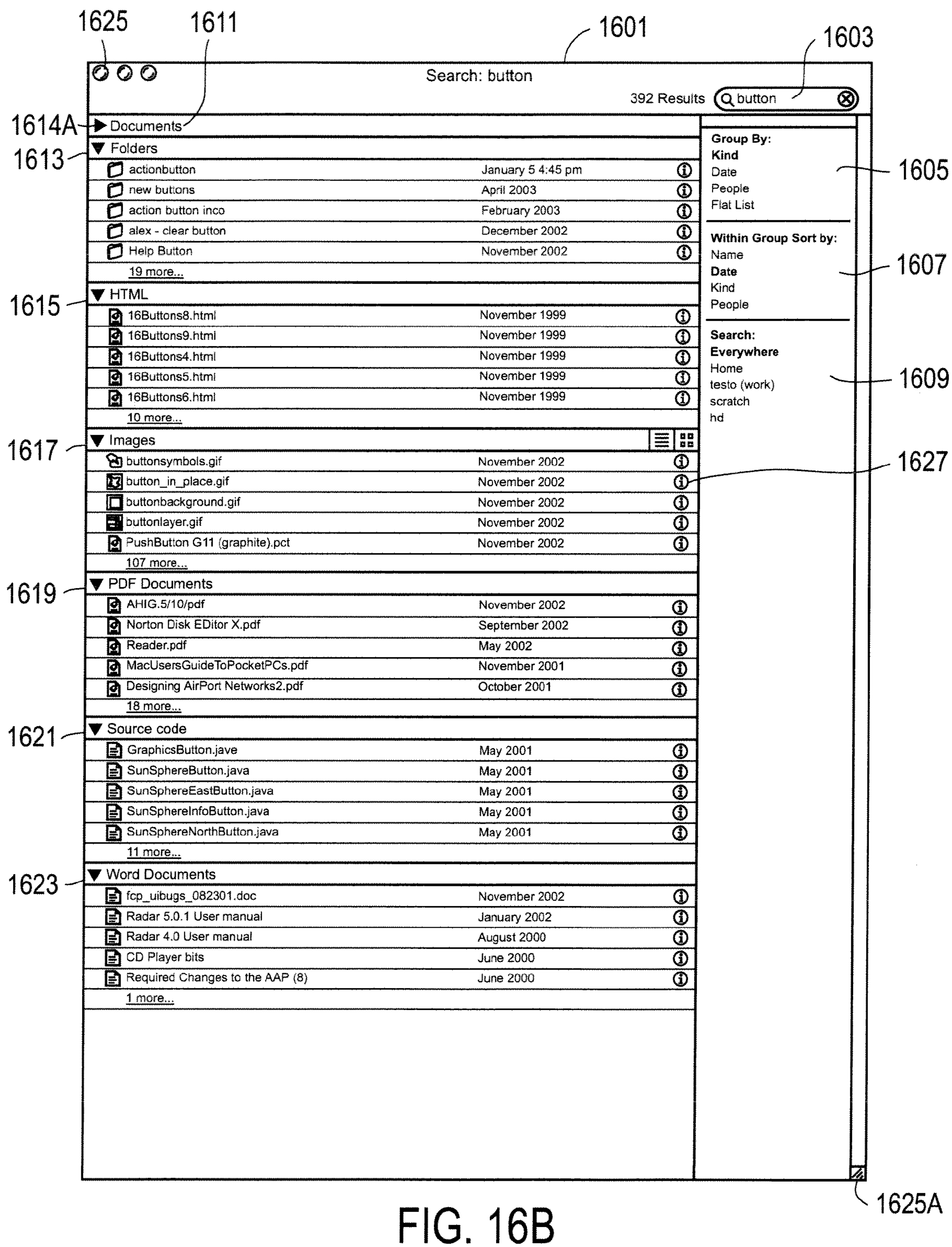
Figure 17:
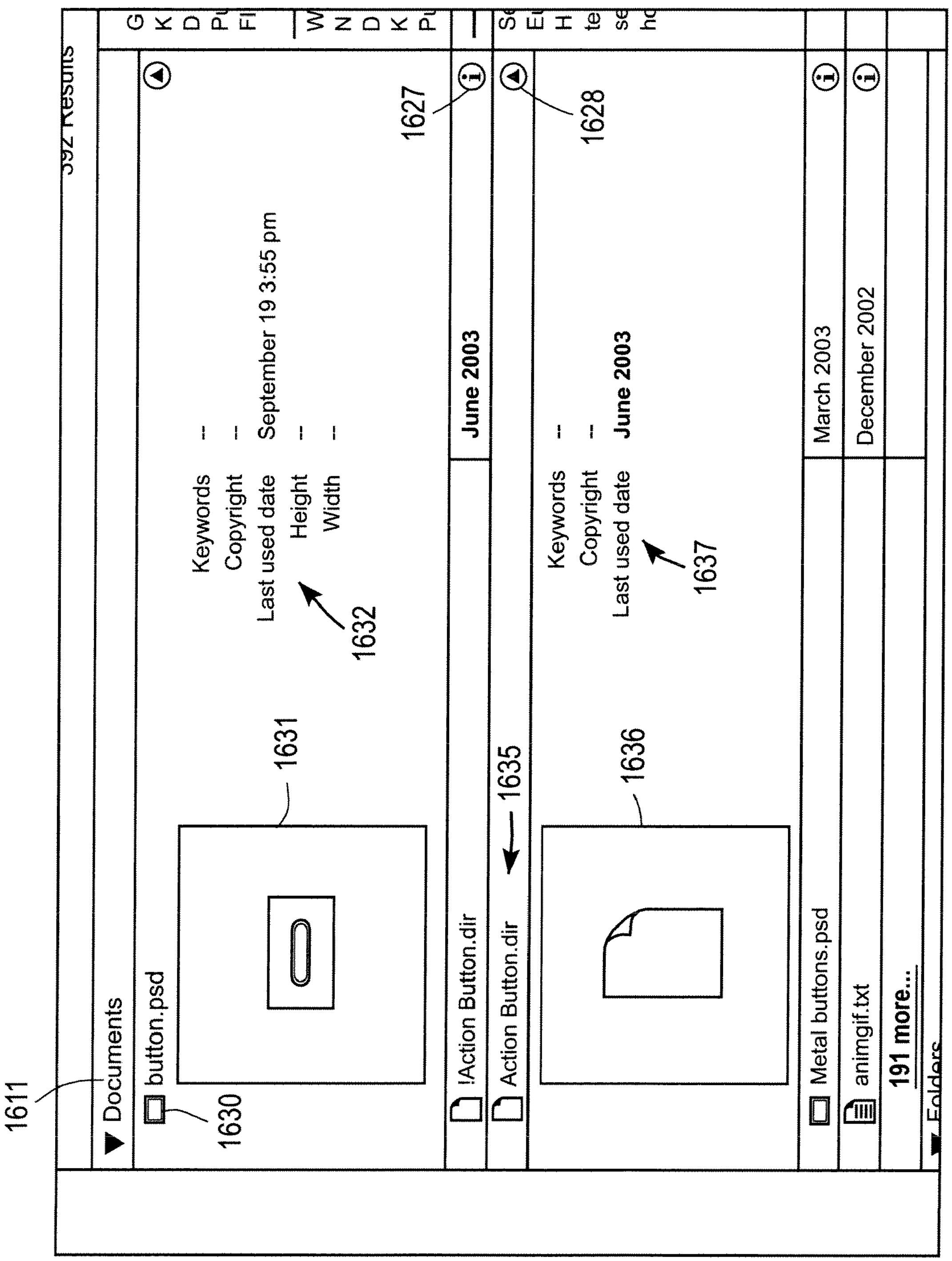
FIG. 17 shows an aspect of certain embodiments of user interfaces according to the present invention.

FIGS. 16A and 16B show examples of search result windows which may be caused to appear by selecting the "show all" command 1509 in FIG. 15A or 15B. Alternatively, these windows may appear as a result of the user having selected a "find" command or a some other command indicating that a search is desired. Moreover, the window 1601 shown in FIGS. 16A and 16B may appear in response to either of the selection of a show all command or the selection of a find command. The window 1601 includes a text entry region 1603, a group by menu selection region 1605, a sort by menu selection region 1607, and a where menu selection region 1609. The group by selection region 1605 allows a user to specify the manner in which the items in the search results are grouped according to. In the example shown in FIG. 16A, the user has selected the "kind" option from the group by menu selection region 1605, causing the search results to be grouped or sorted according to the kind or type of document or file. It can be seen that the type of file includes "html" files, image files, PDF files, source code files, and other types of files as shown in FIG. 16A. Each type or kind of document is separated from the other documents by being grouped within a section and separated by headers from the other sections. Thus, headers 1611, 1613, 1615, 1617, 1619, 1621, and 1623 designate each of the groups and separate one group from the other groups. This allows a user to focus on evaluating the search results according to certain types of documents. Within each group, such as the document groups or the folder groups, the user has specified that the items are to be sorted by date, because the user has selected the date option within the sort by menu region 1607. The user has also specified that all storage locations are to be searched by selecting "everywhere" from the where menu selection region 1609. Each item in the search result list includes an information button 1627 which may be selected to produce the display of additional information which may be available from the system. An example of such additional information is shown in FIG. 17 in which a user has selected the information button 1627 for item 1635, resulting in the display of an image 1636 corresponding to the item as well as additional information 1637. Similarly, the user has selected the information button for another item 1630 to produce the display of an image of the item 1631 as well as additional information 1632. The user may remove this additional information from the display by selecting the close button 1628 which causes the display of the information for item 1635 to revert to the appearance for that item shown in FIG. 16A. The user may collapse an entire group to hide the entries or search results from that group by selecting the collapse button 1614 shown in FIG. 16A, thereby causing the disappearance of the entries in this group as shown in FIG. 16B. The user may cause these items to reappear by selecting the expand button 1614A as shown in FIG. 16B to thereby revert to the display of the items as shown in FIG. 16A.

The search results user interface shown in FIGS. 16A and 16B presents only a limited number of matches or hits within each category. In the particular example of these figures, only the five top (most relevant or most highly sorted) hits are displayed. This can be seen by noticing the entry at the bottom of each list within a group which specifies how many more hits are within that group; these hits can be examined by selecting this indicator, such as indicator 1612, which causes the display of all of the items in the documents category or kind for the search for "button" which was entered into the text entry region 1603. Further examples of this behavior are described below and are shown in conjunction with FIGS. 18A and 18B. It will be appreciated that window 1601 is a closeable and resizable and moveable window and includes a close button and a resizing control 1625A.

Figure 18A:
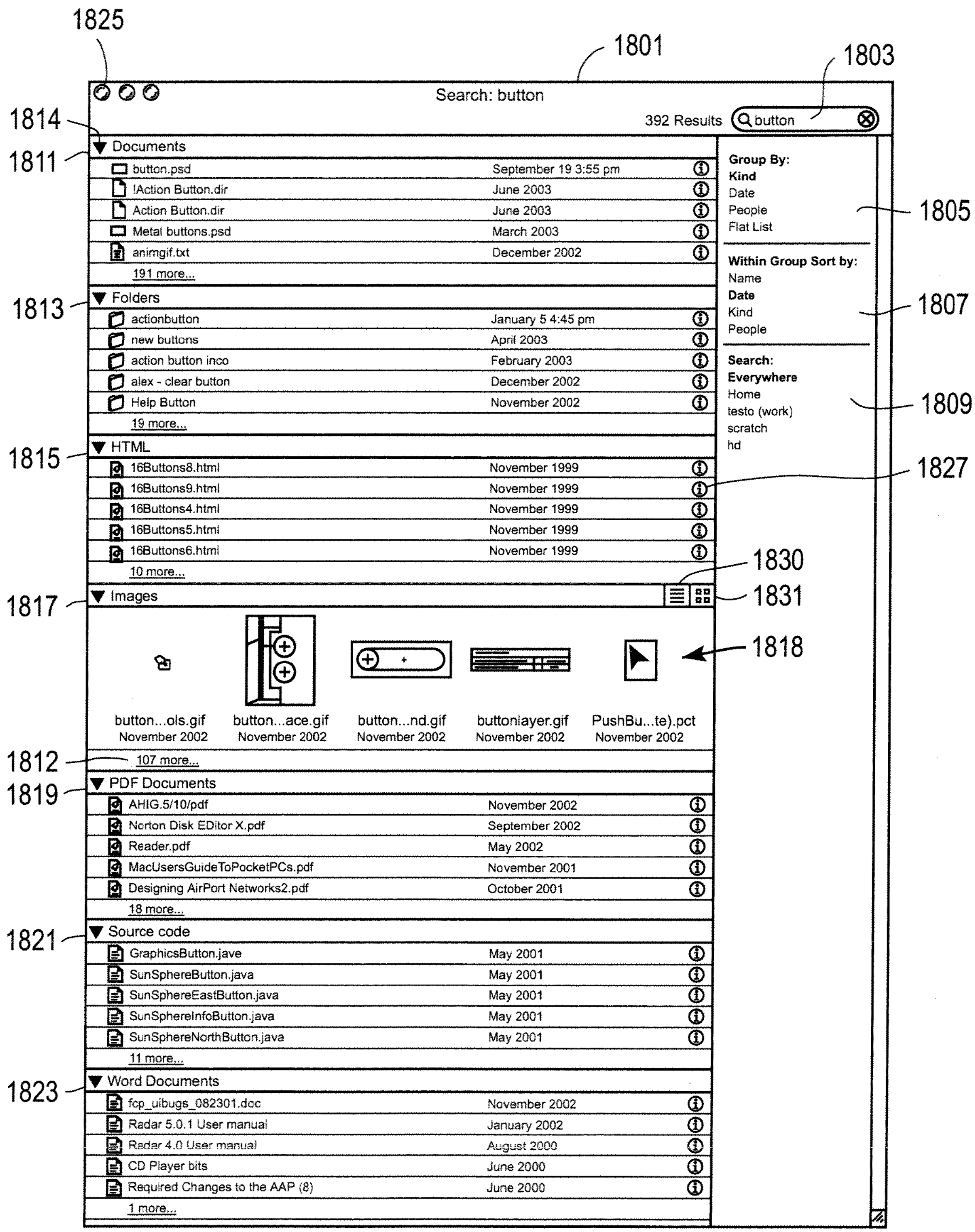
FIGS. 18A and 18B show further aspects of certain embodiments of user interfaces according to the present invention.
Figure 18B:
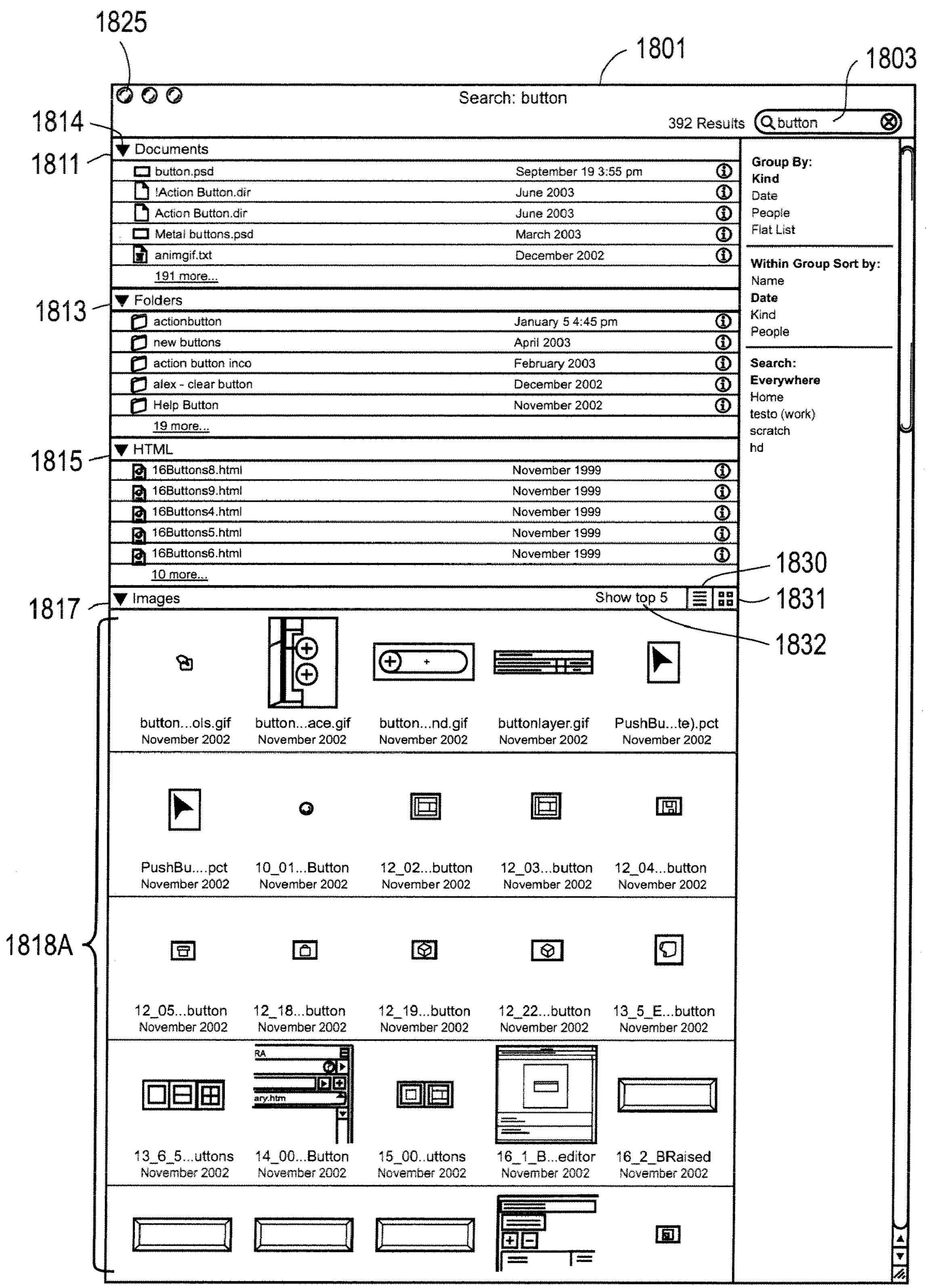

FIGS. 18A and 18B illustrate another window 1801 which is very similar to the window 1601. The window 1801 includes a text entry region 1803, a group by menu selection region 1805, a sort by menu selection region 1807, and a where menu selection region 1809, each of which function in a manner which is similar to the regions 1605, 1607, and 1609 respectively of FIG. 16A. Each item in a list view within the window 1801 includes an information button 1827, allowing a user to obtain additional information beyond that listed for each item shown in the window 1801. The window 1801 further includes headers 1811, 1813, 1815, 1817, 1819, 1821, and 1823 which separate each group of items, grouped by the type or kind of document, and sorted within each group by date, from the other groups. A collapse button 1814 is available for each of the headers. The embodiment shown in FIGS. 18A and 18B shows the ability to switch between several modes of viewing the information. For example, the user may display all of the hits within a particular group by selecting the indicator 1812 shown in FIG. 18A which results in the display of all of the images files within the window 1801 within the region 1818A. The window is scrollable, thereby allowing the user to scroll through all the images. The user can revert back to the listing of only five of the most relevant images by selecting the "show top 5" button 1832 shown in FIG. 18B. Further, the user can select between a list view or an icon view for the images portion shown in FIGS. 18A and 18B. The user may select the list view by selecting the list view button 1830 or may select the icon view by selecting the icon view button 1831. The list view for the images group is shown in FIG. 16A and the icon view for the images group is shown in FIGS. 18A and 18B. It can be seen that within a single, moveable, resizable, closeable search result window, that there are two different views (e.g. a list view and an icon view) which are concurrently shown within the window. For example, the PDF documents under the header 1819 are displayed in a list view while the images under the header 1817 are displayed in an icon view in FIGS. 18A and 18B. It can also be seen from FIGS. 18A and 18B that each image is shown with a preview which may be capable of live resizing as described in a patent application entitled "Live Content Resizing" by inventors Steve Jobs, Steve Lemay, Jessica Kahn, Sarah Wilkin, David Hyatt, Jens Alfke, Wayne Loofbourrow, and Bertrand Serlet, filed on Jun. 25, 2004, and being assigned to the assignee of the present inventions described herein, and which is hereby incorporated herein by reference.

Figure 19A:
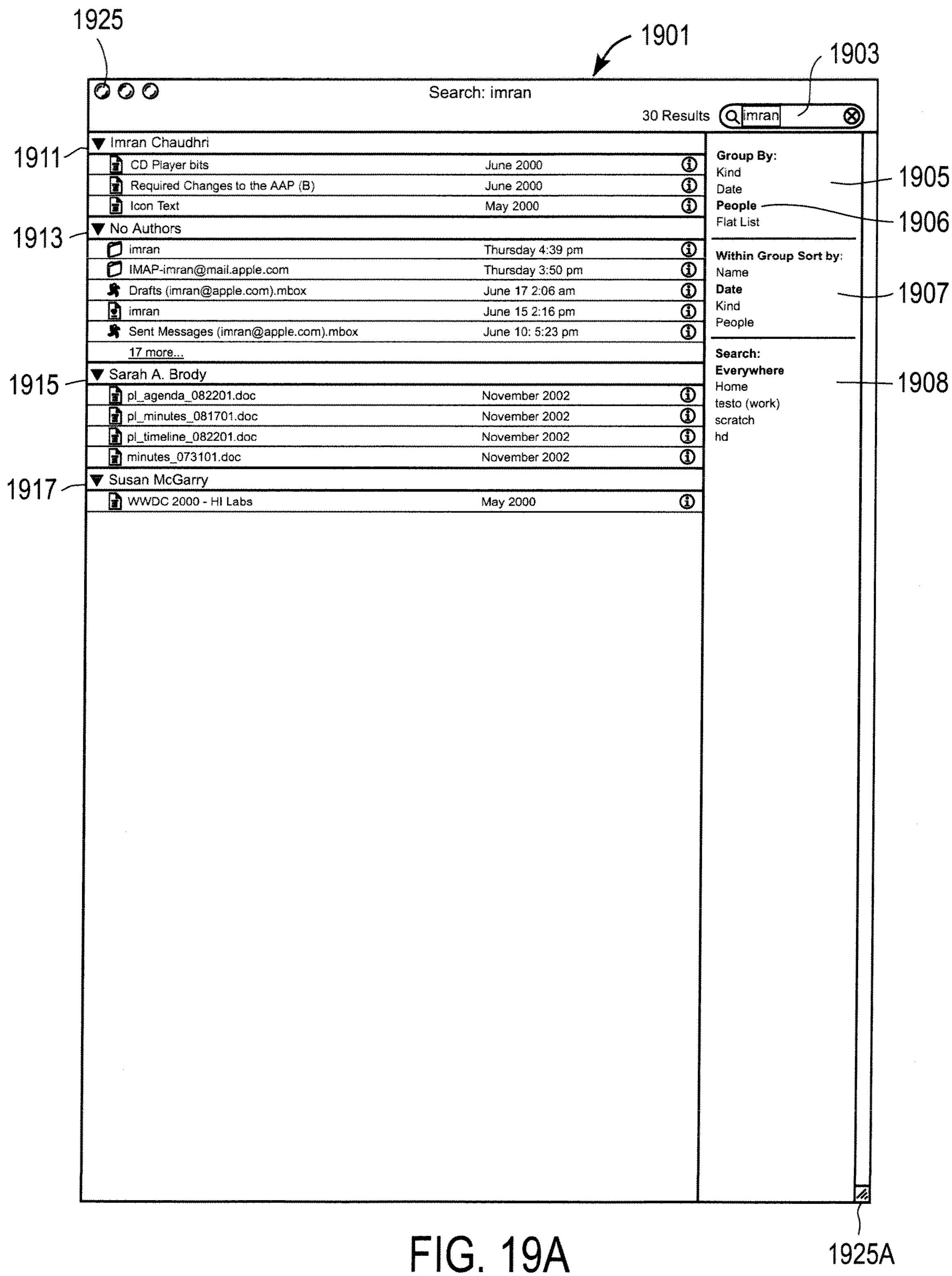
FIGS. 19A, 19B, 19C, 19D, and 19E show further illustrative embodiments of user interfaces according to the present invention.
Figure 19B:
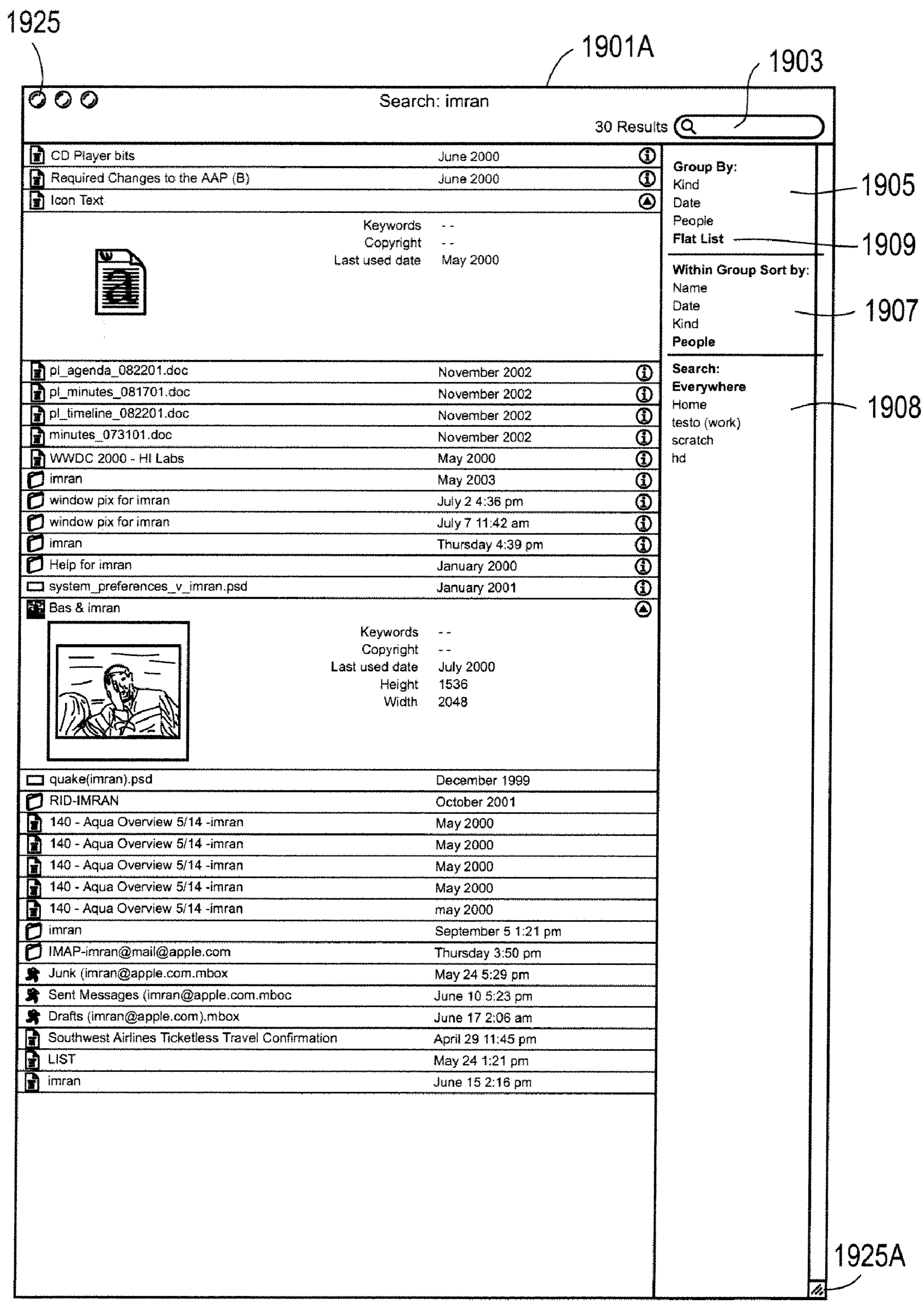

FIG. 19A shows another example of a search result window which is similar to the window 1601. The window 1901 shown in FIG. 19A includes a text entry region 1903 and a group by menu selection region 1905 and a sort by menu selection region 1907 and a where menu selection region 1908. Further, the window includes a close button 1925 and a resizing control 1925A. Text has been entered into the text entry region 1903 to produce the search results shown in the window 1901. The search results again are grouped by a category selected by a user which in this case is the people options 1906. This causes the headers 1911, 1913, 1915, and 1917 to show the separation of the groups according to names of people. Within each group, the user has selected to sort by the date of the particular file or document. The user interface shown in FIG. 19A allows a user to specify an individual's name and to group by people to look for communications between two people, for example. FIG. 19B shows another way in which a user can group a text search ("imran") in a manner which is different from that shown in FIG. 19A. In the case of FIG. 19B, the user has selected a flat list from the group by menu selection region 1905 and has selected "people" from the sort by menu region 1907. The resulting display in window 1901A is without headers and thus it appears as a flat list.

Figure 19C:
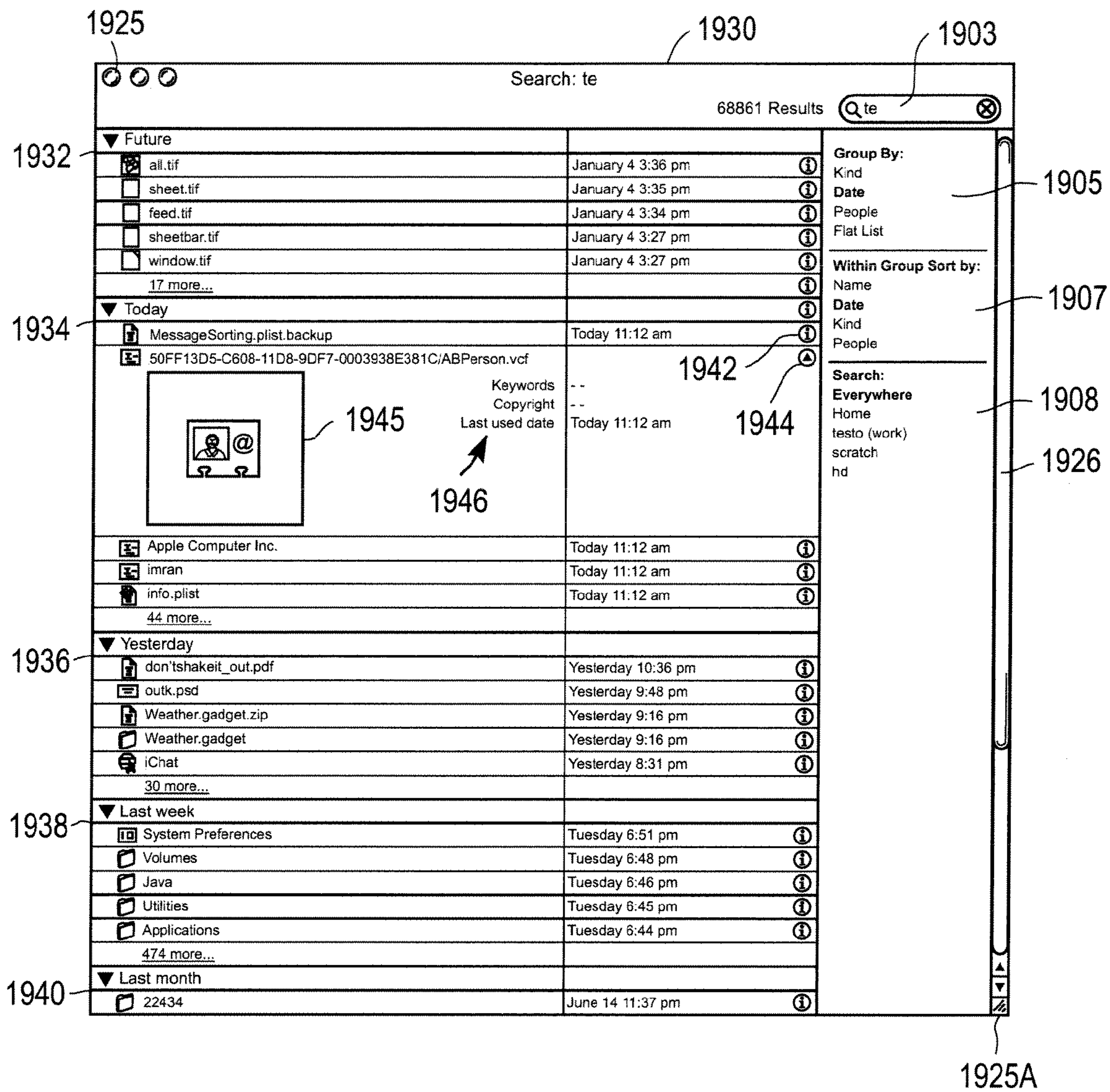

FIG. 19C shows the user interface of another search result window 1930 which includes a text entry region 1903 and the selection regions 1905, 1907, and 1908 along with a scrolling control 1926. The results shown in the window 1930 have been grouped by date and sorted within each group by date. Thus, the headers 1932, 1934, 1936, 1938, and 1940 specify time periods such as when the document was last modified (e.g. last modified today, or yesterday, or last week). Also shown within the search results window 1930 is the information button 1942 which may be selected to reveal further information, such as an icon 1945 and additional information 1946 as shown for one entry under the today group. This additional information may be removed by selecting the contraction button 1944.

Figure 19D:
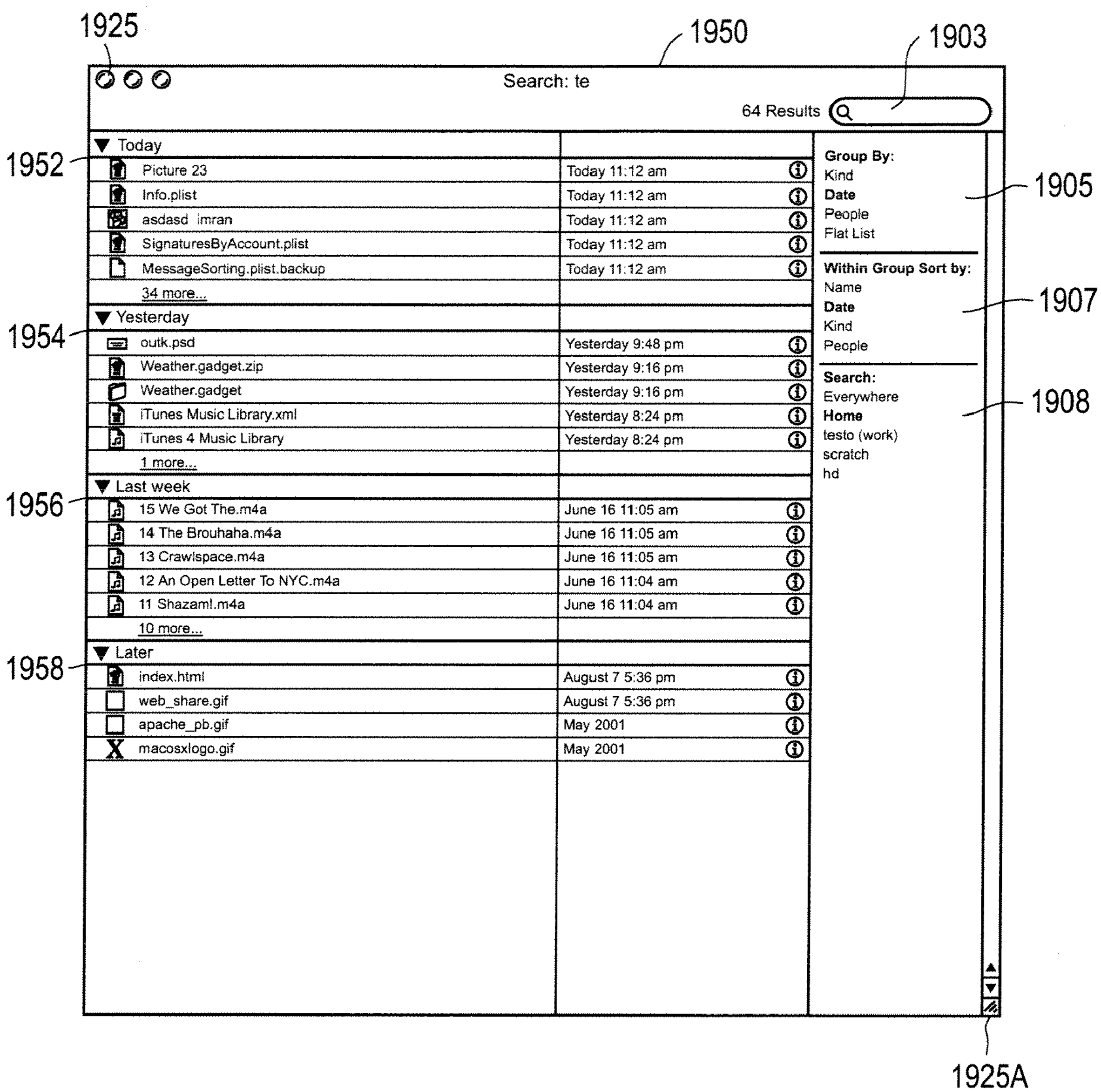

FIG. 19D shows a search result window 1950 in which a search for the text string "te" is grouped by date but the search was limited to a "home" folder as specified in the where menu selection region 1908. Time specific headers 1952, 1954, 1956, and 1958 separate items within one group from the other groups as shown in FIG. 19D.

Figure 19E:
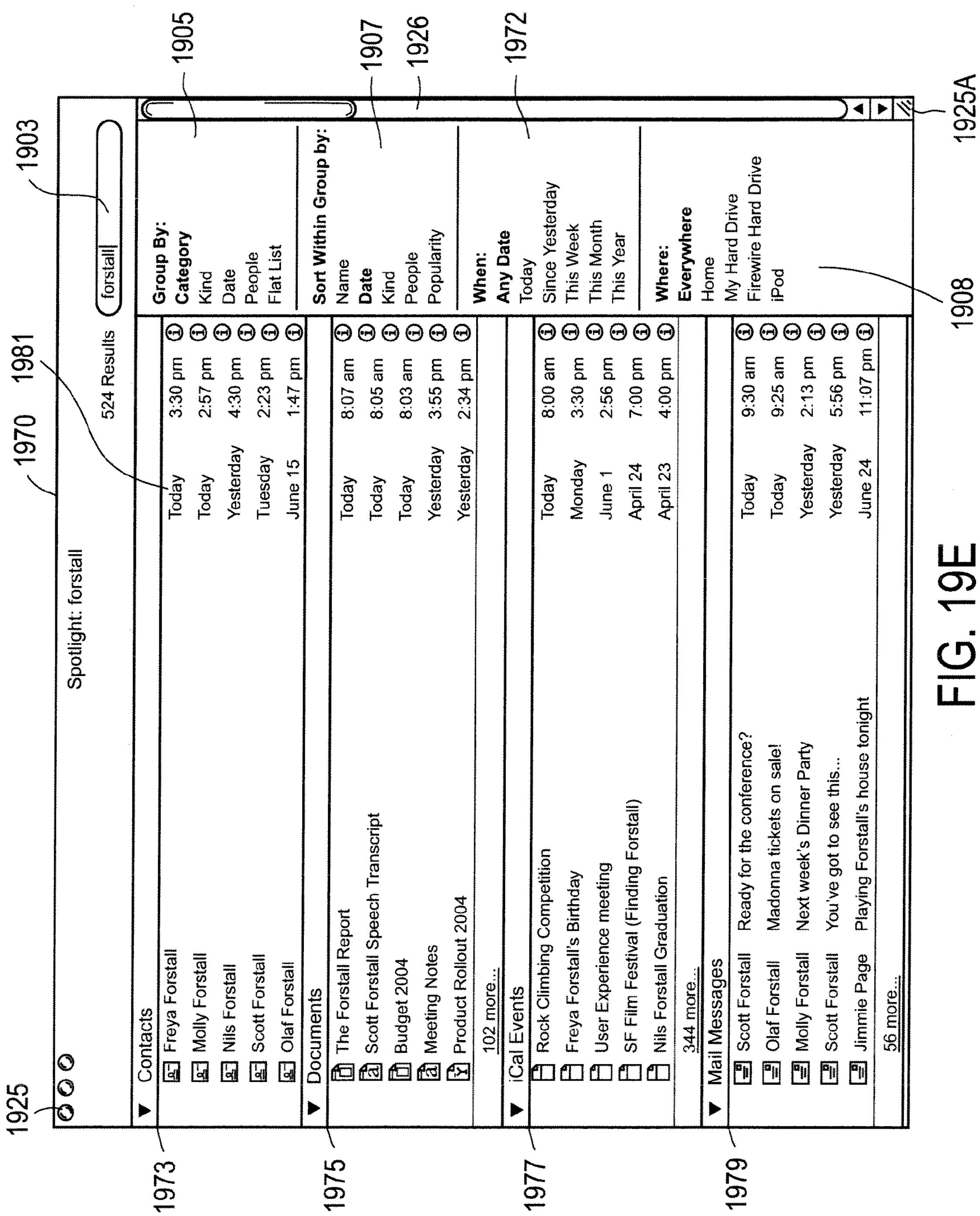

FIG. 19E shows an alternative embodiment of a search result window. In this embodiment, the window 1970 includes elements which are similar to window 1901 such as the selection regions 1905, 1907, and a scrolling control 1926 as well as a close button 1925 and a resizing control 1925A. The search result window 1970 further includes a "when" menu selection region 1972 which allows the user to specify a search parameter based on time in addition to the text entered into the text entry region 1903. It can be seen from the example shown in FIG. 19E that the user has decided to group the search results by the category and to sort within each group by date. This results in the headers 1973, 1975, 1977, and 1979 as shown in FIG. 19E.

Figure 20:
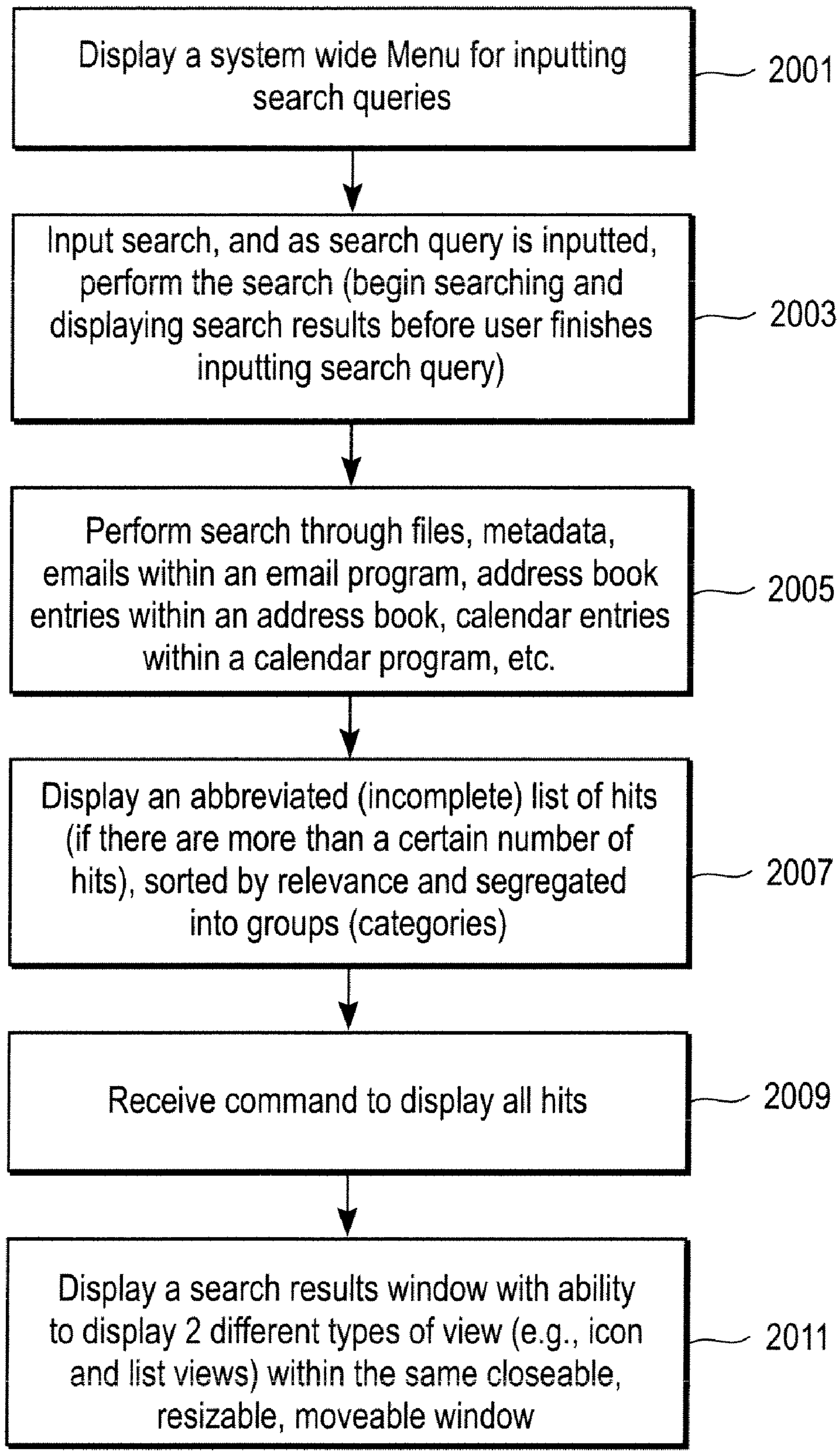
FIG. 20 is a flow chart which illustrates another exemplary method of the present invention.

FIG. 20 shows an exemplary method of operating a system wide menu for inputting search queries, such as the system wide menu available by selecting the search menu command 1505 shown in FIG. 15A or 15B, or 15C. In operation 2001, the system displays a system wide menu for inputting search queries. This may be the search menu command 1505. The user, in operation 2003, inputs a search, and as the search query is being inputted, the system begins performing and begins displaying the search results before the user finishes inputting the search query. This gives immediate feedback and input to the user as the user enters this information. The system is, in operation 2005, performing a search through files, metadata for the files, emails within an email program, address book entries within an address book program, calendar entries within a calendar program, etc. The system then, in operation 2007, displays an abbreviated (e.g. incomplete) list of hits if there are more than a certain number of hits. An example of this abbreviated listing is shown in FIG. 15B. The listing may be sorted by relevance and segregated into groups such as categories or types of documents. Then in operation 2009, the system receives a command from the user to display all the hits and in operation 2011 the system displays the search results window, such as the window 1601 shown in FIG. 16A. This window may have the ability to display two different types of views, such as an icon view and a list view within the same closeable, resizable, and moveable window. It will be appreciated that the searching, which is performed as the user is typing and the displaying of results as the user is typing may include the searching through the metadata files created from metadata extracted from files created by many different types of software programs.

Figure 21:
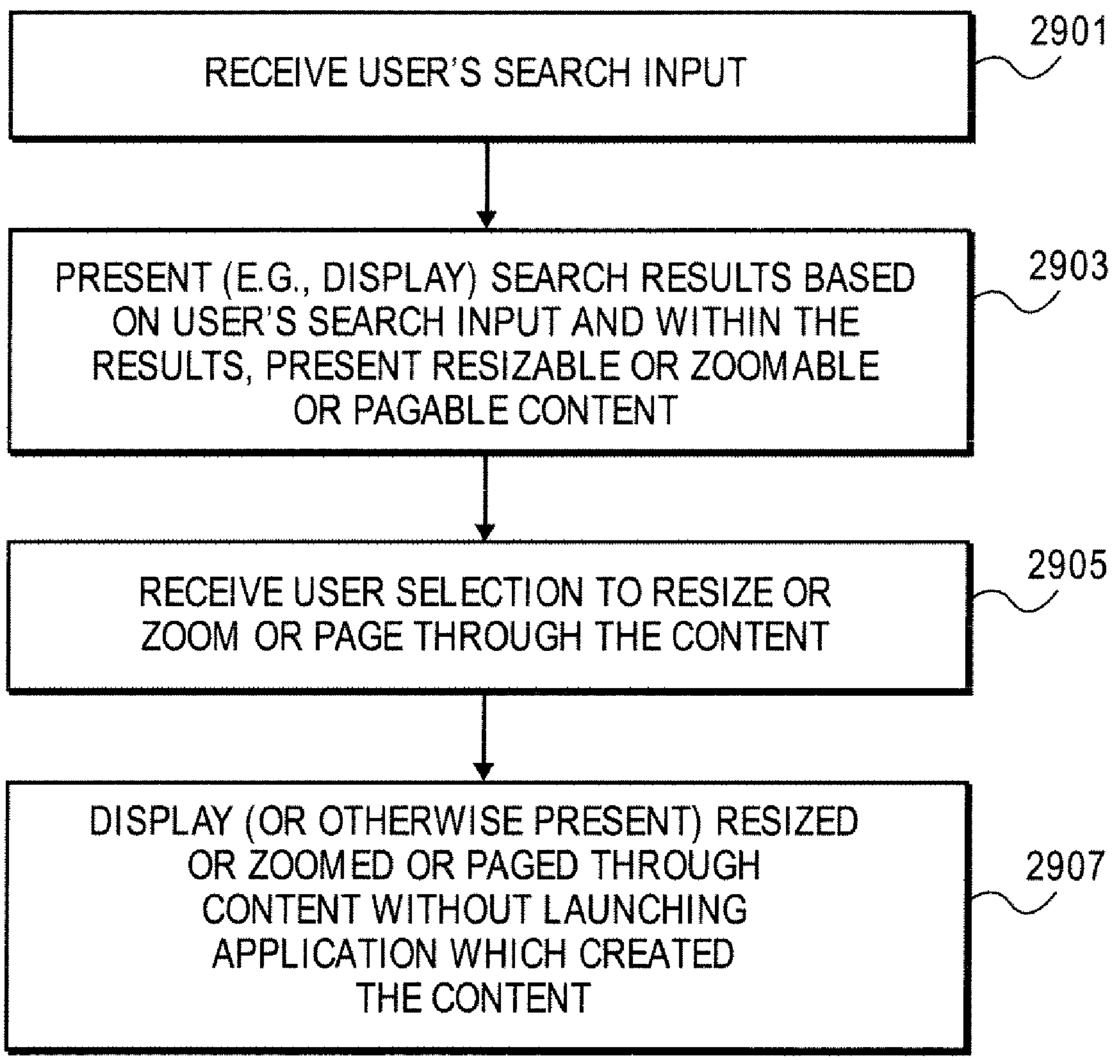
FIG. 21 shows a method, according to one exemplary embodiment, of another aspect of the present inventions.

Another aspect of the present inventions relates to previews, displayed within search results windows, which are at least one of being resizeable, zoomable, or pageable through. For example, a first representation of a first file found by the search may be at least one of being resizeable or zoomable or scrollable or pageable through within a display region, such as a window, which contains the results of the search. FIG. 21 shows an exemplary method for performing at least some of the functionality of this aspect. In operation 2901, a user's search input is received by a data processing system which, in turn, in operation 2903, performs the search and then presents the search results based on the user's search input. In addition, the results are presented such that, for at least one file which was found by the search, the file is represented by a preview or other representation of the file, where the preview or other representation is either resizeable or zoomable or scrollable or pageable through or a combination of those capabilities. For example, if the file which is found is a picture file, then a thumbnail of the picture file may be the representation which is resizeable within the search results window, such that it can be enlarged in size or decreased in size on the display device within the search results window. Further, the picture, which is a thumbnail which represents the file, may be zoomable in that the content of the representation may be zoomed in (e.g. magnified) or out (e.g. demagnified) while maintaining the same area or size of the representation. In addition or alternatively, the content in the representation may be pageable in that multiple different pages of the content may be displayed either sequentially over time by paging through the multiple pages in sequence, as if one were flipping through pages in a book, or multiple pages may be spread out concurrently. One or more of these actions may be possible, depending upon the particular type of content. Images will typically be resizeable or zoomable or scrollable and may also be pageable, for example. In at least certain embodiments of the present invention, as shown in operation 2907, the representation within the search results window may be resized or scrolled or zoomed or paged through without having to launch the application which created the content.

A preview, at least in certain embodiments, can apply to files or other objects (e.g. records, emails, messages, vCards, etc.). A single page preview can be used for a thumbnail or in any situation where a single image is needed to provide a preview of an item. Multiple items can be previewed at once and compared, or viewed in sequence. When multiple items are previewed at once, they can be of any file type including many different file types. The previews can be shown in the same window as the search results window or in a separate window or in a layer that is overlaid above the item, shown in a search result, which is being previewed in the layer above.

A preview may be presented using a variety of different implementations, such as a plug-in implementation which uses one or more plug-ins, such as a QuickTime plug-in, etc. Each of the previews may be formatted in one of several standard data/file types (such as PDF, text, HTML, JPEG, a movie format, or a sound/music format). The previews may be either generated by the application, which created the item or file represented by the preview, when the item or file is stored or may be generated dynamically when needed. A dynamically generated preview may be produced by invoking a generator plug-in that translates the native format of the item being previewed to one of the "standard" data/file types (e.g. PDF, text, HTML, JPEG, a standard movie format, or a standard sound/music format). A preview generator plug-in may be loaded in a separate process to protect against failures and/or security vulnerabilities. Alternatively, a trusted generator plug-in (e.g. QuickTime), or a set of such plug-ins may be loaded directly in the process of presenting the search results and such plug-ins may be used to present the previews. A preview generator may be capable of handling multiple preview requests concurrently and the preview generator and/or the search software controlling the search results window may manage a queue of preview requests, and the search software can cancel or reorder the preview requests in the queue.

Figure 22A:
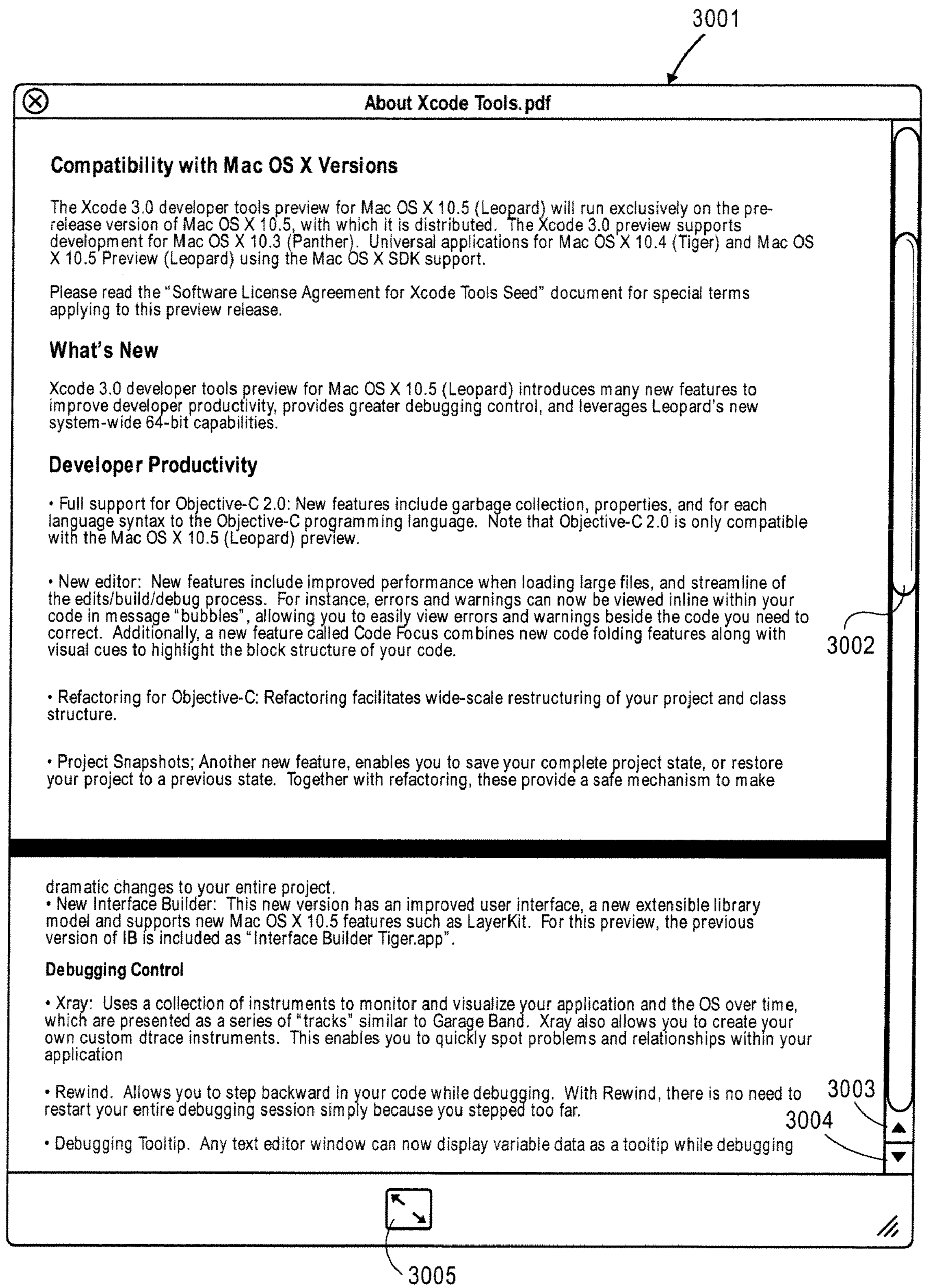
FIGS. 22A, 22B and 22C show examples of previews of items found from a search query, with the previews being capable of being presented within the window showing the search results.
Figure 22B:
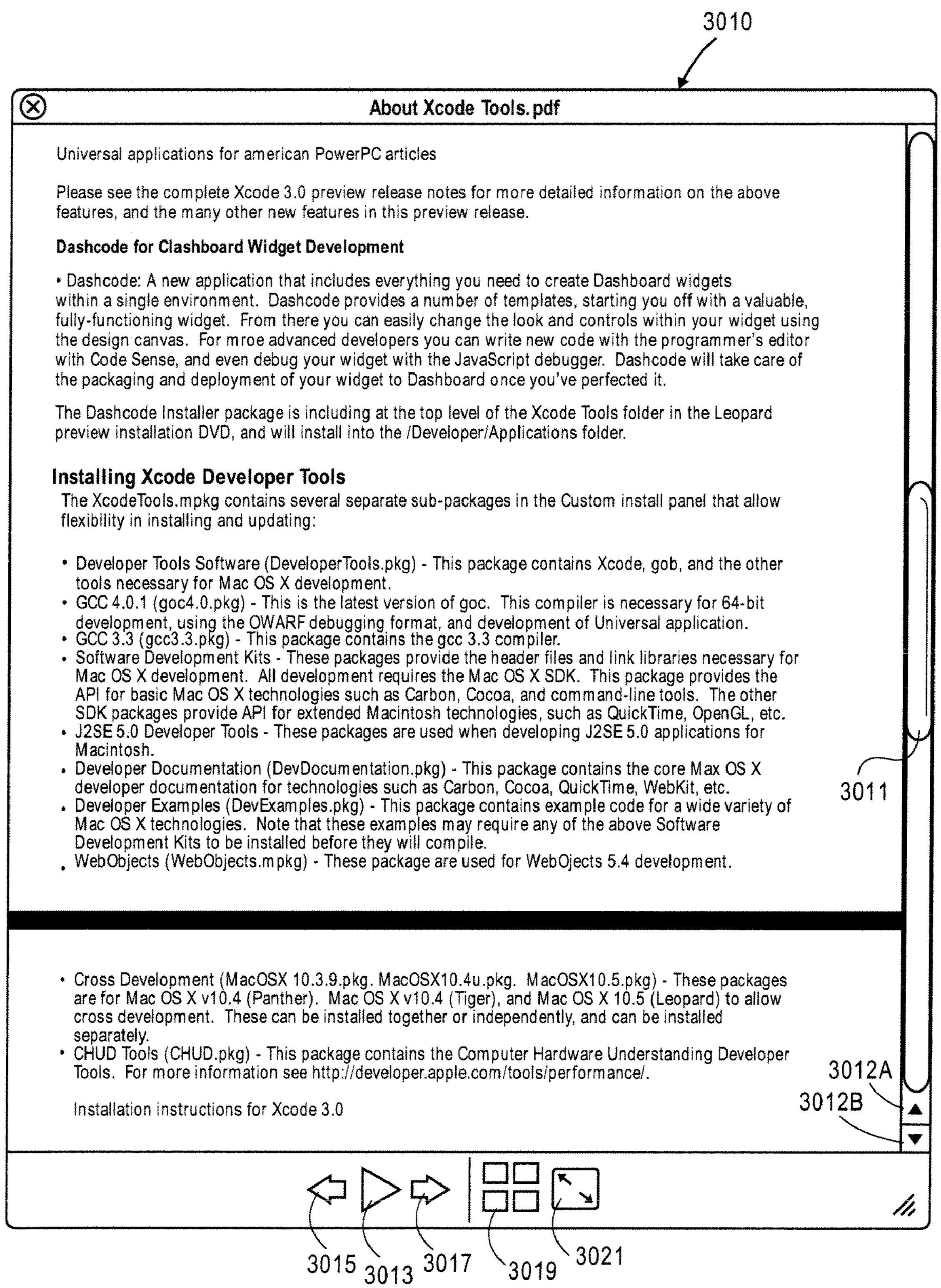
Figure 22C:
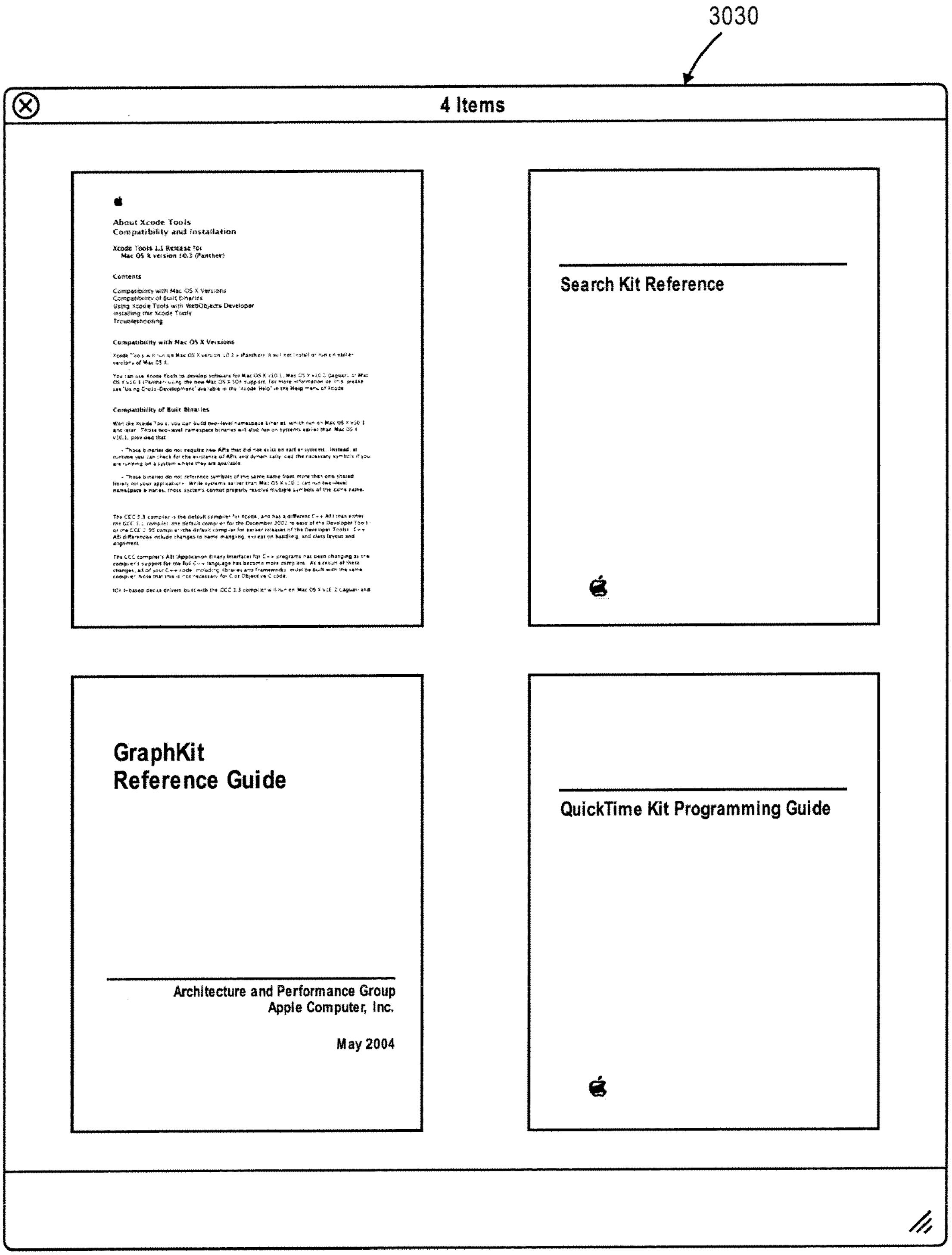

The following figures show examples of previews or other representations which are resizeable or zoomable or scrollable or pageable through. FIG. 22A shows an example of a preview 3001 displayed on a display device, either within a search result window or as an overlay on the window. The preview 3001 is scrollable and resizeable; it may be scrolled using any one of the scroll controls 3002, 3003 and/or 3004. It may be resized using the resize control 3005. FIG. 22B shows a preview 3010 which can display multiple documents or items in a scrollable format. The view shown in FIG. 22B of the preview 3010 shows only one document and another document can be selected for viewing using interface controls 3015, 3013, and 3017. The view of preview 3010 is scrollable using scroll controls 3011, 3012A and/or 3012B. The view of preview 3010 is also resizeable using resize control 3005. The user can also switch to display multiple documents or items at once in the view of preview 3010 by selecting the user interface control 3019 which will cause the preview shown in FIG. 22B to appear similar to the preview shown in FIG. 22C which shows multiple documents concurrently. The preview shown in FIG. 22C may also be scrollable.

Figure 23:
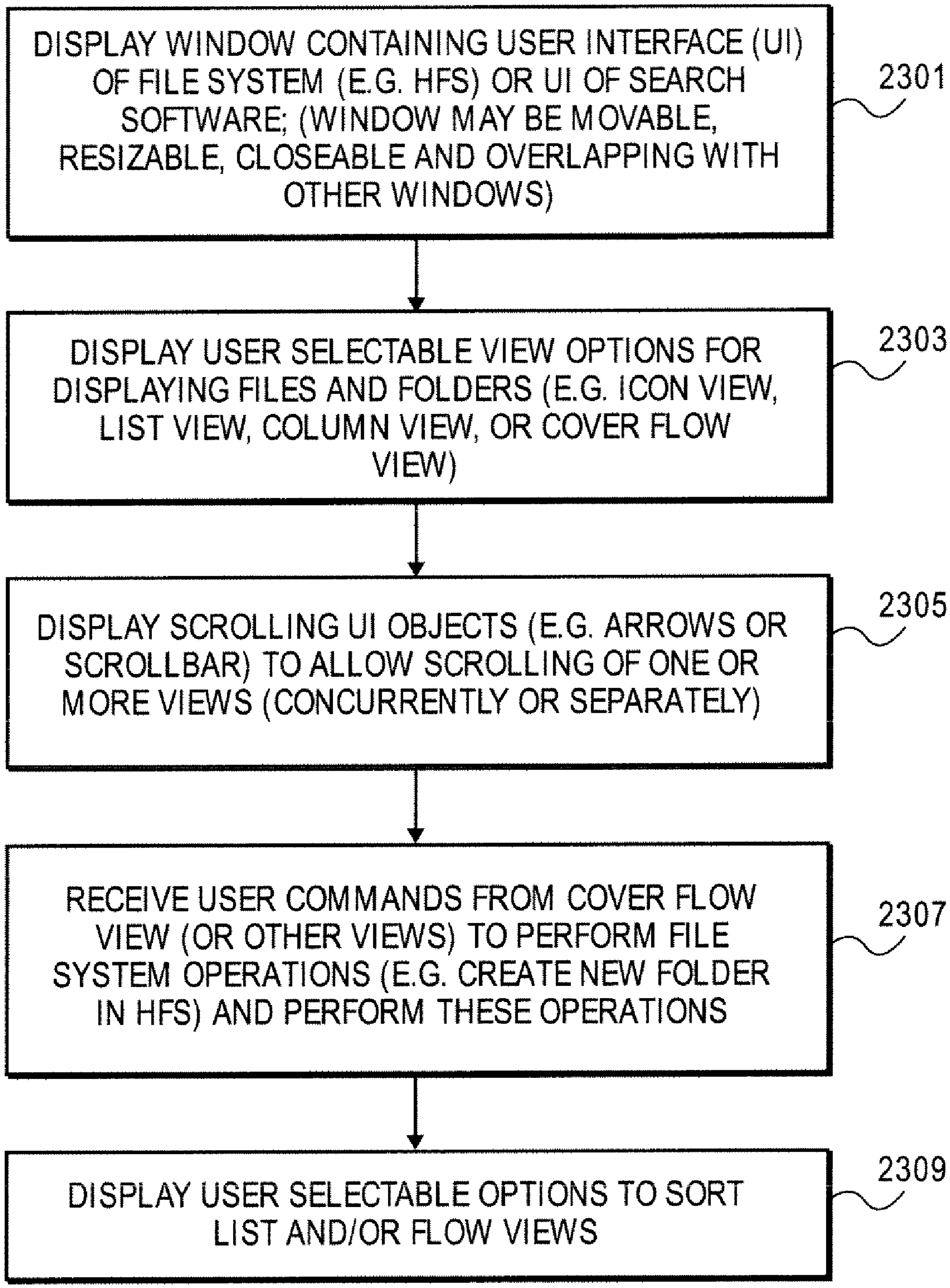
FIG. 23 is a flow chart which illustrates an exemplary method according to certain embodiments of the present invention which may include a cover flow view.

Previews or other representations which are resizeable or scrollable or zoomable or pageable through may also be provided in other user interfaces which may include alternative types of views such as a cover flow view which is further described below. FIG. 23 provides an example of one method of using a cover flow view, such as the cover flow view area 2318 shown in FIG. 24A. In operation 2301, a data processing system displays one or more windows containing a user interface of a file system, such as a hierarchical file system (HFS) or a user interface of a search software, such as the search software known as Spotlight from Apple Inc. of Cupertino, Calif. The window 2316 is an example of a window containing a user interface of a file system; in this case, the file system user interface is the program Finder from Apple Inc. Another example of a user interface for a file system is the user interface provided by the Windows Explorer computer program from Microsoft. An example of a window which contains a user interface of a search software, such as the search software Spotlight, is the window 2401 shown in FIG. 25A. These windows may be moveable, resizeable, closeable, and be able to overlap with other windows. For example, other windows may partially cover the window displayed in operation 2301 or the window displayed in operation 2301 may cover other windows. Moreover, the window may be moveable around the display device (e.g. by positioning a cursor over a portion of the window, such as the title bar of the window, and by then moving the cursor after the title bar has been selected by a user to thereby move the window) and the window may be resizeable, by using one or more user interface objects as is known in the art, or closeable or minimizeable. In operation 2303, the data processing system may display user selectable view options for displaying files and folders. These view options may include an icon view, or a list view, or a column view, or a cover flow view. One or more of these view options may be selected by a user through a user interface object, such as the icon view user interface object 2330 or the list view user interface object 2331, or the column view user interface object 2332, or the cover flow view user interface object 2333 shown in FIG. 24A. These selectable view options may be displayed within the window displayed in operation 2301 or in another part of the user interface such as in a menu bar or other selectable menu object or a dock, such as dock 2317. In operation 2305, the data processing system may display scrolling user interface objects which may include arrow user interface objects, such as the up-scroll user interface object 2348 and the down-scroll user interface object 2349 shown in FIG. 24A. These scrolling user interface objects may allow scrolling of one or more views either concurrently or separately as further described below. Each view may include its own set of scrolling user interface objects or a single set of scrolling user interface objects may be used to scroll both views if the scrolling is concurrent or linked as further described below. In operation 2307, the data processing system may receive one or more user commands from the cover flow view area or from other view areas to perform file system operations, such as creating a new folder in the HFS, and the system responds by performing these operations. Commands may be received through various user interface objects, including pull-down menus on a menu bar, such as the menu bar 2312 shown in FIG. 24A, or a contextual command user interface object, such as the contextual command user interface object 2335, or through a dragging and dropping manipulation on an icon representing the document or file from one window to another window or within the same window, etc. These user interface objects may be in the same window as the window displayed in operation 2301 or in different or other portions of the user interface displayed on the display device of the data processing system. In addition to or instead of user commands to perform file system operations, the data processing system may receive user commands requesting a zoom or a scroll or a page through or a resizing of content displayed within the cover flow area as further described below. The data processing system may also, in operation 2309, display user selectable options to sort a list or flow view either concurrently or separately. These user selectable options may include options to sort by the name of a file or the type/kind of file or the date last used or other parameters which may be used to sort files in either a list view or other types of views, such as an icon view or column view or a cover flow view as described further below.

It will be understood that the method shown in FIG. 23 is one general example of a use of a cover flow view to display content within a file system and to receive commands for the file system through the cover flow view, such as through direct manipulation of icons representing documents in the cover flow view. Further, the method of FIG. 23 may also be used in the context of receiving search inputs and providing the search results through software which provides a user interface for searching for files in a file system, such as an HFS. It will be appreciated that the operations shown in FIG. 23, as in other flow charts described herein, may be performed in a different order and may include fewer operations than shown in FIG. 23 or may include more operations than shown in FIG. 23.

Figure 24A:
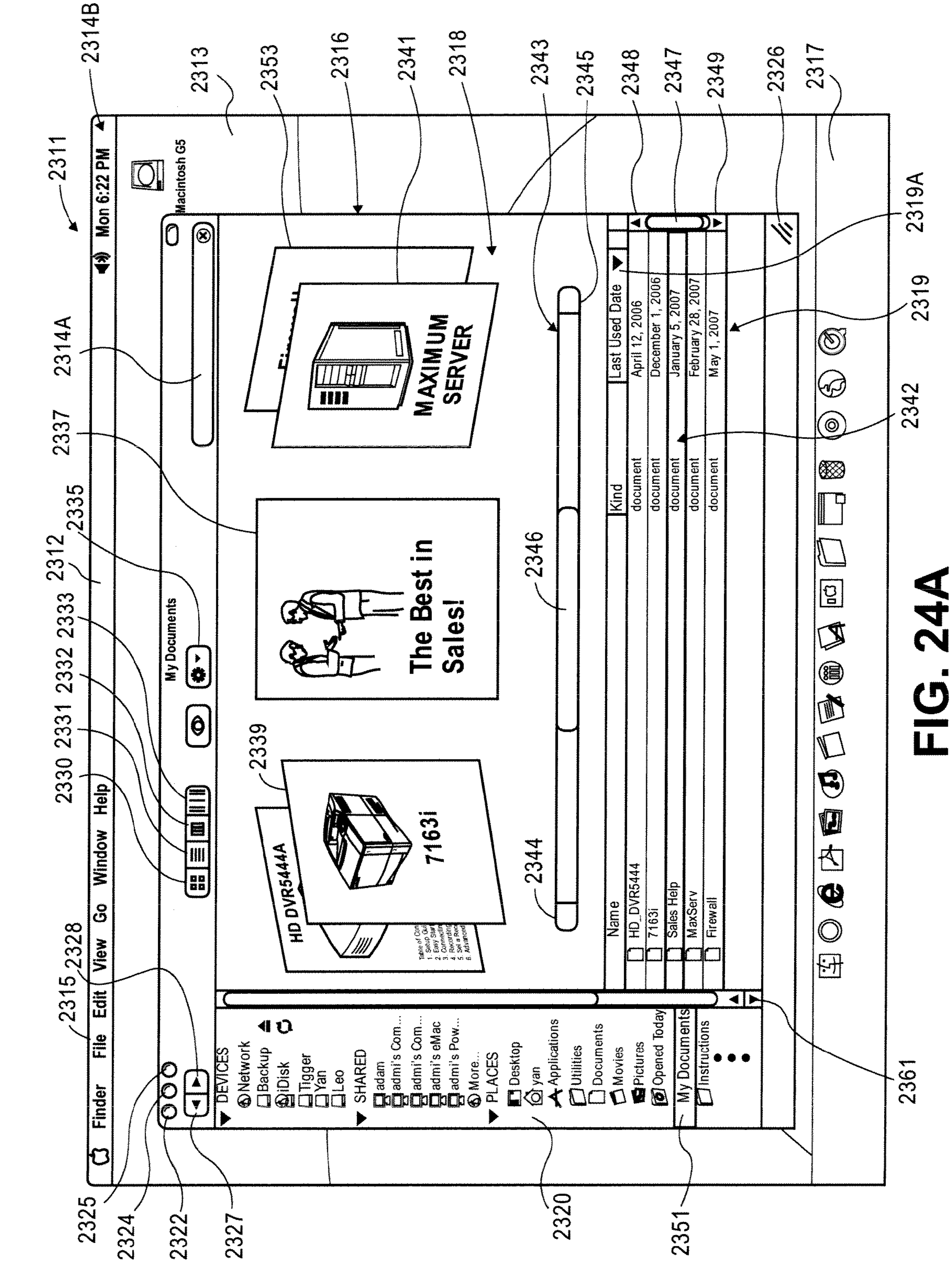
FIGS. 24A-24G show examples of user interfaces for providing a cover flow view in the context of a software program for managing files in a file system, such as a hierarchical file system.

FIG. 24A shows an example of the user interface on a display device 2311 which is coupled to a data processing system or which is part of a data processing system. The particular user interface shown in FIG. 24A represents the user interface of a file system provided by software which runs on an operating system and which may be referred to as a file management software; the Finder from Apple Inc. of Cupertino, Calif., and Windows Explorer from Microsoft Corporation of Redmond, Wash., are two examples of file management software which allow a user to manage files in an HFS maintained by a data processing system. The files can be displayed in one or more windows and users can perform operations on the files by selecting menu options or by performing direct manipulation, as in a drag and drop operation or by the use of contextual menu items or by the use of right-clicking on a file and selecting commands from a contextual menu (e.g. a contextual pop-up menu) or in other manners known in the art. The user interface as shown in FIG. 24A may include a menu bar 2312 which is displayed at the top of the display device in at least certain embodiments and which includes a pull-down menu such as the pull-down menu 2315 which includes the word "File" at the top of the pull-down menu, which is known in the art. The user interface may also include a dock 2317 or a task bar on some region of the screen, such as the lower bottom portion region of the screen, or in other locations. The task bar or dock may be used to house a minimized window as is known in the art, which results from the selection by the user of the minimize window user interface object 2324 shown in the upper left corner of the window 2316. The activation of this minimize window user interface object 2324 causes the window to be minimized, as is known in the art, which results in an icon of the window appearing on the dock 2317 or, in other implementations, a task bar. The window can be put in its prior state by selecting that icon in the dock or the task bar. The window 2316 also includes a side bar region which is described above and which is also described in co-pending U.S. patent application Ser. No. 10/873,661, filed Jun. 21, 2004. This side bar region is user-configurable and allows a user to add folders created by the user into the side bar region for easy access to those folders or directories without requiring the user to drill down through a hierarchy of folders to reach a desired folder. In the case of the side bar region 2320 shown in FIG. 24A, the user has selected the folder "My Documents" which is a particular selected subdirectory in a HFS. The title bar of the window 2316 also shows the "My Documents" name, indicating that the files displayed within the window 2316 are within the folder "My Documents." The window 2316 also includes two regions which display the files within this folder. The cover flow view area 2318 shows a cover flow view of the files within the "My Documents" folder. The list display view area 2319 also shows those files but in a traditional list view. As can be seen from FIG. 24A, the list view and the cover flow view area are adjacent and contained within the same moveable, resizeable, and minimizeable window.

The window 2316 also includes a search input field 2314A into which a user may enter one or more search terms to cause the data processing system to perform a search, such as the searches described above, through metadata and/or one or more indexes of the full content of files, such as text files. The user interface may also include a search input menu area 2314B which may be activated by the user (e.g. by clicking in the area on an icon in the area) to cause the display of another search input field into which a user can enter one or more search terms to cause a search to also be performed as described above. The window may also include one or more icons which a user can select to select one or more views within the window 2316. Examples of such icons are the icons 2330, 2331, 2332, and 2333 shown in the upper portion of the window 2316. In particular, the icon view interface object 2330 may be selected by a user to cause the display of files within a particular folder or group of folders in an icon view manner as is known in the art. The selection of the list view user interface object 2331 will cause the display of files in a list, such as in a manner which is similar to the list display view area 2319; this list will typically include one or more columns, such as name, kind, and last used date as shown in FIG. 24A which can be used to sort the list in a variety of different ways as is described further below, in conjunction with, for example, FIG. 24B. The column view user interface object 2332 may be selected by the user to cause a column view as is known in the art. Lastly, the cover flow view user interface object 2333 may be selected to cause a cover flow view which may be a view of the cover flow view area by itself or a view with the cover flow view area and the list display view area, such as the list display view area 2319 as shown in FIG. 24A. The window 2316 may also include a close window user interface object 2322 and a maximize window user interface object 2325 which operate to close and maximize the window respectively as is known in the art. The window 2316 may also include a back control user interface object 2327 and a forward control user interface object 2328 which operate to toggle the contents of the window back or forward through a history list of the window's previous displays as is known in the art. The window 2316 may also include a contextual command user interface object 2335 which, when activated or selected, presents a menu of options such as the menu shown as menu 2365 (in FIG. 24E) or other menus from which a user can choose one or more commands depending on the context of the system. These commands may be commands to perform file system operations such as moving or copying files, or creating a folder or other operations, including search operations. The window 2316 may also include one or more scroll control user interface objects for the side bar region 2320, such as the scroll control user interface objects 2361 which may be used to scroll up and down the side bar region 2320. The window 2316 may also include a resize control user interface object 2326 which may be selected by a user and then dragged by the user to resize the window 2316 as is known in the art.

The window 2316 may have two sets of scroll control user interface objects. One set may control scrolling within the cover flow view area and the other set may control scrolling within the list display view area. The scrolling of one view area may be linked to the scrolling of the other view area, such that activation of a scroll control in one of the sets to cause scrolling in one view area will also cause a corresponding scrolling in the other view area. In alternative embodiments, the scrolling may not be linked, such that one area can be scrolled independently of the other area; for example, scrolling the list display view area does not cause scrolling in the cover flow view area in this alternative embodiment. The scroll controls for the cover flow view area include the scroll bar control object 2346 which may be dragged or moved by a user, and it further includes the left scroll user interface object 2344 which acts like a left scroll arrow, and the right scroll user interface object 2345 which acts as a right scroll arrow. Together these three objects are part of the scroll control user interface object 2343. The scroll controls for the list display view area include a scroll bar control object 2347 and an up-scroll user interface object 2348 and a down-scroll user interface object 2349 to cause scrolling in a known manner. The cover flow view area includes a set of documents on one side of the selected document 2337 in the cover flow view area and another set of documents or files on the other side of the selected document 2337. In particular, document 2339 and another document are on the left side of the selected document 2337 and the documents 2341 and 2353 are on the right side of the selected document 2337. As can be seen from FIG. 24A, the density of documents on either side of the selected document is higher than the density of documents between the rightmost edge of document 2339 and the leftmost edge of document 2341. In other words, the selected document in the cover flow view is spaced apart from the collection of documents on either side of it. Furthermore, in the cover flow view, the documents on either side of the selected document are shown in perspective view such that the documents on the left side appear to face the selected document while the documents on the right side appear to face the selected document. Also, when several documents are on one side of the selected document, at least some of the documents are covered by other documents on that side; in other words, on that side, the documents are arranged in an overlapping manner. Further, when a document moves from one side of the selected document to the other side of the selected document, its content will appear to change the direction in which it faces. This can be seen by comparing document 2339 in FIG. 24A with document 2339 in FIG. 24B. In the case of FIG. 24A, the document 2339 appears to face towards the right side, which is towards the selected document 2337, while in FIG. 24B, the document 2339 appears to face towards the left, which is also towards the selected document 2337 in FIG. 24B. As the document moves across the selected document position in the middle of the cover flow area, the direction of its content appears to switch. This may again be due to the perspective view in which the document appears to be angled. This may also be due to the use of different lengths of sides for two parallel sides of a thumbnail or icon in the cover flow view. For example, document 2339 appears to have two parallel sides which are vertical but which do not have an equal length even if the document represented by document 2339, in fact, has two such sides which are of equal length. This can also be seen by comparing the two vertical sides of the thumbnail 2376 in FIG. 24F.

It will be appreciated that the files and items displayed in the cover flow view and in the list view 2318 and 2319, respectively, may include a variety of different documents of a variety of different types, such as text files, PDF files, picture files such as JPG files, web page (e.g. HTML) files, Microsoft Word or Excel files, movie files, other files and other file types noted herein, and folders or subdirectories as is commonly found in file management software such as the Finder or Windows Explorer. These folders may be containers for other documents in a hierarchical file system as is known in the art.

In addition to the use of a cover flow view for a view of files and folders in either or both of a file management software program (such as the Finder) or a search software program (such as Spotlight), a cover flow view may also be provided in "open" or "save as" windows which are presented/displayed to a user to allow the user to open an existing file from within an application (such as a word processing or image processing or web browsing application) or to save a file from within such application.

Figure 24B:
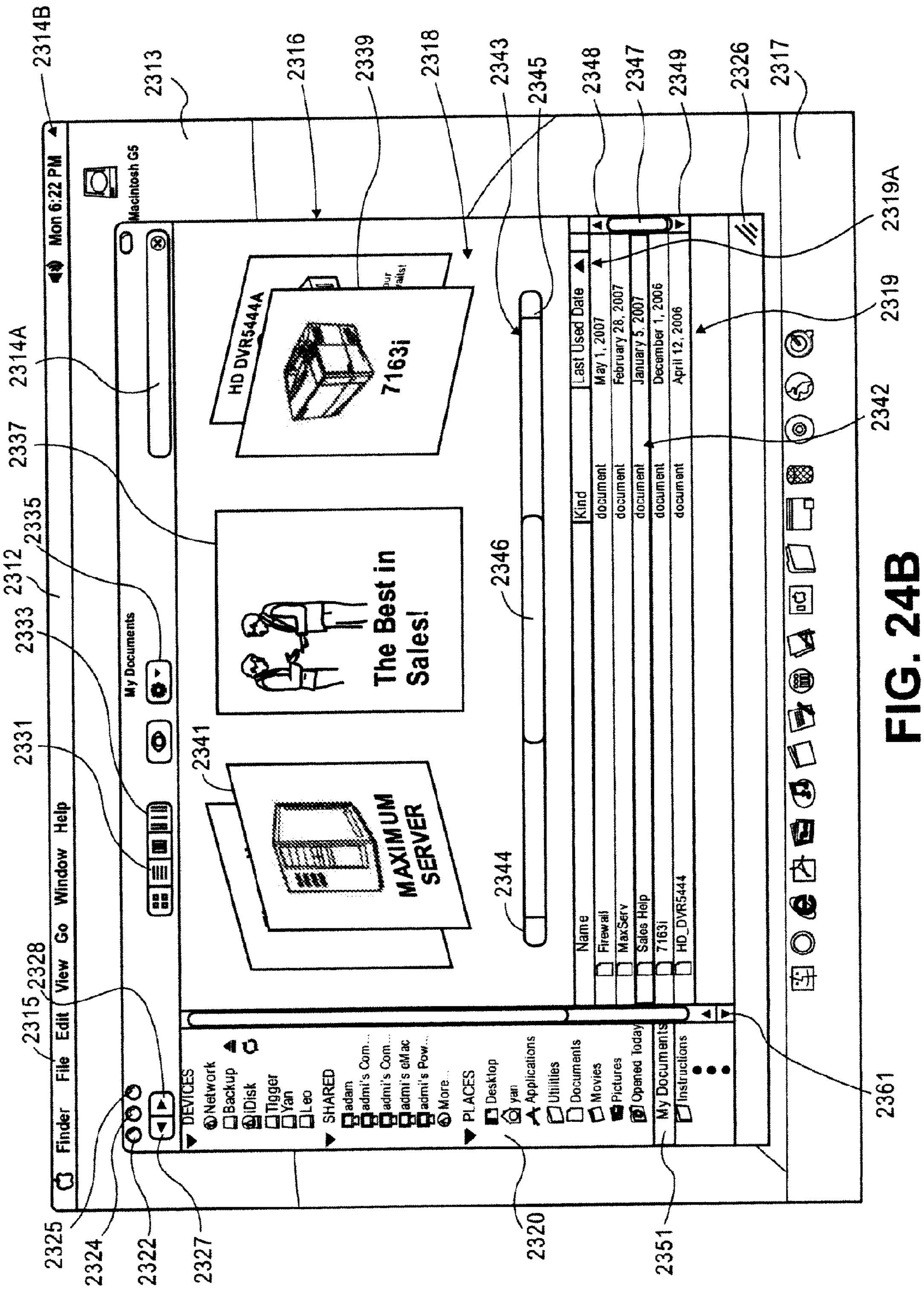

FIG. 24B illustrates an example of how the sort controls in the list view, such as sort control 2319A, may be used to change the order in which the files and/or folders are displayed within both the list view area 2319 and the cover flow view area 2318. In particular, the user or the system has changed the order of the last used date by toggling the sort control user interface object 2319A between two different states. In the case of FIG. 24A, the dates are sorted from oldest to most recent, and in the case of FIG. 24B, the files and/or folders are sorted from most recent to oldest. It will be appreciated that the user may similarly toggle or otherwise change one or more of the other sort control user interface objects (e.g. name; kind; etc.) in order to achieve different sortings of the files and/or folders. The change in sorting between FIGS. 24A and 24B is reflected in both the list display view area 2319 and the cover flow view area 2318. It can be seen that the order of the files in both view areas in FIG. 24A is the same and is changed to that shown in FIG. 24B in which the order of the files in both view areas is also the same but different than the order shown in FIG. 24A.

Figure 24C:
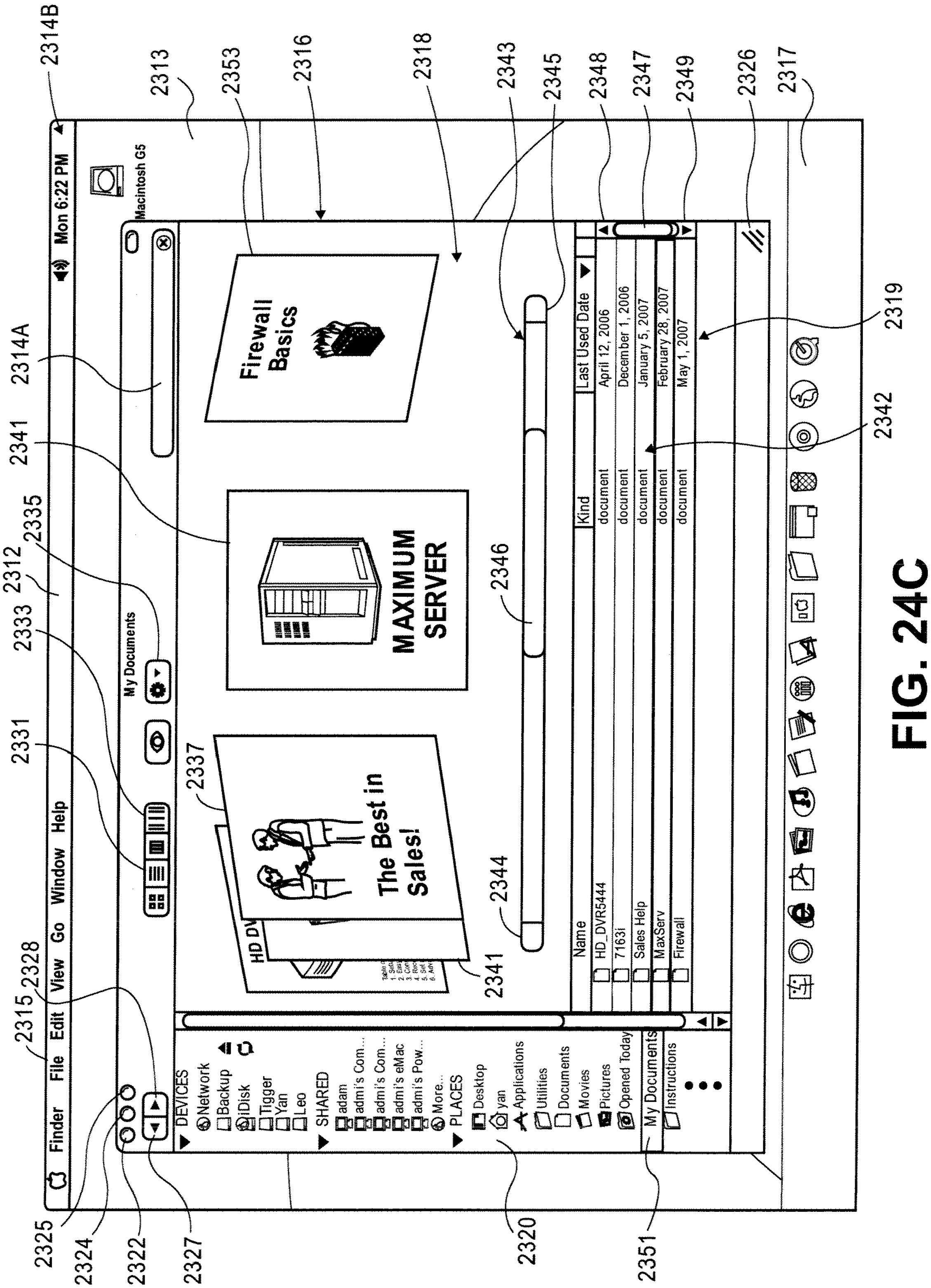

The user interface shown in FIG. 24C shows how the user or the system can change the selected document 2342 within the list display view area 2319 and thereby cause the change in the selected document shown in the cover flow view area. In the case of FIG. 24A, the user or the system has selected as the selected document the document entitled "Sales Help," thereby causing this document to also appear as the selected document 2337 in the cover flow view area 2318. In the case of the user interface shown in FIG. 24C, the user or the system has selected the document "MaxServ" as the selected document 2342 which has, in turn, caused the selected document to appear as document 2341 in the cover flow view area 2318. In some embodiments, the selected document may be selected by selecting a document (e.g. document 2341) in the cover flow view to change the selected document in both views.

Figure 24D:
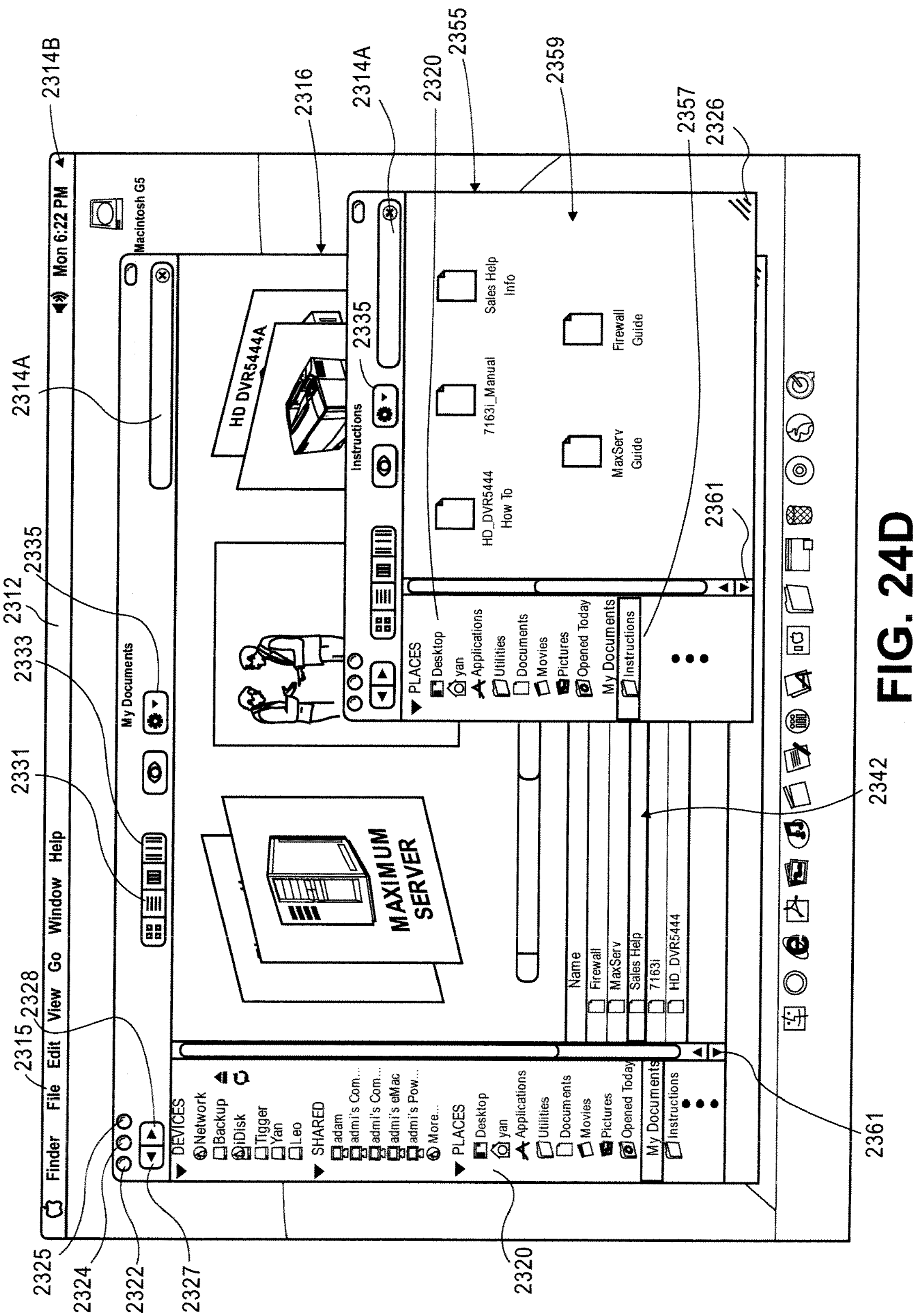
Figure 24E:
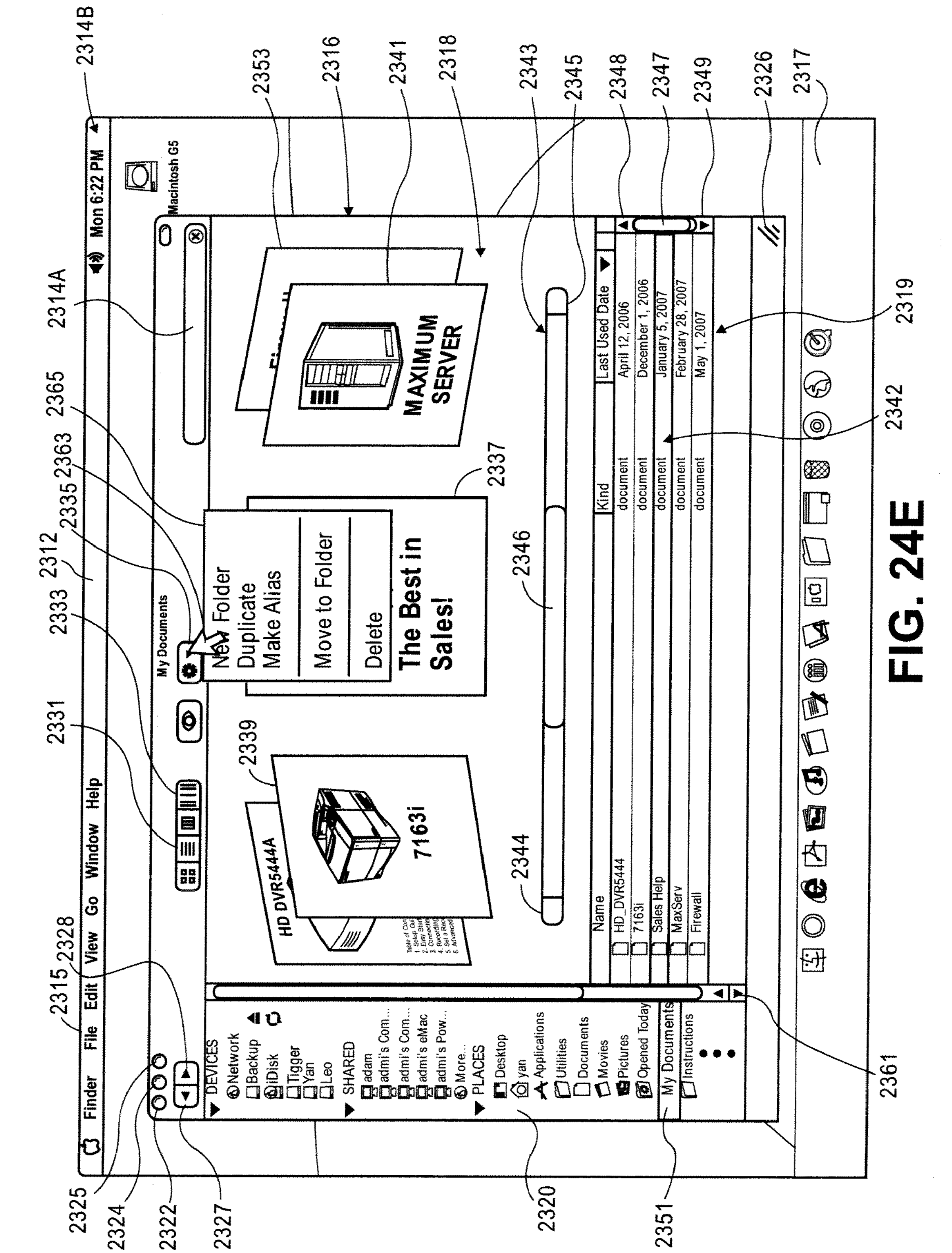

FIGS. 24D and 24E will now be referred to while describing the various file system operations which a user may cause to be performed through the use of a file management software program such as the Finder or Windows Explorer. In the case of the user interface shown in FIG. 24D, the user or the system has opened a second window 2355 which overlaps partially the window 2316. The window 2355, like the window 2316, also includes various user interface objects, including user interface objects 2322-2325, 2327-2328, 2330-2333, and 2326. The window 2355 also includes a side bar region in which the user or the system has selected the folder "Instructions" 2357 which is different than the selected folder in the side bar region of the window 2316. Hence, the window 2355 displays the contents of the folder or subdirectory "Instructions" which includes five files shown in the icon view area 2359, which displays the files as icons because the user or the system has selected the icon view user interface object 2330 to cause the display of the files as icons, as is known in the art. The window 2355 also includes a search input field 2314A into which a user or the system may enter a search input to cause the system to perform a search as described herein with respect to metadata and/or one or more indexes of full-text content in one or more index databases. The user may use the user interface shown in FIGS. 24D and 24E to perform a variety of different file management tasks using the file management software in either window or both windows. For example, the user may select one or more files or folders from either the cover flow area view or the list view area in window 2316 and drag the selected file(s) or folder(s) into the window 2355 to relocate the file or folder within the "Instructions" folder or another folder. By dragging a file or folder from either the cover flow view area within window 2316 or the list view area 2319, the user can move that file from the "My Documents" folder to the "Instructions" folder (which is a different subdirectory in the HFS) by depositing the file or folder within the icon view area 2359 within the window 2355. Alternatively, a user may drag a file from the window 2355 into the cover flow view area 2318 in the window 2316 or to the list view area 2319 within the window 2316 and thereby relocate the file from the "Instructions" folder into the "My Documents" folder. Numerous other file management activities may be performed from either the cover flow area or the list view or the icon view within window 2355. For example, the user may select a document or folder within the cover flow view area and then select a command such as "copy" or "duplicate" which causes the file or document to be duplicated and then move that file, with either a drag and drop operation or a cut and paste operation or other operations, to another folder such as the "Instructions" folder. In certain embodiments, the user may use the contextual command user interface object 2335 to perform operations on a file or to perform other operations to manage the files using the file management software, such as the Finder. By selecting or activating the contextual command user interface object 2335, a menu, such as the menu 2365, may be displayed, and the user may then select an option from that menu by positioning the cursor 2363 over that option and pressing and releasing a button or otherwise indicating the selection of that menu option. As shown in FIG. 24E, the user may select the option "New Folder" to create a new folder within the "My Documents" folder or may duplicate an existing file by selecting the file and then selecting "duplicate" or selecting "duplicate" and then selecting the file, in certain embodiments. Further, the user may make an alias or shortcut of a file selected to be selected. Further, the user may delete a file that has been selected or to be selected or may cause a file to be moved by selecting the "Move To" folder option. Numerous other file management operations may be performed either through direct manipulation methods (drag and drop operations) or right-clicking operations, in which a user selects a file by pressing the mouse's right button which causes the display of a contextual menu from which the user can select a file system operation, or by selecting the file pull-down menu 2315 which includes a variety of different possible commands, or by selecting other pull-down menus on the menu bar 2312 or by performing other operations known in the art. These various actions allow a user to utilize the cover flow view area as if it was an icon view or a list view to perform file management operations. These operations may include, for example, moving a file within the HFS;

creating a copy of a file in the HFS; deleting a file in the HFS; creating a new folder in the HFS; moving a folder in the HFS; creating a copy of a folder in the HFS; deleting a folder in the HFS; moving a file from a first folder to a second folder in the HFS; moving a file or folder to or from the desktop; changing access permissions of a file or folder and/or changing the name of a file in the HFS.

Figure 24F:
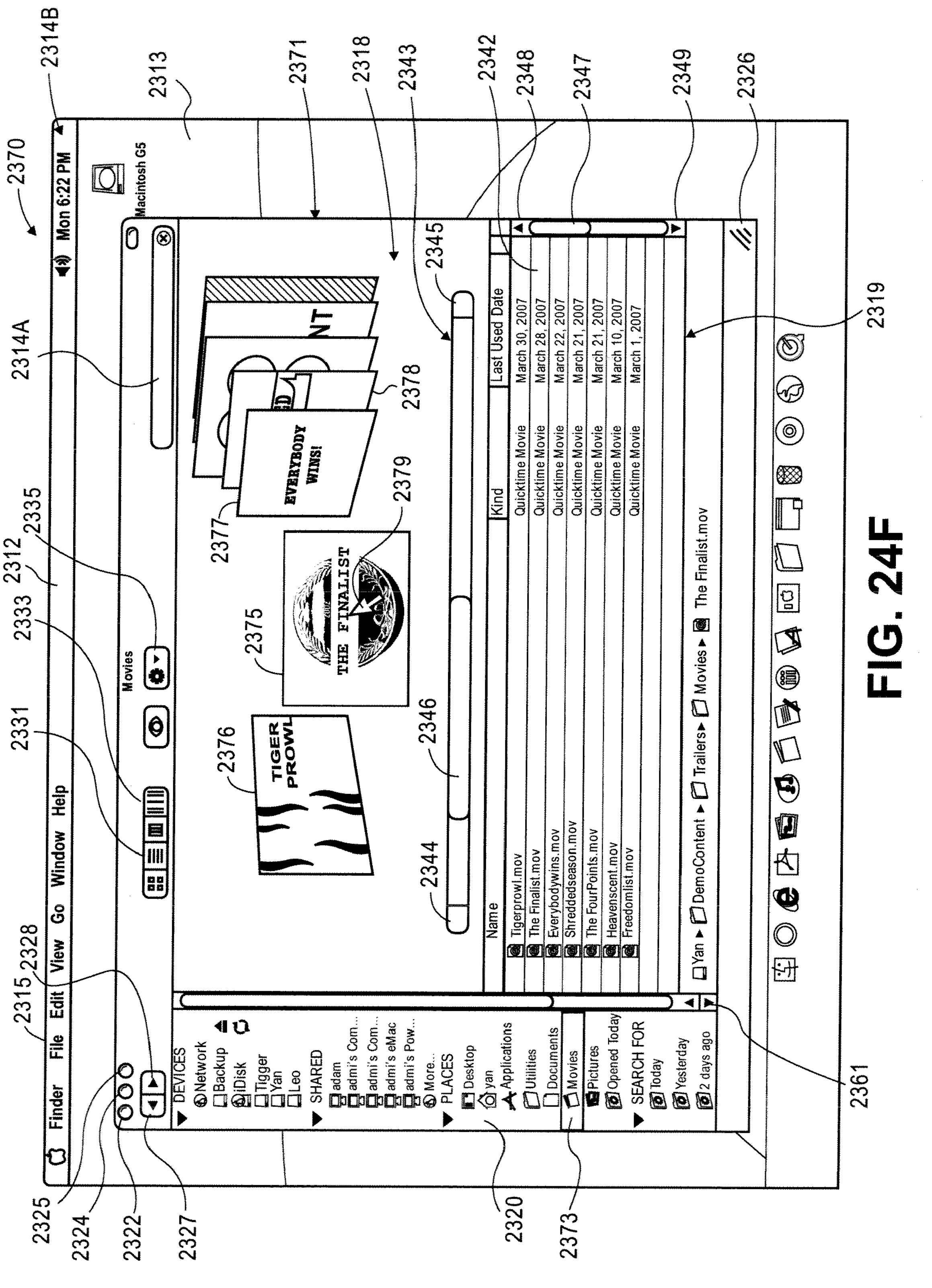
Figure 24G:
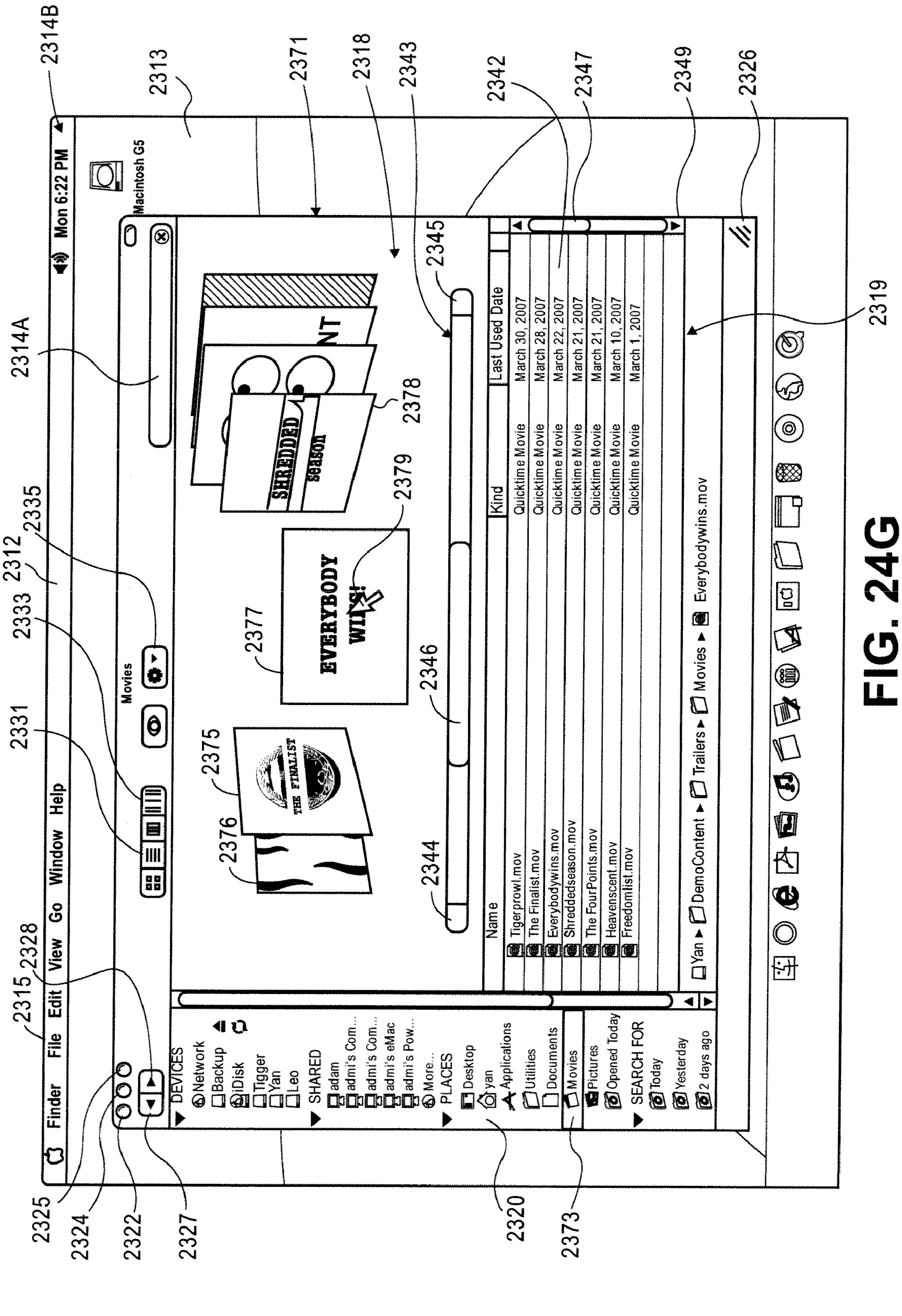

FIGS. 24F and 24G provide two further examples of a user interface for viewing files, browsing files, or manipulating files using a file management software, such as the Finder, from within the cover flow view area. In this case, the cover flow view area includes thumbnails of movies contained within the Movies folder 2373 shown in the side bar region 2330. It will be appreciated that the window 2371 (in FIG. 24F) has different folders in the side bar and different documents in the Movies folder than the window 2316 (in FIG. 24E); this may be because the system has been changed over time, for example. The Movies folder includes movies shown in the list display view area 2319, which are shown also, in the same order, in the cover flow view area 2318. The thumbnails shown in the cover flow view area include thumbnails 2375, which in this case is the selected document, as well as thumbnails 2376, 2377, and 2378, in addition to several other thumbnails shown on the right side of the selected document 2375. A cursor 2379 is shown near the center of the thumbnail 2375. As described herein, the user may perform a variety of different file management operations by selecting thumbnails within the cover flow view or icons within the list view to perform those operations. For example, in one embodiment, the user may select a thumbnail within the cover flow view area 2318 and drag that thumbnail to one of the folders in the side view area 2320 to relocate the particular thumbnail. For example, the user may select the thumbnail 2375 or another thumbnail within the cover flow view area 2318 and drag that particular selected thumbnail to the Utilities folder or to some other folder or location available within the side bar region 2320. Alternatively, the user may drag the thumbnail to the desktop region 2313. In addition to using a direct manipulation technique such as drag and drop, the user may select the object and then select a command either from a pull-down menu or the contextual command user interface object or may right-click on the selected document or other document within the cover flow area and select a command from a contextual or pop-up menu to perform a file management software operation. FIG. 24G shows the window 2471 after the user or the system has selected a different selected document in the cover flow area, which in this case is the thumbnail 2377. This selection may occur by using the cursor 2379 and positioning the cursor at the thumbnail 2377 within the cover flow view area 2318 shown in FIG. 24G and pressing a button or otherwise selecting the thumbnail 2377. Alternatively, this may occur by selecting the file corresponding to the thumbnail 2377 from within the list display area 2319. Alternatively, this may also occur by using one or both of the scroll control user interface objects, such as the scroll bar control object 2346 or the scroll bar control object 2347, etc. in order to cause scrolling within the cover flow view area and/or the list display view area.

Figure 25A:
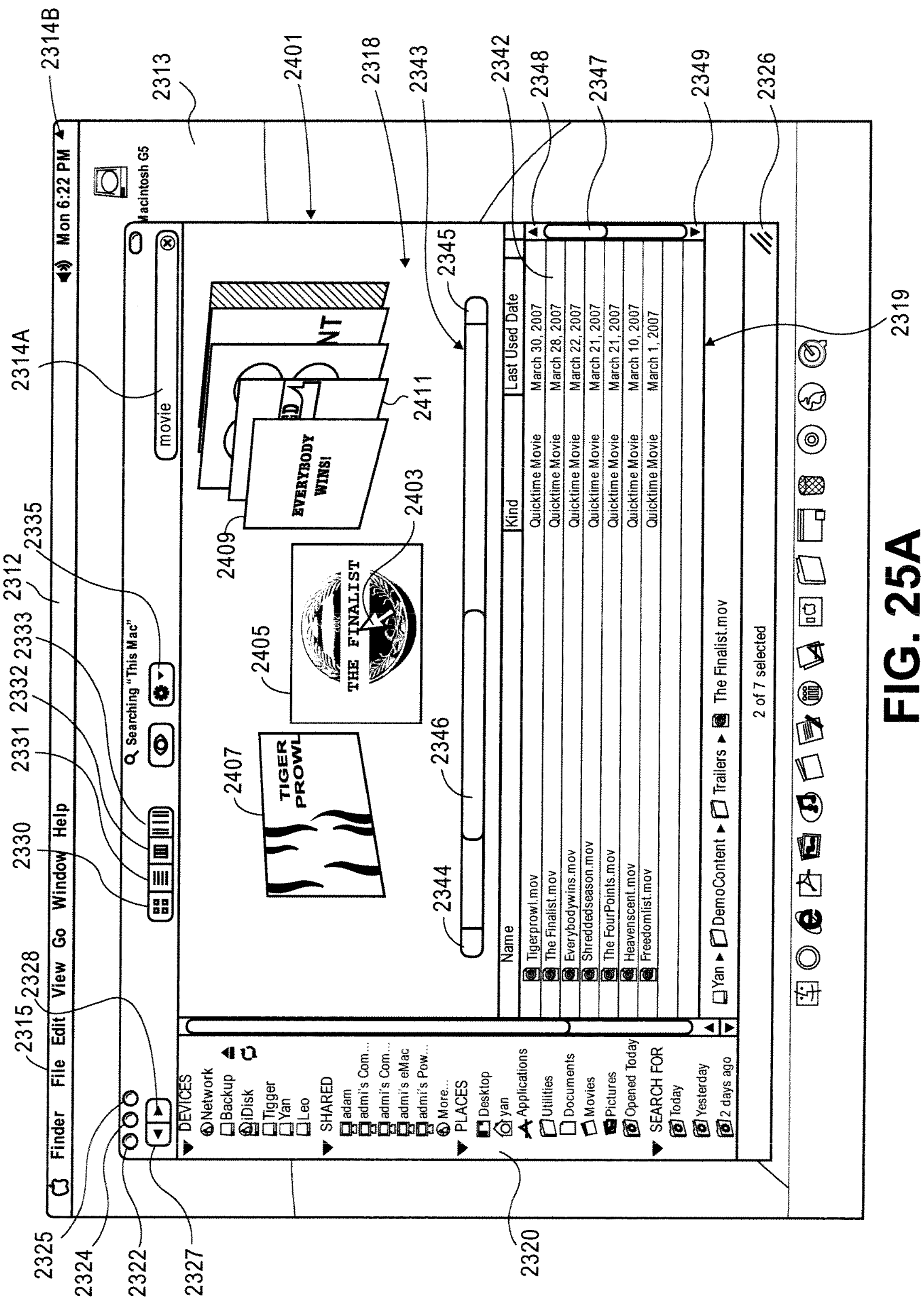
FIGS. 25A and 25B provide examples of a user interface for showing a cover flow view to depict the results of a search of files and folders in a hierarchical file system or other file system.
Figure 25B:
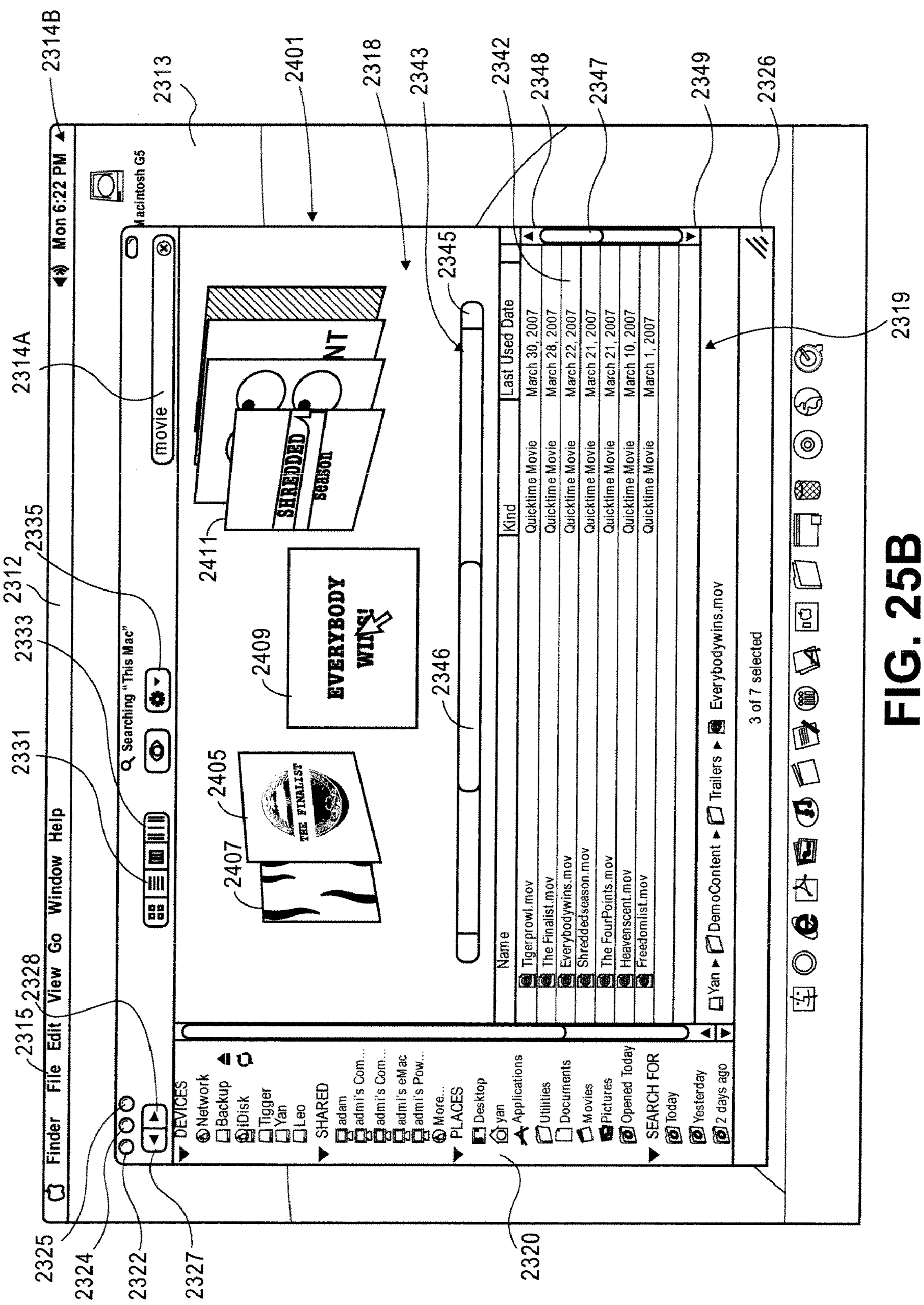

FIGS. 25A and 25B provide examples of user interfaces in which the cover flow view area is used in the context of a search software program, such as Spotlight from Apple Inc. of Cupertino, Calif. The cover flow view area may be used to display the results of a search, in addition to an optional list view, and the user may be able to directly manipulate the icons or thumbnails retrieved by the search from the cover flow view area in order to obtain further information about the document or file retrieved by the search. For example, this further manipulation may include causing a zoom of the document to occur or to present multiple pages by paging through or scrolling through a document shown in the cover flow view. In the case of FIGS. 25A and 25B, a user may have entered a search phrase (e.g. "movie") into the search input field 2314A and caused the data processing system to perform a search as described herein. For example, a search through metadata and/or an index database may retrieve various movies and cause the results of that search to be displayed in both the list display view area 2319 and the cover flow view area 2318. As shown in the cover flow view area 2318, seven files or movies have been retrieved, including those represented by the thumbnails 2405, 2407, 2409, and 2411. The cursor 2403 is available for use by the user to select one or more of the thumbnails for further inspection. For example, in the case of FIG. 25B, the user has selected the thumbnail 2409 to present that thumbnail as the selected document in the middle of the cover flow area 2318. This may be performed by either selecting the thumbnail 2409 directly in the cover flow area 2318 or by selecting that movie document within the list display view area 2319.

Figure 26A:
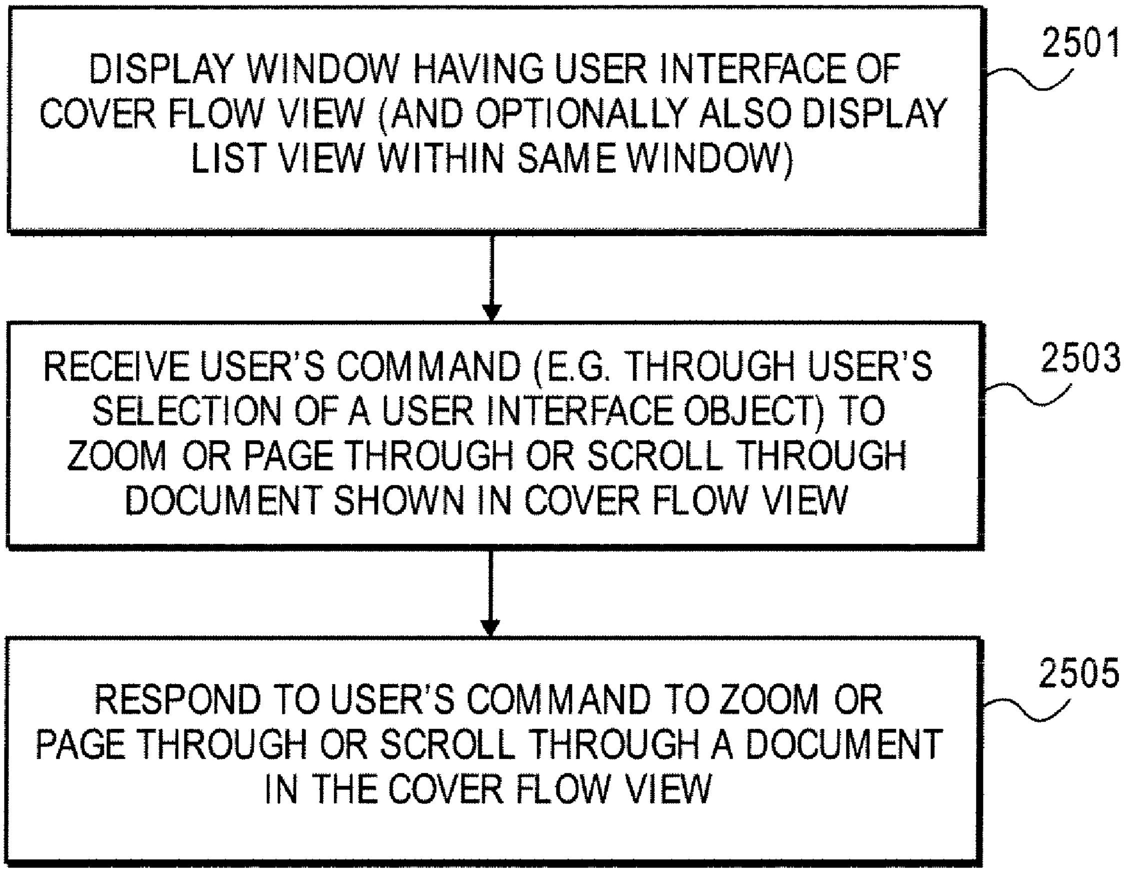
FIG. 26A is a flow chart which depicts an example of a method for interacting with representations of documents shown in a cover flow view; the interaction may include zooming or paging through or scrolling through the documents shown in the cover flow view.
Figure 26B:
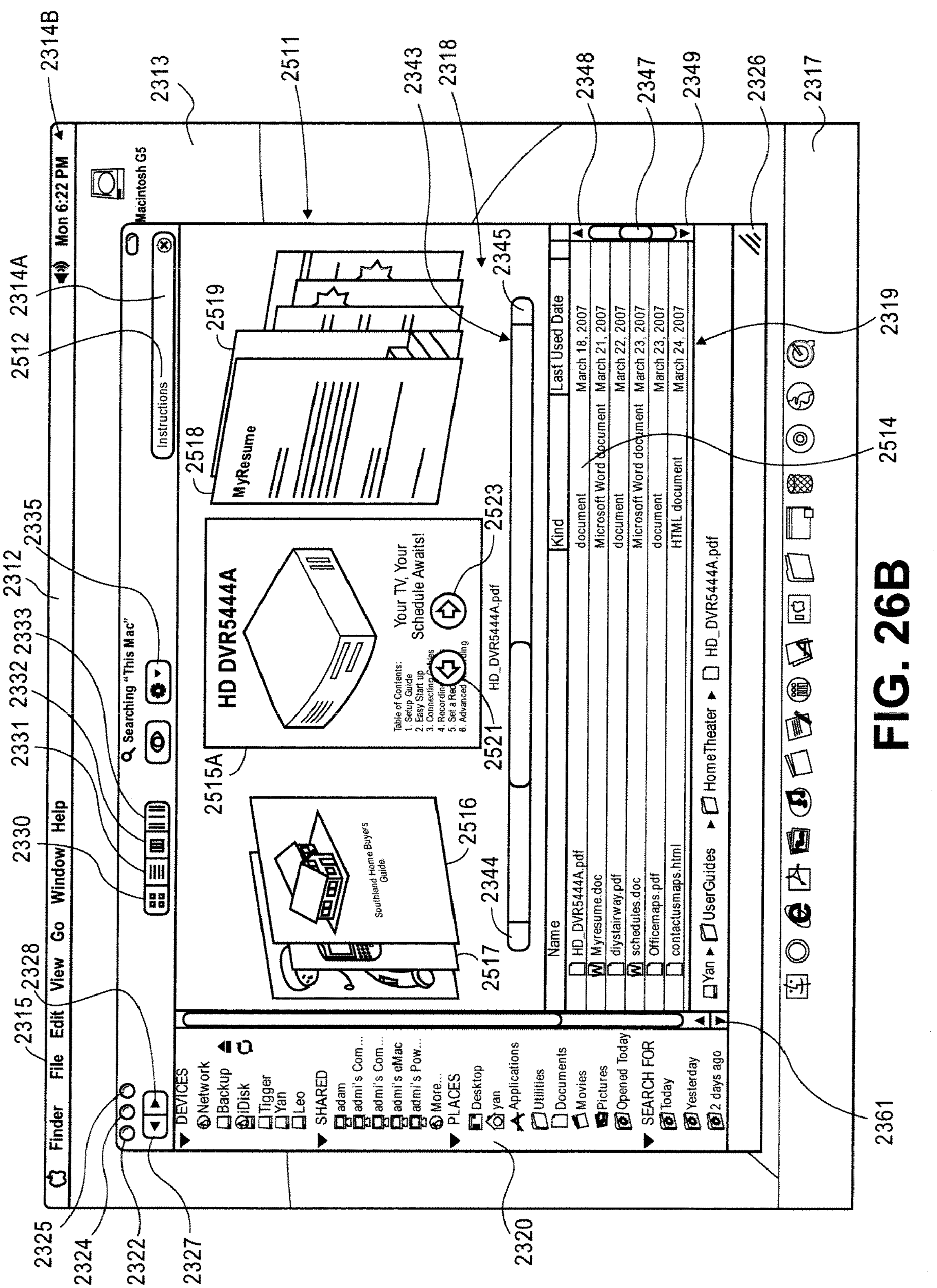
FIGS. 26B-26I provide examples of user interfaces for interacting with documents within a cover flow view according to at least certain embodiments of the present inventions.
Figure 26C:
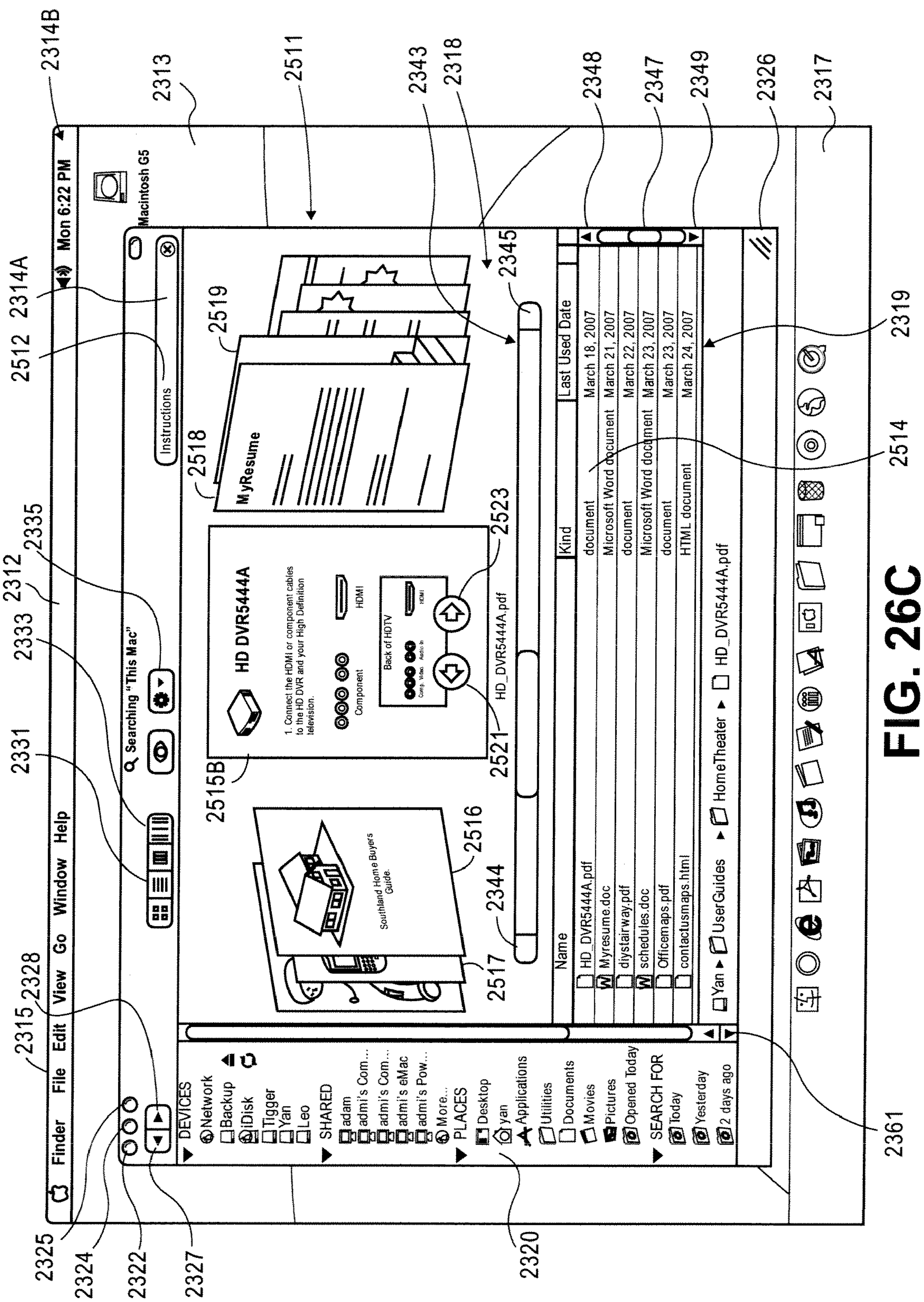
Figure 26D:
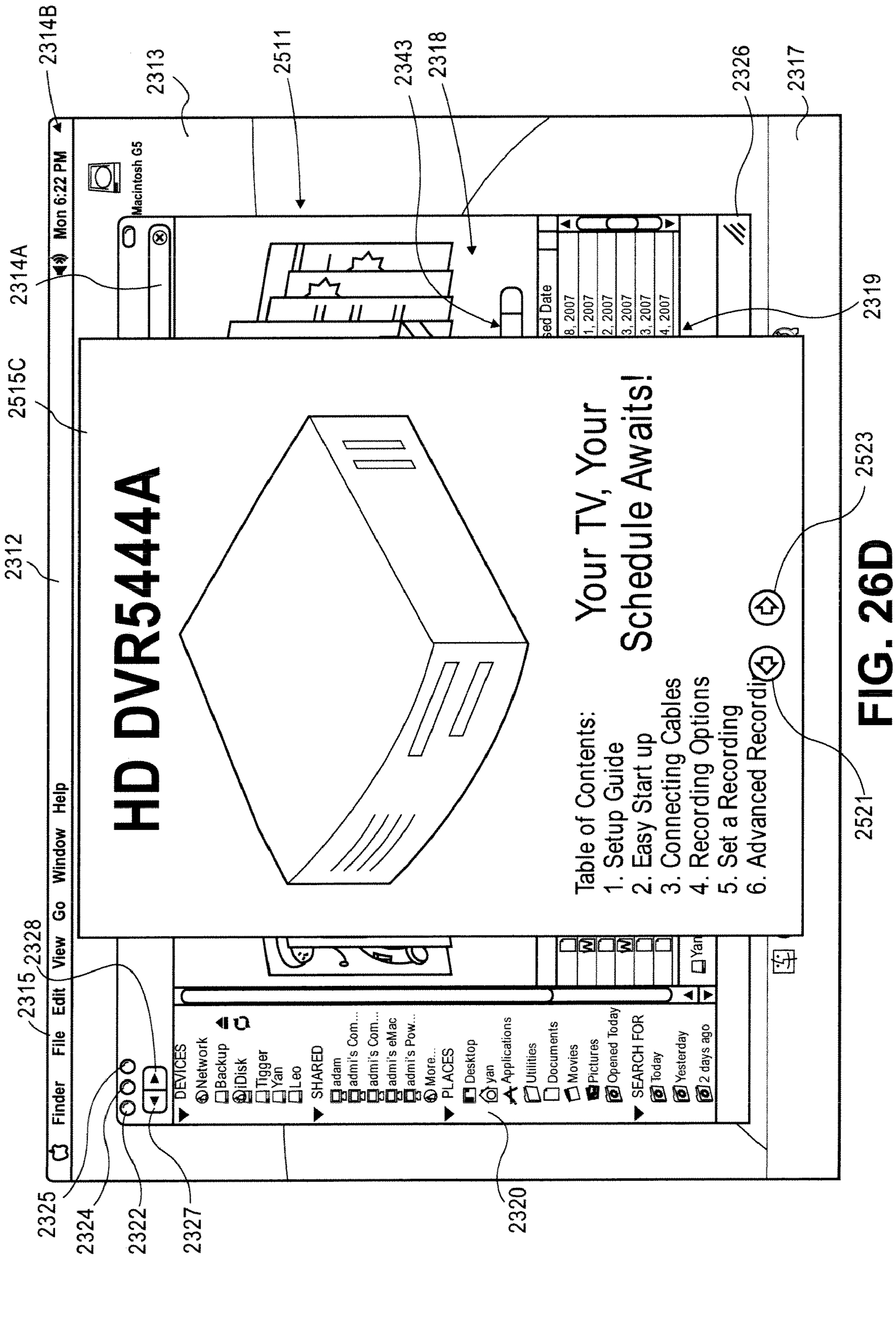
Figure 26E:
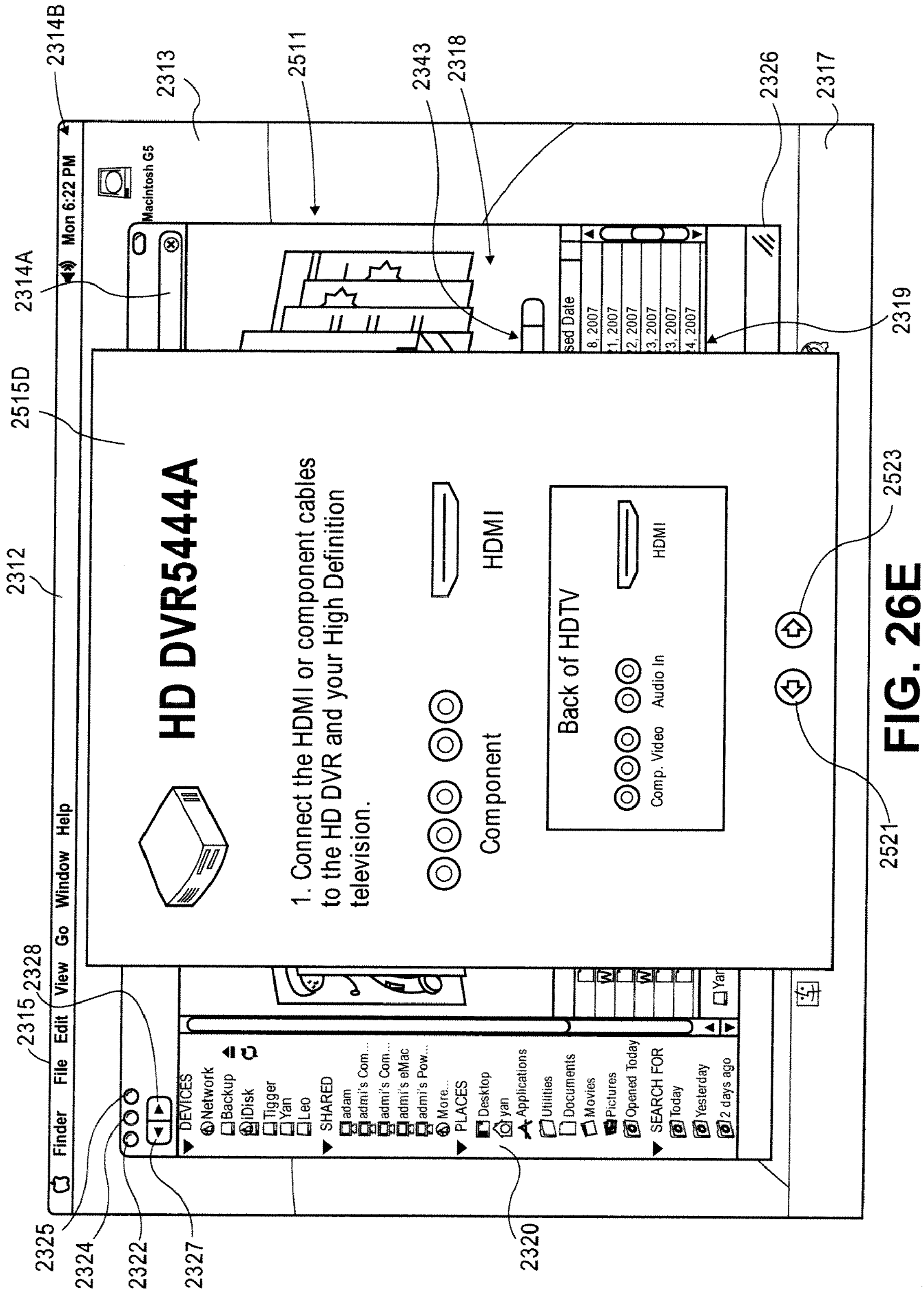
Figure 26F:
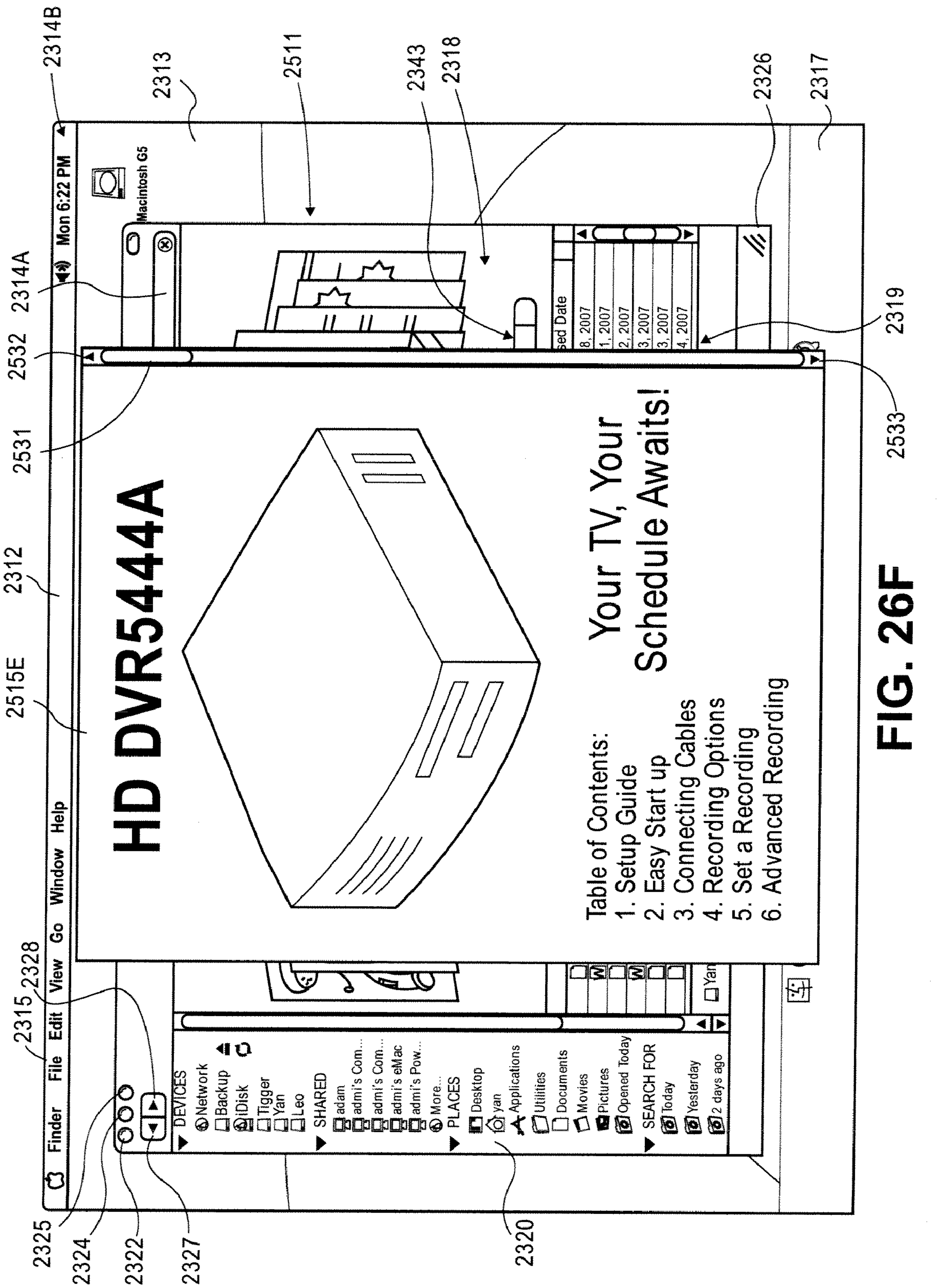
Figure 26G:
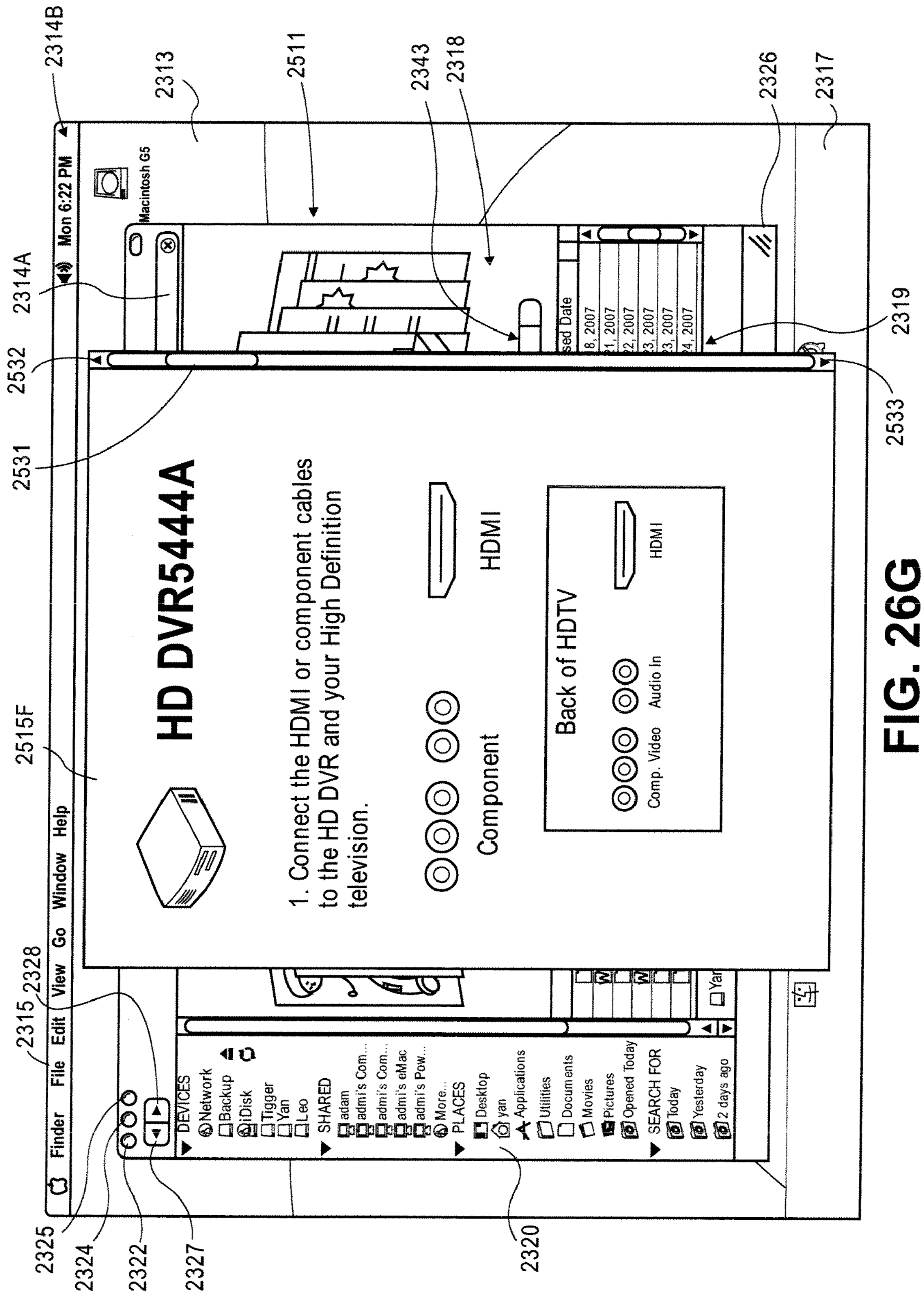
Figure 26H:
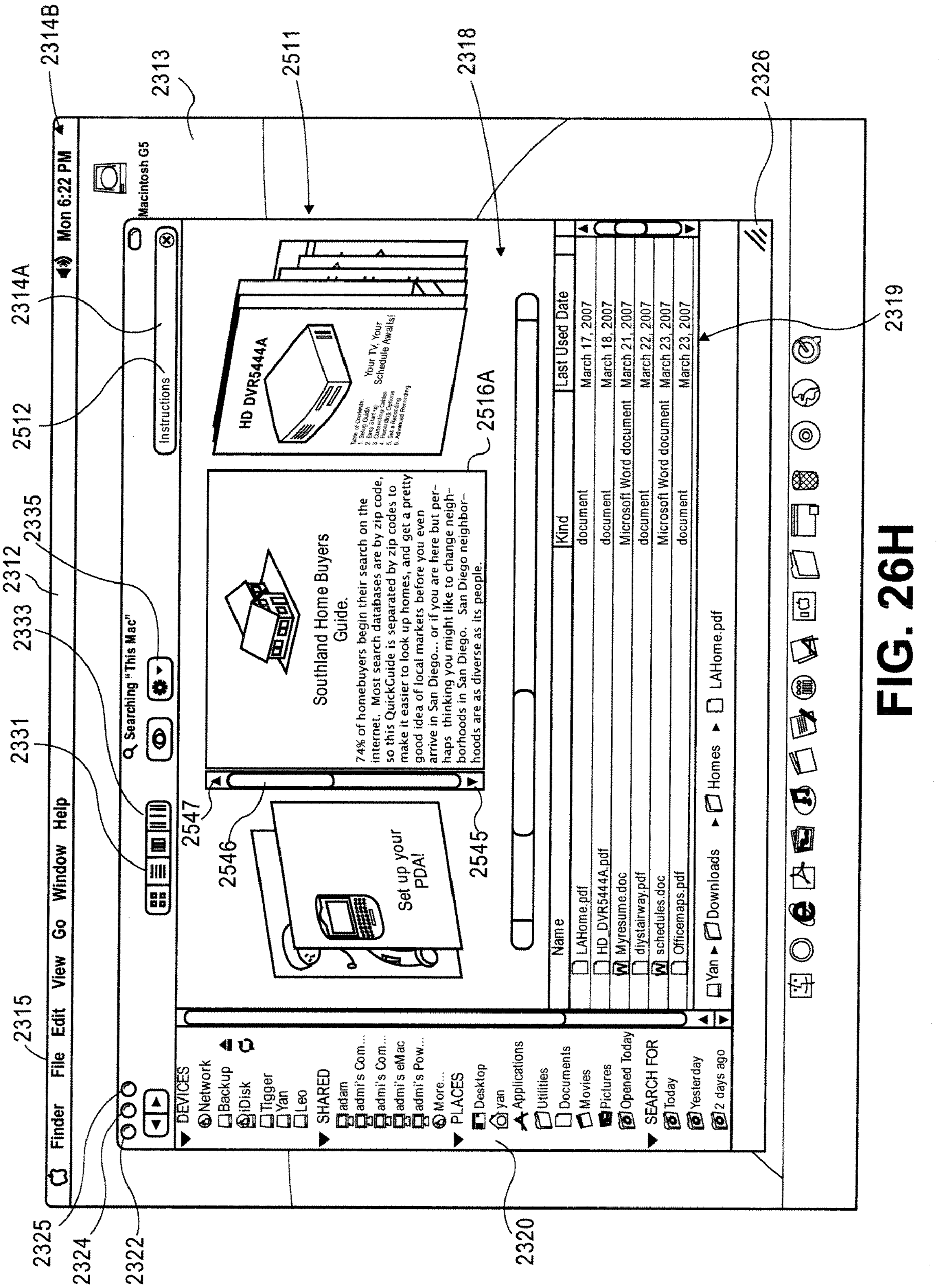
Figure 26I:
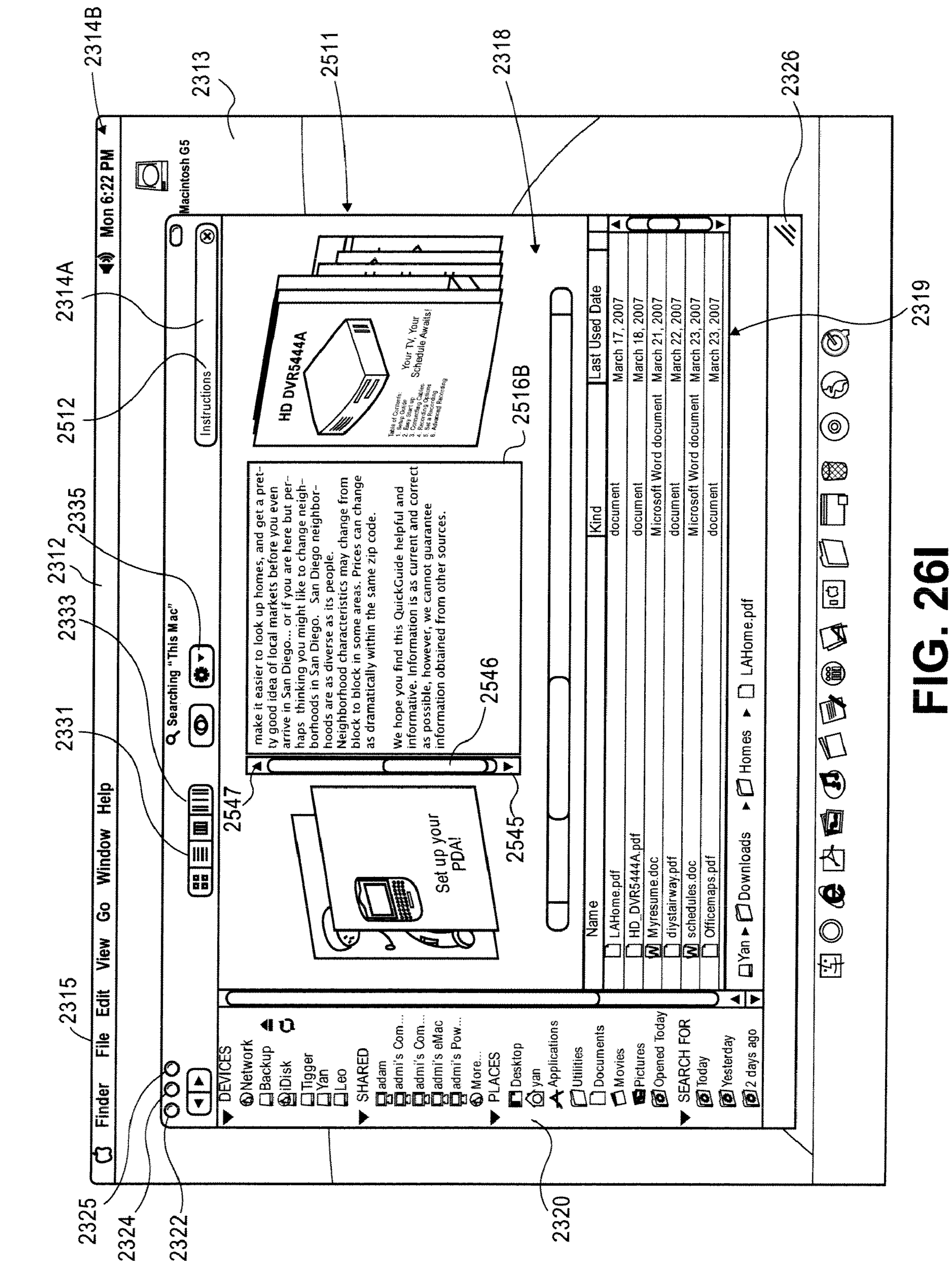

An example of the use of the manipulation of a document or file from within the cover flow view area will now be provided relative to the method shown in FIG. 26A in conjunction with FIGS. 26B, 26C, 26D, 26E, 26F, 26G, 26H, and 26I. The method shown in FIG. 26A may begin in operation 2501 in which a window is displayed by the data processing system. The window may have a user interface of a cover flow view and optionally may also display a list view within the same window. An example of this operation is shown in FIG. 26B in which the window 2511 includes a cover flow view area 2318 and a list display view area 2319 in the same window 2511. In operation 2503, the data processing system receives a user's command to zoom or page through or scroll through a document shown in or selected from the cover flow view area. This command may be through the user's selection of a user interface object or a direct manipulation or a variety of other techniques described herein. For example, the user may desire to page through a multiple page document by selecting arrow icons such as the arrow icons 2521 or 2523. In other embodiments, the user command may be the selection of a scroll control, such as one or more of the scroll controls 2531 or 2532 or 2533 shown in FIG. 26F in order to cause scrolling through the document. In other embodiments, the user interface object may, when selected, cause zooming of the object from one size to another size, such as the zooming shown in FIGS. 27A-27N or the zoomed view shown in FIG. 26D or 26F. The system, in operation 2505, responds to the user's command to zoom or page through or scroll through the document in or selected from the cover flow view area. Examples of the response of such a system are shown in FIGS. 26C, and 26E, and 26I, for example.

FIG. 26B shows the window 2511 which displays the search results of a search based on the word "instructions" 2512 entered into the search input field 2314A or entered, alternatively, in a field presented in response to activating a search input menu area 2314B. The search results produced a number of documents shown in both the list display view area 2319 and the cover flow view area 2318. The list of documents includes the selected document 2514 which is shown as the thumbnail 2515A within the cover flow view area 2318. Other thumbnails or previews shown in the cover flow view area 2318 include thumbnails 2517, 2516, 2518, and 2519. The thumbnail or preview 2515A includes a left arrow 2521 and a right arrow 2523. These arrows may be used to page through, one page at a time or several pages at a time, a thumbnail representation of the file or document represented by the thumbnail 2515A. FIG. 26C shows the result of the activation of the right arrow icon 2523, causing the data processing system to present the second or next page of the document or file, which is shown as the thumbnail 2515B in FIG. 26C. FIGS. 26D, 26E, 26F, 26G, 26H, and 26I also show alternative ways of presenting multiple pages through a preview or thumbnail which is activated from a cover flow view, such as the cover flow view area 2318. In the case of FIG. 26D, the thumbnail or preview is an enlarged view which may be zoomed with a continuous or intermittent animation from the thumbnail 2515A to present the preview 2515C as shown in FIG. 26D. The preview or thumbnail 2515C may also be paged through by activating either of the arrow icons 2521 or 2523. FIG. 26E shows the second or next page of the document as the preview or thumbnail 2515D which in effect is an enlarged or zoomed view of the thumbnail 2515B shown in FIG. 25C. FIGS. 26F and 26G show an alternative in which a scrolling user interface is provided to allow the user to scroll through multiple pages of a multiple page document. In particular, a scroll control user interface may include a scroll bar 2531, an up arrow 2532, and a down arrow 2533 which allows the user to see multiple pages in the preview mode, such as the preview 2515E shown in FIG. 26F, or the next page shown as preview 2515F in FIG. 26G. The embodiment shown in FIGS. 26H and 26I shows the use of a scrolling user interface to display a preview of a file or document within the cover flow view area 2318 without requiring a large, zoomed preview as in the case of the embodiments shown in FIGS. 26F and 26G. In this case, the list display view area 2319 remains visible and useable while the cover flow view area 2318 displays multiple pages of a selected document, such as the selected document shown as interactive preview 2516A. The user may scroll through the content of the preview 2516A by using one or more of the scroll control user interface objects which include the scroll bar control user interface object 2546 or the up arrow 2547 or the down arrow 2545. The view shown in FIG. 26H shows the top or beginning part of the document represented by the preview 2516A, and the view shown in FIG. 26I shows the preview 2516B which shows the bottom portion of the document represented by the preview 2516B.

As described above, these previews or thumbnails may be shown by a set of software routines such as a set of plug-ins which are separate from a file management software program, such as the Finder or Windows Explorer. This separation between the plug-ins which renders the content and the Finder or other file management software provides security and stability because, for example, if the plug-in crashes, the Finder will not. These plug-ins may be a standard set of plug-ins that translate the native format of an item being previewed into one of a standard data/file type, such as PDF, text, HTML, JPG, a standard movie format or a standard sound/music format or into fully rendered content (e.g. a bit map). The set of plug-ins may be an extensible set of plug-ins and may interact with the file management software, such as the Finder or Windows Explorer, through a set of APIs in which the file management software makes a call to a plug-in management daemon which receives the call or API from the file management software (or other software program) and which, in turn, asks for the file type (e.g. UTI) from a file system kernel and matches one of the plug-ins in the standard set of plug-ins, which may be extensible, with the file type and which then calls the matched plug-in to cause the plug-in to load and return the content of the file (either in an immediately displayable form or in a standard format) as a preview to the file management software which, in turn, causes the preview to be displayed in, for example, the cover flow view area. This may occur in response to merely browsing the files through the use of the file management software, such as the Finder, or through the use of a search software program, such as Spotlight, to find files and then display previews or thumbnails of files retrieved by the search. As noted above, the preview or thumbnail may be generated dynamically upon request rather than when the item or file is stored or created by the application. This dynamic generation may be through an API. It will be understood that a dynamic generation of a preview or thumbnail may be provided without invoking or launching the application which created the file or document. Examples of software architectures to dynamically generate previews are discussed in conjunction with FIG. 31. In addition to a file management software program or a search software program, such as Spotlight, other software application programs may provide or use application programming interfaces (API) to request the preview generator or preview daemon to provide a preview or thumbnail of the content of a document within their windows. For example, an email program or a calendar program or a video conferencing application or an instant messaging application program or other application programs may also make a call to the preview generator or preview generator daemon to provide the content of a particular file in the manner described herein. In response to the call through an API from the email program or the calendar program or other program, the preview generator or preview generator daemon asks the file system for the file type and matches the file type with a plug-in having an ability to process that file type and causes that plug-in to be loaded (for example, by calling the plug-in through another optional API). The plug-in, in turn, processes the content of the file to generate the preview or thumbnail and provides that content to the original application which requested the content, such as the email program or a calendar program or, as noted above, a file management software. A preview or thumbnail may be provided in an inline preview manner in the cover flow view area or in an icon view or in an inline preview manner within a list view, such as the list view shown in FIG. 17 (which includes a preview or thumbnail view) or in a "get information" or "properties" panel or window or in other uses.

FIGS. 24B, 26B, and 26H will be referred to in order to provide an example of how an interactive preview may be presented through this set of software routines while also showing an initial set of previews. For example, thumbnails of files may be the initial set of previews shown in a particular view (e.g. list view or cover flow view), and the set of software routines provide an interactive preview, within the same view, for at least one of these initial previews. The initial previews may also be provided by this set of software routines, but these initial previews may not be interactive with the view; for example, they are not interactive within the view, in response to user commands so they will not, in response to user commands, allow a user to page through or scroll through or browse through the content or to zoom or resize the content or playback the content, such as playback the movie. On the other hand, the interactive preview is interactive in response to user commands in that it can respond to a user command to page through or scroll through or browse or resize or zoom the document represented by the interactive preview or playback the content, either within the particular view (e.g. a list view or cover flow view (see, e.g. FIGS. 26B, 26H and 26I) or icon view) or zoom out from the particular view (see, e.g. FIGS. 27A through 27N) or be layered over the particular view (see, e.g., FIG. 26D). In FIG. 24B, the document with the heading "HD DVR5444A" may be considered an initial preview in the cover flow view shown in FIG. 24B. That same document is shown as an interactive preview (with paging buttons) in FIG. 26B. That same document is shown again in an initial preview form in FIG. 26H while another document (which is shown as thumbnail 2516 in FIG. 26B) is shown in FIG. 26H as an interactive preview 2516A with scroll controls, all within the same cover flow view. This same user interface for showing both initial previews and interactive previews may be used in a list view or icon view, such as a list view or icon view of files or folders from a search result or a list view or icon view of files and folders from within a file management software window (e.g. a Finder window).

Figure 31:
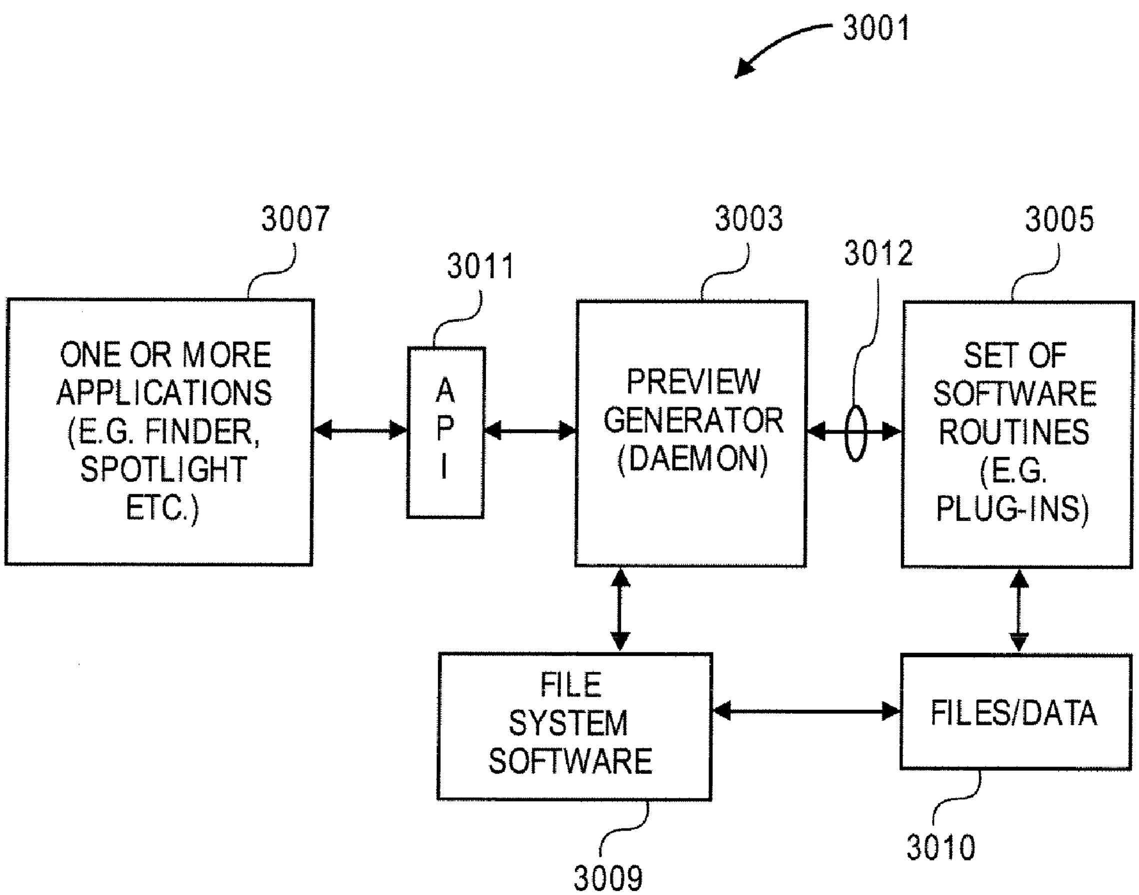
FIG. 31 shows an example of an architecture, which includes at least one application program interface (API), that allows an application, such as a user level application, to obtain a preview of files and other data without having to launch another application which created that file or other data.

FIG. 31 shows an example of a software architecture 3001 which may be used to dynamically generate previews, such as one or both of initial previews and interactive previews. This architecture may include one or more APIs, such as API 3011 and optional API 3012 to act as an interface between separate software programs. For example, API 3011 interfaces between a preview generator 3003, which may be a preview generator daemon provided by an operating system software, and one or more application programs 3007 (such as a file management software program or a search software program, etc.). The one or more application programs 3007 make calls, through the API 3011, in order to have a preview generated for a file or other item in a particular view. The preview generator 3003 is configured to receive those calls to generate a preview of the content of the file. The preview of the content can be generated by requesting a software routine (such as a first plug-in), in a set of software routines 3005, to generate either displayable content or data in a standard format which can be converted by the application which made the call (or a helper application/plug-in or system resource) into displayable content. The first plug-in may be loaded and then process the file (from the storage 3010 of files and data) to generate the preview; the preview generator may determine the file type of the file by making a call, to determine the file type, to the file system software 3009 which returns an identifier of the file type of the file, and then the preview generator 3003 may match the file type with the most appropriate routine in the set of routines before causing the most appropriate routine to be loaded to generate the preview. Each software routine may include data identifying the file types it can process, and the preview generator matches the file type for the file, which was in the call through API 3011, with the software routine which can process that file type, based on the data identifying the file types it can process.

Figure 27A:
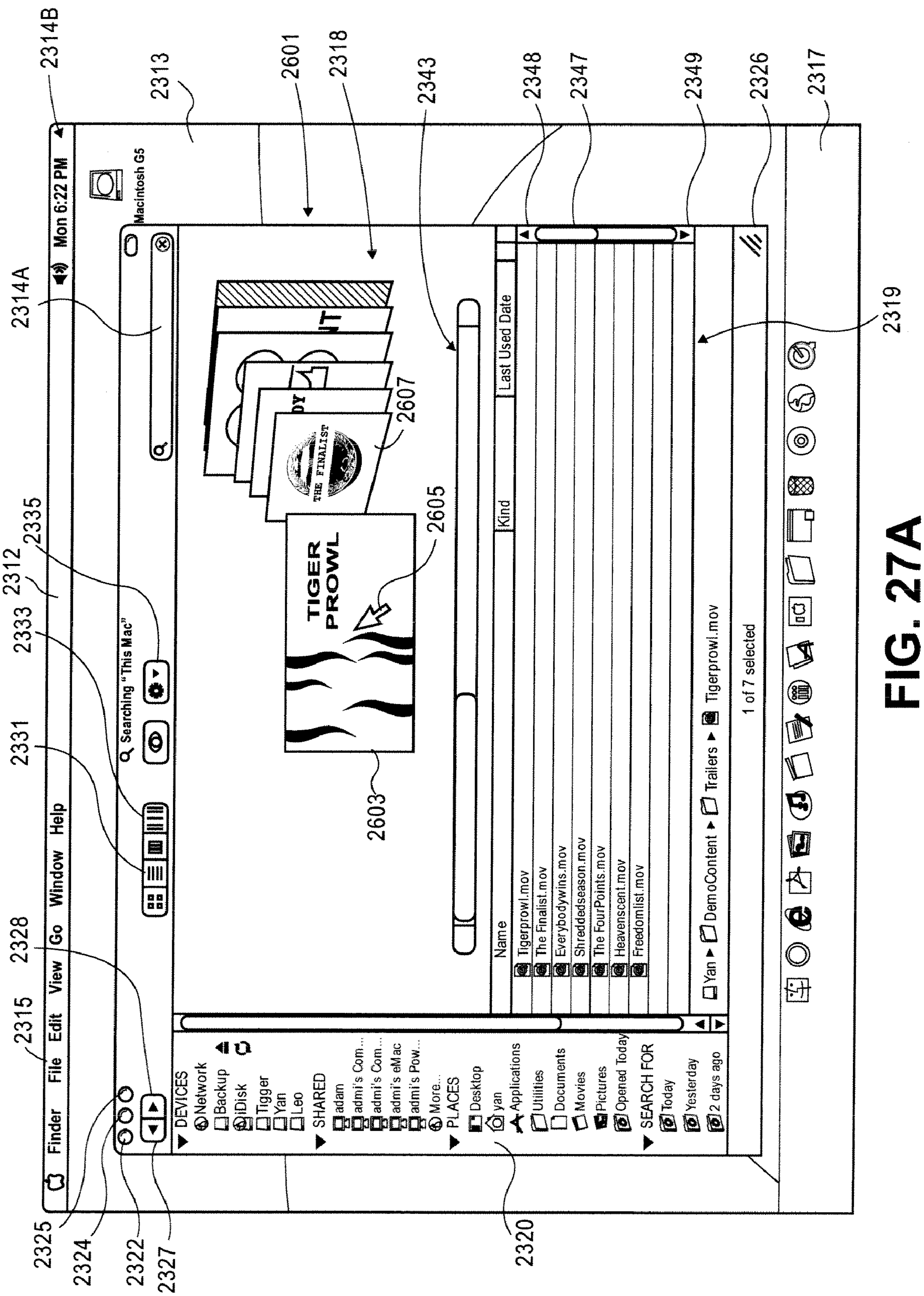
FIGS. 27A-27N show examples of user interfaces for causing zooming in and out from a cover flow view of a document, such as a movie.
Figure 27B:
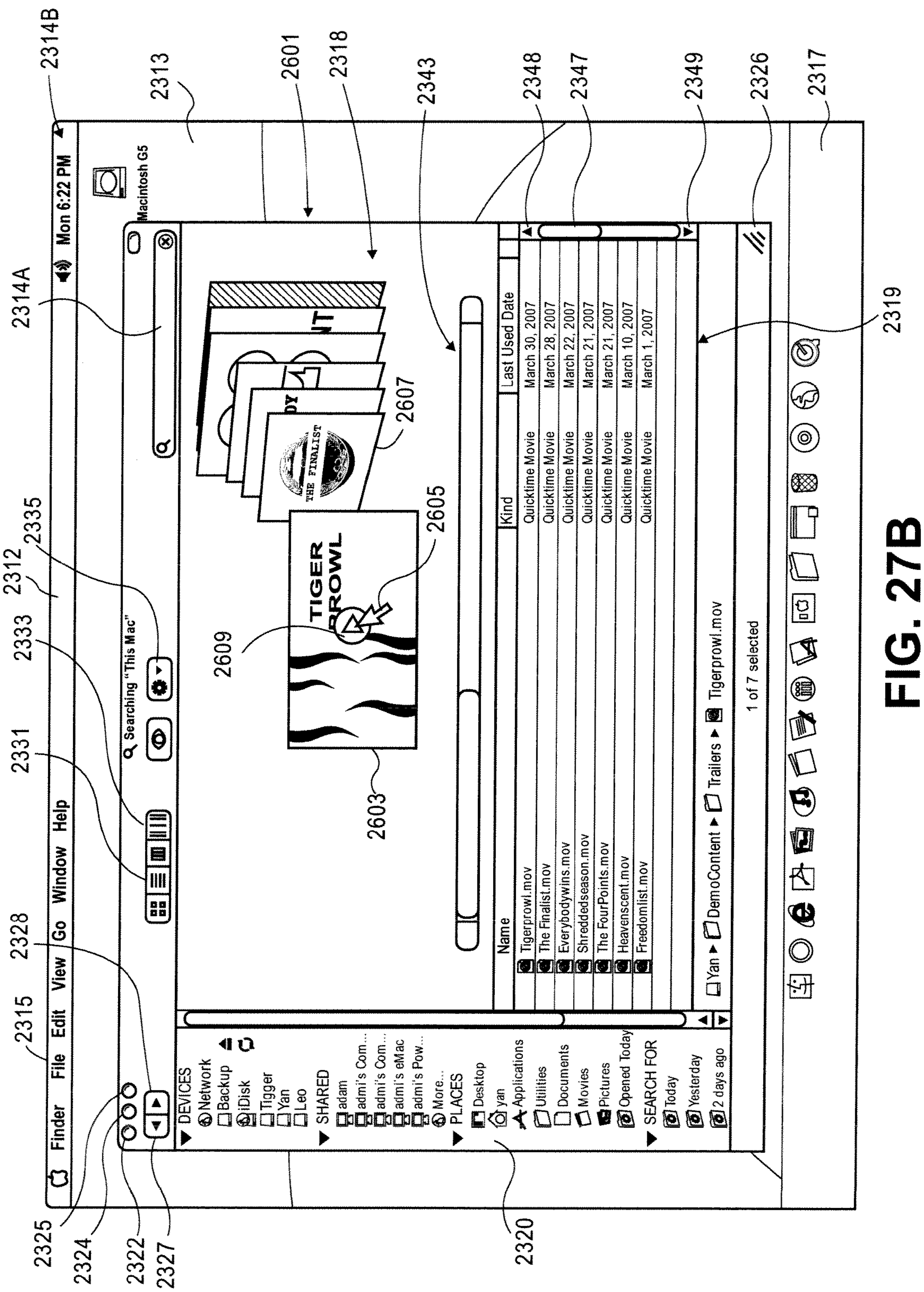
Figure 27C:
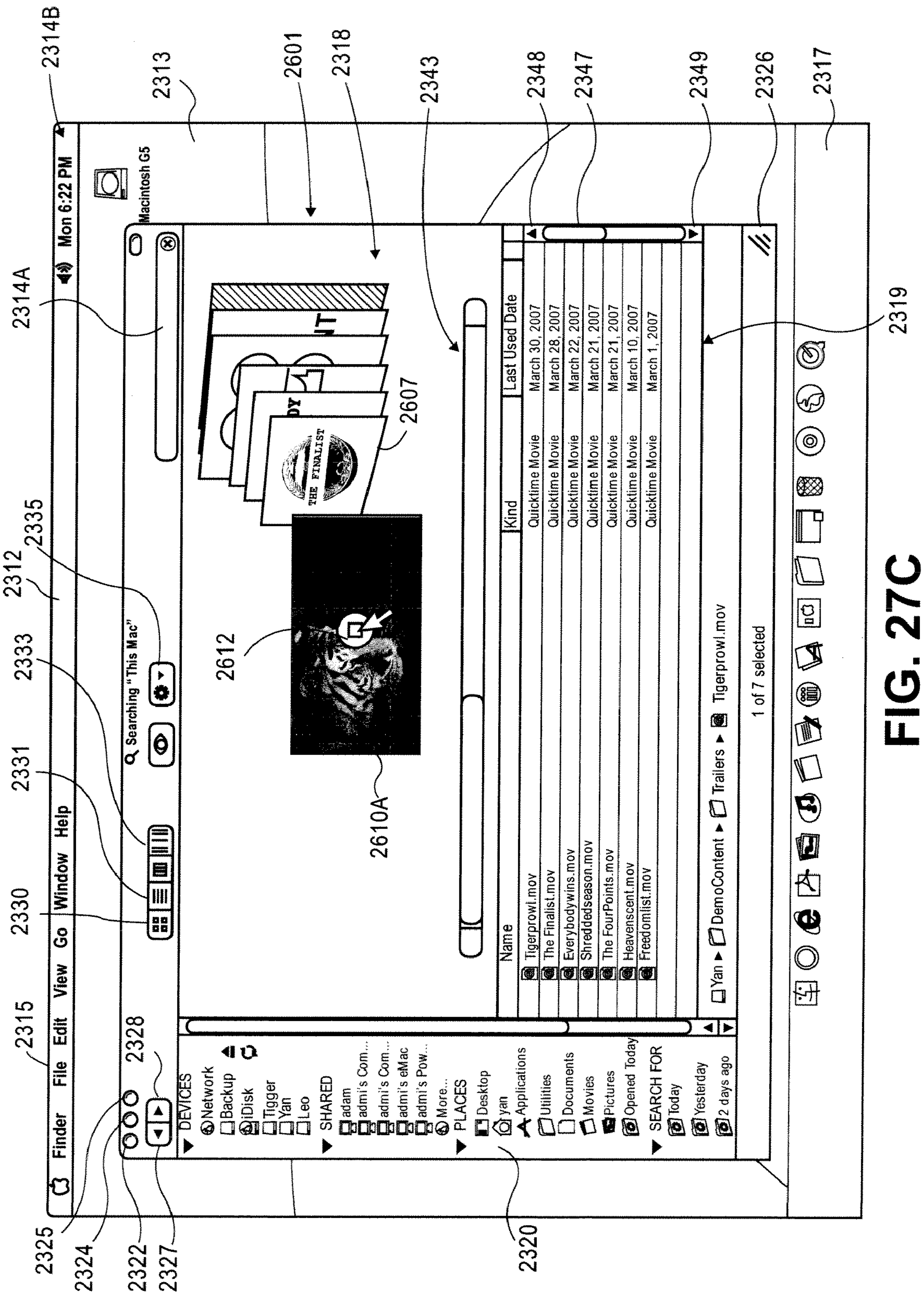
Figure 27D:
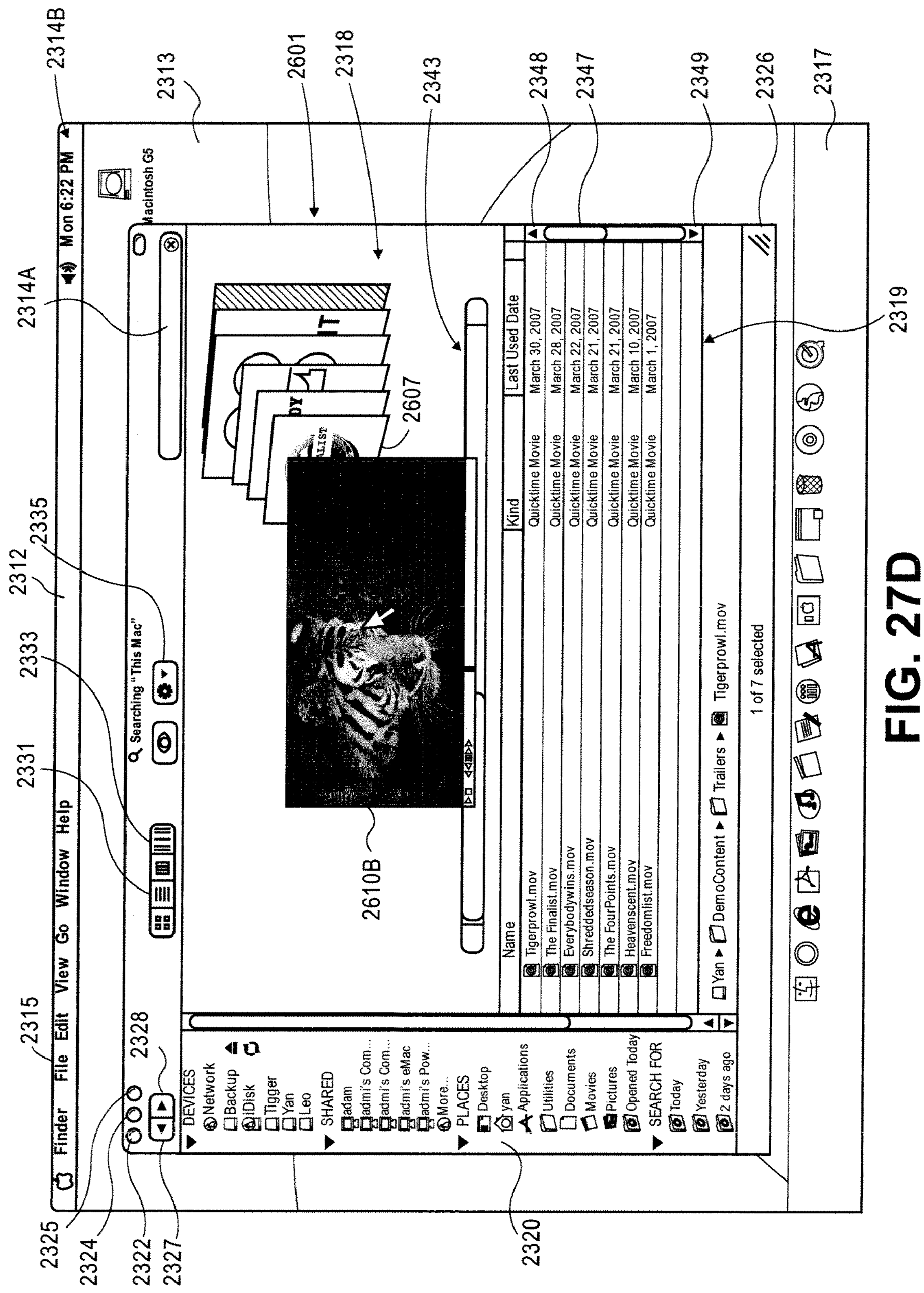
Figure 27E:
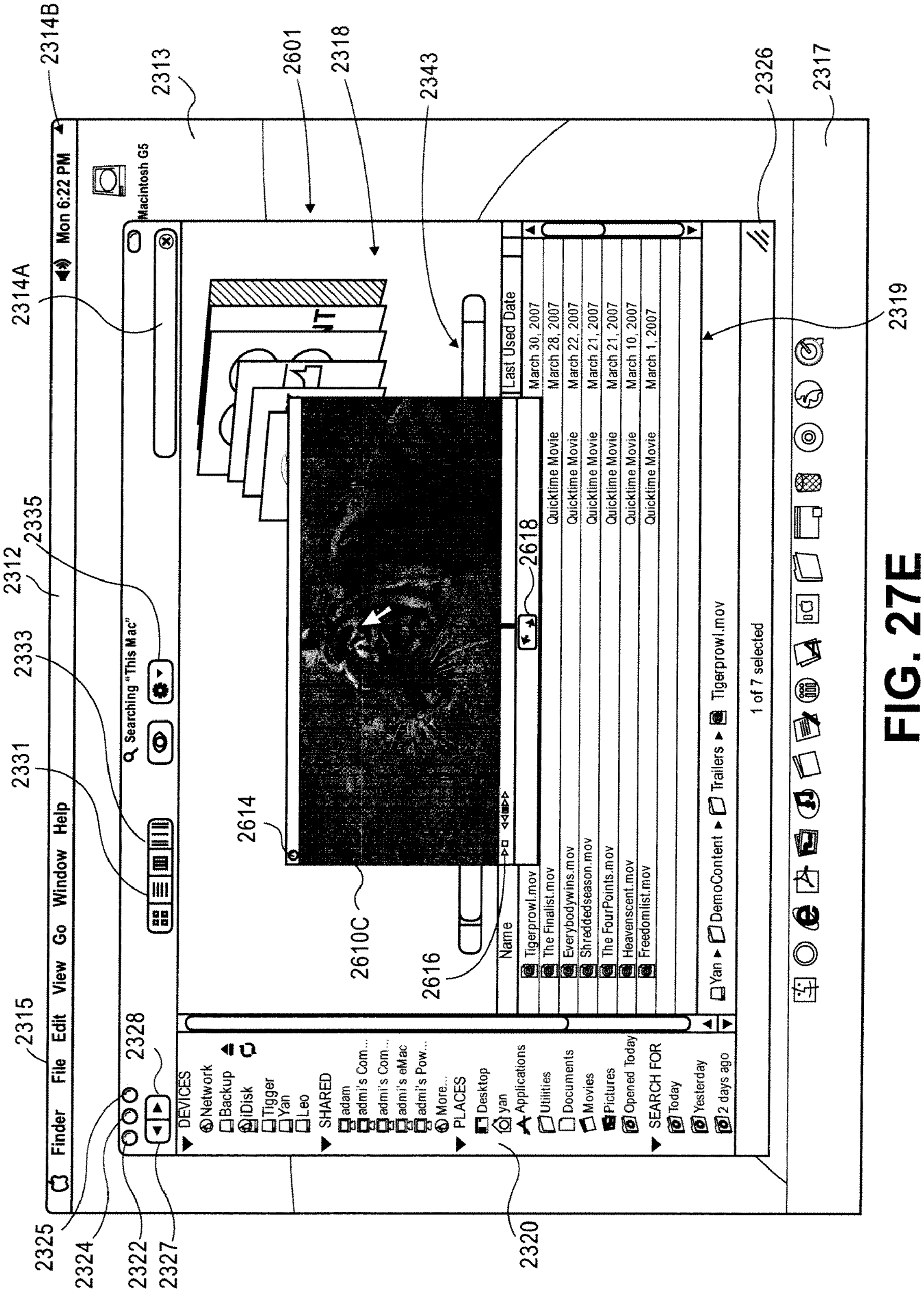
Figure 27F:
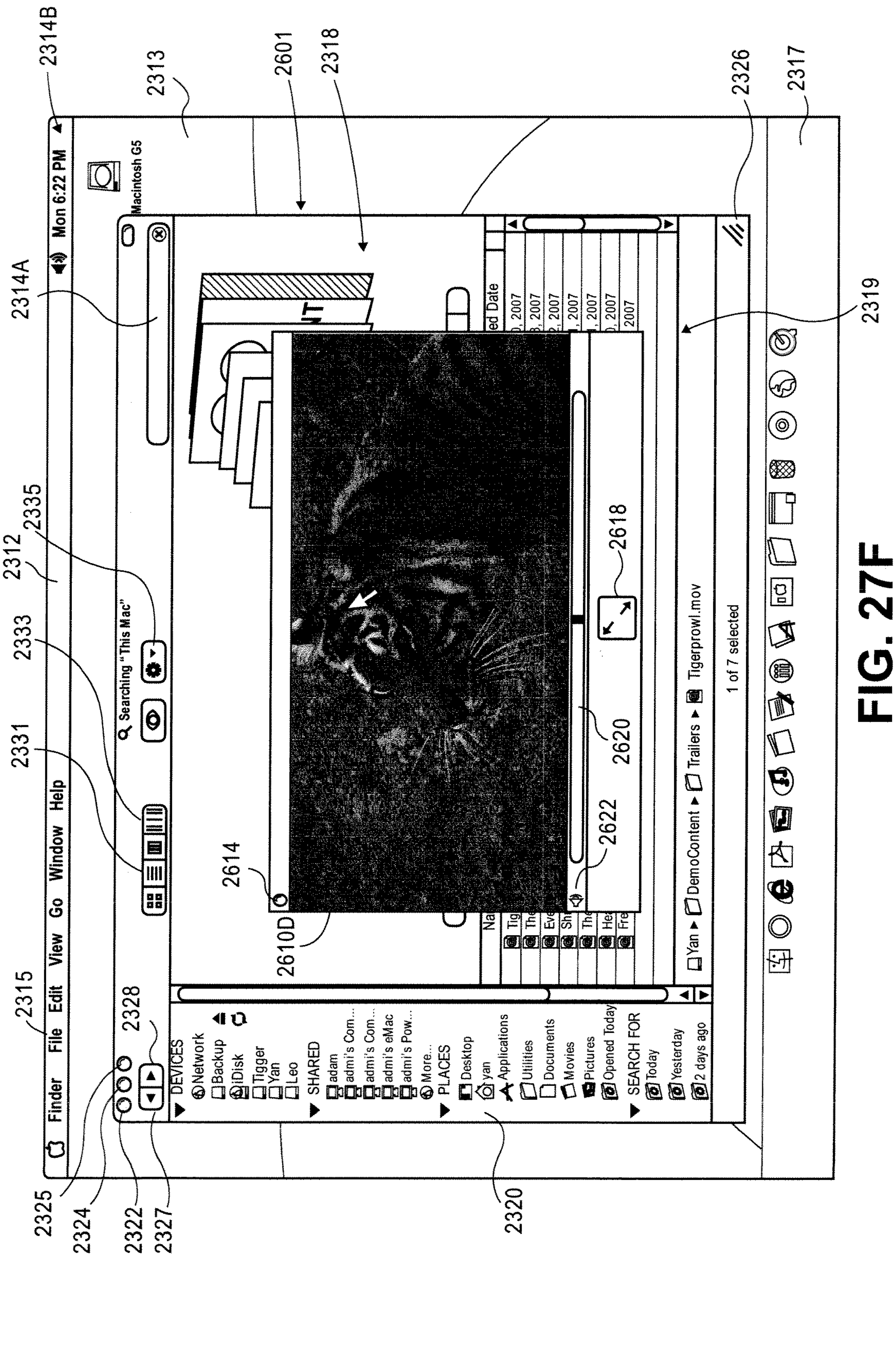
Figure 27G:
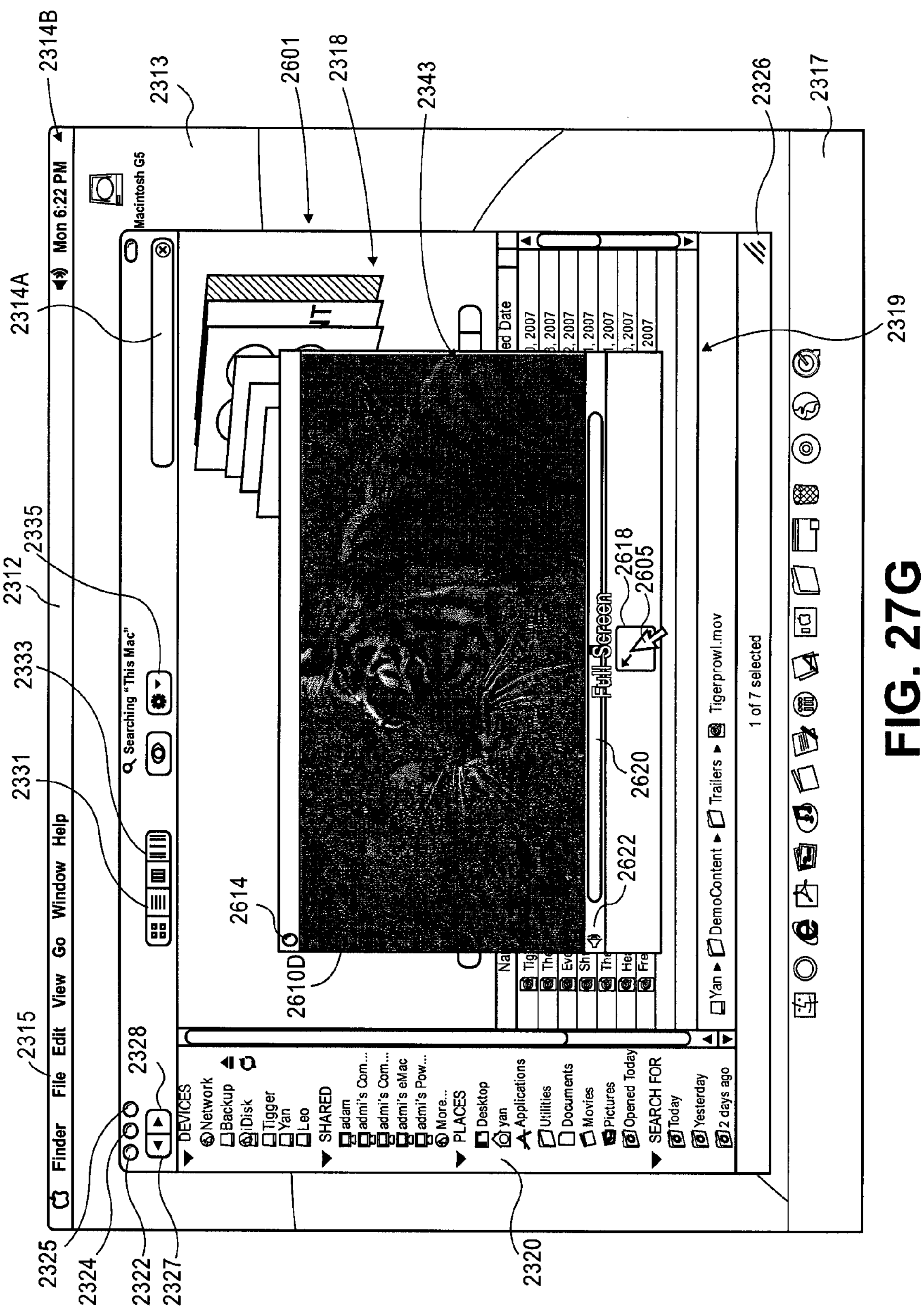
Figure 27H:
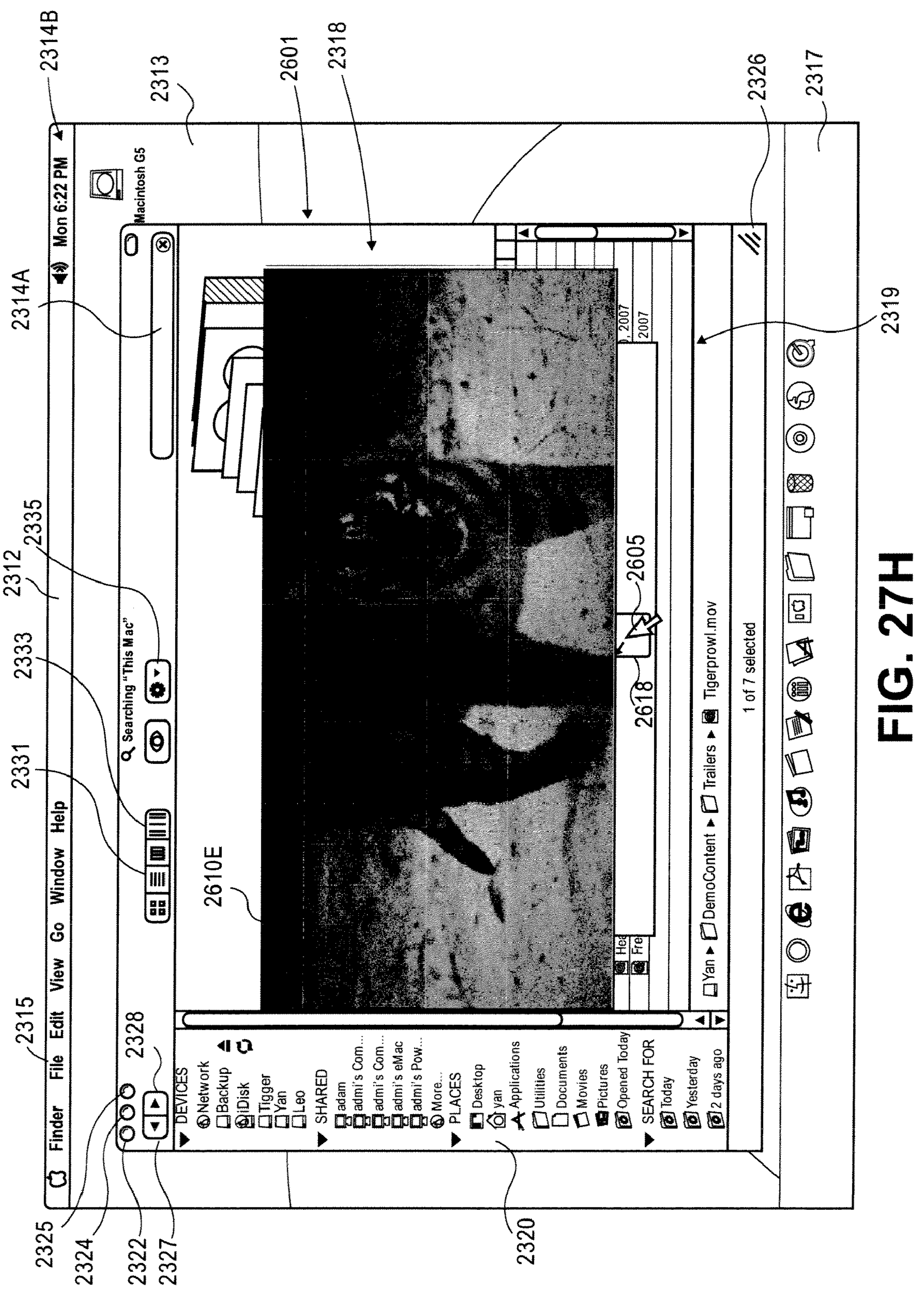
Figure 27I:
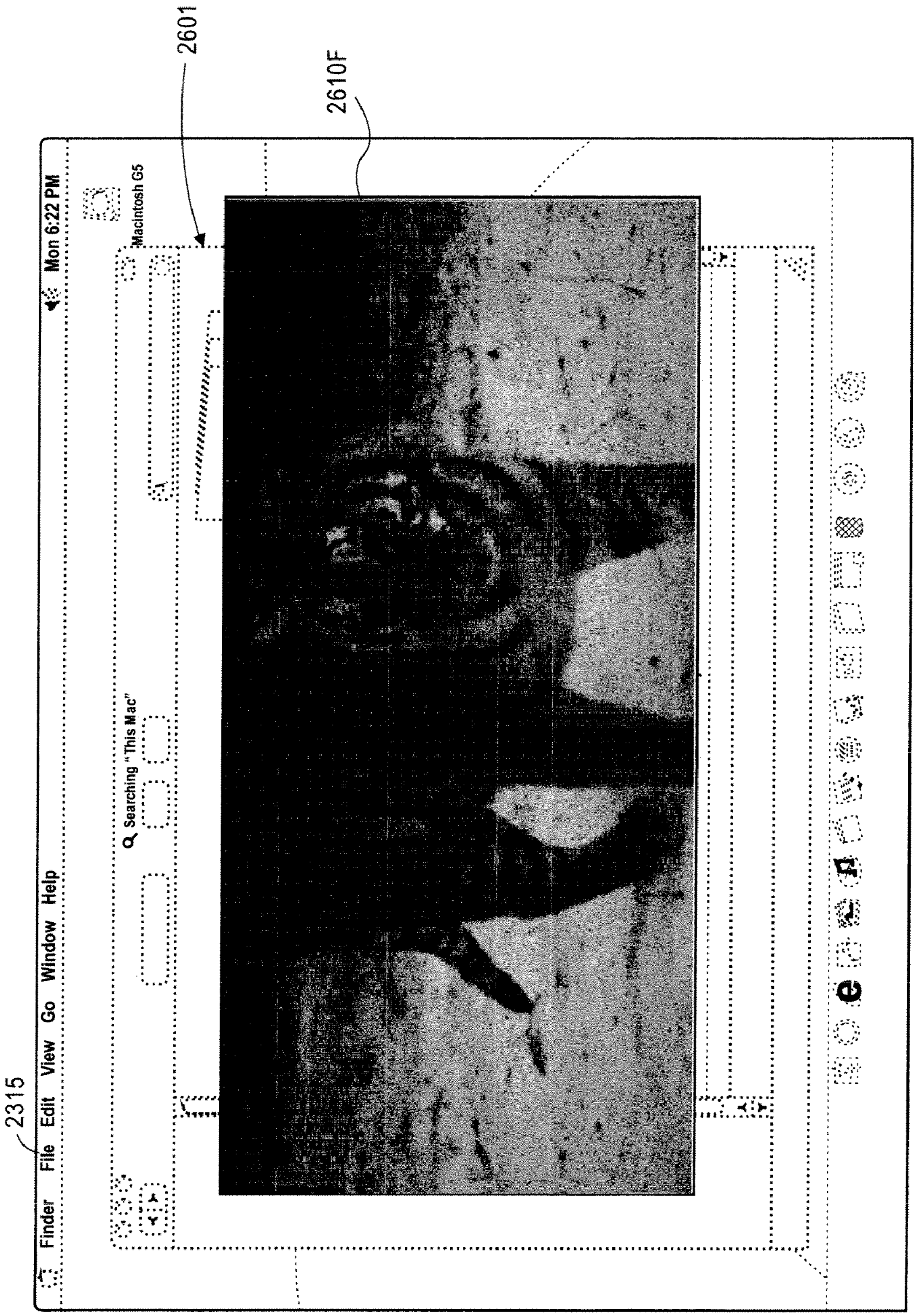
Figure 27J:
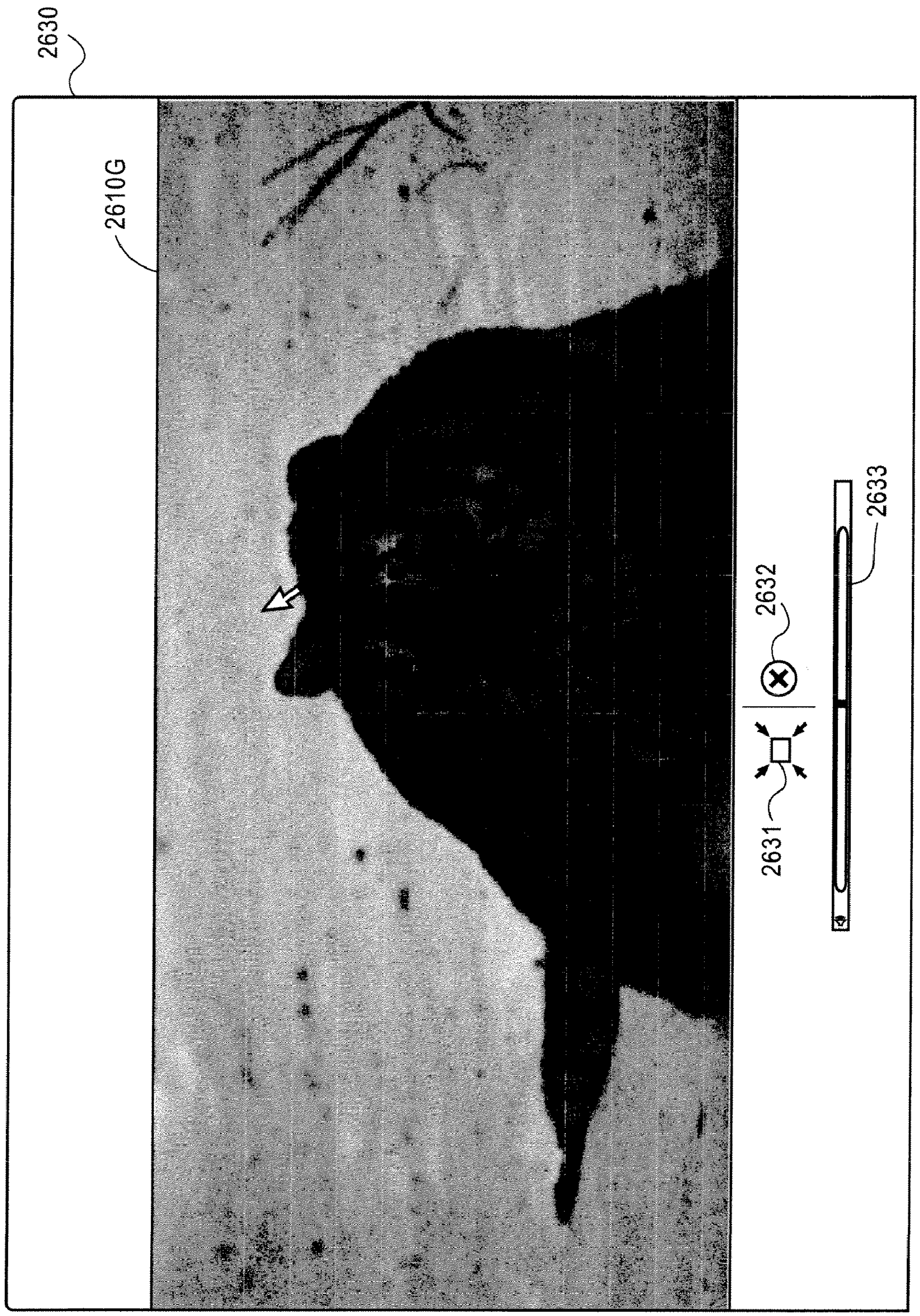
Figure 27K:
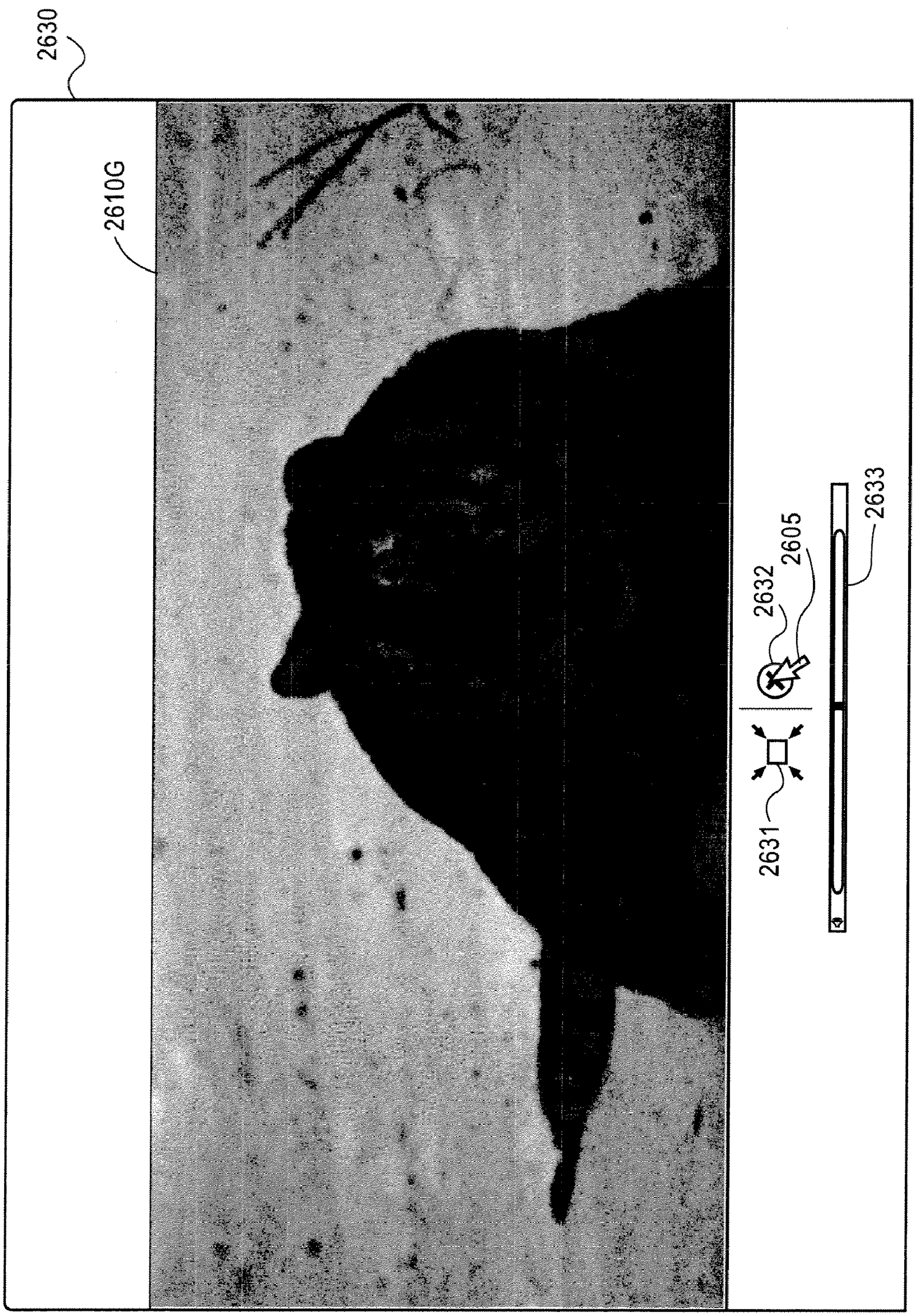
Figure 27L:
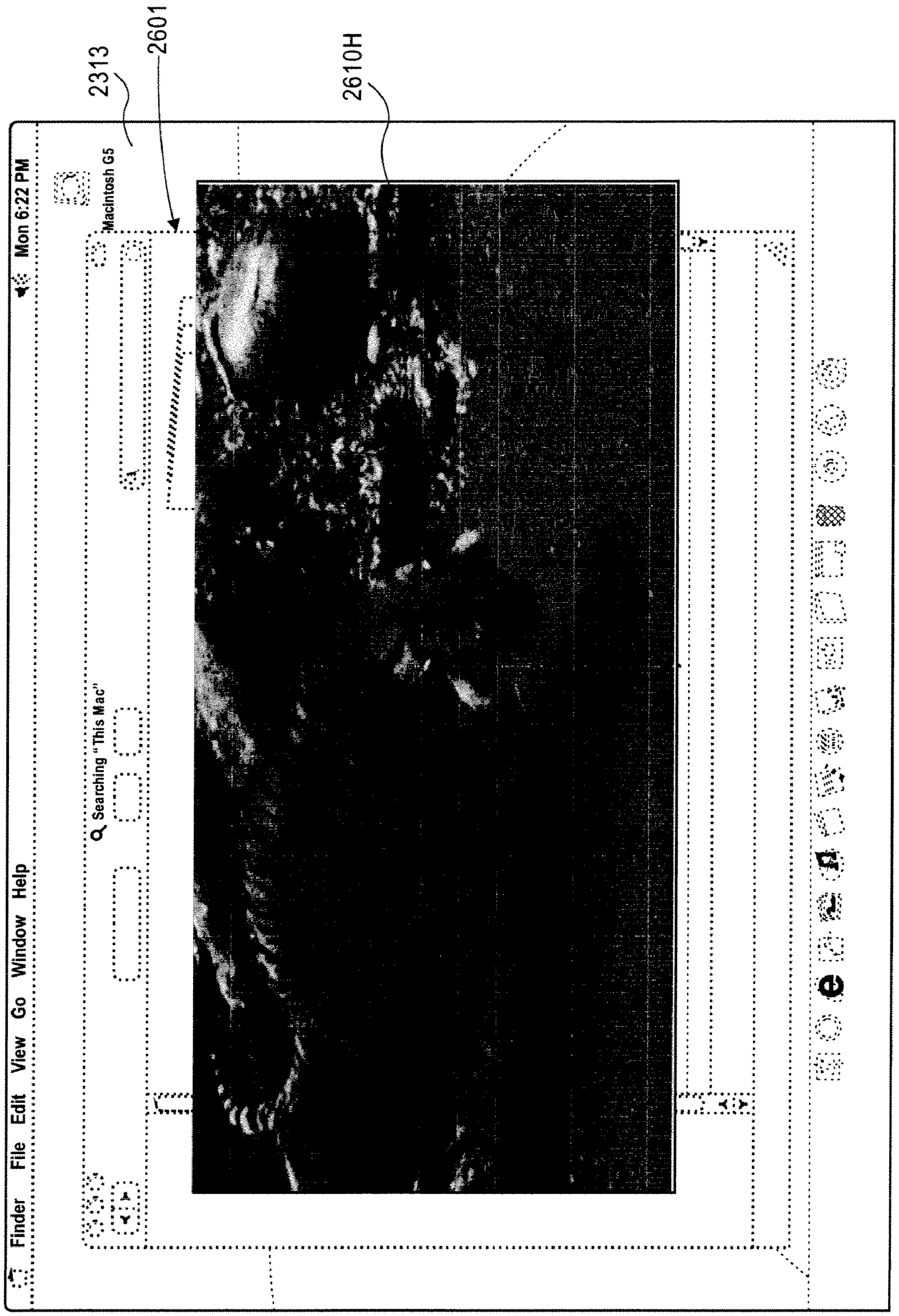
Figure 27M:
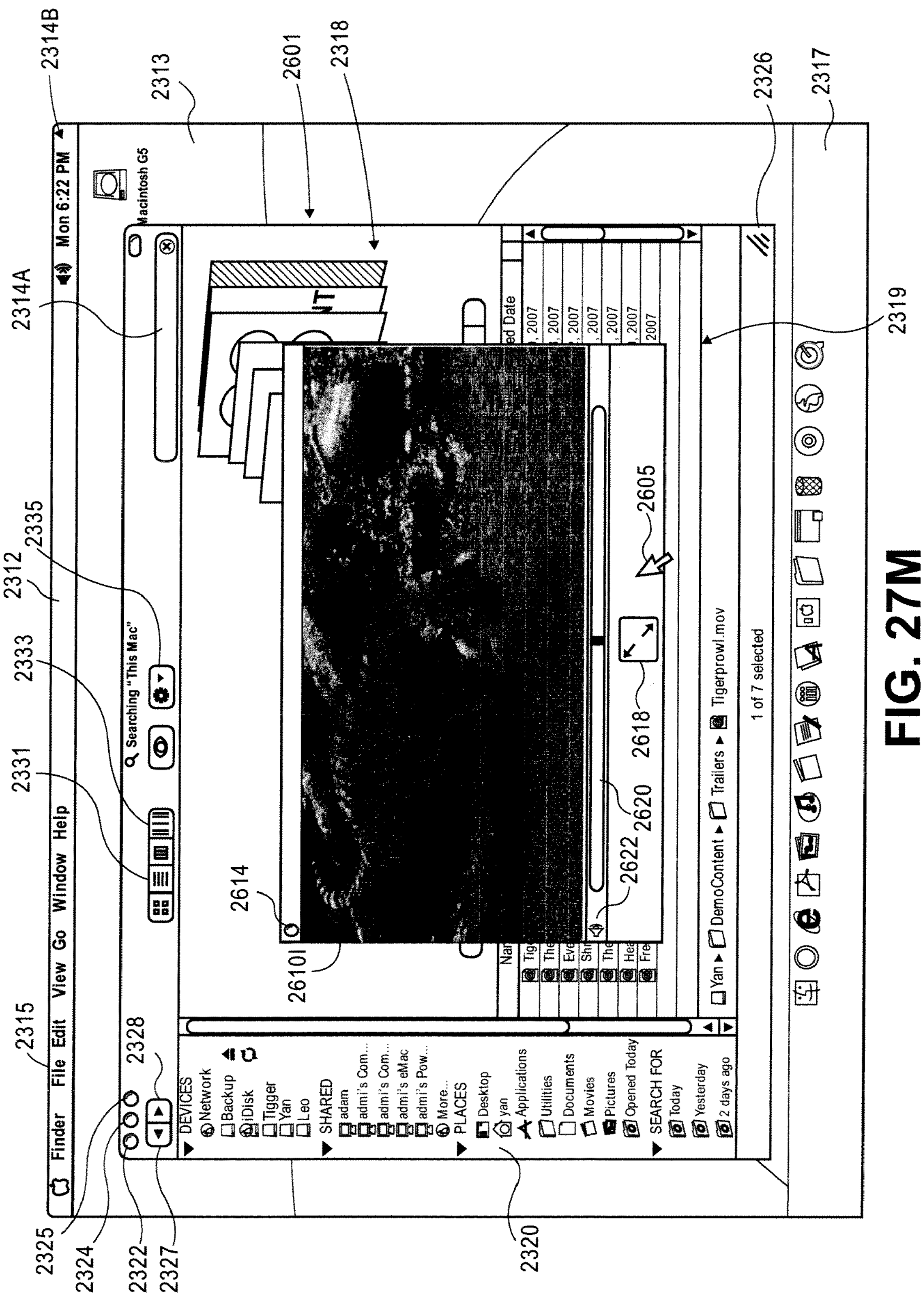
Figure 27N:
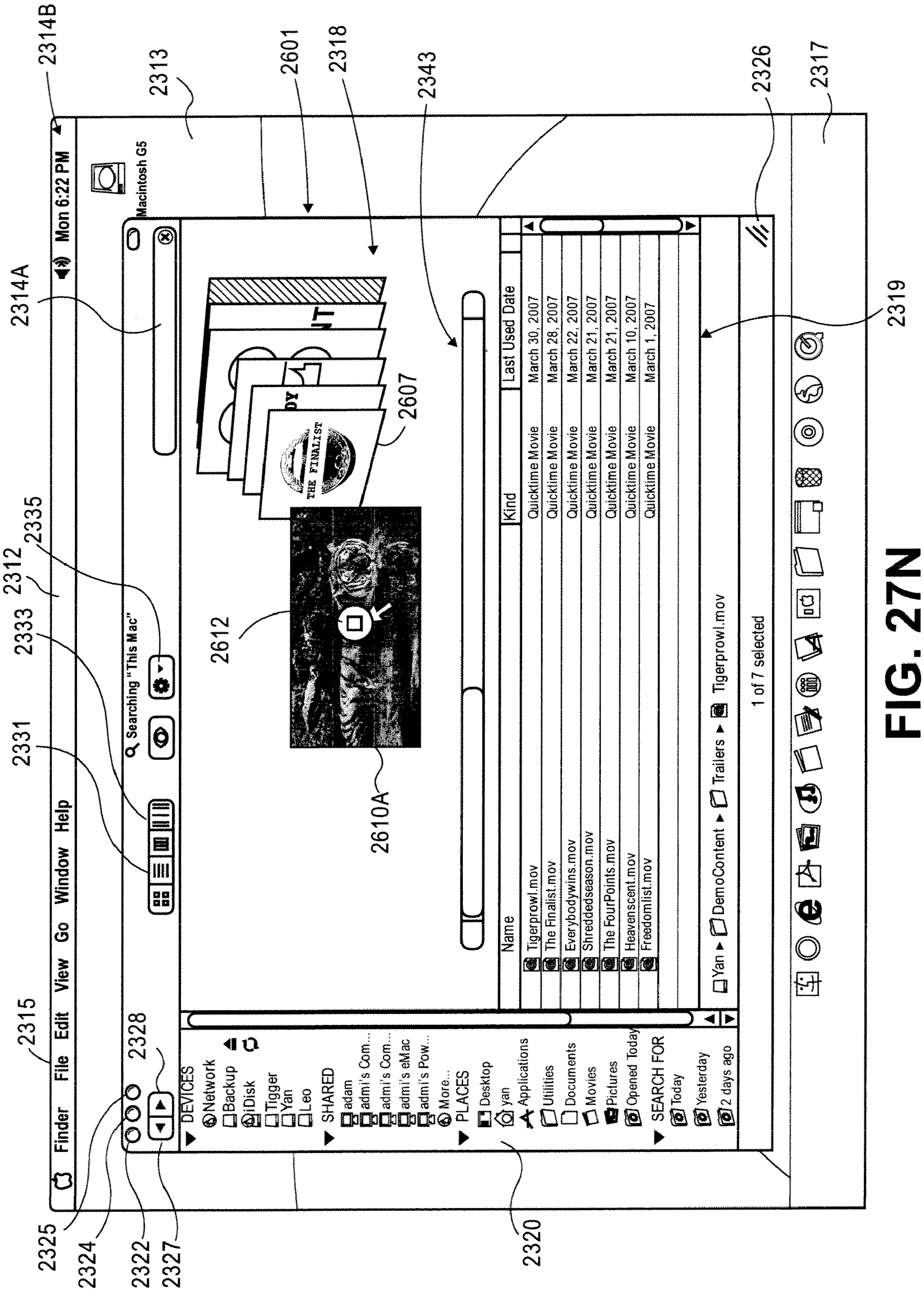

FIGS. 27A-27N provide an example of a preview or thumbnail which zooms out first from a small thumbnail view to a full-screen view and back into the small thumbnail view. This may occur though a continuous or substantially continuous animation or may occur in progressive, intermittent steps. In the case of a continuous or substantially continuous animation, if the content is a movie which plays over time with a sequence of related images, the movie may appear to play smoothly and continuously as the thumbnail expands from the thumbnail 2603 or the thumbnail 2610A to the full-screen view shown in FIG. 27J. In this case, it will be understood that the animation may begin with the user interface shown in FIG. 27A and proceed in series from FIG. 27A through and including FIG. 27N. The animation may begin with the user placing the cursor 2605 over the thumbnail in the cover flow view area 2318 and then activating a command, such as pressing a button on a mouse or otherwise causing the system to display a play button, such as the play button 2609. In one embodiment, merely hovering the cursor over the thumbnail 2603 may cause the display of the play button 2609 within the thumbnail 2603 as shown in FIG. 27B. In alternative embodiments, the user may select playback by selecting an option from a pull-down menu or by pressing a key on a keyboard, etc. The user may begin the playback of the thumbnail by selecting the play button 2609 while the cursor 2605 is positioned over the play button as shown in FIG. 27B. In response, the movie begins to play and the play button turns into a stop button 2612. The movie may play as a small thumbnail, such as the thumbnail 2610A, or may, in response to a user command or automatically in response to a playback command, expand or zoom to a larger size. As noted above, this expansion or zooming out may occur in a smooth, continuous fashion and the playback may occur and continue as the zooming occurs. FIG. 27D shows the expansion/enlargement of the thumbnail to create an enlarged thumbnail 2610B which will continue to enlarge to become the thumbnails 2610C and 2610D as shown in FIGS. 27E and 27F and 27G. As the thumbnail becomes enlarged, while the movie continues to play back, a window begins to appear from behind the movie, wherein the window includes user controls, such as a "close" control 2614, "play" and other controls 2616, and a full-screen control 2618. In one embodiment, the zooming animation of the thumbnail's enlargement may stop at the stage shown in FIG. 27G and wait for further user input to either close the window (e.g. by activating the "close" user interface object 2614) or enlarge to full-screen mode by activating the user interface object 2618. The thumbnail 2610D provides for playback of the movie and allows the user to modify the volume or the position of the current frame in the movie by using the volume control 2622 or the timeline 2620, respectively. If the user selects full-screen mode, then the movie begins to enlarge beyond the size shown in FIG. 27G. This enlargement may again be smooth and continuous while the movie is playing. FIGS. 27H and 27I represent two stages of such continuous enlargement from the window shown in FIG. 27G. An example of full-screen mode is shown in FIGS. 27J and 27K. The user interface now includes a stop control 2632, a timeline control 2633 which may be used to adjust the current playback position of the movie, and a reduce size control 2631 which may be used to return the movie from full-screen mode back to the thumbnail through a sequence, which may be continuous, beginning with the user interface shown in FIG. 27J through the user interface shown in FIG. 27N.

Figure 28A:
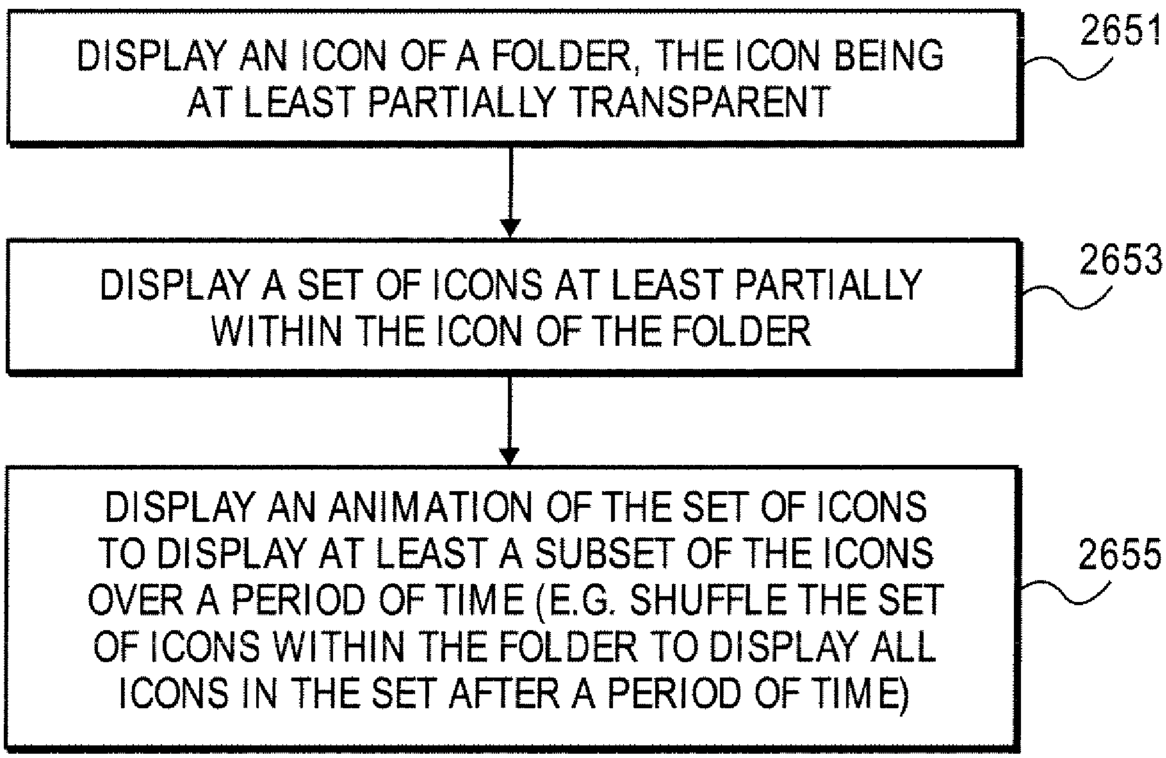
FIG. 28A is a flow chart showing an example of one method of animating icons within a partially transparent folder.

Another aspect of the inventions described herein relates to the use of animation to display the contents of a folder. This aspect will be shown through the examples given in FIGS. 28A-30E. FIG. 28A shows an example of a method according to one embodiment which uses animations to display at least a subset of icons representing files within a folder. In operation 2651, a data processing system displays an icon of a folder, the icon being at least partially transparent. FIG. 28C shows an example of a folder icon 2701 which is at least partially transparent, and FIG. 30A shows an example of a folder icon 2751 which is also partially transparent. In operation 2653, the data processing system displays a set of icons at least partially within the icon of the folder. FIG. 28C shows an example of icons, such as icons 2707, 2709, 2711, and 2713 at least partially within the folder icon 2701. FIG. 30A shows another example of a set of icons which are at least partially within the folder icon 2751; in this case, the icons are thumbnails or previews of the documents within the folder. In particular, the thumbnails or previews 2757, 2758, 2759, and 2761 are shown at least partially within the transparent folder icon 2751. These previews or thumbnails may be generated dynamically (and stored temporarily in a cache for the animation) as described above to show the actual content of each file represented by the thumbnail or preview, such as thumbnail 2757. In alternative embodiments, the thumbnail or preview may be generated by the application and stored in the file system as a preview for the particular file and retrieved and used to provide the preview, such as the thumbnail 2757. Referring back to FIG. 28A, operation 2655 involves the display by the data processing system of an animation of the set of icons to display at least a subset of the icons over a period of time. The animation may occur automatically without user interaction with the icon of the folder, such as the folder icon 2701, or may occur in response to user activity such as the selection of a command or in response to the user moving a cursor over the icon of the folder, such as the folder icon 2701, etc. The animation may involve one or more of a set of changing user interfaces over time. For example, the animation may include rotating, over time, the icons in the set of icons or shuffling, over time, the icons in the set of icons, or displaying momentarily and sequentially each of the icons in the set of icons or displaying momentarily and sequentially a group of the icons in the set of icons or rearranging, over time, the icons in the set of icons. After a sufficient period of time, all of the icons within the folder can be displayed such that a user can, by watching the animation, determine which files are within the folder. It will be understood that the folder may be a directory or folder in a hierarchical file system (HFS) which is maintained by file system software and which interacts with file management software such as the Finder or Windows Explorer. The shuffling of icons may be similar to the shuffling of cards in a deck of cards; this shuffling animation is shown in the sequence of images provided by FIGS. 28C, 28D, 28E, 28F, and 28G. In these figures, the icons 2707, 2709, 2711, and 2713 appear to shuffle, one over the other, in a manner which is similar to cards in a deck of playing cards. In at least certain embodiments, the icons may be displayed within the folder, such as folder icon 2701 or folder icon 2751, at different angles and different orientations as shown in FIGS. 28C-28G and FIGS. 30A-30E. This may improve the visibility of the various icons such that more than one icon can be seen within the folder, such as the folder icon 2701 or 2751. The sequence of the shuffling of the icons may be random or may be in the order selected by a current sorting criteria, such as the name of the file or the date last used, etc. In certain embodiments, the folder icon, such as folder icon 2701 or 2751, may be displayed in any one of an icon view (selected through activation of the icon view user interface object 2330) or a list view, selected through activation of the list view user interface object 2331, or a column view, selected by activation of the column view user interface object 2332, or even a cover flow view, activated by selection of the cover flow view user interface object 2333. Hence, for example, the animation within the folder icon 2701, or the folder icon 2751, may appear in the cover flow view area 2318 to provide the user with an indication of the files and documents within a folder without even requiring the user to open the folder into another view or window.

Figure 30A:
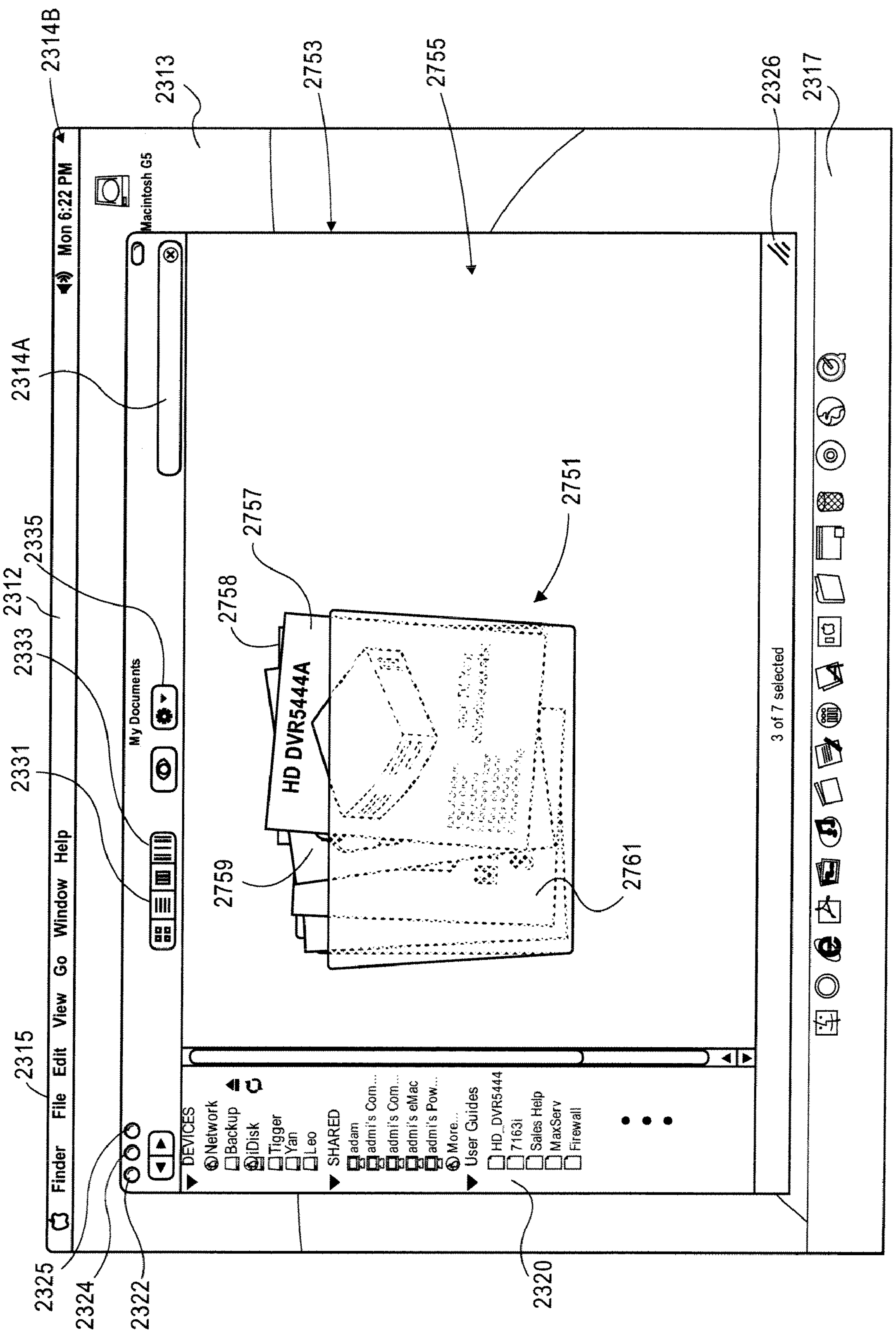
FIGS. 30A-30E show examples of user interfaces for animating thumbnails representing files within at least a partially transparent folder according to certain embodiments of the present invention.
Figure 30B:
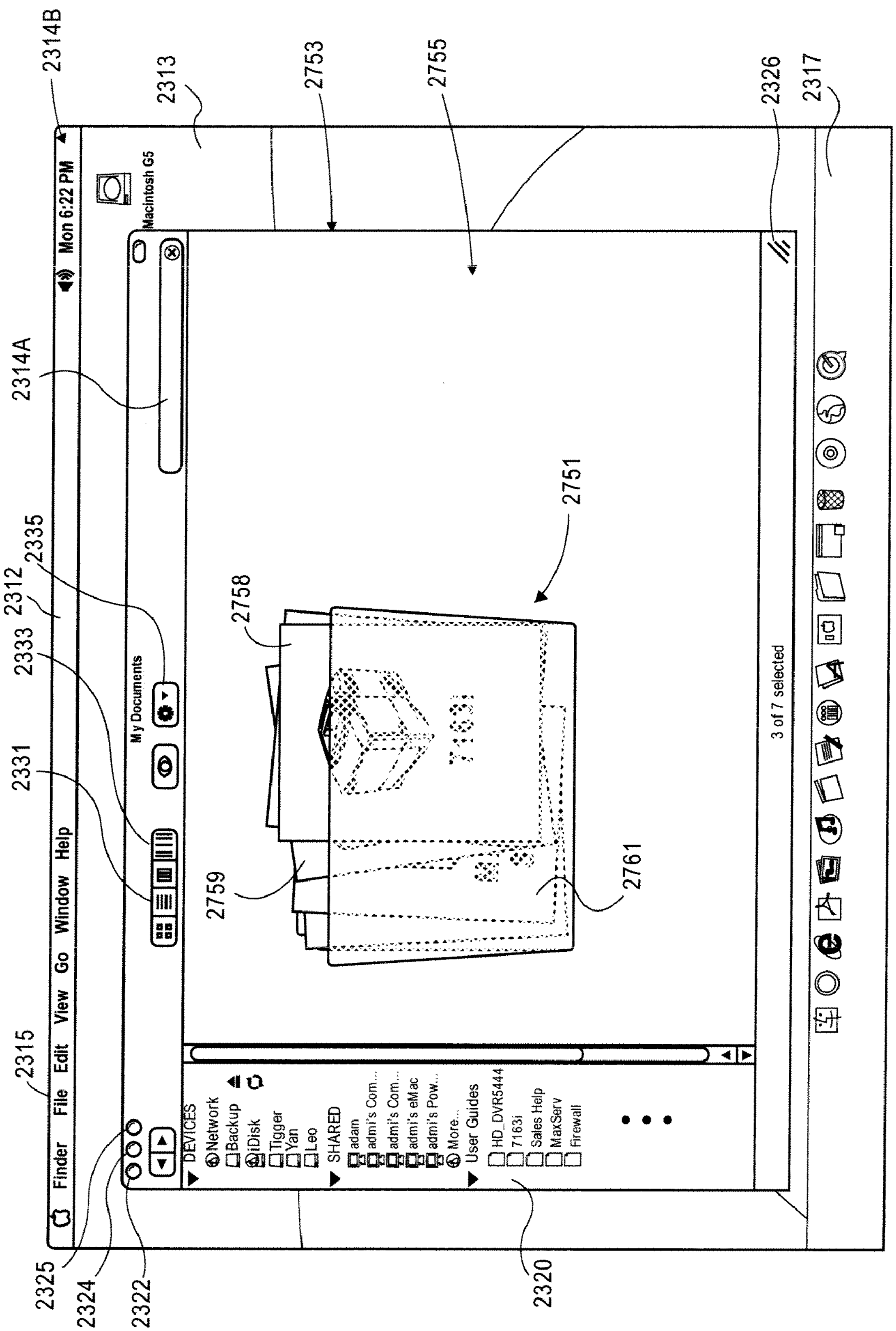
Figure 30C:
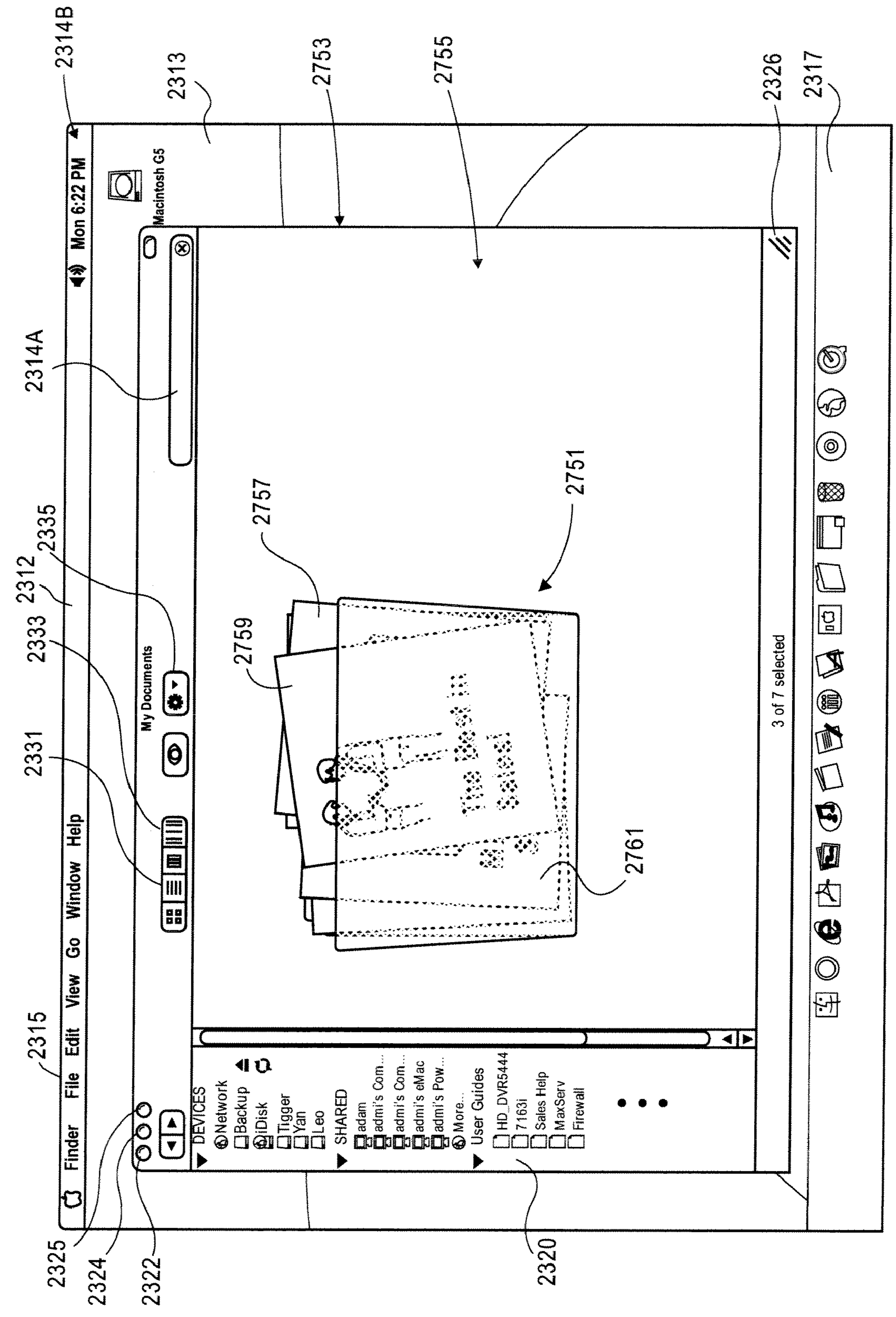
Figure 30D:
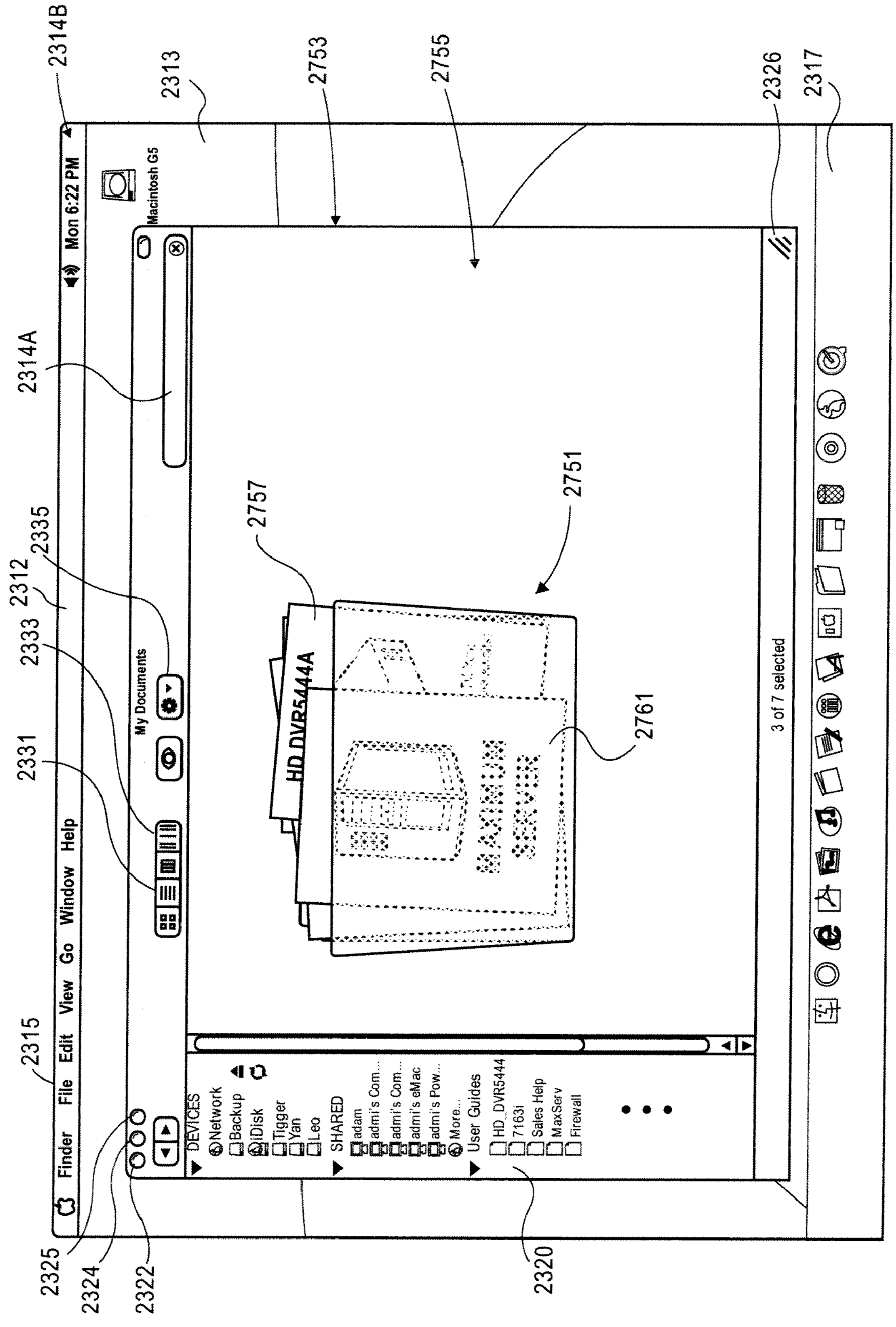
Figure 30E:
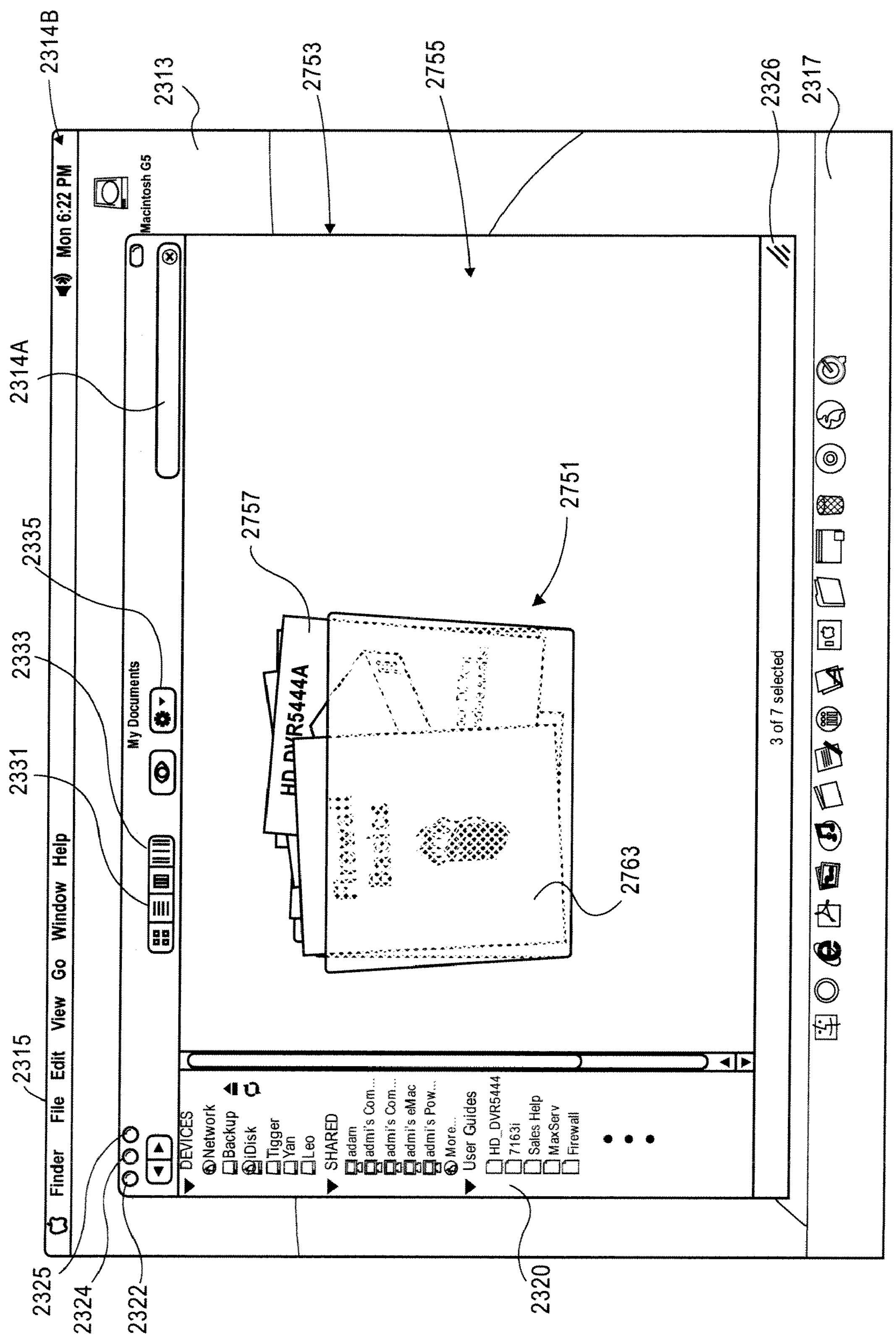

FIGS. 30A-30E illustrate the shuffling of thumbnails within a partially transparent folder which is the folder icon 2751. As shown in FIG. 30A, the thumbnail 2751 appears on top of the other thumbnails 2758, 2759, and 2761. Then, over time, the thumbnail 2758 appears on top of the rest of the thumbnails 2759 and 2761 and 2757, as shown in FIG. 30B. Then, over time, as shown in FIG. 30C, the thumbnail 2759 appears on top of the other thumbnails 2757 and 2761. Then, over time, the thumbnail 2761 appears on top of the other thumbnails, such as thumbnail 2757, which is beginning to return to the top as can be seen in FIG. 30D. In FIG. 30E, the thumbnail 2763 is shown on top of the other thumbnails, including thumbnail 2757, which is shown immediately behind the thumbnail 2763 as the sequence of the shuffling is nearing completion. The animation, such as the shuffling, may occur continuously over time or may occur once through the entire sequence of files within the folder. The animation may occur without user input automatically in response to displaying the folder, or may occur in response to user input, such as positioning the cursor over the folder or hovering the cursor over the folder or activating a command to cause the animation.

Figure 28B:
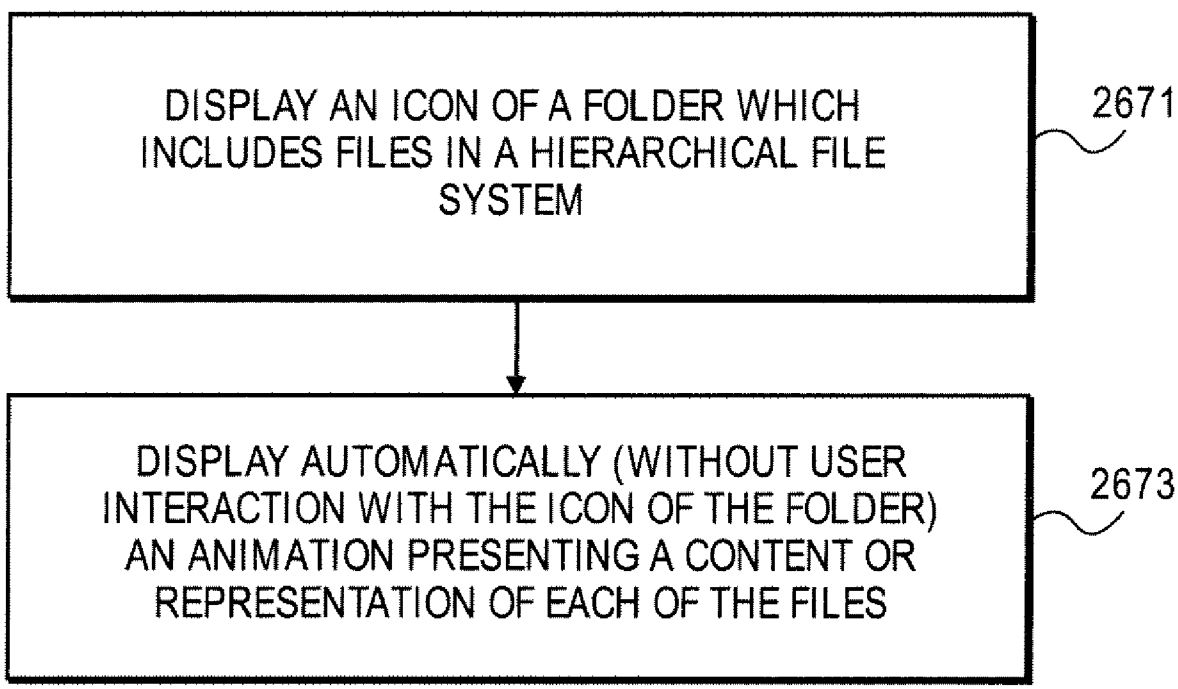
FIG. 28B is a flow chart showing another example of an animation of an icon in a folder according to other embodiments of the present invention.
Figure 28C:
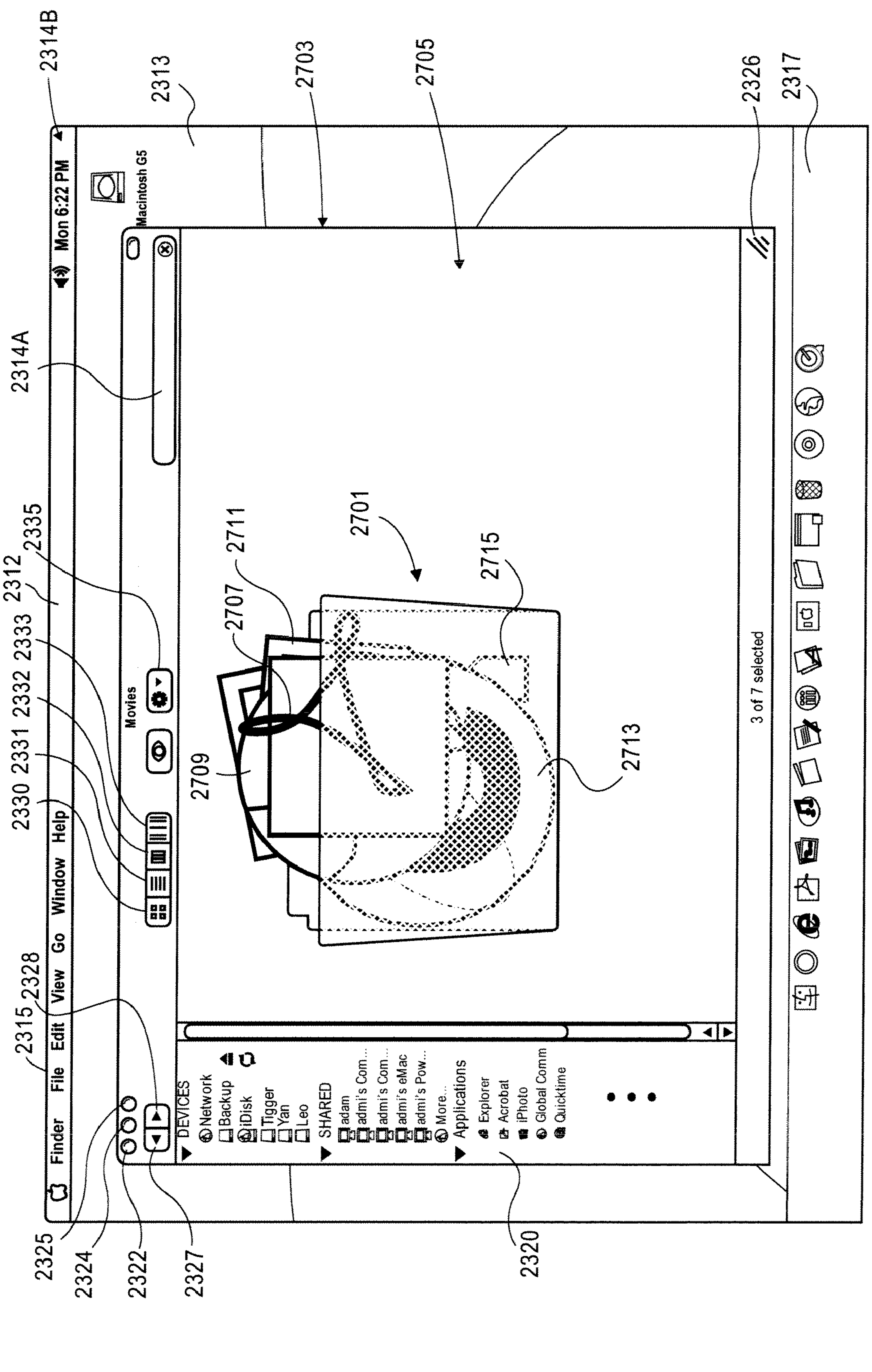
FIGS. 28C-28G provide examples of user interfaces showing one embodiment of animations of icons within a folder.
Figure 28D:
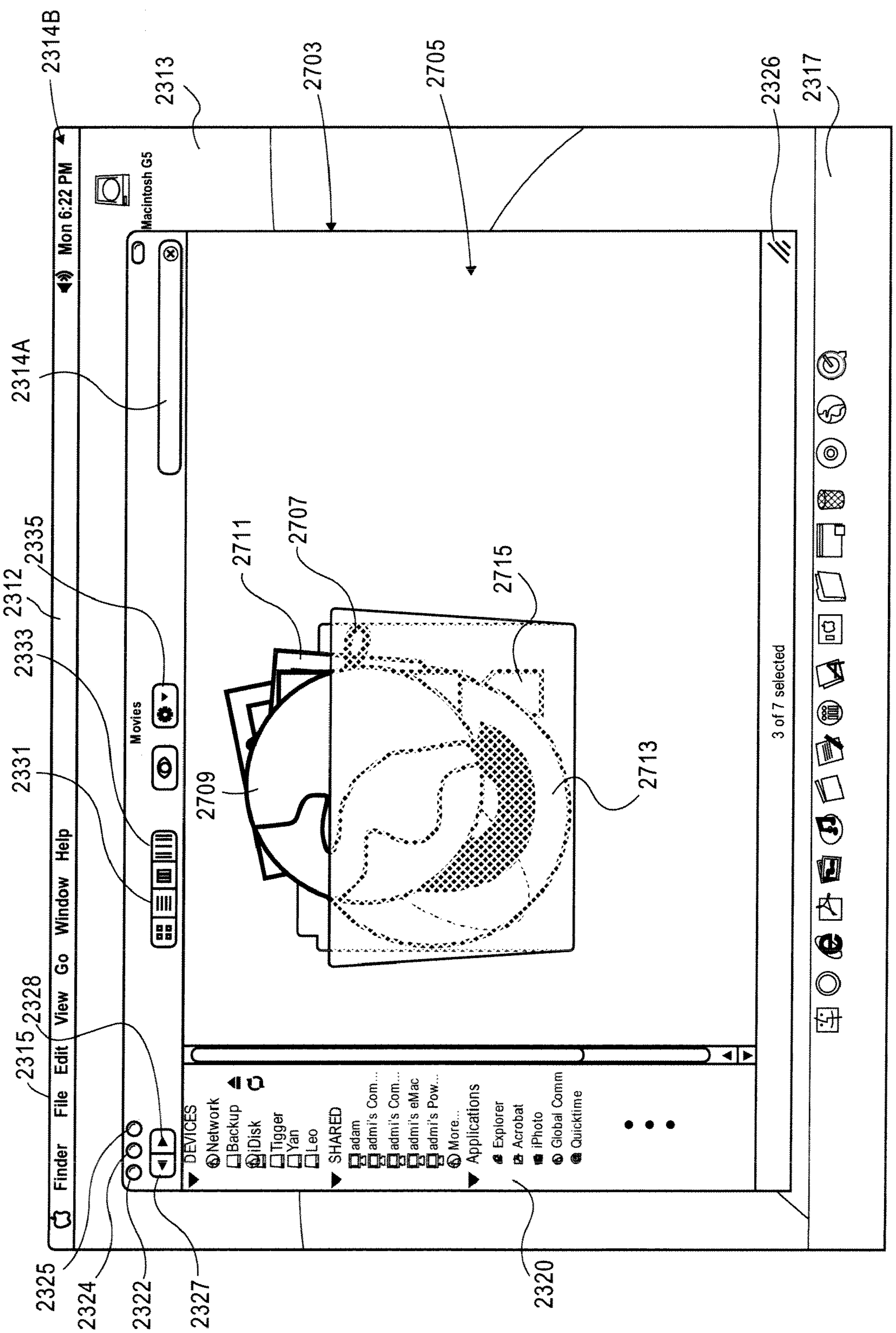
Figure 28E:
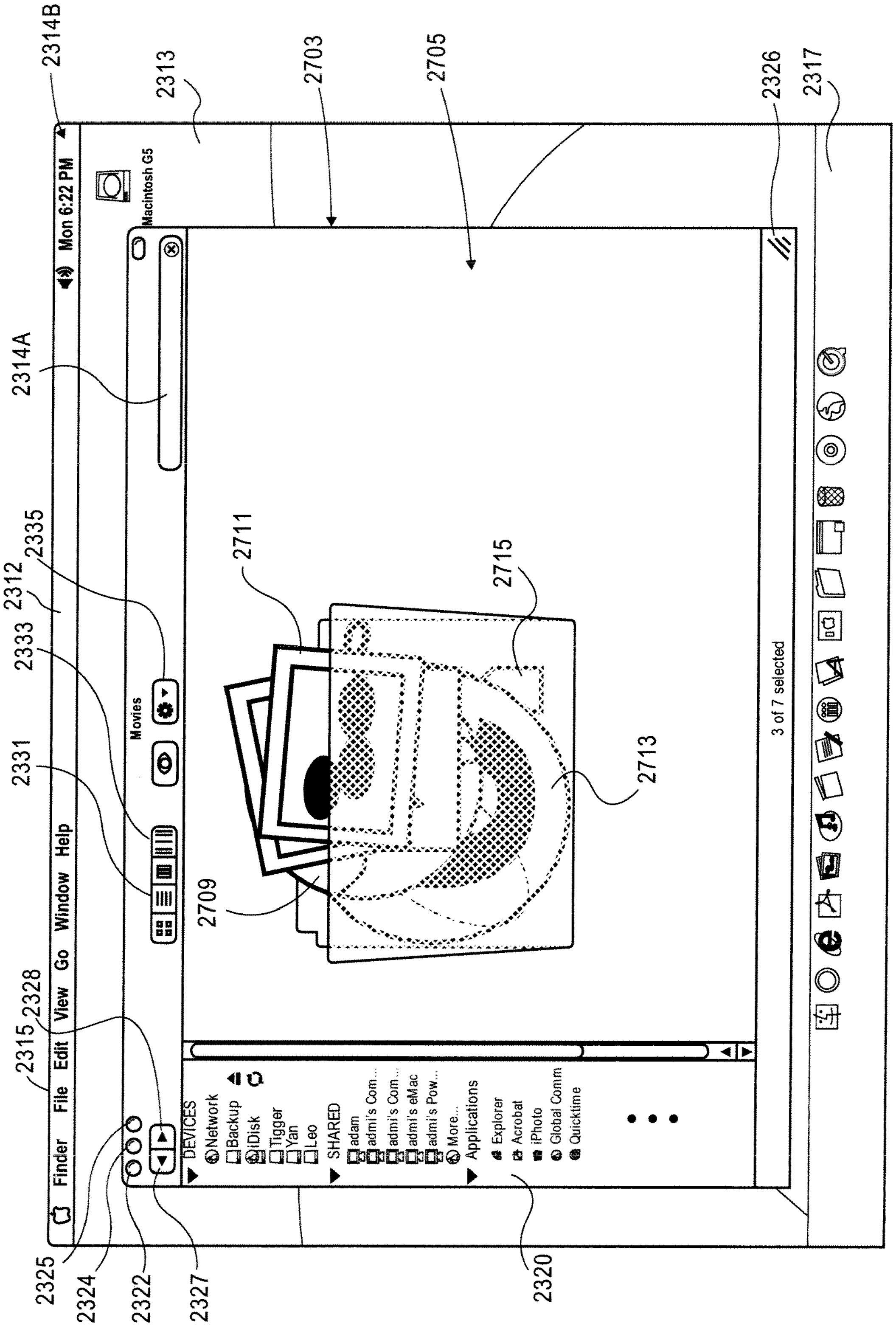
Figure 28F:
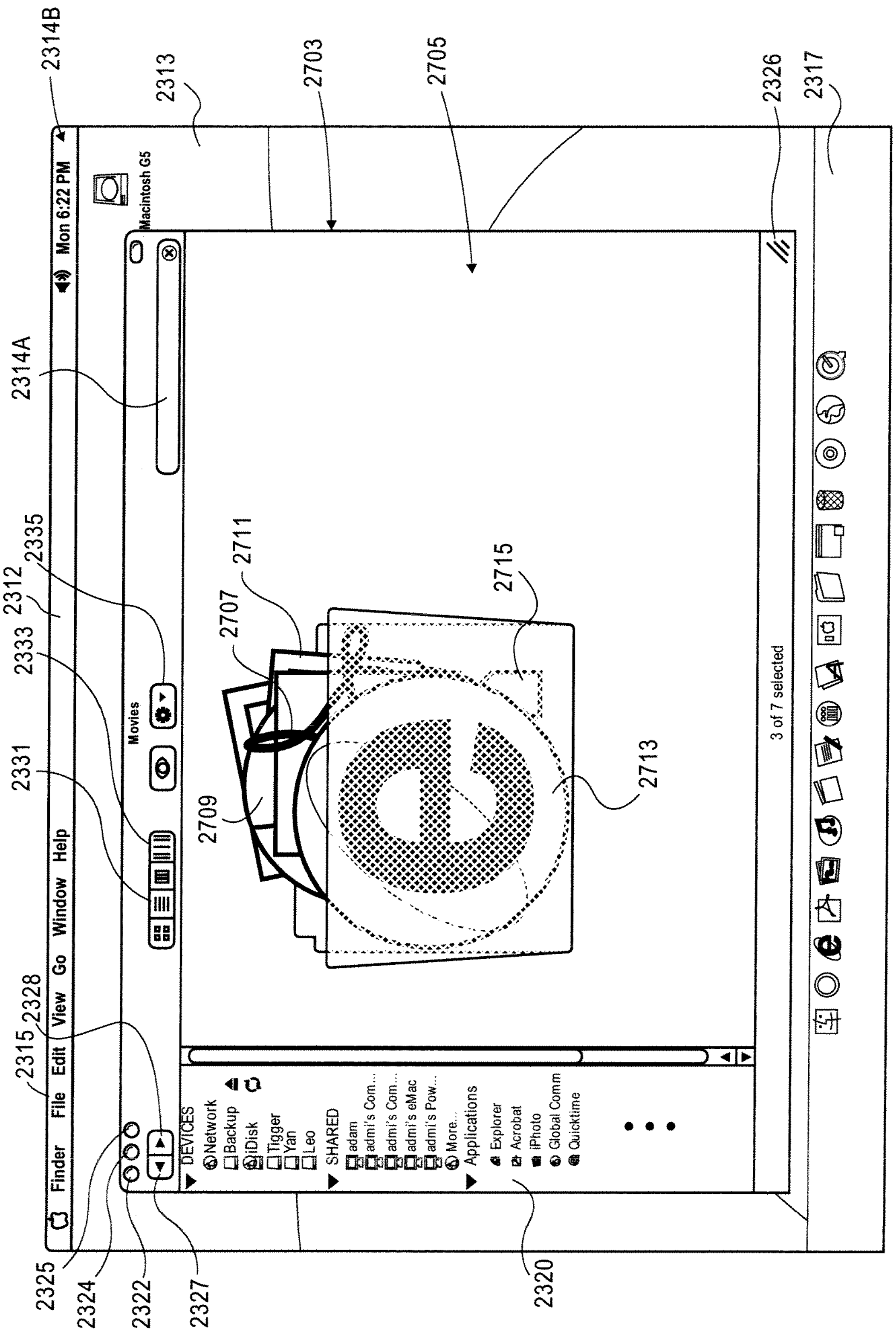
Figure 28G:
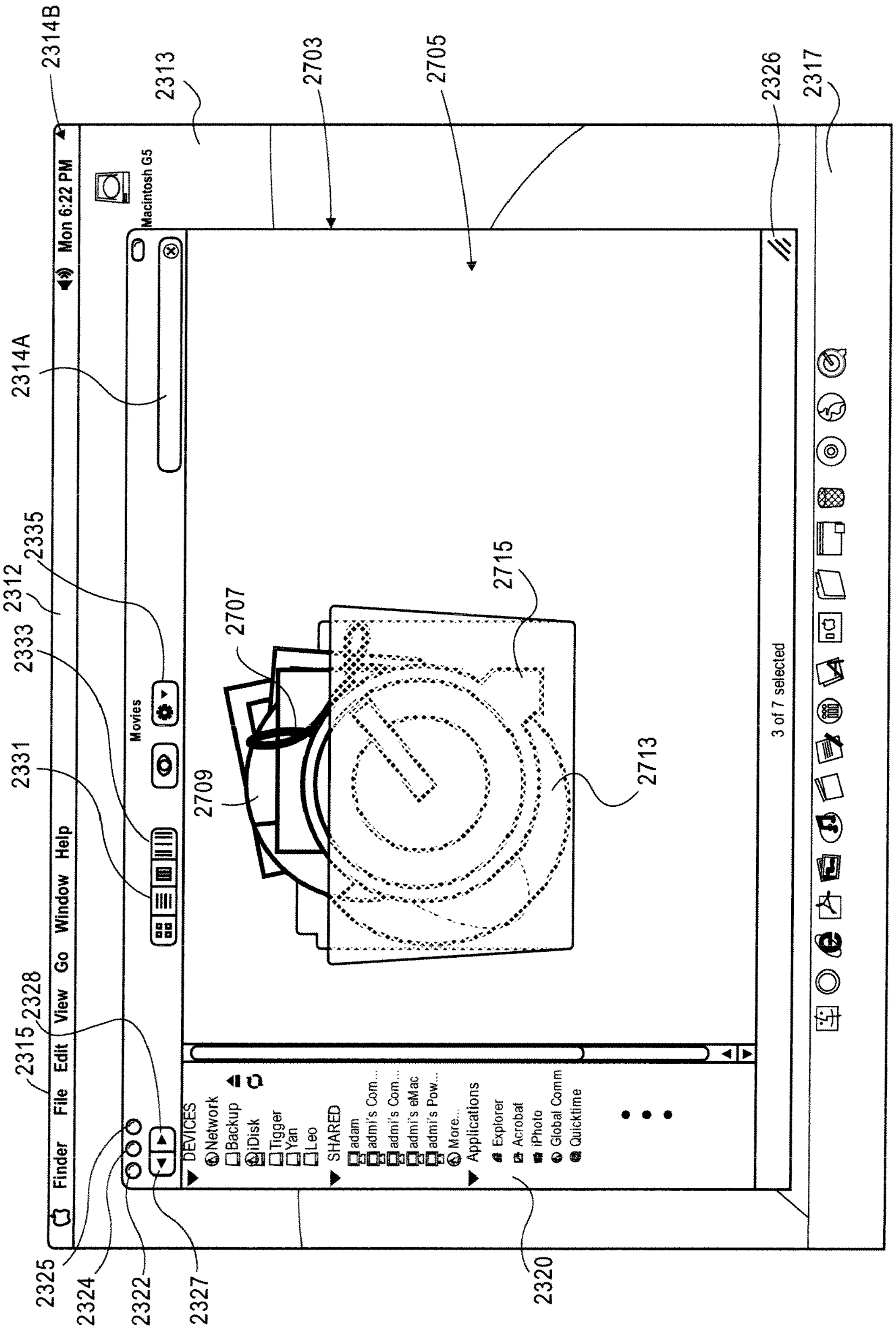

FIG. 28B represents an alternative method according to certain embodiments of the inventions. In operation 2671, the data processing system displays an icon of a folder which includes files in a hierarchical file system. The icon may be displayed in a file management software program, such as the Finder or Windows Explorer. In operation 2673, the data processing system may then display automatically (e.g. without user interaction with the icon of the folder) an animation presenting a content or representation of each of the files. This may occur in any one of the various views of a hierarchical file system, including a cover flow view, an icon view, a column view, or a list view as described above. The animation may involve shuffling, or rotating, or the other forms of animation described herein.

Figure 29A:
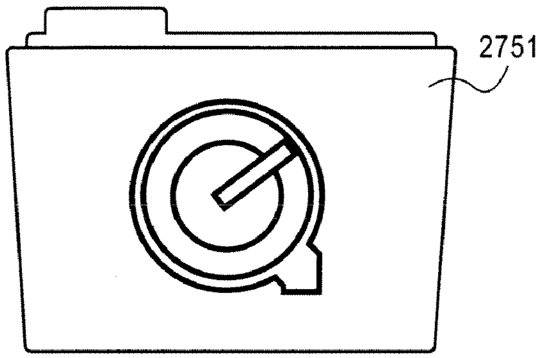
FIGS. 29A-29E show examples of animations on the cover of a folder.
Figure 29D:
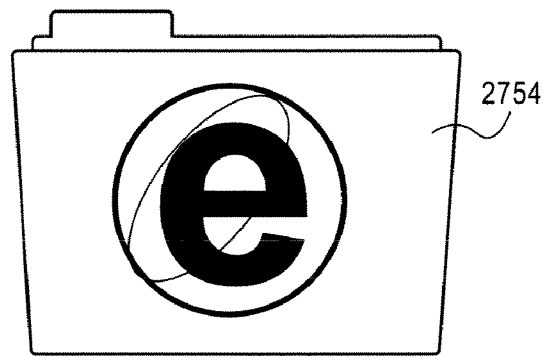
Figure 29B:
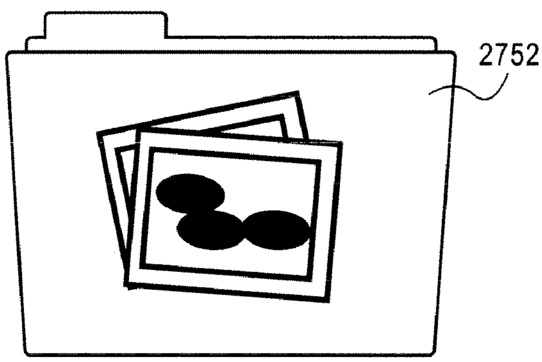
Figure 29E:
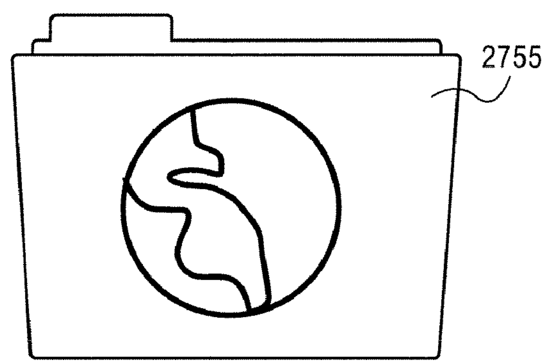
Figure 29C:
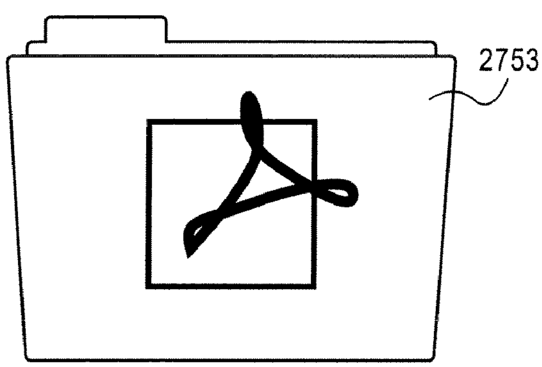

FIGS. 29F-29E represent another embodiment in which the folder animates over time to indicate to the user the content of the folder. In this case, the folder may not be transparent but rather is opaque and the icon is displayed on the face of the folder over time. Hence, the face of the folder begins as face 2751 and changes over time through faces 2752, 2753, 2754, 2755.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:

performing, at a computing device, a search using a search query, wherein the search is through indexed content and metadata associated with a plurality of files in a hierarchical file system;

generating search results;

determining an associated file type for each file in the search results;

using the file type to identify a plug-in capable of processing the content in the file associated with that file type;

using the plug-in for each file to process the content for that file and dynamically generate a preview view entry for that file, wherein the preview view entry includes a display of the content of the file or an icon representing the content of the file;

generating a preview view including one or more preview view entries in a preview view area;

generating a list view including one or more list view entries in a list view area;

linking the list view and the preview view together such that scrolling or sorting within either view area concurrently causes the same scrolling or sorting within the other view area; and concurrently displaying the same search results in both view areas.

2. The method of claim 1, wherein an interactive preview view entry is transformable into a non-interactive preview view entry, and wherein a non-interactive preview view entry is transformable into an interactive preview view entry.

3. The method of claim 1, wherein each list view entry has a corresponding preview view entry, and wherein when a list view entry in the list view area is selected, the corresponding preview view entry in the preview view area is also selected.

4. The method of claim 1, wherein each preview view entry has a corresponding list view entry, and wherein when a preview view entry in the preview view area is selected, the corresponding list view entry in the list view area is also selected.

5. The method of claim 1, wherein the list view area and preview area are separate and distinct areas, and wherein when a preview view entry is interactive, the preview view entry includes one or more interactive controls.

6. The method of claim 5, wherein file types include text files, PDF files, picture files, web page files, document files, spreadsheet files, sound files, music files, and movie files.

7. A system, comprising:

one or more processors;

a non-transitory computer-readable storage medium containing instructions configured to cause the one or more processors to perform operations, including:

performing a search using a search query, wherein the search is through indexed content and metadata associated with a plurality of files in a hierarchical file system;

generating search results;

determining an associated file type for each file in the search results;

using the file type to identify a plug-in capable of processing the content in the file associated with that file type;

using the plug-in for each file to process the content for that file and dynamically generate a preview view entry for that file, wherein the preview view entry includes a display of the content of the file or an icon representing the content of the file;

generating a preview view including one or more preview view entries in a preview view area;

generating a list view including one or more list view entries in a list view area;

linking the list view and the preview view together such that scrolling or sorting within either view area concurrently causes the same scrolling or sorting within the other view area; and concurrently displaying the same search results in both view areas.

8. The system of claim 7, wherein an interactive preview view entry is transformable into a non-interactive preview view entry, and wherein a non-interactive preview view entry is transformable into an interactive preview view entry.

9. The system of claim 7, wherein each list view entry has a corresponding preview view entry, and wherein when a list view entry in the list view area is selected, the corresponding preview view entry in the preview view area is also selected.

10. The system of claim 7, wherein each preview view entry has a corresponding list view entry, and wherein when a preview view entry in the preview view area is selected, the corresponding list view entry in the list view area is also selected.

11. The system of claim 7, wherein the list view area and preview area are separate and distinct areas, and wherein when a preview view entry is interactive, the preview view entry includes one or more interactive controls.

12. The system of claim 11, wherein file types include text files, PDF files, picture files, web page files, document files, spreadsheet files, sound files, music files, and movie files.

13. A computer-program product, embodied in a non-transitory machine-readable storage medium, including instructions configured to cause a data processing apparatus to:

perform a search using a search query, wherein the search is through indexed content and metadata associated with a plurality of files in a hierarchical file system;

generate search results;

determine an associated file type for each file in the search results;

use the file type to identify a plug-in capable of processing the content in the file associated with that file type;

use the plug-in for each file to process the content for that file and dynamically generate a preview view entry for that file, wherein the preview view entry includes a display of the content of the file or an icon representing the content of the file;

generate a preview view including one or more associated preview view entries in a preview view area;

generate a list view including one or more list view entries in a list view area;

link the list view and the preview view together such that scrolling or sorting within either view area concurrently causes the same scrolling or sorting within the other view area; and concurrently display the same search results in both view areas.

14. The computer-program product of claim 13, wherein an interactive preview view entry is transformable into a non-interactive preview view entry, and wherein a non-interactive preview view entry is transformable into an interactive preview view entry.

15. The computer-program product of claim 13, wherein each list view entry has a corresponding preview view entry, and wherein when a list view entry in the list view area is selected, the corresponding preview view entry in the preview view area is also selected.

16. The computer-program product of claim 13, wherein each preview view entry has a corresponding list view entry, and wherein when a preview view entry in the preview view area is selected, the corresponding list view entry in the list view area is also selected.

17. The computer-program product of claim 13, wherein the list view area and preview area are separate and distinct areas, and wherein when a preview view entry is interactive, the preview view entry includes one or more interactive controls.

18. The method of claim 17, wherein file types include text files, PDF files, picture files, web page files, document files, spreadsheet files, sound files, music files, and movie files.

* * * * *

UNITED STATES PATENT AND TRADEMARK OFFICE

CERTIFICATE OF CORRECTION

PATENT NO. : 8,201,096 B2
APPLICATION NO. : 11/760759
DATED : June 12, 2012
INVENTOR(S) : Julien Robert et al.

It is certified that error appears in the above-identified patent and that said Letters Patent is hereby corrected as shown below:

In the Claims:

Column 52, line 24, please delete “associated”.

Signed and Sealed this
Eighteenth Day of December, 2012

David J. Kappos
*Director of the United States Patent and Trademark Office*